US009612155B2

(12) United States Patent
Ho et al.

(10) Patent No.: US 9,612,155 B2
(45) Date of Patent: Apr. 4, 2017

(54) CURVED GRATING SPECTROMETER AND WAVELENGTH MULTIPLEXER OR DEMULTIPLEXER WITH VERY HIGH WAVELENGTH RESOLUTION

(71) Applicant: OptoNet, Inc., Evanston, IL (US)

(72) Inventors: Seng-Tiong Ho, Wheeling, IL (US); Yingyan Huang, Wilmette, IL (US)

(73) Assignee: Electronic Photonic IC Inc. (EPIC Inc.), Wheeling, IL (US)

( * ) Notice: Subject to any disclaimer, the term of this patent is extended or adjusted under 35 U.S.C. 154(b) by 0 days.

(21) Appl. No.: 14/482,615

(22) Filed: Sep. 10, 2014

(65) Prior Publication Data

US 2015/0070697 A1    Mar. 12, 2015

(51) Int. Cl.
| | |
|---|---|
| *G01J 3/28* | (2006.01) |
| *G01J 3/18* | (2006.01) |
| *G01J 3/02* | (2006.01) |
| *G02B 6/10* | (2006.01) |
| *G01J 3/20* | (2006.01) |
| *G01J 3/22* | (2006.01) |

(Continued)

(52) U.S. Cl.
CPC .............. *G01J 3/18* (2013.01); *G01J 3/0256* (2013.01); *G01J 3/20* (2013.01); *G01J 3/22* (2013.01); *G01J 3/28* (2013.01); *G02B 6/10* (2013.01); *G02B 6/29326* (2013.01); *G02B 6/29328* (2013.01); *H04B 10/07* (2013.01)

(58) Field of Classification Search
CPC .... G01J 3/18; G01J 3/0256; G01J 3/20; G01J 3/22; G01J 3/28; G01J 3/04; G02B 6/29326; G02B 6/29328; H04B 10/07

USPC .......................................................... 356/328
See application file for complete search history.

(56) References Cited

U.S. PATENT DOCUMENTS

| | | |
|---|---|---|
| 4,027,975 A | 6/1977 | Turner et al. |
| 4,140,394 A | 2/1979 | Roos |
| | (Continued) | |

OTHER PUBLICATIONS

U.S. Appl. No. 60/242,219, filed Oct. 20, 2000, Ooi et al.
(Continued)

*Primary Examiner* — Tarifur Chowdhury
*Assistant Examiner* — Jonathon Cook
(74) *Attorney, Agent, or Firm* — DeWitt Ross & Stevens S.C.

(57) ABSTRACT

The present application discloses a system comprising a compact curved grating (CCG) and its associated compact curved grating spectrometer (CCGS) or compact curved grating wavelength multiplexer/demultiplexer (WMDM) module and a method for making the same. The system is capable of achieving a very small (resolution vs. size) RS factor. The location of the entrance slit and detector can be adjusted in order to have the best performance for a particular design goal. The initial groove spacing is calculated using a prescribed formula dependent on operation wavelength. The location of the grooves is calculated based on two conditions. The first one being that the path-difference between adjacent grooves should be an integral multiple of the wavelength in the medium to achieve aberration-free grating focusing at the detector or a first anchor output slit even with large beam diffraction angle from the entrance slit or input slit, the second one being specific for a particular design goal of a curved-grating spectrometer.

16 Claims, 38 Drawing Sheets

(51) Int. Cl.
   *G02B 6/293* (2006.01)
   *H04B 10/07* (2013.01)

(56) References Cited

U.S. PATENT DOCUMENTS

| | | |
|---|---|---|
| 4,380,393 A | 4/1983 | Nagata et al. |
| 4,571,074 A | 2/1986 | Thevenon |
| 4,820,046 A | 4/1989 | Sohma et al. |
| 5,066,127 A | 11/1991 | Schwenker |
| 5,114,231 A | 5/1992 | Gautherin et al. |
| 6,169,838 B1 | 1/2001 | He et al. |
| 9,916,701 | 7/2001 | Ooi et al. |
| 6,339,662 B1 | 1/2002 | Koteles et al. |
| 6,878,562 B2 | 4/2005 | Ooi et al. |
| 7,283,233 B1 | 10/2007 | Ho et al. |
| 8,462,338 B1 * | 6/2013 | Ho .................. H04B 10/07 356/328 |
| 2004/0196458 A1 | 10/2004 | Shimizu et al. |

OTHER PUBLICATIONS

U.S. Appl. No. 60/430,507, filed Dec. 3, 2002, Ooi et al.
International Search Report and Written Opinion for PCT/US2015/049386 dated Dec. 22, 2015.

\* cited by examiner

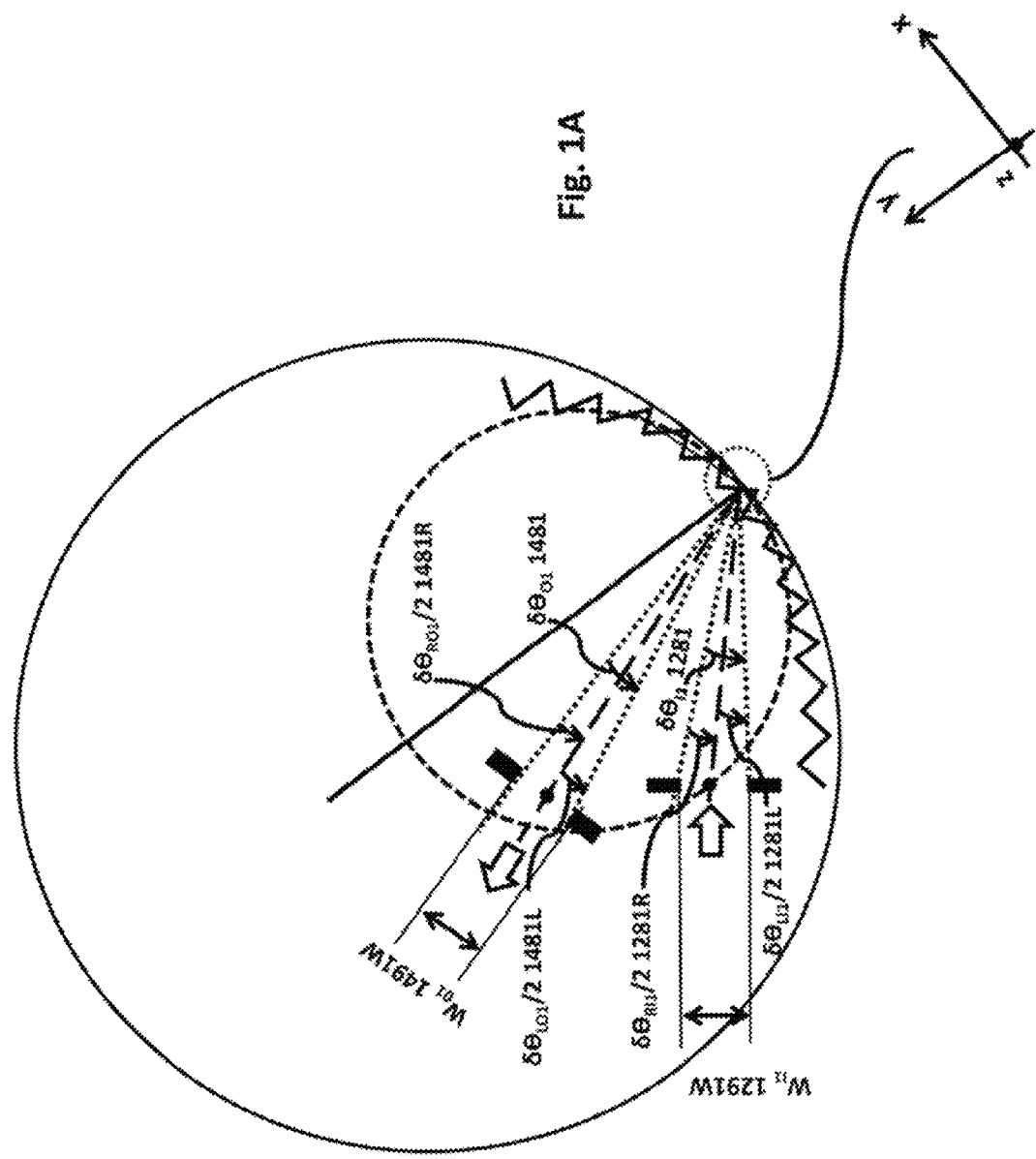

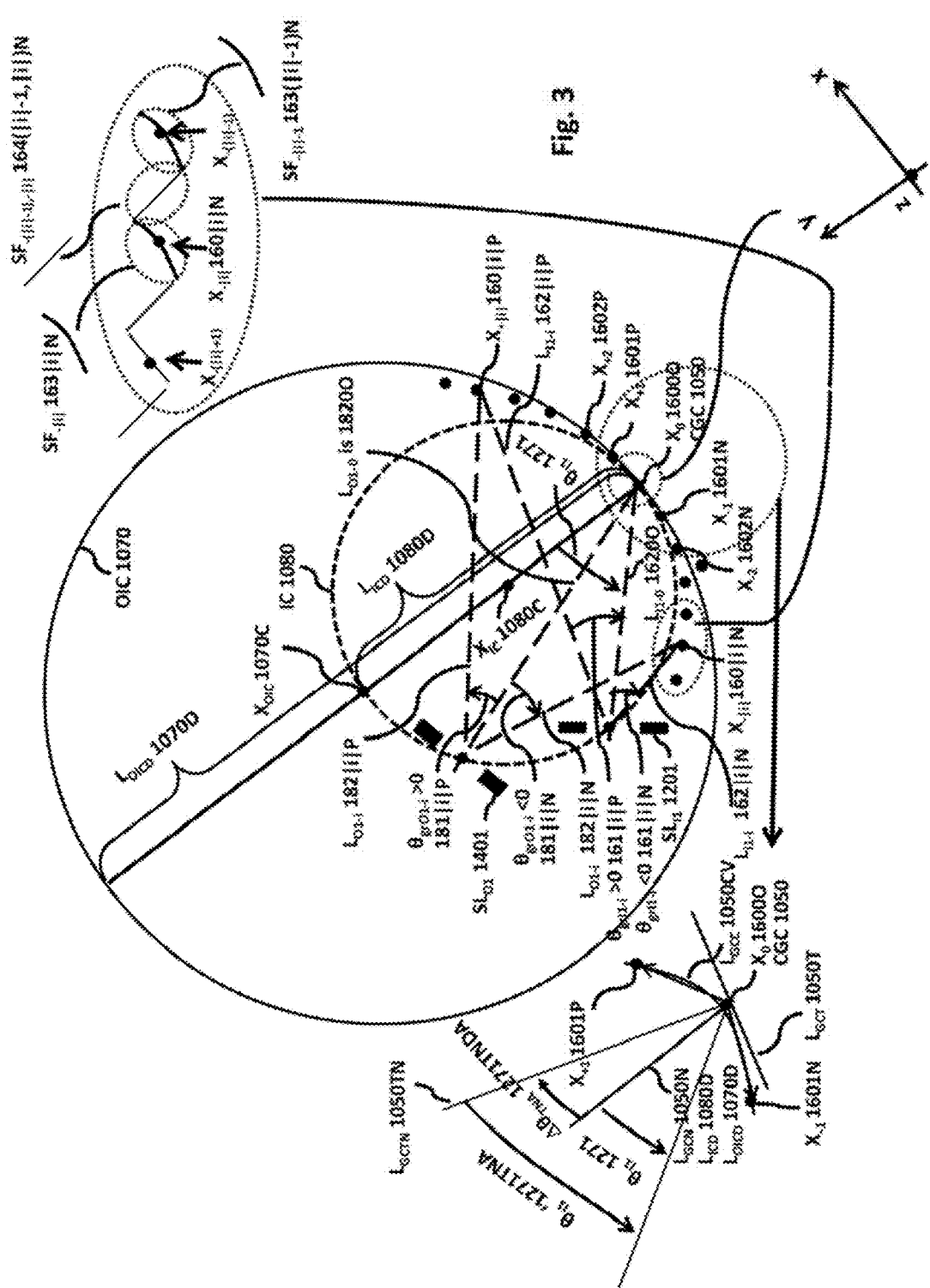

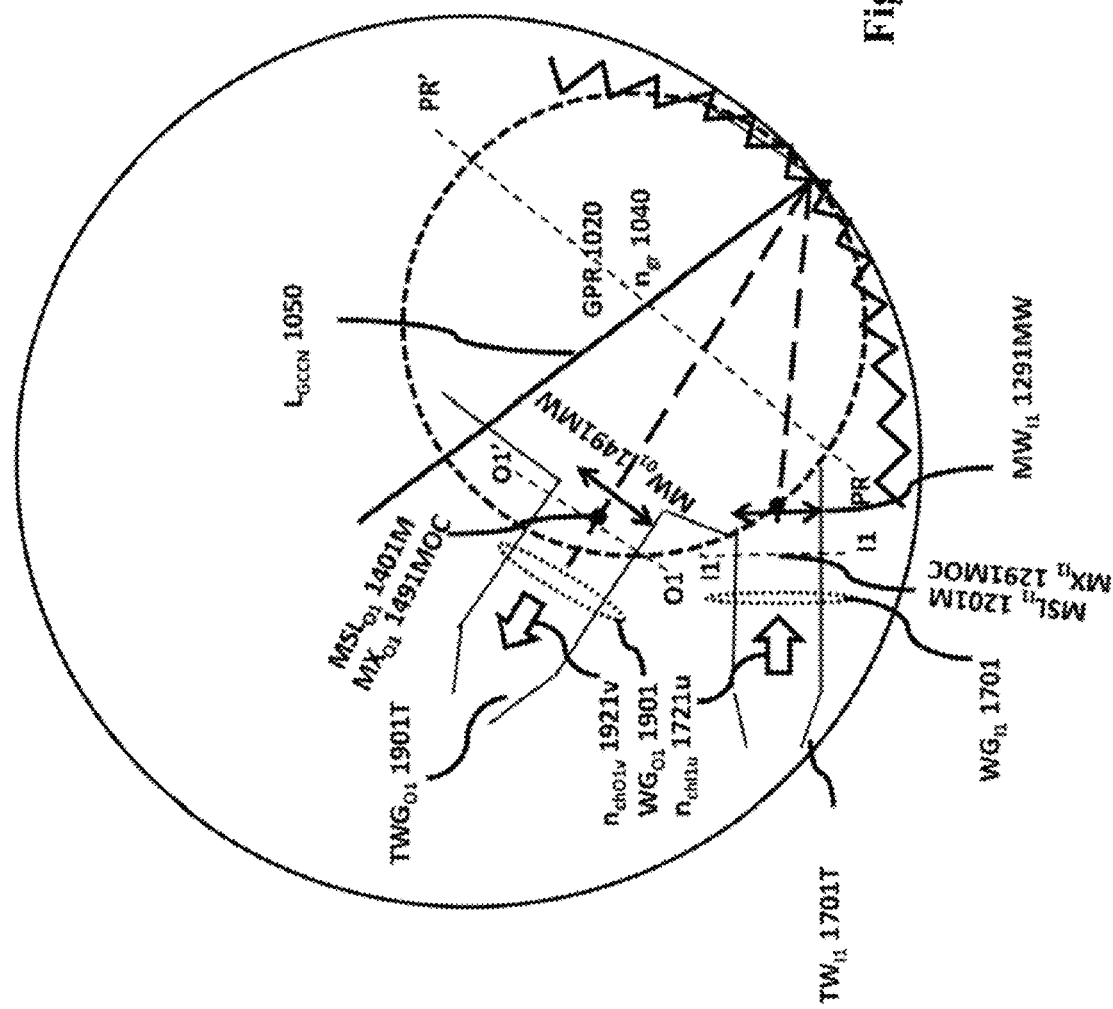

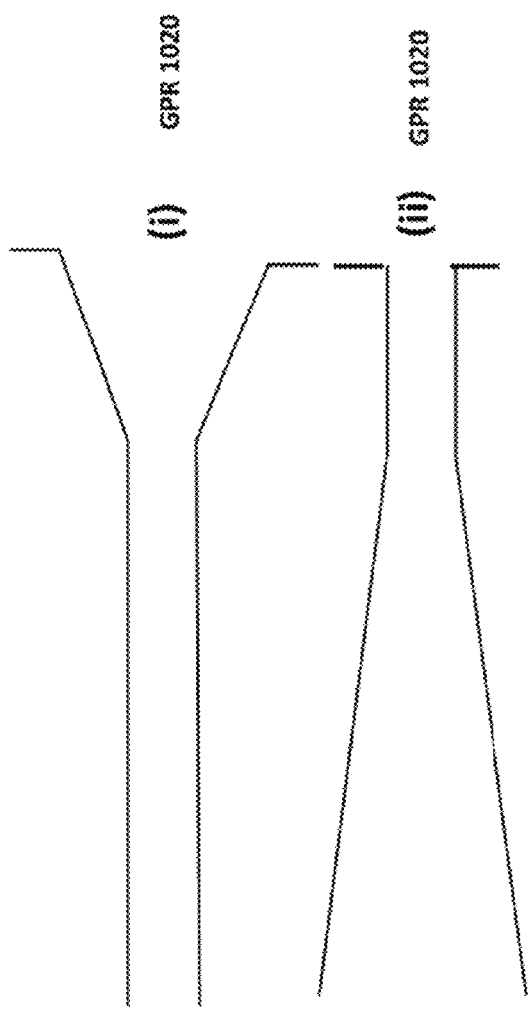
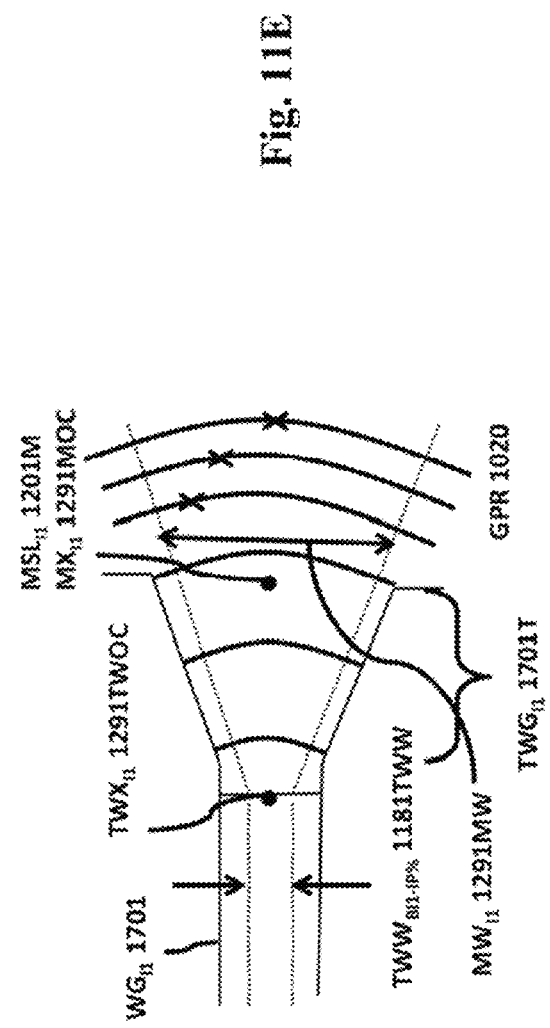
Fig. 11E

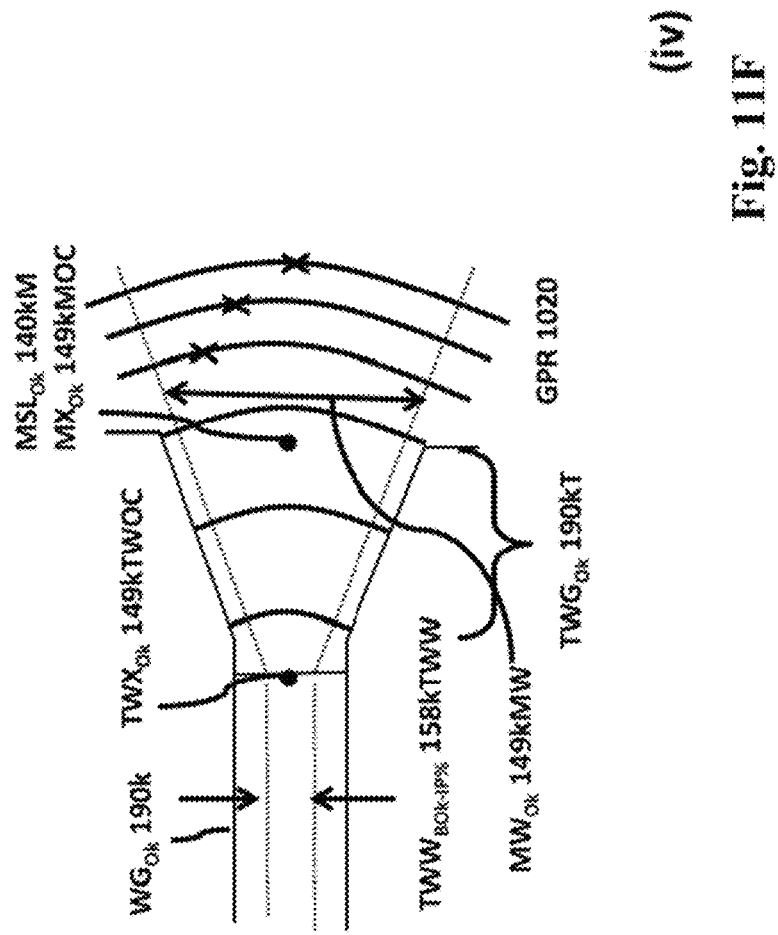
Fig. 11F (iv)

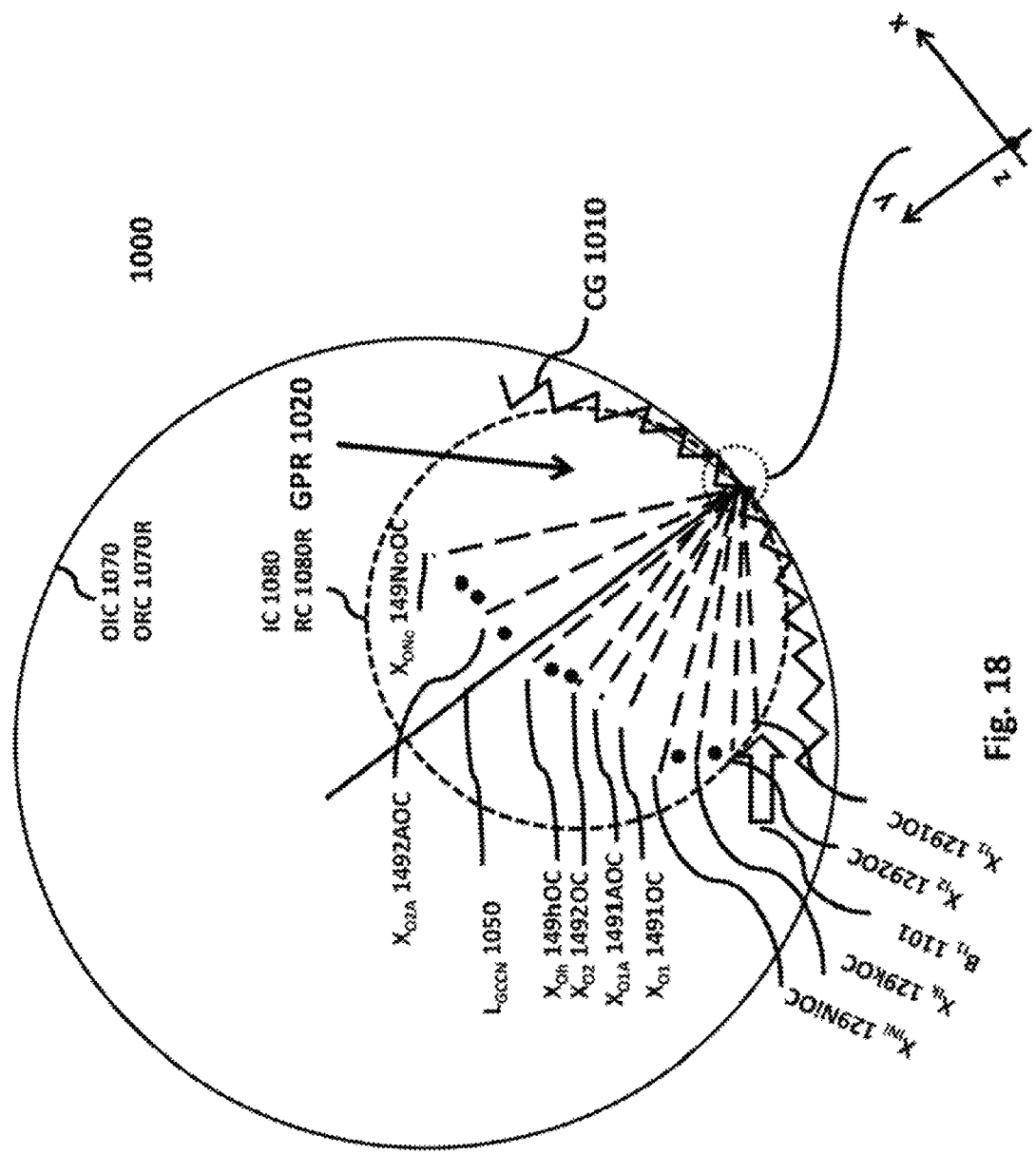

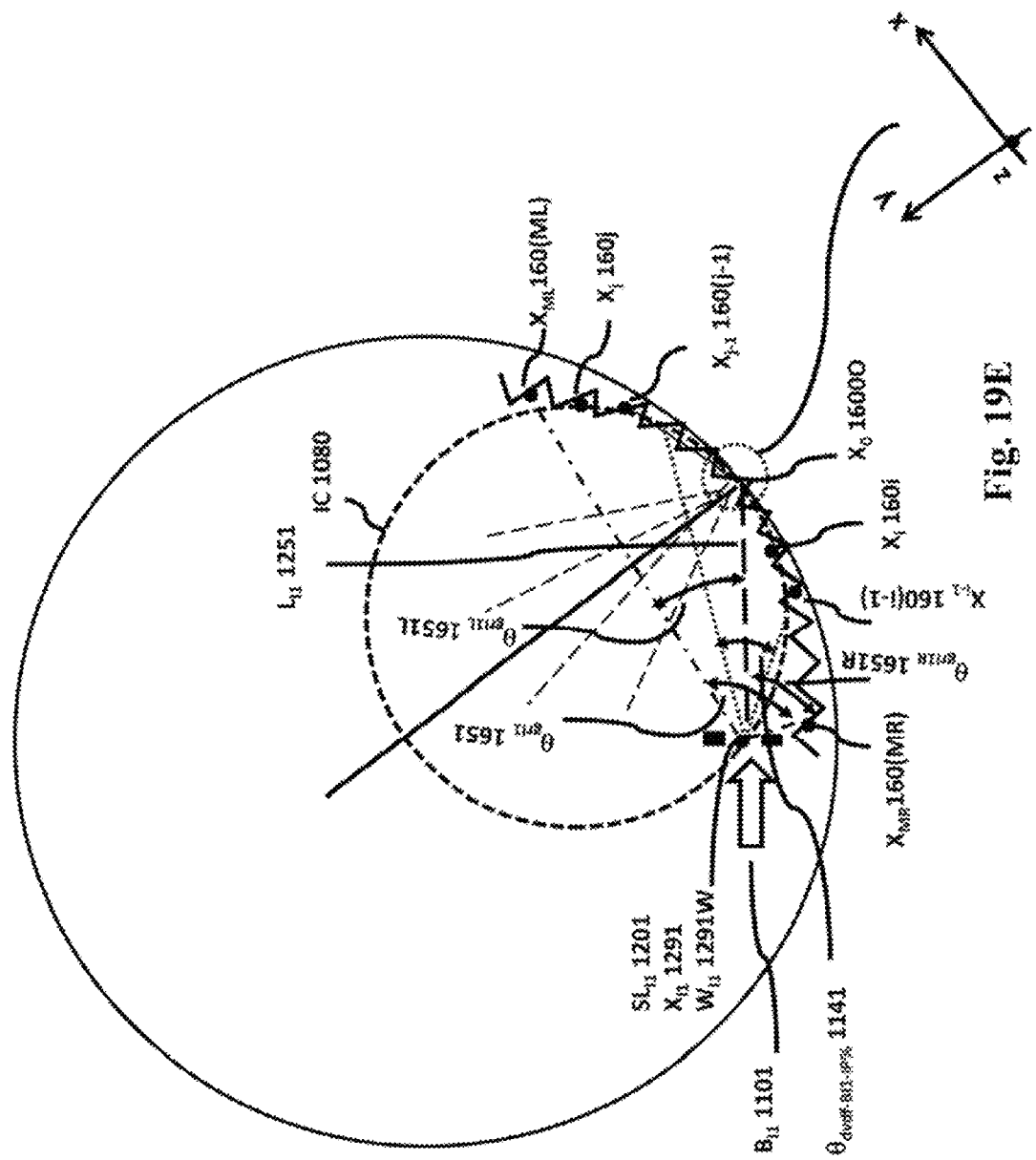

CURVED GRATING SPECTROMETER AND WAVELENGTH MULTIPLEXER OR DEMULTIPLEXER WITH VERY HIGH WAVELENGTH RESOLUTION

BACKGROUND OF THE INVENTION

Optical gratings are well known in the art and are used to disperse optical spectra spatially. Such gratings are commonly used in optical spectrometers to analyze the spectral composition of an optical beam. There is always a tradeoff between the length of an optical spectrometer and its resolution. Thus, if a higher wavelength resolution is required, the length required is also longer. Consider an example of a typical 1-meter long grating spectrometer in the market, which has a typical wavelength resolution of about $\Delta\lambda_{SM}$=0.1 nm at a center operating wavelength $\lambda_{SM}$=1000 nm or $\Delta\lambda_{SM}/\lambda_{SM}$=$10^{-4}$. The dimensionless quantity for the length of the spectrometer $L_{SM}$ is $L_{SM}/\lambda_{SM}$ and $L_{SM}/\lambda_{SM}$=$10^6$ in this example. The dimensionless product of the relative resolution $\Delta\lambda_{SM}/\lambda_{SM}$ and the relative physical size $L_{SM}/\lambda_{SM}$ of the spectrometer is dependent on the design of the spectrometer.

Resolution vs Size/Area Factor

More precisely, consider a curved grating spectrometer device 1000 shown in FIG. 1 with a curved grating CG 1010 and a wave or beam propagating region between the input slit $SL_{I1}$ 1201 and the grating or the grating and the output slit $SL_{O1}$ 1401 called grating-propagating region GPR 1020. If the spectrometer has a width $W_{SM}$ 1002 and a length $L_{SM}$ 1003, then the dimensionless product of interest is:

$$RS_{SM}=(\Delta\lambda_{SM}/\lambda_{SM})*[(W_{SM}/\lambda_{SM})*(L_{SM}/\lambda_{SM})]^{0.5}, \quad (1)$$

where "*" denotes numerical multiplication. This factor ($RS_{SM}$) is referred to here as the "resolution vs size" factor of the spectrometer. The square of $RS_{SM}$ factor is called "resolution vs area" factor:

$$RA_{SM}=(RS_{SM})^2. \quad (2)$$

The factors $RA_{SM}$ and $RS_{SM}$ basically measure the compactness of a spectrometer for a given spectral resolution power. In this example, if $W_{SM}$=$L_{SM}$=1 m, then $RS_{SM}$=100 and $RA_{SM}$=$10^4$. The smaller the $RS_{SM}$ and $RA_{SM}$ value, the more compact is the spectrometer.

Only a few conventional spectrometers have $RA_{SM}$ factor less than about 100 (or $RS_{SM}$<10). This is primarily because of the various limitations in the prior arts (as will be described below). In many photonic integrated circuit, electronic-photonic integrated circuit, and fiber-optic applications, $RA_{SM}$ factors of smaller than about $RA_{SM}$=1 down to $RA_{SM}$=0.01 are desirable. These cannot be achieved via the methods in the prior arts.

Furthermore, for many applications in photonic integrated circuits, electronic-photonic integrated circuits, and fiber-optics, the background extinction of the spectral power outside the wavelength range that is supposed to be detected is important, which measures the relative optical power from outside the detection wavelength range that is scattered into the output slit or photodetector of the spectrometer.

Spectral Output Power Efficiency

A parameter that measures such unwanted background scattering is the "adjacent-channel power extinction ratio". As shown by FIGS. 1 and 1B, assuming the input light at an input slit labeled as slit "$SL_{I1}$" 1201 for which "I1" labels "input" "1" has an optical spectrum with optical power spectral density $PS_{I1}(\lambda)$ 1131 at wavelength $\lambda$. Let $\lambda_{I1-O1}$ 1321 be the center spectral wavelength that goes from the spectrometer's input slit $SL_{I1}$ to the spectrometer's output slit labeled as output slit "$SL_{O1}$" 1401. Let the optical power spectrum entering or being detected at output slit $SL_{O1}$ 1401 be $PS_{I1-O1}(\lambda)$ 1331. $PS_{I1-O1}(\lambda)$ 1331 is then given in terms of the spectral density of the input beam $PS_{I1}(\lambda)$ by:

$$PS_{I1-O1}(\lambda)=\eta_{effI1-O1}(\lambda)*PS_{I1}(\lambda). \quad (3)$$

The factor $\eta_{effI1-O1}(\lambda_M)$ is the efficiency of passing or detecting the power of the input beam from input slit $SL_{I1}$ at the output slit $SL_{O1}$ at wavelength $\lambda_M$, assuming that the input beam is basically a monochromatic light source at $\lambda_M$ (e.g. a narrow-bandwidth laser light). The factor $\eta_{effI1-O1}(\lambda_M)$ is called the "spectral power output efficiency".

As shown in FIG. 1B, the power at input slit SL 1201 over a small spectral bandwidth $\Delta\lambda$ centered at wavelength $\lambda_A$ (small comparing to the spectral bandwidth of $PS_{I1-O1}(\lambda)$ at $\lambda_A$ or more precisely, small enough so that $PS_{I1-O1}(\lambda)$ at $\lambda_A$ does not change much over the wavelength bandwidth $\Delta\lambda$), denoted as $P_{I1}(\lambda_A; \Delta\lambda)$ 1131 DL, is given by:

$$P_{I1}(\lambda_A; \Delta\lambda)=PS_{I1}(\lambda_A)*\Delta\lambda. \quad (4A)$$

Let the total optical power entering or being detected at output slit $SL_{O1}$ 1401 over a small spectral bandwidth $\Delta\lambda$ centered at wavelength $\lambda_A$ for the beam from input slit $SL_{I1}$ be $P_{I1-O1}(\lambda_A; \Delta\lambda)$ 1331 DL. $P_{I1-O1}(\lambda_A; \Delta\lambda)$ is then given by $PS_{I1-O1}(\lambda_A)*\Delta\lambda=\eta_{effI1-O1}(\lambda)* PS_{I1}(\lambda)\Delta\lambda$ according to Eq. (3). It is also given by $\eta_{effI1-O1}(\lambda_A)*P_{I1}(\lambda_A; \Delta\lambda)$. $P_{I1-O1}(\lambda_A; \Delta\lambda)$ is thus related to the spectral density of the input beam $PS_{I1}(\lambda_A)$ by:

$$P_{I1-O1}(\lambda_A; \Delta\lambda)=PS_{I1-O1}(\lambda_A)*\Delta\lambda=\eta_{effI1-O1}(\lambda_A)*PS_{I1}(\lambda_A)*\Delta\lambda. \quad (4B)$$

In the situation that $\Delta\lambda$ is large, Eqs. (4A) and (4B) should be more precisely converted to an integration of $PS_{I1-O1}(\lambda)$ with respect to wavelength $\lambda$ over wavelength bandwidth $\Delta\lambda$ centered at wavelength $\lambda=\lambda_A$ given by:

$$P_{I1}(\lambda_A; \Delta\lambda) = \int_{\lambda_A-\frac{\Delta\lambda}{2}}^{\lambda_A+\frac{\Delta\lambda}{2}} PS_{I1}(\lambda) d\lambda \quad (5A)$$

$$P_{I1-O1}(\lambda_A; \Delta\lambda) = \int_{\lambda_A-\frac{\Delta\lambda}{2}}^{\lambda_A+\frac{\Delta\lambda}{2}} PS_{I1-O1}(\lambda) d\lambda = \int_{\lambda_A-\frac{\Delta\lambda}{2}}^{\lambda_A+\frac{\Delta\lambda}{2}} \eta_{effI1-O1}(\lambda) * PS_{I1}(\lambda) d\lambda \quad (5B)$$

Total Power and Power Spectrum

To define the "adjacent-channel power extinction ratio", let the spectral resolution bandwidth for a beam at wavelength $\lambda_{I1-O1}$ 1321 from input slit $SL_{I1}$ 1201 to output slit $SL_{O1}$ 1401 be $\Delta\lambda_{Res-I1-O1}$ 1381Res, as shown in FIG. 1B. Assuming the input power spectrum at an input slit of the spectrometer $PS_{I1}(\lambda)$ 1131 is approximately a constant for the wavelength $\lambda$ around $\lambda=\lambda_{I1-O1}$ 1321. Let the optical power from the input slit $SL_{I1}$ 1201 entering or being detected at an output slit of the spectrometer $SL_{O1}$ 1401 over the spectral bandwidth given by the spectral resolution bandwidth $\Delta\lambda_{Res-I1-O1}$ 1381Res be $P_{I1-O1}(\lambda_{I1-O1}; \Delta\lambda_{Res-I1-O1})$, where:

$$P_{I1-O1} = P_{I1-O1}(\lambda_{I1-O1}; \Delta\lambda_{Res-I1-O1}) = \int_{\lambda_{I1-O1}-\frac{\Delta\lambda_{Res-I1-O1}}{2}}^{\lambda_{I1-O1}+\frac{\Delta\lambda_{Res-I1-O1}}{2}} \eta_{effI1-O1}(\lambda) * PS_{I1}(\lambda) d\lambda, \quad (6A)$$

Then at an adjacent wavelength that is separated from $\lambda_{I1-O1}$ 1321 by "one spectral resolution bandwidth" $\Delta\lambda_{Res-I1-O1}$ 1381Res away, the power detected over the same spectral resolution bandwidth $\Delta\lambda_{Res-I1-O1}$ 1381Res given by:

$$P_{I1-O1}(\lambda_{I1-O1} + \Delta\lambda_{Res-I1-O1}; \Delta\lambda_{Res-I1-O1}) = \quad (6B)$$

$$\int_{\lambda_{I1-O1}+\Delta\lambda_{Res-I1-O1}-\frac{\Delta\lambda_{Res-I1-O1}}{2}}^{\lambda_{I1-O1}+\Delta\lambda_{Res-I1-O1}+\frac{\Delta\lambda_{Res-I1-O1}}{2}} \eta_{effI1-O1}(\lambda) * PS_{I1}(\lambda) d\lambda,$$

should ideally be zero at the output slit (as the spectral power output efficiency $\eta_{effI1-O1}(\lambda)$ shall be approximately zero when $\lambda=\lambda_{I1-O1}+\Delta\lambda_{Res-I1-O1}$ is not at the supposed output detection/passing wavelength $\lambda_{I1-O1}$ 1321 of output slot $SL_{O1}$ and is at one resolution bandwidth $\Delta\lambda_{Res-I1-O1}$ 1381Res away from $\lambda_{I1-O1}$ 1321).

Adjacent-Channel Extinction Ratio

The ratio of the power at $\lambda_{I1-O1}$ 1321 and the power at $\lambda_{I1-O1}+\Delta\lambda_{Res-I1-O1}$ given by:

$$\eta_{ace}(\lambda_{I1-O1})=P_{I1-O1}(\lambda_{I1-O1}; \Delta\lambda_{Res-I1-O1})/P_{I1-O1}$$
$$(\lambda_{I1-O1}+\Delta\lambda_{Res-I1-O1}; \Delta\lambda_{Res-I1-O1}), \quad (7)$$

is called the "adjacent-channel power extinction ratio" or "adjacent-wavelength power extinction ratio" or "adjacent wavelength-channel extinction ratio", or "adjacent channel extinction ratio" for the beam from input slit $SL_{I1}$ 1201 to output slit $SL_{O1}$ 1401. It is also related to what is known to those skilled in the art as "adjacent-channel crosstalk rejection" or "adjacent-channel crosstalk extinction". These terminologies will thus be used interchangeably below.

Adjacent Channel Extinction Ratio of a Spectrometer

Let $\eta_{ace}(\lambda_{SM})$ denotes the adjacent channel extinction ratio for the spectrometer at its center operating wavelength $\lambda_{SM}$. It is called the "adjacent channel extinction ratio of a spectrometer". This adjacent-channel extinction ratio $\eta_{ace}(\lambda_{SM})$ is typically higher than about 100, especially when the size of the spectrometer is small (i.e. when the $RA_{SM}$ factor is smaller than about $10^4$). For many applications, in photonic integrated circuits, electronic-photonic integrated circuits, and fiber-optics, $\eta_{ace}(\lambda_{SM})$ higher than about 100, and $RA_{SM}$ factor smaller than about $10^4$ are desirable but they are largely not reachable via the methods in the prior arts.

Furthermore, for many applications in photonic integrated circuits, electronic-photonic integrated circuits, and fiber-optics, it is desirable that at the wavelength range of interest, the efficiency of passing or detecting the input spectral power be efficient, which is given by the spectral power output efficiency factor $\eta_{effI1-O1}(\lambda_{I1-O1})$ defined above.

Spectral Power Output Efficiency of a Spectrometer

Let $\eta_{eff}(\lambda_{SM})$ denote the spectral power output efficiency $\eta_{effI1-O1}(\lambda_{I1-O1})$ when the output slit wavelength $\lambda_{I1-O1}$ 1321 is at the center operating wavelength $\lambda_{SM}$ of the spectrometer. In an ideal situation, $\eta_{eff}(\lambda_{SM})$ shall be equal to unity (i.e. the number "1" so that the output power is equal to the input power or it has 100% passing or detection efficiency) or at least near unity. In many applications $\eta_{ace}(\lambda_{SM})$ higher than about 100 with $RA_{SM}$ factor smaller than about $10^4$ and $\eta_{eff}(\lambda_{SM})$ higher than about 0.5 or having a higher than 50% passing/detection efficiency is desirable. In some other applications, $\eta_{ace}(\lambda_{SM})$ higher than about 100 with $RA_{SM}$ factor smaller than about $10^4$, and $\eta_{eff}(\lambda_{SM})$ higher than about 0.1 (i.e. having a higher than 10% passing/detection efficiency) are desirable. These capabilities are desirable for the spectrometer but they are largely not reachable via the methods in the prior arts.

Conventional Rowland Gratings and Their General Limitations

Although a small input slit width is required to achieve high spectral resolution for a spectrometer, a smaller input slit width $W_{I1}$ 1291W (see FIG. 1A), however, leads to a larger beam divergence full angle $\theta_{dvdf-BI1-IP\%}$ 1141 (see FIG. 2) from the input slit defined as the beam angular span that encompasses IP %=95% of the beam energy. It can be shown that the conventional Rowland design in the prior art works reasonably well only up to $(\theta_{dvdf-BI1-95\%})/2<4°$ (for a grating in air for which the beam propagation region has a refractive index of $n_{gr}=1$). More specifically, $\theta_{dvdf-BI1-95\%}$ is the full divergence angle of the input beam due to spatial diffraction that we refer to as the "divergence-diffraction" (dvdf) angle. The 95% refers to the angle being defined by 95% of the beam power to be within the divergence angle. Note that the 4° is half the divergence angle of $\theta_{dvdf-BI1-95\%}$. If the grating cannot intercept or refocus a large percentage of the beam power well, then it will result in an unnecessarily large beam spot size at the output slit, and hence a worse wavelength resolution at the output slit.

Let the input beam be a monochromatic beam with wavelength $\lambda_{I1-O1}$ 1321 (see FIG. 2) and the focal spot size for this beam at the output slit $SL_{O1}$ 1401 be $W_{BI1-O1-IP\%}$ 1381W (see FIG. 2). When $\theta_{dvdf-BI1-95\%}/2>4°$, the Rowland design could not give a sharp enough focus at the output slit $SL_{O1}$ 1401, thereby limiting the resolution of the spectrometer.

A half-diffraction angle of $\theta_{dvdf-BI1-95\%}/2=4°$ corresponds to a slit width of about 25 microns (for an input beam wavelength around $\lambda_{I1-O1}=1000$ nm and n=1). In the current art, it is typically difficult to make slit width smaller than about 25 microns, and Rowland design is adequate for most present spectrometers with slit widths larger than about 25 microns (for a grating in air for which the beam propagation region has a refractive index of $n_{gr}=1$).

| Slit size (n = 3.4) | $\theta_D$(>95% energy) |
|---|---|
| 10 μm | 6° |
| 6 μm | 10° |
| 2 μm | 24° |
| 1 μm | 46° |
| 0.5 μm | 70° |
| 0.3 μm | 90° |

Focusing Aberration Limitation:

In the case of the Rowland design, when $(\theta_{dvdf-BI1-95\%})/2>4$ Degree(s) (DEG), serious aberration in the refocusing beam will occur to limit wavelength resolution ($\theta_{dvdf-BI1-95\%}$ 1141 is the full divergence angle of the input beam due to spatial diffraction that we refer to as the "divergence-diffraction" (dvdf) angle. The 95% refers to the angle being defined by 95% of the beam power to be within the divergence angle). This is shown in FIG. 4, illustrating the ray tracing for the typical Roland-Echelle design at 4, 8, and 16 DEG diffraction. The ray tracing will allow us to see potential focusing distortion or aberration at the exit slit. In the figure, we show the focusing behavior for two sets of rays with wavelengths separated by 0.4 nm. Let the "half angle" $\Theta_{div}=(\theta_{dvdf-BI1-95\%})/2$. From the figure, we see that their focused spots are clearly separated when $\Theta_{div}=4$ DEG. However, when $\Theta_{div}=8$ DEG, the focused spots began to smear out. FIG. 4A shows the cases of $\Theta_{div}=16$ DEG, and $\Theta_{div}=50$ DEG, for which the focused spots smear out even more. Thus, there is substantial distortion for the focusing rays when $\Theta_{div}>4$ DEG. Further simulations based on numerical solutions to Maxwell's wave equations using finite-difference time-domain (FDTD) method also show similar onset of focused spot size distortion at $\Theta_{div}>4$ DEG. In short, the current designs are close to their resolution area ($RA_{SM}$) limits at $\Theta_{div}$ of about 4 DEG and cannot be made substantially more compact without losing wavelength resolution.

Definitions of Common Terminologies

The sub-section below defines various more common terminologies useful for describing the prior arts as well as the present invention. As discussed above, curved-grating spectrometers, including those of the present invention, are specified by the geometrical configurations of its components as shown in FIGS. 1, 1A, 1B, 2, 2A, 2B, 3. An exemplary grating spectrometer illustration for defining these terminologies is referred to as device illustration 1000.

A center of the grating is defined, called the curved grating center CGC 1050. In applications, curved grating center CGC 1050 is generally designed to be the part of the grating hit by the center (i.e. high intensity point) of an input beam $B_{I1}$ 1101 that propagates towards the grating. In our convention, the groove situated at the grating center is numbered as groove 0. The grating is specified by the positions of all its grooves in general by a groove number i, where i is a positive or negative integer and includes zero. Grating-Center Circle Normal Line and, Input Slit, and Grating Circle.

A line that passes through the grating center point, called the grating-center circle normal line $L_{GCCN}$ 1050N is defined. More specifically, as shown in FIG. 3, the grating-center circle normal line $L_{GCCN}$ 1050N is defined to be a line passing through the grating center point CGC 1050 and coincide with a diameter $L_{ICD}$ 1080D of a circle with one end of the diameter line at the grating center point CGC 1050 (see FIG. 3), and with the circle's diameter adjusted so that the circle also passes through the center of one of the input slits, say slit $SL_{I1}$ denoted as point $PX_{I1}$ 1291O in FIG. 3. The diameter of this circle so generated has a numerical value referred to as R (i.e. its radius will be R/2). Hence, $L_{ICD}=R$. This circle will be called the input-slit-and-grating reference circle or simply as "input circle" IC 1080.

In the situation in which there are plurality of input slits, there is in general no requirement that these input slits be situated on this input circle, though preferably, their input angles will all be defined with respect to the same grating-center circle normal line $L_{GCCN}$ 1050N.

Coordinate System Specification

To properly specify the grating grooves, the input slit, the output slit, and various components of a grating spectrometer, for the purpose of illustration and not limitation, it is convenient to set up a coordinate system that can be any coordinate system (e.g. Cartesian polar, spherical coordinate system etc). For the purpose of illustration, as shown in FIG. 3, it is convenient to use a three-dimensional Cartesian coordinate system with the origin of the x-y-z coordinates situated at the grating center, the y-axis parallel to the grating-center circle normal line $L_{GCCN}$ 1050N, the x-axis perpendicular to the y axis and in the plane of propagating of the input and output beams, and the z-axis perpendicular to the y axis and x axis (i.e. perpendicular to the plane of propagation for the input and output beams). The grating groove surfaces are deformed by lines (can also be referred to as rows or columns) of surfaces called the "groove lines", as is known to those skilled in the art, parallel to the z axis so that the groove lines will diffract the output beam in a direction mainly parallel to the x-y plane. Thus the wavelength dispersion functionalities of the grating grooves that depend only on the relative positions of these grating groove lines with respect to each other in the x and y directions can be described by functions in the x-y plane with two-dimensional coordinates denoted by vector X=(x,y). The cross-section of these lines (or rows or columns) of grating surfaces thus forms a curvilinear line in the two-dimensional x-y plane that describes the essential design of the grating surfaces that will affect its diffraction property. The grating surfaces can also in general vary in the z direction such as to form a curved surface but typically such variation only serves the conventional optical function of reflecting and focusing the beam in the z direction and not the function of diffracting the beam. The descriptions of the embodiments of the grating designs in the present invention thus serve to specify an x-y cross-section of a grating that could significantly affect its wavelength dispersive property, and is not meant not to limit possible variations also in the z direction as those skilled in the art will know how to vary it also in the z direction to achieve the typical optical functions for the beam in the z direction (e.g. reflecting and focusing the beam).

For a waveguiding case there is also no significant variation in the grating shape in the direction perpendicular to the plane where the grating lies, which is also the plane within which the beam propagates and is guided in the planar-waveguiding geometry.

Hence, in both the non-waveguiding applications as well as in a planar-waveguiding geometry, the geometrical shape of a groove can be described by a two-dimensional coordinate system and it is usually referred to as a "one-dimensional curve of a particular shape".

Input/Output Slit Specification.

The input slit location is specified as follows (see FIGS. 1 and 2): the location of the center point $PX_{I1}$ 1291O of an input slit $SL_{I1}$ is specified by a first input angle $\theta_{I1}$ 1271 that is an angle sustained between a line $L_{I1}$ 1251 joining the center point $PX_{I1}$ 1291O of the input slit $SL_{I1}$ 1201 to the curved grating center CGC 1050, and the grating-center circle normal line $L_{GCCN}$ 1050N. Line $L_{I1}$ 1251 is called the "grating-center to input-slit line". This angle $\theta_{I1}$ 1271 is positive if the input slit location is rotated about the grating center CGC 1050 towards the counter clockwise direction from the grating-center circle normal line $L_{GCCN}$ 1050N. The input slit location is further specified by a first input distance $S_{I1}$ 1261 from the grating center CGC 1050 to the center point $PX_{I1}$ 1291O of the first input slit $SL_{I1}$ 1201, which is basically the length of the "grating-center to input-slit line" $L_{I1}$ 1251. The center point of the input slit (at point $PX_{I1}$ 1291O) has the coordinate $X_{I1}$ 1291OC.

The output slit location is specified as follows: the location of the center point $PX_{O1}$ 1491O of an output slit $SL_{O1}$ is specified by a first output angle $\theta_{O1}$ 1471 that is an angle sustained between a line $L_{O1}$ 1481 joining the center point $PX_{O1}$ 1491O of the output slit $SL_{O1}$ 1401 to the grating center CGC 1050, and the grating-center circle normal line $L_{GCCN}$ 1050N. Line $L_{O1}$ 1451 is called "grating-center to output-slit line". This $\theta_{O1}$ 1471 angle is positive if the output slit location is rotated about the grating center CGC 1050 towards the counter clockwise direction from the grating-center circle normal line $L_{GCCN}$ 1050N. The output slit location is further specified by a first output distance $S_{O1}$ 1461 from the grating center CGC 1050 to the center point $PX_{O1}$ 1491O of the first output slit $SL_{O1}$ 1401, which is basically the length of the "grating-center to output-slit line"

$L_{O1}$ 1451. The center point of the output slit (at point $PX_{O1}$ 1491O) has the coordinate $X_{O1}$ 1491OC.

Grating-Center Curve, Grating-Center Tangent Line Construction, and Grating-Center Tangent Normal Line Definition.

As shown in FIG. 3, the grating grooves are designed (as to be elaborated below) so that the center points of the grating grooves at the grating center CGC 1050 when joint by an approximated smooth curve resulted in a grating-center curve $L_{GCC}$ 1050CV. The tangent line $L_{GCT}$ 1050T (called the grating-center tangent line), to the resulted grating-center curve $L_{GCC}$ 1050CV at the grating center CGC 1050, is approximately perpendicular to the grating-center circle normal line $L_{GCCN}$ 1050N. It is important to note that this construction is used as a reference to specify the geometry of the grating such as giving a consistent definition to the "input angle" $\theta_{I1}$ 1271 (see FIG. 1A) and is not to limit the invention. If the grating generated produces a tangent line $L_{GCT}$ 1050T that is not perpendicular to grating-center circle normal line c (which is used to define angle $\theta_{I1}$ 1271), it will just amount to an offset of the angle $\theta_{I1}$ 1271 with respect to an "actual normal line" that is actually perpendicular to the tangent line $L_{GCT}$. This actual normal line is called grating center tangent normal line $L_{GCTN}$ 1050TN. That means the "normal line" $L_{GCCN}$ 1050N used is rotated by an angle, say $\Delta\theta_{TNA}$ 1271TNDA (rotating about the grating center CGC 1050 towards the $i>0$ direction is defined as positive angle), from this "actual normal line" $L_{GCTN}$ 1050TN, called the grating center tangent normal line. With respect to this actual normal line, the value of the input angle $\theta_{I1}$ 1271TNA will just be given in terms of $\theta_{I1}$ by $\theta_{I1}'=\theta_{I1}+\Delta\theta_{I1\,TNA}$. Likewise the value of the output angle $\theta_{O1}'$ 1471TNA with respect to this new (actual) grating center tangent normal line $L_{GCTN}$ 1050TN, will just be given in terms of $\theta_{O1}$ by $\theta_{O1}'=\theta_{O1}+\Delta\theta_{TNA}$.

Outer Input Circle.

For the purpose of discussion, it is also useful to construct an "outer input-slit-and-grating circle" or simply called "outer input circle" OIC 1070 that has a diameter line $L_{OICD}$ 1070D with one end of the diameter line at the same grating center CGC 1050 and the diameter line $L_{OICD}$ is parallel and overlap with the diameter line $L_{ICD}$ 1080D of the IC 1080. The x-y coordinates of the center of this "input circle" IC 1080 is then denoted by $X_{IC}$ 1080C. The radius of this "outer input circle" OIC 1070 is R (i.e. twice the radius of IC 1080). Hence, $L_{OICD}=2$ R. The x-y coordinates of the center of this "outer input circle" OIC 1070 is then denoted by $X_{OIC}$ 1070C.

Rowland Grating Design Case.

When the IC 1080 is discussed under the context of it being a "Rowland Circle" in the conventional Rowland grating design, we will use a similar labeling system, and will label the Rowland Circle as RC 1080R and its diameter line as $L_{RCD}$ 1080RD (i.e. RC corresponds to IC and $L_{RCD}$ corresponds to $L_{ICD}$). An Outer Rowland Circle ORC is defined like the Outer Input Circle OIC (i.e. ORC corresponds to OIC). The Outer Rowland Circle will be referred to as ORC 1070R and its diameter line as $L_{ORCD}$ 1070RD (i.e. $L_{ORCD}$ corresponds to $L_{OICD}$).

It is important to note that though the circles of radius R/2 and radius R are also referred to as "Rowland circle" RC 1080R and "outer Rowland circle" ORC 1070R in a conventional application, in the present invention, they only serve as reference circles for illustrative purposes and not for the purpose of limitations. One purpose of IC 1080 and OIC 1070 are for comparison of the present invention to the so called Rowland curved grating design. In that situation, the input circle 1080 coincides with the Rowland circle 1080R and the outer input circle 1070 coincides with the outer Rowland circle 1080R. Another purpose is for estimating the physical size of the spectrometer. As yet another purpose is for illustrating the position of the input slit relative to the grating center. These circles are thus defined for the purpose of illustrations and not limitations. The purposes of IC 1080 and OIC 1070 differ from that of Rowland circle 1080R and outer Rowland circle 1070R. For example, in Rowland curved grating design, it is required that the output slit $SL_{O1}$ be on Rowland circle 1080R and the grating groove positions be on the outer Rowland circle 1070R, but these are not the requirements in our present invention to be described later.

Grating Groove Position Specifications.

As noted above, for the purpose of illustrating this invention and not limitation, the shape of grating or grooves will be referred to with a curve using a two-dimensional coordinate system, not with a surface using a three-dimensional coordinate system.

The grooves are labeled by an integer that is counted starting from the groove right at the curved grating center CGC 1050, which is labeled as groove "0". To one side, the grooves are labeled as $i=1,2,3,4,\ldots$. To the opposite side, the grooves are labeled as $i=-1,-2,-3,-4\ldots$. As shown in FIG. 2, the position of the $i^{th}$ groove is thus specified by its x-y coordinates $X_i=(x_i, y_i)$. The x-y coordinates are specified with respect to the grating center and the input slit, for which the grating center has the coordinate $X_0=(0, 0)$ 1600O and the input slit (at point $PX_{I1}$ 1291O) has the coordinate $X_{I1}$ 1291OC.

Thus, in x-y coordinates, the input slit center location is given by $X_{I1}=(-S_{I1}*\mathrm{Sin}(\Theta_{I1}), S_{I1}*\mathrm{Cos}(\Theta_{I1}))$. Let the angle $\theta_{grI1-i}$ 161|i|P/N be the angle made by two lines pivoted (or joint) at the input slit location: the line joining the input slit location $X_{I1}$ 1291OC to the groove location $X_i$ and the line joining the input slit location $X_{I1}$ 1291OC to the groove at grating center $X_0$ 1600O. The line joining the input slit location $X_{I1}$ 1291OC to the groove location $X_i$ line is called line $L_{I1-i}$, which can also be referred to as "input light ray to groove i" or ray $L_{I1-i}$ as it describes the light ray propagating from the input slit to the grating groove i at $X_i$. The line joining the input slit location $X_{I1}$ 1291OC to the groove at the grating center $X_0$ 1600O can also be referred to as "input light ray to grating center" or "input center ray" $L_{I1-0}$. For the purpose of labeling in FIGS. 1, 1A, 1B, 2, 2A, 2B, 3, line $L_{I1-0}$ is 1620O, $L_{I1-1}$ is 1621P, $L_{I1-(-1)}$ is 1621N, and $L_{I1-i}$ is 162|i|P/N means that it is 162|i|N if $i<0$ and 162|i|P if $i>0$. The same goes for $\theta_{grI1-i}$ 161|i|P/N, and any denotation involving a number ending with P/N (or some time written as N/P). The suffix "N" stands for "i" being a negative number and "P" stands for "i" being a positive number. If |i| is a single-digit positive integer, then the labeling system could illustrate "i" from $i=0$ to at most up to $i=9$ or $-9$ (i.e. up to $|i|=9$, where "|x|" means taking the absolute value of the number x). However, those skilled in the art will know how to extend it further to groove number $|i|>9$, by allowing |i| to be multiple-digit positive integer, if needed.

$\theta_{grI1-i}$ 161|i|P/N defined above can be used to give the divergence angle span of the input beam intercepted by the grating from the grating groove at $i=0$ up to groove number i, and may be referred to as the "input-ray angle at groove i" or alternatively called the "input-groove angle at goove i". The value of $\theta_{grI1-i}$ 161|i|P/N is zero when $i=0$ or $X_i=X_0$, is positive when the end point of the line $L_{I1-i}$ 162|i|P/N at $X_i$, is rotated counter-clockwise (also called the direction "left" with the grating center as the front) around $X_{I1}$ with $X_{I1}$ as the pivot of rotation from $\theta_{grI1-i}=0$ and is negative when the end point of the line $L_{I1-i}$ 162|i|P/N at $X_i$, is rotated clockwise (also called the direction "right" with the grating center as the front) around $X_{I1}$. The groove number i is a positive integer when $\theta_{grI1-i}>0$ and takes a value equals to the number of groove counted from the grating center to goove i with the grating center at i=0 (e.g. the next groove in the $\theta_{grI1-i}>0$ direction from i=0 is at i=1 etc). The groove number i is a negative integer when $\theta_{grI1-i}<0$ and takes a value equals to the negative of the number of groove counted from the grating center to goove i with the grating center at i=0 (e.g. the next groove in the $\theta_{grI1-i}<0$ direction from i=0 is at i=−1 etc).

Let the grating input left "angular span" be defined as $\theta_{grI1L}$ 1651L where $\theta_{grI1L}=|\theta_{grI1-ML}|$, where j=ML is the maximum groove number to left side of the grating with j>0 and $\theta_{grI1-ML}$ 161|ML|P is its input-groove angle (also called "input-ray angle at groove ML"). Let the grating input right angular span be defined as $\theta_{grI1R}$ 1651R where $\theta_{grI1R}=|\theta_{grI1-MR}|$, j=MR is the maximum groove number to the right side of the grating with i<0 and $\theta_{grI1-MR}$ 161|MR|N is its input-groove angle (also called "input-ray angle at groove MR"). Then the grating input total angular span $\theta_{grI1}$ 1651 is defined as $\theta_{grI1}=\theta_{grI1L}+\theta_{grI1R}=|\theta_{grI1-ML}|+|\theta_{grI1-MR}|$.

For the purpose of labeling, $X_0$ is 1600O, $X_1$ is 1601P, $X_{-1}$ is 1601N, etc. Note that i=|i| on the left $\theta_{grI1-i}>0$ side and i=−|i| on the right $\theta_{grI1-i}<0$ side. Hence, $X_i$ is 160|i|N if i<0 and 160|i|P if i>0. Likewise, $\theta_{grI1-0}=0$ is 1610O, $\theta_{grI1-1}$ is 1611P, $\theta_{grI1-(-1)}$ is 1611N, and $\theta_{grI1-i}$ is 161|i|P/N means that it is 161|i|N if i<0 and 161|i|P if i>0. The suffix "N" stands for "i" being a negative number and "P" stands for "i" being a positive number. This labeling system could illustrate "i" from i=0 to at most up to i=9 or −9 (i.e. up to |i|=9, where "|x|" means taking the absolute value of the number x). However, those skilled in the art will know how to extend it further to groove number |i|>9 if needed.

For the output side, let the angle $\theta_{grO1-i}$ be the angle made by two lines pivoted (or joint) at the output slit $SL_{O1}$ location: the line joining the output slit location $X_{O1}$ 1491OC to the groove location $X_i$ (called line $L_{O1-1}$ or "output light ray from groove i") and the line joining the output slit location $X_{O1}$ 1491OC to the groove at grating center $X_0$ 1600O (called line $L_{O1-0}$ or "output light ray from grating center"). Line $L_{O1-0}$ is 1820O, $L_{O1-1}$ is 1821P, $L_{O1-(-1)}$ is 1821N, and $L_{O1-i}$ is 182|i|N if i<0 and 182|i|P if i>0.

$\theta_{grO1-i}$ defined above can be referred to as the "output-ray angle from groove i" or alternatively as "output-groove angle at groove i". It describes the ray in the output beam that is converging from groove i to the output slit. The value of $\theta_{grO1-i}$ is zero when i=0 or $X_i=X_0$, is positive when the end point of the line $L_{O1-i}$ at $X_i$, is rotated counter-clockwise (also called the direction "left" with the grating center as the front) around $X_{O1}$ with $X_{O1}$ as the pivot of rotation from $\theta_{grO1-i}=0$ and is negative when the end point of the line $L_{O1-i}$ at $X_i$, is rotated clockwise (also called the direction "right" with the grating center as the front) around $X_{O1}$. In terms of illustration labeling, i=|i| on the left $\theta_{grO1r-i}>0$ side and i=−|i| on the right $\theta_{grO1r-i}<0$ side. Hence, $\theta_{grO1-0}=0$ is 1810O, $\theta_{grO1-1}$ is 1811P, $\theta_{grO1-(-1)}$ is 1811N, and $\theta_{grO1-i}$ is 181|i|N if i<0 and 181|i|P if i>0.

Let the grating output left angular span be defined as $\theta_{grO1L}$ 1851L where $\theta_{grO1L}=|\theta_{grO1-MP}|$, where i=MP is the maximum groove number to left side of the grating with i>0 and $\theta_{grO1-MP}$ 181|MP|P/N is its output-groove angle (also called "output-ray angle at groove MP"). Let the grating output right angular span be defined as $\theta_{grO1R}$ 1851R where $\theta_{grO1R}=|\theta_{grO1-MN}|$, j=MN is the maximum groove number to the right side of the grating with j<0 and $\theta_{grO1-MN}$ 181|MN|P/N is its output-groove angle (also called "output-ray angle at groove MN"). Then the grating output total angular span $\theta_{grO1}$ 1851 is defined as $\theta_{grO1}=\theta_{grO1L}+\theta_{grO1R}=|\theta_{grO1-MP}|+|\theta_{grO1-MN}|$ Grating Groove Specification.

As is known to those skilled in the art, the main geometry of the curved diffraction grating is properly specified by specifying the center of each grating grooves called grating's "groove centers specification". With this main geometry specified, the detailed geometry of the curved diffraction grating is then specified by further specifying the surface of each grating groove that passes through the groove center and joining to the surface of the adjacent groove, called grating's "groove surfaces specification". As part of this "groove surfaces specification", the efficiency of the grating's beam diffraction from an input slit to a particular output slit can be designed, manipulated, modified, or optimized. A process often referred to as "blazing the grating's reflecting surfaces".

It is important to note that in conventional grating design, the groove surface facing the input beam is almost always chosen to be a straight line (or a flat plane surface) but oriented at an angle to optimize power diffracted to a particular output slit (a process called blazing the grating diffraction angle). The angle of the chosen output slit is called the "blazed angle", the receiving wavelength of the chosen output slit is called the "blazed wavelength". In the present invention, as will be described below, the grating "groove surface" design can further take on other shapes other than straight line.

Specifically as an example, at grating groove $X_i$, say i>0 (i<0 case can be easily deduced like other groove position nomenclature), let us look at groove $X_{|i|}$ and $X_{|i|+1}$. At the location of $X_{|i|}$, the grating groove surface that passes through $X_{|i|}$ and facing the input beam is given by the curvilinear line denoted by $SF_{|i|}$ 163|i|P. At the location of $X_{|i|+1}$, the grating groove surface that passes through $X_{|i|+1}$ and facing the input beam given by the curvilinear line denoted by $SF_{|i|+1}$ 163(|i|+1)P. The surface that is somewhat perpendicular to the surfaces $SF_{|i|}$ 163|i|P and $SF_{|i|+1}$ 163(|i|+1)P that is used to join an edge of grating groove surface $SF_{|i|}$ 163|i|P to the closest edge of $SF_{|i|+1}$ 163(|i|+1)P is given by the curvilinear line denoted by $SF_{|i|,|i|+1}$ 164(|i|, |i|+1)P. The important surfaces that reflect the input ray $L_{I1-|i|}$ 162|i|P at groove $X_{|i|}$ 160|i|P towards output ray $L_{O1-|i|}$ 182|i|P is thus the surface $SF_{|i|}$ 163|i|P. If the grating grooves are blazed to output slit $SL_{O1}$, then surface $SF_{|i|}$ 163|i|P (though it can be of various curvilinear shape in this invention, it typically can be approximated by a straight line or a flat plane surface) shall be oriented at an angle so that it acts as a directing mirror that reflects input ray $L_{I1-|i|}$ 162|i|P to output ray $L_{O1-|i|}$ 182|i|P. For example, if $SF_{|i|}$ 163|i|P is a plane surface given by a straight line, then the normal to that line shall "bisect" the angle of incidence for the incident ray $L_{I1-|i|}$ 162|i|P and the angle of reflection for the reflected ray $L_{O1-|i|}$ 182|i|P.

"Groove Surface" Versus "Grating Surface".

The "groove surface" is the surface at the individual groove level and is not to be confused with "grating surface" that is the average surface of the entire grating formed by basically joining the center points of all the grooves or fitting a curve through the center points of all the grooves.

Nomenclatures for Various More Specific Geometries of a Curved Grating Spectrometer or Wavelength Mux/deMux.

Note that the numbering system denoting the various geometrical components in FIG. 5 to be discussed next has the prefix "5". The number after the prefix 5 uses the same numbering system as those in FIG. 1A to 1C for defining the common terminologies of a curved grating spectrometer or wavelength Mux/deMux (i.e. multiplexer or de-multiplexer). So for example, the geometrical component denoted as 5-1201 in FIG. 5 and 1201 in FIGS. 1, 1A, 1B, 2, 2A, 2B, 3 both refer to the "first" input slit $SL_{I1}$ etc. For simplicity, the prefix 5 may not be shown in the figure itself. These also apply to other Figures later involving some descriptions of some other more specific geometries of a curved grating spectrometer or wavelength Mux/deMux. There are occasions whereby a geometry is specific to FIG. 5 or other subsequent figures. In such cases, new numbers after the prefix may be introduced. The "Prefix" may not be specifically shown in these figures at all, so in the text, when we say item 5-1201 means item 1201 in FIG. 5. When obvious, the item may not be specifically labeled in the figure and usually the specific item can be referred from FIGS. 1, 1A, 1B, 2, 2A, 2B, or 3. When a particular item number is mentioned in the text but not specifically shown in the figure, one shall refer back to the same item in FIGS. 1, 1A, 1B, 2, 2A, 2B, 3 for its designation.

Exemplary Prior Art Based on Conventional Rowland Grating Design

In this subsection, we will describe an exemplary prior art based on conventional Rowland grating design and discuss their disadvantages. As a broad overview, a conventional curved grating spectrometer is made with a grating on a curved surface with a radius of curvature R. As shown in FIG. 5, as is well known to those skilled in the art, the commonly used design for the curved grating CG 5-1010 is the Rowland design. As noted above, the item-numbering prefix "5" will not be shown in the figure. When a particular item number is mentioned in the text but not specifically shown in the figure, one shall refer back to the same item in FIGS. 1, 1A, 1B, 2, 2A, 2B, 3 for its designation. In the Rowland design, the curved grating CG 5-1010 has a circularly curved shape lying along a circle, called the Outer Rowland Circle ORC 5-1070R of radius R, and the slits $SL_{I1}$ 5-1201 and $SL_{O1}$ 5-1401 lying on a circle called the Rowland circle RC 5-1080R, of radius R/2. The Rowland Circle RC 5-1080R and Outer Rowland Circle ORC 5-1070R are shown in FIG. 5. Both circles ORC 5-1070R and RC 5-1080R intersect at the curved grating center CGC 5-1050.

More specifically, the grating center, grating input slit and output slit are placed a "Rowland circle" 5-1080R that has a radius of R/2 and a diameter line $L_{RCD}$ 5-1080RD as shown in FIG. 5. An "outer Rowland circle" ORC 5-1070R is also constructed and this circle has a diameter line $L_{ORCD}$ 5-1070RD that terminates at the same grating center CGC 5-1050 at one end and this line is parallel and overlap with the diameter of the Rowland circle $L_{RCD}$ 5-1080RD. The curved grating surface is ruled using a diamond tip with "constant horizontal displacement d", which ruled the curved grating surface with constant Chord lines $C_{-2}$ 5-1022NL, $C_{-1}$ 5-1021NL, $C_0$ 5-1020OL, $C_1$ 5-1021PL, $C_2$ 5-1022PL and so forth, as shown in FIG. 5. The segment "arc" lengths, $AS_{-2}$ 5-1022NA, $AS_{-1}$ 5-10221A, $AS_1$ 5-1021PA, $AS_2$ 5-1022PA, and so forth, along the Outer Rowland Circle ORC 5-1070R are not a constant and vary along the curved surface.

In an approach to specify the grating in accordance to the Rowland design, starting from the grating center CGC 5-1050, the locations of the first three grooves are specified; these are specified by its location vectors $X_1=(x_1, y_1)$ 5-1601P, $X_0=(0, 0)$ 5-1600O, and $X_{-1}=(x_{-1}, y_{-1})$ 5-1601N, where the x-axis is perpendicular to the Rowland Circle diameter line $L_{RCD}$ 5-1080D and hence is parallel to the Outer Rowland Circle diameter line $L_{ORCD}$ 5-1070RD as well. The vectors $X_1$ 5-1601P and $X_{-1}$ 5-1601N and all $X_i$ are all lying on the Outer Rowland Circle ORC 5-1070R. Let the groove's "perpendicular spacing" (or pitch) $d_1=|x_1-x_0|$ 5-1641P and $d_{-1}=|x_{-1}-x_0|$ 5-1641N, and let them be equal so that $d=d_1=d_{-1}$. The "perpendicular spacing" is defined as the spacing perpendicular to the Rowland Circle Diameter Line $L_{RCD}$ 5-1080D. The Outer Rowland Circle 5-1070R passes these three points $X_0$ 5-1600O, $X_1$ 5-1601P, and $X_{-1}$ 5-1601N forming the "grating-center curve" $L_{GCC}$ 5-1050CV and its radius R is referred to as the "radius of curvature of the grating center".

Third, the location of the output slit $SL_{O1}$ 5-1401 should be on the Rowland circle and it is further specified by an angle $\theta_{O1}$ 5-1471 with respect to the grating-center circle normal line $L_{GCCN}$ 5-1050N and the distance $S_{O1}$ 5-1461 from the grating center to the output slit location $SL_{O1}$ 5-1401 on the Rowland Circle 5-1080R. For a given operating wavelength $\lambda_{f1-O1}$ 5-1321, the initial groove perpendicular spacing d is usually chosen to satisfy the diffraction grating formula for a given output slit (or detector) location. The curved grating is further specified by the location of other grooves with the groove's perpendicular spacing $d_i$ between groove i and the previous groove i−1 given by $d_i=|x_i-x_{i-1}|$ 5-164|i|N (for i<0) or 5-164|i|P (for i>0). Thus, distance $d_1$ is labeled as $d_1$ 5-1641P, and distance $d_{-1}$ is labeled as $d_{-1}$ 5-1641N etc.

Let the total number of grooves be N in each side of the grating center. The locus of all the grooves defined by the lines that join all tips of the vectors $X_{-N}, \ldots, X_{-1}, X_0, X_1, \ldots, X_N$ together form a curved shape, which will all lie in the Outer Rowland Circle 5-1070R by design. The curved shape of the grating acts as an imaging element of the spectrometer that helps to focus the diverging beam from the input slit to the output slit.

More specifically, conventional Rowland grating design spectrometers are specifically configured by the design rule described below in conjunction with FIG. 5.

Referring to FIG. 5, the input slit $SL_{I1}$ 5-1201 is located on a circle of R/2 5-1080R, where R is the radius of curvature of the grating at the grating center. This curvature at the grating center is called the grating-center curve $L_{GCC}$ 5-1050CV. This circle of radius R/2 is called the Rowland circle and it is tangent to the grating center curve $L_{GCC}$ 5-1050CV. In the Rowland design, the distance $S_{I1}$ 5-1261 of the input slit $SL_{O1}$ 5-1201 to the curved grating center CGC 5-1050 is related to the angle of incidence $\theta_{I1}$ 5-1271 by $S_{I1}=R*Cos(\theta_{I1})$, where "*" denotes numerical multiplication.

An output slit (or a photodetector) $SL_{O1}$ 5-1401 is also located on the same Rowland circle 5-1080R as the input slit $SL_{I1}$ 5-1201. In the Rowland design, the distance $S_{O1}$ 5-1461 of the output slit (or photodetector) $SL_{O1}$ 5-1401 to the grating center is related to the output angle of grating diffraction $\theta_{O1}$ 5-1471 by $S_{O1}=R*Cos(\theta_{O1})$ 5-1461.

During operation, an input light beam from the input slit $SL_{I1}$ 5-1201 will propagate to the curved grating CG 5-1010 and the different frequency components of the light beam will be dispersed by the curved grating CG 5-1010 to different directions. Part of the dispersed light then propagates to the output slit (or photodetector) $SL_{O1}$ 5-1401. The medium in which the light propagates in can be air or a material medium with an effective refractive index of propagation "$n_{gr}$," 5-1040. In the case of free space, "$n_{gr}$" 5-1040 is the material refractive index. In the case of a planar waveguide, "$n_{gr}$" 5-1040 is the effective refractive index of propagation within the planar waveguide.

The relation between $\theta_{I1}$ 5-1271, $\theta_{O1}$ 5-1471, and the initial perpendicular groove spacing d is given by the grating formula, $$d*(\operatorname{Sin}(\Theta_{O1})+\operatorname{Sin}(\Theta_{I1}))=m*\lambda_{I1\text{-}O1}/n_{gr} \quad (8)$$

where m is the diffraction order, $n_{gr}$ 5-1040 is the effective refractive index of propagation of the medium, $\lambda_{I1\text{-}O1}$ 5-1321 is the wavelength of the spectral component in the input beam diffracted from the input slit $SL_{I1}$ specified by the input angle $\theta_{I1}$ 5-1271 to the location of the output slit $SL_{O1}$ specified by the output angle $\theta_{O1}$ 5-1471. Note that when $\Theta_{O1} = -\Theta_{I1}$, we have m=0, which is known as the zeroth order that corresponds to the "mirror" reflection from the grating. This grating formula is a so-called far-field approximation formula, which is valid only when $S_{I1}$ and $S_{O1}$ are much larger than d.

Initial groove positions are $X_0=(0,0)$ 5-1600O, $X_1=(d, R-(R^2-d^2)^{1/2})$ 5-1601P and $X_{-1}=(-d, R-(R^2-d^2)^{1/2})$ 5-1601N. These three initial grooves with position vectors $X_0$, $X_1$, and $X_{-1}$ form the "grating-center curve", and are located on a circle of radius R and have the initial groove's perpendicular spacing of $d_i=d$ 5-164|i|P/N along a chord parallel to the grating-center tangent line $L_{GCT}$ 5-1050T (AB in FIG. 5). The grating tangent is a line segment tangent to the grating-center curve $L_{GCC}$ 5-1050CV.

All other grooves, specified by its position vector $X_i$'s, are located on the same outer Rowland circle of radius R 5-1070R defined by the initial three groove positions $X_0$, $X_1$, and $X_{-1}$. $X_i$'s are also equally spaced along a chord that is parallel to the tangent line $L_{GCT}$ 5-1050T to the grating-center curve $L_{GCC}$ 5-1050CV at the curved grating center CGC 5-1050. In other words, the projection of the displacement vector $X_i - X_{i-1}$ on this chord always has the same length. Specifically, the position vectors of these grooves can be written as $X_i=(d*i, R-(R^2-(d*i)^2)^{1/2})$ for i>0, and $X_i=(-d*|i|, R-(R^2-(d*|i|)^2)^{1/2})$ for i<0 (note that we can also write $X_i=(d*i, R-(R^2-(d*i)^2)^{1/2})$ for i<0, the same equation as for i>0 case or alternatively expressed for i<0 as $X_{-j}=(-d*j, R-(R^2-(d*j)^2)^{1/2})$ by taking j=-i so that j>0), where "*" denotes numerical multiplication and "i" is an integer denoting the $i^{th}$ groove so that "i" can take any of the values . . . -4,-3,-2,-1,0,1,2,3,4, . . . etc.

The shape of each groove centered at $X_i$ is typically not critical to the resolution power of the grating and hence is not necessary to be a part of the main specification. However, the groove shape is related to the diffraction efficiency. For example, in order to increase the diffraction efficiency at a particular output diffraction angle $\theta_{O1}$ 5-1471, it is typically made a planar surface for each groove, oriented in such a way that it acts like a tiny mirror reflecting the input ray towards the angle $\theta_{O1}$ 5-1471, a process typically referred to as blazing to output slit angle $\theta_{O1}$ 5-1471 (for a given input slit angle $\theta_{I1}$ 5-1271). A section of each groove which reflects light is physically a two-dimensional surface of a particular shape, not a one-dimensional curve. However, as the diffraction occurs in a planar geometry with the input and output beams all lying on a plane (in an x-y plane that is perpendicular to direction of the grating groove lines that are along the z-axis direction), the geometric shape of a groove is usually referred to as a "one-dimensional curve of a particular shape". Thus, the shape of grating or grooves will be referred to with a curve, not with a surface.

An Exemplary Embodiment If a Rowland Grating Design with Echelle Configuration in Prior Art In this subsection, we give a specific exemplary embodiment of a Rowland grating design with Echelle configuration in prior art. For example, if the radius of curvature at the grating center is R=100 μm, the Rowland circle 5-1080R, where the entrance slit or input slit 5-1201 and output slit (or waveguide or photodetector) 5-1401 are located, has the radius of R/2=50 μm. Here, we assume that tangent line $L_{GCT}$ 5-1050T at the grating-center curve $L_{GCC}$ 5-1050CV is parallel to the x-axis. The Rowland circle 5-1080R is tangent to the grating-center curve and it forms a circle by passing through both the grating center $X_0=(0,0)$ 5-1600O and a point (0, 50) (in unit of μm). If the angle of the input slit is $\theta_{I1}=45°$ 5-1271, the distance of the input slit to the grating center is $S_{I1}=R*\cos(\theta_{I1})=70.71$ μm 5-1261 ($S_{I1}$ is the length of $L_{I1}$ 5-1251). In terms of (x,y)-coordinate, the input slit is located at $X_{I1}$ 5-1291OC with $X_{I1}=(-50, 50)$. It is well-known that grating is more efficient if the propagation direction of the diffracted light from the grating is nearly parallel and opposite to the propagation direction of the input beam. Such a scheme is known as "Littrow configuration" and is widely used for a high-efficiency spectrometer. Another configuration of interest is grating used at high order m (e.g. m larger than approximately 10) with coarse grating groove distance and large input angle so that the side in which the grating groove has a narrower facet width is facing the input beam, which is called the "Echelle grating". Echelle grating is often used in the Littrow configuration. Typically, this means that the input angle $\theta_{I1}$ 5-1271 is larger than about 45°. A Littrow configuration in the Rowland design will be equivalent to having the angle of output slit (or photodetector) being almost equal to the angle of the input slit, i.e., $\theta_{I1} \approx \theta_{O1}$. Besides being at the Littrow configuration, the groove spacing d at the grating center has to be properly chosen so that it satisfies grating formula Eq. (8). For example, when the wavelength $\lambda_{I1\text{-}O1}$ 5-1321 is 1550 nm and the angle of input slit is $\theta_{I1}=45°$ 5-1271, the diffraction order of m=12 of a grating with the groove spacing of d=4.2 μm at its center propagate toward a photodetector located at $\theta_{O1}=37.37°$ 5-1471, which is close to the Littrow configuration. The output slit (or photodetector) location can be fine tuned by changing the initial groove perpendicular spacing d. The lower the groove spacing d, the larger the output slit (or photodetector) angle $\theta_{O1}$ 5-1471. For the groove spacing d=4.2 μm and radius of curvature R=100 μm, the initial three positions of grooves are $X_0=(0,0)$, $X_1=(4.2, 0.088)$, and $X_{-1}=(-4.2, 0.088)$ (in unit of μm). Below, all the coordinates are understood to be in the unit of μm.

In the Rowland design, other grooves are located such that their spacing is the same along a chord parallel to the grating tangent at the center. Therefore, the position vectors of other grooves are $X_i=(d*i, R-(R^2-(d*i)^2)^{1/2})=(4.2*i, 100-(100^2-(4.2*i)^2)^{1/2})$, and $X_{-i}=(-d*i, R-(R^2-(d*i)^2)^{1/2})=(-4.2*i, 100-(100^2-(4.2*i)^2)^{1/2})$. The position vectors of the grooves are listed in the following table for the case of Rowland design with R=100 μm, d=4.2 μm, m=12, $\theta_{I1}=45°$, and $\theta_{O1}=37.37°$ for an operation wavelength of $\lambda_{I1\text{-}O1}=1550$ nm 1321.

TABLE 1

| | |
|---|---|
| $X_{-13}$ | (−54.6, 16.221) |
| $X_{-12}$ | (−50.4, 13.630) |

TABLE 1-continued

| | |
|---|---|
| $X_{-11}$ | (−46.2, 11.312) |
| $X_{-10}$ | (−42, 9.248) |
| $X_{-9}$ | (−37.8, 7.419) |
| $X_{-8}$ | (−33.6, 5.814) |
| $X_{-7}$ | (−29.4, 4.419) |
| $X_{-6}$ | (−25.2, 3.227) |
| $X_{-5}$ | (−21, 2.230) |
| $X_{-4}$ | (−16.8, 1.421) |
| $X_{-3}$ | (−12.6, 0.797) |
| $X_{-2}$ | (−8.4, 0.353) |
| $X_{-1}$ | (−4.2, 0.088) |
| $X_0$ | (0, 0) |
| $X_1$ | (4.2, 0.088) |
| $X_2$ | (8.4, 0.353) |
| $X_3$ | (12.6, 0.797) |
| $X_4$ | (16.8, 1.421) |
| $X_5$ | (21, 2.230) |
| $X_6$ | (25.2, 3.227) |

A Summary of the Deficiencies in the Prior Art

The advent in Dense Wavelength Division Multiplexing (DWDM) optical communication networks, however, requires that the multiple wavelengths in an optical fiber to be analyzed by spectral analysis devices that are much smaller in size than that of the current grating spectrometer. The challenge is to circumvent the current limitation in grating spectrometer design and fabrication methods. As discussed above, the current design basically cannot achieve the Resolution-vs-Area factor ($RA_{SM}$) much smaller than about $10^4$. While several current technologies are capable of using planar waveguide technologies to make grating based spectrometers on a single silica or semiconductor substrate, they are still not able to achieve $RA_{SM}$ much smaller than $10^4$ (e.g. smaller than 100) due to the basic limitations of the grating spectrometer design. Achieving a smaller $RA_{SM}$ factor is important for combining or integrating high-resolution grating spectrometers or wavelength multiplexer (Mux) and demultiplexer (deMux) with various photonic devices (such as lasers, modulators, or photodetectors in a compact module or silica/silicon/semiconductor wafer).

These wavelength-division-multiplexed (WDM) integrated photonic devices or modules would be of great importance for applications to Dense Wavelength Division Multiplexed (DWDM) networks. The costs of these integrated WDM devices are typically proportional to their sizes. The wavelength dispersion elements, such as the grating spectrometer or other form of wavelength filters and wavelength Mux/deMux, are typically about 100 times larger in size than any other photonic devices in the module or wafer. In order to reduce their costs substantially, it is desirable to reduce the size of these wavelength dispersion elements to as small a size as possible.

Thus, it is desirable to have grating based spectrometers that have an $RA_{SM}$ factor of less than 100. It is also desirable to reduce the size, and hence the cost, of integrated WDM devices that are used in DWDM networks.

Beside size, it is also important for the spectrometer to have high adjacent channel extinction ratio $\eta_{ace}(\lambda_{SM})$ and high spectral power output efficiency $\eta_{eff}(\lambda_{SM})$.

For many applications in photonic integrated circuits, electronic-photonic integrated circuits, and fiber-optics, $\eta_{ace}(\lambda_{SM})$ higher than about 100, $RA_{SM}$ factor smaller than about 100, and $\eta_{eff}(\lambda_{SM})$ higher than about 0.1 (i.e. having a larger than 10% passing/detection efficiency) are desirable but they are not reachable via the methods in the prior arts.

The present invention discloses such a device and a method for making the same.

SUMMARY OF THE INVENTION

The present invention relates to semiconductor photonic, discrete optic, integrated optic, and opto-electronic devices. In particular, the present invention relates to optical spectrometers, wavelength channel multiplexers, wavelength channel demultiplexers, wavelength or frequency filters, wavelength combiners, wavelength splitters, optical spectrum analyzers, wavelength detectors, spectra dispersion devices, optical arbitrary waveform generators, optical dispersion compensators, optical signal processors, and optical wavelength-domain or frequency-domain processors, for combining, filtering, analyzing, processing, or detecting the spectral compositions of an input optical beam or plurality of input beams, with one or plurality of output beams, and method of making the same.

It is an aim of the invention to provide a compact curved grating and associated compact curved grating spectrometer or wavelength multiplexer and demultiplexer that is capable of achieving very small resolution-area factors ($RA_{SM}$) thereby enabling high resolution at small size. It is also capable of achieving high adjacent-wavelength power extinction ratio $\eta_{ace}(\lambda_{SM})$, and high spectral output efficiency $\eta_{eff}(\lambda_{SM})$ at the detecting wavelength $\lambda_{SM}$.

The compact curved grating device can be constructed with discrete optical and mechanical components or can be integrated in a photonic integrated circuit or an electronic-photonic integrated circuit. The present invention discloses a device that will have a wide range of utilities and can be used as a device in optical spectrometers, wavelength channel multiplexers, wavelength channel demultiplexers, wavelength or frequency filters, wavelength combiners, wavelength splitters, optical spectrum analyzers, wavelength detectors, spectra dispersion devices, optical arbitrary waveform generators, optical dispersion compensators, optical signal processors, and optical wavelength-domain or frequency-domain processors, for combining, filtering, analyzing, processing, or detecting the spectral compositions of an input optical beam or plurality of input beams, with one or plurality of output beams, and methods of making the same.

It is another aim of the invention to provide a compact curved grating spectrometer module that can be used as an isolated optical spectrometer, discrete optical spectrometer module, or wavelength Mux/deMux module with integration possibility or as an isolated optical component, using either integration technology or free-space and discrete optics.

It is another aim of the invention to provide a compact curved grating spectrometer module that can be used as a wavelength dispersion element in a photonic integrated circuit.

In order to attain the above-mentioned aims, a compact curved grating and associated compact curved grating spectrometer or wavelength Mux/deMux with integration or discrete optics possibility is provided. The compact curved grating spectrometer includes an input slit (or waveguide), an output slit (or waveguide or photodetector) and a curved grating and the compact curved grating wavelength Mux/deMux includes a curved grating, at least an input slit or waveguide and at least an output slit or waveguide for propagating through at least an input light beam and at least an output light beam, respectively. The locations of the input slit (or waveguide) and the output slit (or waveguide or photodetector) can be adjusted to control the performance of the spectrometer or wavelength Mux/deMux. The distance between the grooves of the gratings depend on the location of the input slit (or waveguide), the output slit (or waveguide or photodetector), the center of the operation wavelength, the diffraction order and the refractive index of the medium. The resolution, size, and spectral processing capabilities of the spectrometer or wavelength Mux/deMux depend on the locations and sizes of one or plurality of the input slits (or waveguides), the locations and sizes of one or plurality of the output slits (or waveguides or photodetectors), the placement of each grating groove in the curved grating, the surface shape and surface orientation of each grating groove in the curved grating, and the angular span of the entire grating.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which FIG. 1, FIG. 1A, FIG. 1B, FIG. 2, FIG. 2A, FIG. 2B, FIG. 3 show different views of an illustrative curved grating spectrometer or wavelength Mux/deMux that define the various terminologies related to the construction of a curved grating spectrometer or wavelength Mux/deMux.

FIG. 11A illustrates a curved grating spectrometer configured with waveguides acting as the input and output slits.

FIGS. 11E and 11F illustrates a curved grating spectrometer configured with waveguides acting as the input and output slits, and the tapered waveguide mouths and how they are equivalent to the effective slit locations and width at the input and output.

FIG. 18 shows a High Resolution Compact Curved Grating with dual aberration-free anchor points (the Dual Anchor Points Plurality Output and Plurality Input Case), the two anchor output slits (or waveguides or photodetectors) $SL_{O1}$ and $SL_{O2}$, and the input slit (or waveguide) $SL_{I1}$ being present anywhere including but not limited to the Rowland circle, plurality of No more outputs $SL_{O3}, \ldots, SL_{ONo}$ further disposed in-between or on both sides of the two anchor output slits (or waveguides or photodetectors) $SL_{O1}$ and $SL_{O2}$ at minimal aberration points, plurality of Ni more inputs $SL_{I2}, \ldots, SL_{INi}$ further disposed anywhere at minimal aberration points, in accordance with an embodiment of the present invention.

FIG. 19E shows a High Resolution Compact Curved Grating with dual aberration-free anchor points (the Dual Anchor Points Output-Input Inline Case) and how the angles spanned by the grating teeth are determined so as to capture sufficiently large percentage of the beam energy from the input slit due to input beam divergence because of wave diffraction.

DETAILED DESCRIPTION

The present invention discloses a system comprising a compact curved grating (CCG), its associated compact curved grating spectrometer (CCGS) or wavelength Mux/deMux (WMDM) module and a method for making the same. The system is capable of achieving very small (resolution vs. size/area) $RS_{SM}/RA_{SM}$ factor thereby enabling high resolution at small size. It is also capable of achieving high adjacent-wavelength power extinction ratio $\eta_{ace}(\lambda_{SM})$, and high spectral output efficiency $\eta_{eff}(\lambda_{SM})$ at the detecting wavelength $\lambda_{SM}$.

The uses of CCGS or WMDM module include an isolated optical spectrometer or wavelength Mux/deMux using discrete optical components such as slits, grating, spectrometer or wavelength Mux/deMux casing, photodetector, photodetector array, or motor drive. The CCGS or WMDM module could also be used as a wavelength dispersion element in a photonic integrated circuit or electronic-photonic integrated circuit.

The integrated circuit can be based on various materials including but not limited to glass (silica) waveguide, semiconductor waveguide, polymer waveguide, or any other type of optical waveguiding devices. Semiconductor waveguides include silicon or compound semiconductor waveguides such as III-V (GaAs, InP, InGaAsP, InAlAsP etc). The wavelength dispersion element based on the CCGS or WMDM module in the photonic integrated circuit can be integrated with optical detector, laser, amplifier, waveguide, modulator, splitter, multimode interference devices, other wavelength filters, array-waveguide-based devices, and other photonic devices, materials, or components to achieve a multi-component photonic integrated circuit with useful functionalities. The CCG explained below is a High-Resolution Compact Curved Grating (HR-CCG) that tries to alleviate the disadvantages associated with prior an mentioned earlier, by providing a high resolution in a small (compact) module with high spectral filtering performances such as high adjacent-wavelength power extinction and high spectral power output efficiency.

The present invention discloses a device that will have a wide range of utilities and can be used as a device in optical spectrometers, wavelength channel multiplexers, wavelength channel demultiplexers, wavelength or frequency filters, wavelength combiners, wavelength splitters, optical spectrum analyzers, wavelength detectors, spectra dispersion devices, optical arbitrary waveform generators, optical dispersion compensators, optical signal processors, and optical wavelength-domain or frequency-domain processors for combining, filtering, analyzing, processing, or detecting the spectral compositions of an input optical beam or plurality of input beams with one or plurality of output beams, and methods of making the same.

Figure 4A:
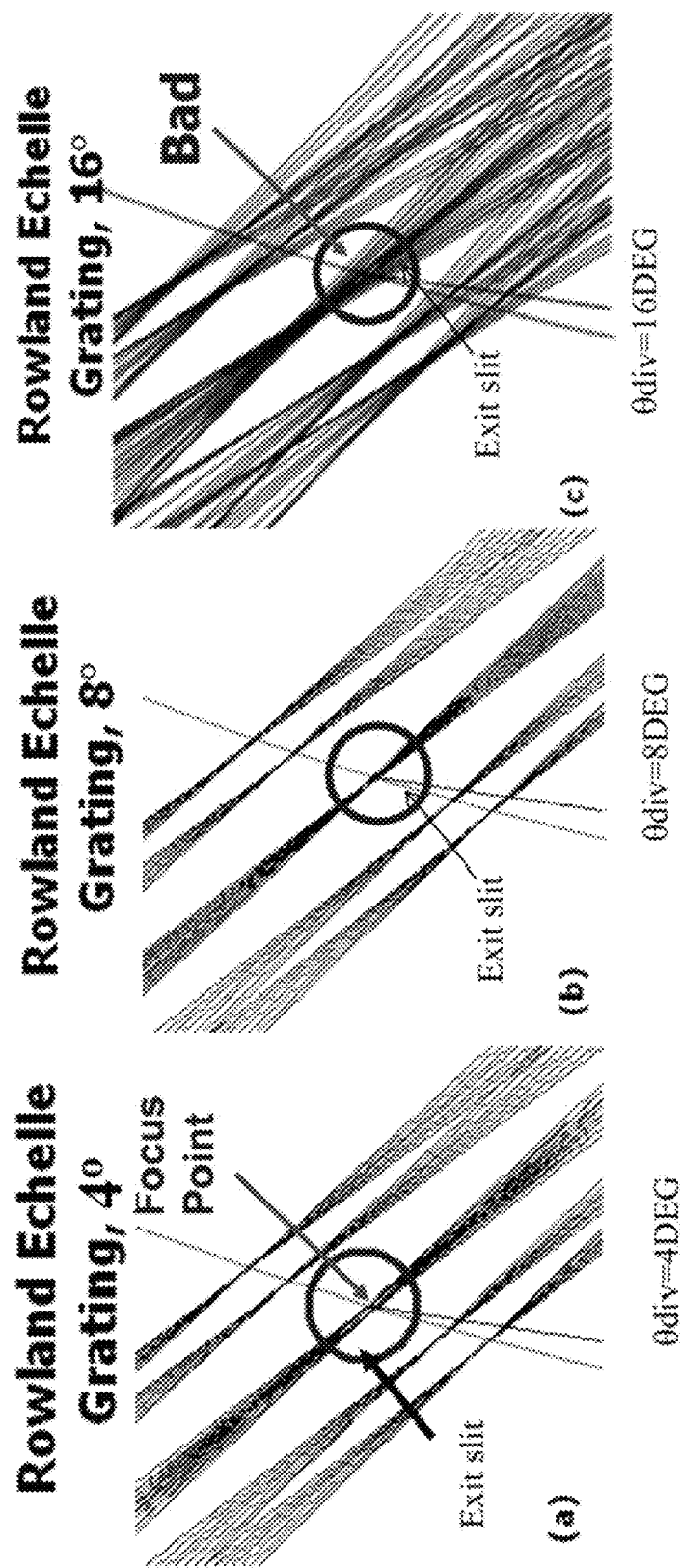
FIG. 4A shows ray-tracing for a Rowland grating design indicating focusing distortion or aberration at the exit slit for the cases where the input's "half divergence angles" $\Theta_{div}$ is such that $\Theta_{div}=(\theta_{dvdf\text{-}BI1\text{-}95\%})/2$ are 4 DEG (left), 8 DEG (middle), and 16 DEG (right).
Figure 4B:
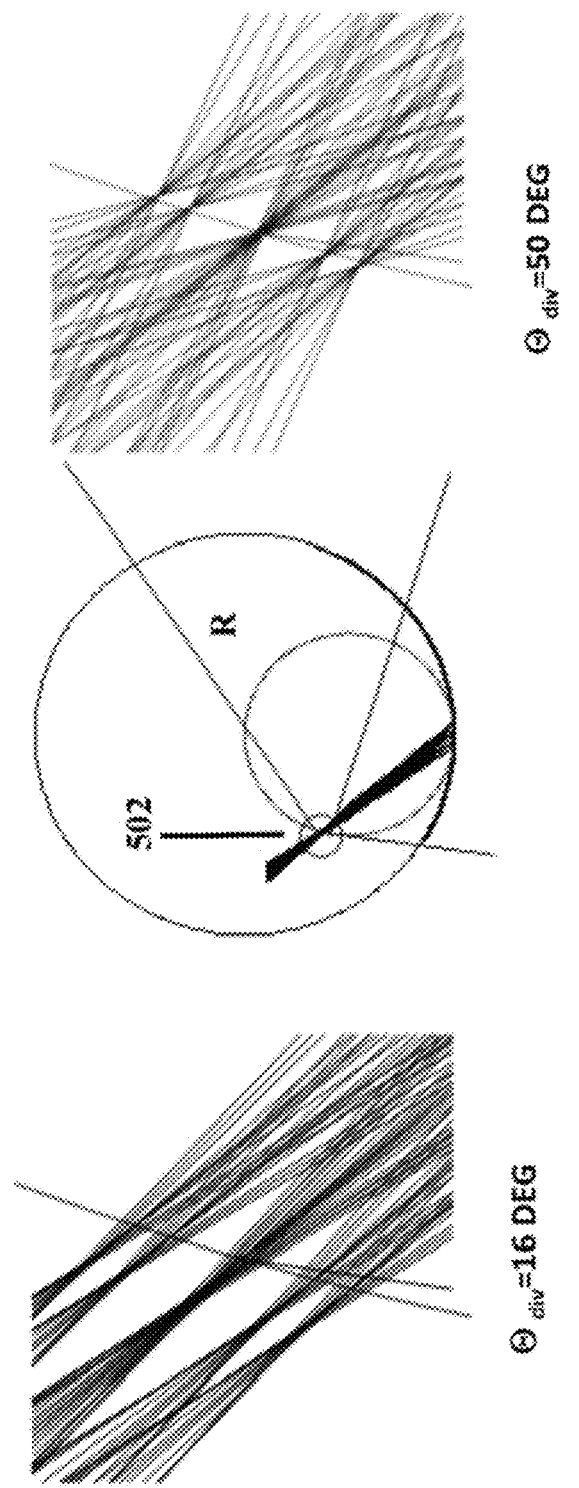
FIG. 4B describes the comparison of angular resolution for Rowland grating (left) with input divergence angle $\Theta_{div}$ 16 DEG and the High-Resolution Compact Curved Grating (HR-CCG) design with large-angle aberration correction at input divergence angle $\Theta_{div}$ 50 DEG (right).

We have improved on the current Rowland design, enabling curved-grating spectrometer with 10-100 times smaller linear size (or 100-10,000 time smaller area) using our HR-CCG with large-angle aberration-corrected design. The typical Rowland design can only reach a useful divergence angle $\Theta_{div}$ of ~4 DEG, beyond which serous aberration in the refocusing beam will occur to limit wavelength resolution. In FIG. 4A we show the angular resolution of the typical Rowland design at $\Theta_{div}$ of 16 DEG diffraction angle compared with a grating based on our HR-CCG design at $\Theta_{div}$ of 50 DEG. We see that our "large-angle aberration-corrected grating" design has much better angular resolution: different direction rays are well converged to a point on the focal circle. This translates to a much smaller $RA_{SM}$ factor or size. The design is also capable of achieving high adjacent-wavelength power extinction ratio $\eta_{ace}(\lambda_{SM})$, and high spectral output efficiency $\eta_{eff}(\lambda_{SM})$ at the detecting wavelength $\lambda_{SM}$.

Figure 6:
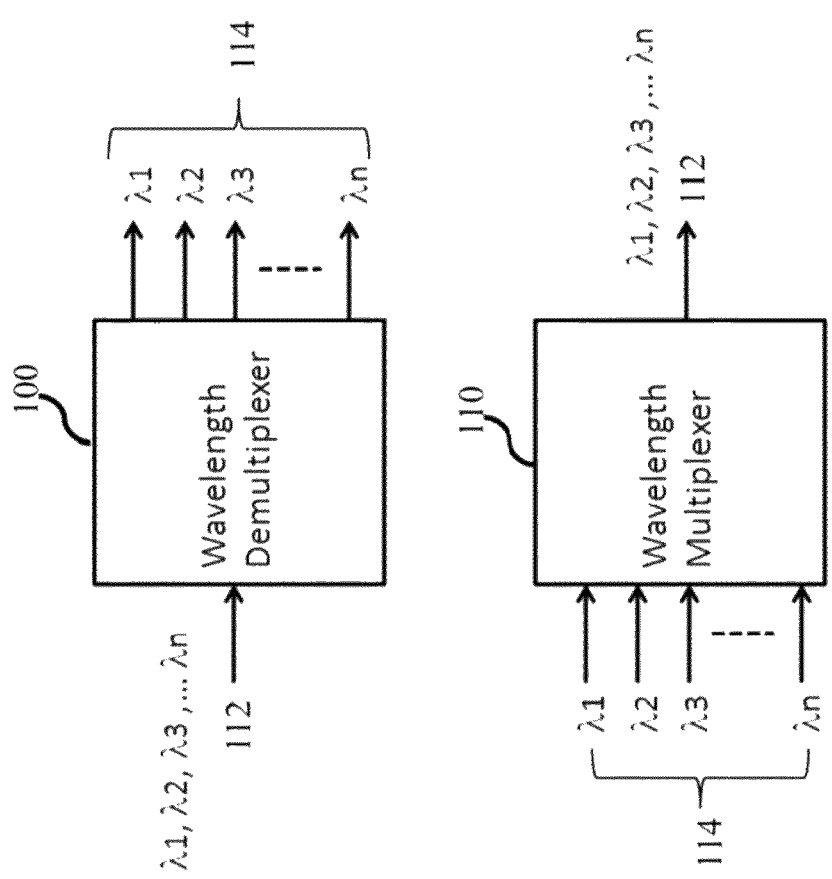
FIG. 6 illustrates a block diagram of a wavelength demultiplexer and a wavelength multiplexer.

We have used discrete time solution of vectorial Maxwell's equations to simulate the HR-CCG design, which verified the high resolution nature of our grating as predicted by the ray-tracing method. Referring to FIG. 6, a wavelength demultiplexer (wavelength deMux) 100 is a device in which multiple wavelengths in a beam of light 112 are separated into several different beams of light 114. A wavelength multiplexer (wavelength Mux) 110 is a device in which multiple wavelengths in several beams of light 114 are combined to a single beam of light 112.

Figure 7:
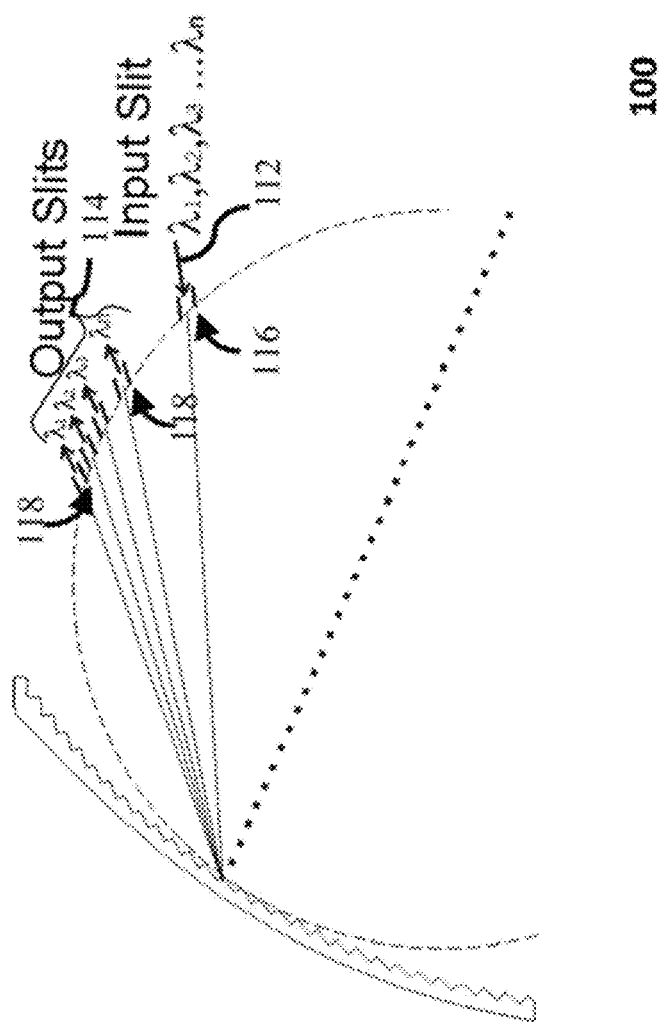
FIG. 7 illustrates a curved grating spectrometer configured as a wavelength demultiplexer.

Referring to FIG. 7, a curved grating spectrometer functions as a wavelength deMux 100 if it has an input slit 116 at the input beam 112 location so that the multiple wavelengths in the input beam will be diffracted to several output points 114 and several output slits 118 are placed at the locations of the spectrometer detectors mentioned above at these output points to form several output beams each with a different wavelength. The output slits 118 replace the detectors so that no detectors will be used.

Figure 8A:
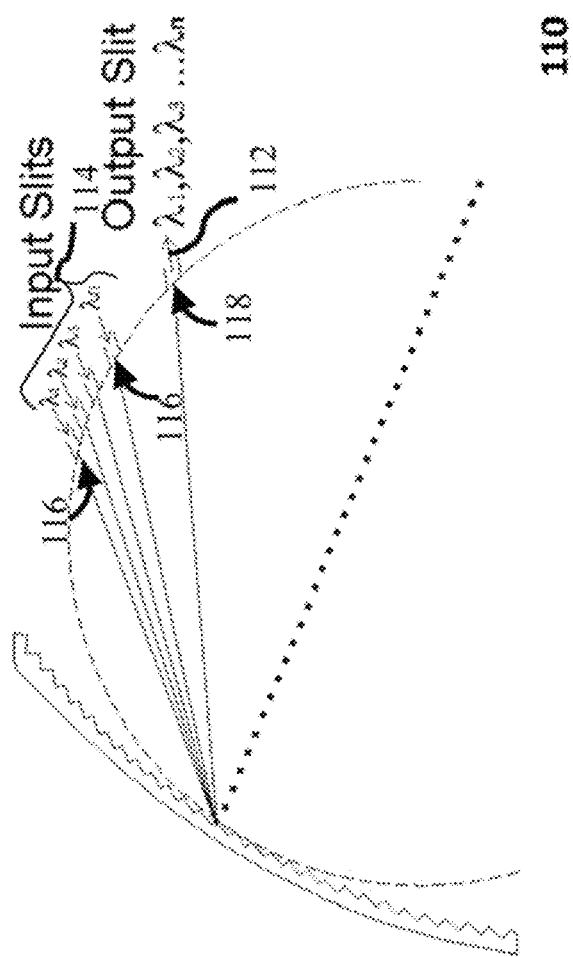
FIG. 8A illustrates a curved grating spectrometer configured as a wavelength multiplexer.
Figure 8B:
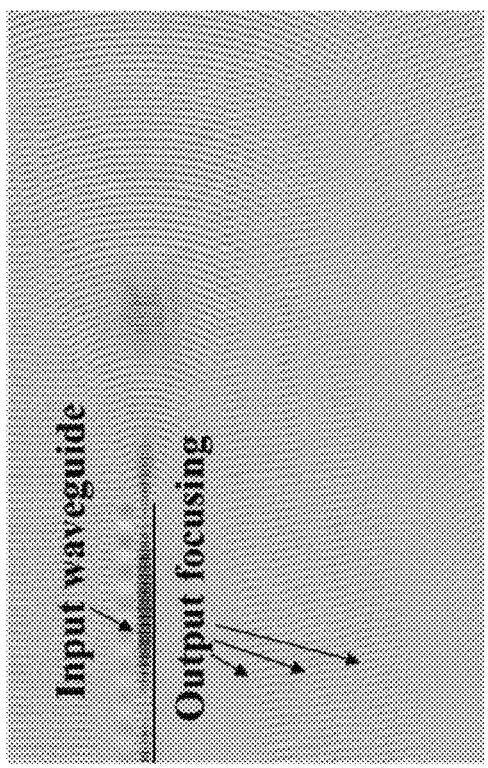
FIG. 8B shows the snapshot of electric field at the output slit (or waveguide of photodetector) location for the Rowland design described in FIG. 5.
Figure 8C:
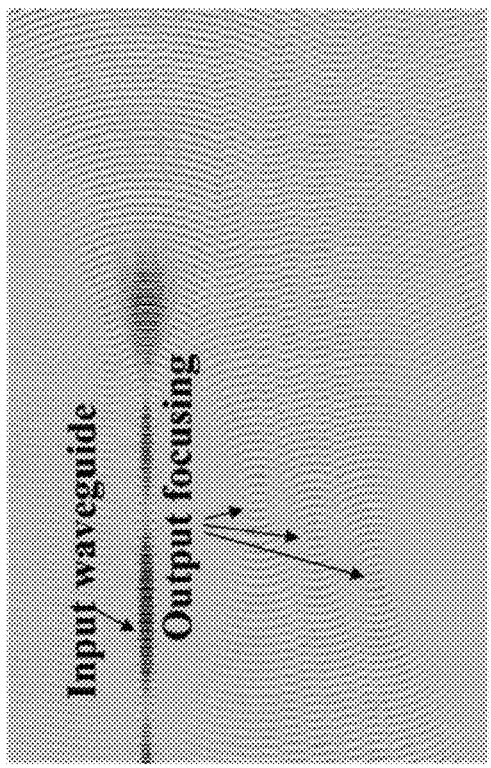
FIG. 8C shows the snapshot of electric field for the HR-CCG with constant arc-length grooves and output slit (or waveguide or photodetector) on a tangent circle.

Referring to FIG. 8, a curved grating spectrometer functions as a wavelength Mux 110 if it has multiple input slits 116, each slit placed at an input beam's 114 location so that all the input beams 114 will be diffracted to the same output point and an output slit 118 is placed at the location of the spectrometer detector mentioned above so that the output slit 118 will give a single output beam of light 112 with the combined wavelengths of light. The output slit 118 replaced the detector so that no detector will then be used.

Figure 9:
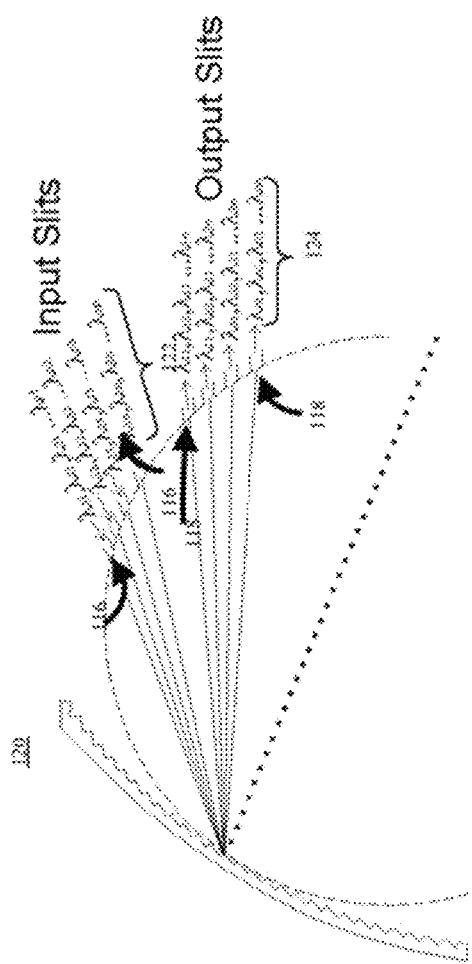
FIG. 9 illustrates a curved grating spectrometer configured as a wavelength multiplexer/demultiplexer.

Referring to FIG. 9, a more general wavelength Mux/deMux device 120 will have multiple input slits 116 and multiple output slits so that several input beams of light 122, each input beam with one or more wavelengths, are dispersed to form several output beams of light 124, each output beam with one or several wavelengths.

Figure 10:
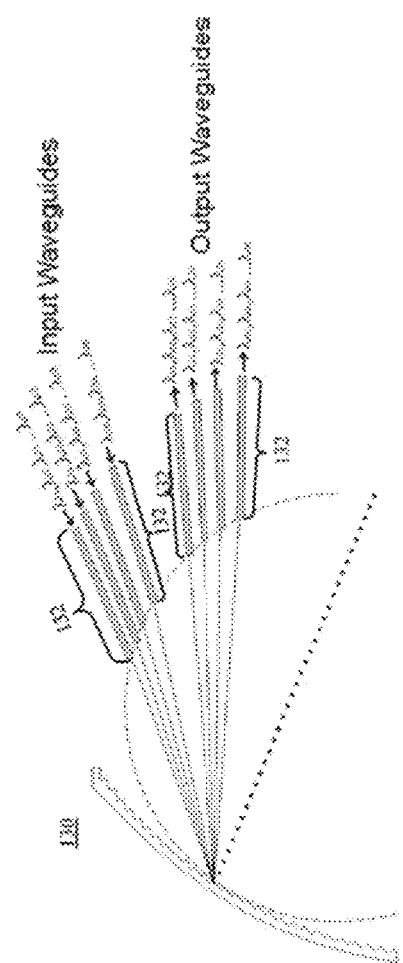
FIG. 10 illustrates a wavelength spectrometer configured as a multiplexer/demultiplexer with waveguides.

Referring to FIG. 10, an integrated version of the wavelength Mux/deMux device 130 will use optical channel waveguides 132 replacing input and output slits in which the mouth of each channel waveguide 132 will be at the location of the slit it is replacing. As is known to those skilled in the art, the waveguides 132 can be formed by optical fibers or with multiple-layer dielectric materials with high-refractive-index core to guide optical waves in the form of channel or planar waveguides 132. Such channel or planar waveguides can be formed on a common substrate. In an exemplary embodiment, the input channel waveguide is connected to a planar waveguiding region that propagates the beam from the input waveguide mouth towards a grating etched vertically into the planar waveguide material. The back side of the grating (the side away from the planar waveguiding region) can be coated with metallic gold reflector (shown as case A) or dielectric multilayer reflector (shown as case B) or reflection based on reflective index contrast (shown as case C) or reflection based on total internal refection (shown as case D). The beam diffracted from the grating is then coupled into an output channel waveguide. The mouth of the output waveguide then acts as the exit slit or output slit. The width of the input waveguide mouth then defines the width of the input slit and the width of the output waveguide mouth defines the width of the output slit. Furthermore, the location of the input waveguide mouth defines the location of the input slit and the location of the output waveguide mouth defines the location of the output slit. Below, when referring to the location of the input or output waveguide, it shall be taken as the location of the mouth of the input or output waveguide.

The planar waveguiding region referred to above is basically the region in which wave or beam propagates between the input slit and the grating or the grating and the output slit and is basically the grating-propagating region referred to as GPR 1020 in FIGS. 1, 1A, 1B, 2, 2A, 2B, 3.

Above illustrate the various general geometrical configurations of the present invention for the purpose of illustration and not limitation. It would be obvious to those skilled in the art to combine, separate, or utilize the components in these illustrative configurations in various ways.

Further Definitions of Common Terminologies

The subsection below further defines the common terminologies useful for describing the present invention.

It is known in the art that a relatively compact optical spectrometer can be achieved using a curved grating. The schematics of such a curved grating spectrometer device 1000 is shown in FIGS. 1, 1A, 1B, 2, 2A, 2B, 3, illustrating a curved grating CG 1010. The center of the curved grating CG 1010 called curved grating center CGC 1050.

Input Region Specification, Grating Center Circle Normal Line, and Grating-Center-to-Input-Slit Line.

A first input optical beam $B_{I1}$ 1101 entering a first input slit $SL_{I1}$ 1201, where the subscript "I1" is the label for "input" slit "1" or the "first" "input" slit. The width of the input slit is specified by a first input slit width $W_{I1}$ 1291W. The location of the center point $PX_{I1}$ 1291O of the first input slit $SL_{I1}$ 1201 is specified by a first input angle $\theta_{I1}$ 1271 that is an angle sustained between the line $L_{I1}$ 1251 joining the center point $PX_{I1}$ 1291O of the input slit $SL_{I1}$ 1201 to the grating center CGC 1050 (called "grating-center to input-slit line"), and a normal line to a circle described below at the grating center (called "grating-center circle normal line") $L_{GCCN}$ 1050N. The input slit location is further specified by a first input distance $S_{I1}$ 1261 from the grating canter CGC 1050 to the center point $PX_{I1}$ 1291O of the first input slit $SL_{I1}$ 1201. The first input angle $\theta_{I1}$ 1271 is zero when line $L_{I1}$ 1251 is parallel to grating-center circle normal line $L_{GCCN}$ 1050N. The angle $\theta_{I1}$ 1271 takes on positive value when the line $L_{I1}$ 1261 is rotated counter-clockwise (CCW) about the grating center CGC 1050 from this zero-angle position and takes on negative value when it is rotated clockwise (CW).

More specifically, as shown in FIG. 3, the grating-center circle normal line $L_{GCCN}$ 1050N is defined to be a line passing through the grating center point CGC 1050 and coincide with a diameter $L_{ICD}$ 1080D of a circle with one end of the diameter line at the grating center point CGC 1050 (see FIG. 3), and with the circle's diameter adjusted so that the circle also passes through the center of one of the input slits, say slit $SL_{I1}$ denoted as point $PX_{I1}$ 1291O in FIG. 3. The diameter of this circle so generated has a numerical value referred to as R (i.e. its radius will be R/2). Hence, $L_{ICD}$=R. This circle will be called the input-slit-and-grating reference circle or simply as "input circle" IC 1080.

In the situation in which there are plurality of input slits, there is in general no requirement that these input slits be situated on this input circle, though preferably, their input angles will all be defined with respect to the same grating-center circle normal line $L_{GCCN}$ 1050N.

Optical Axis Definition.

Figure 2:
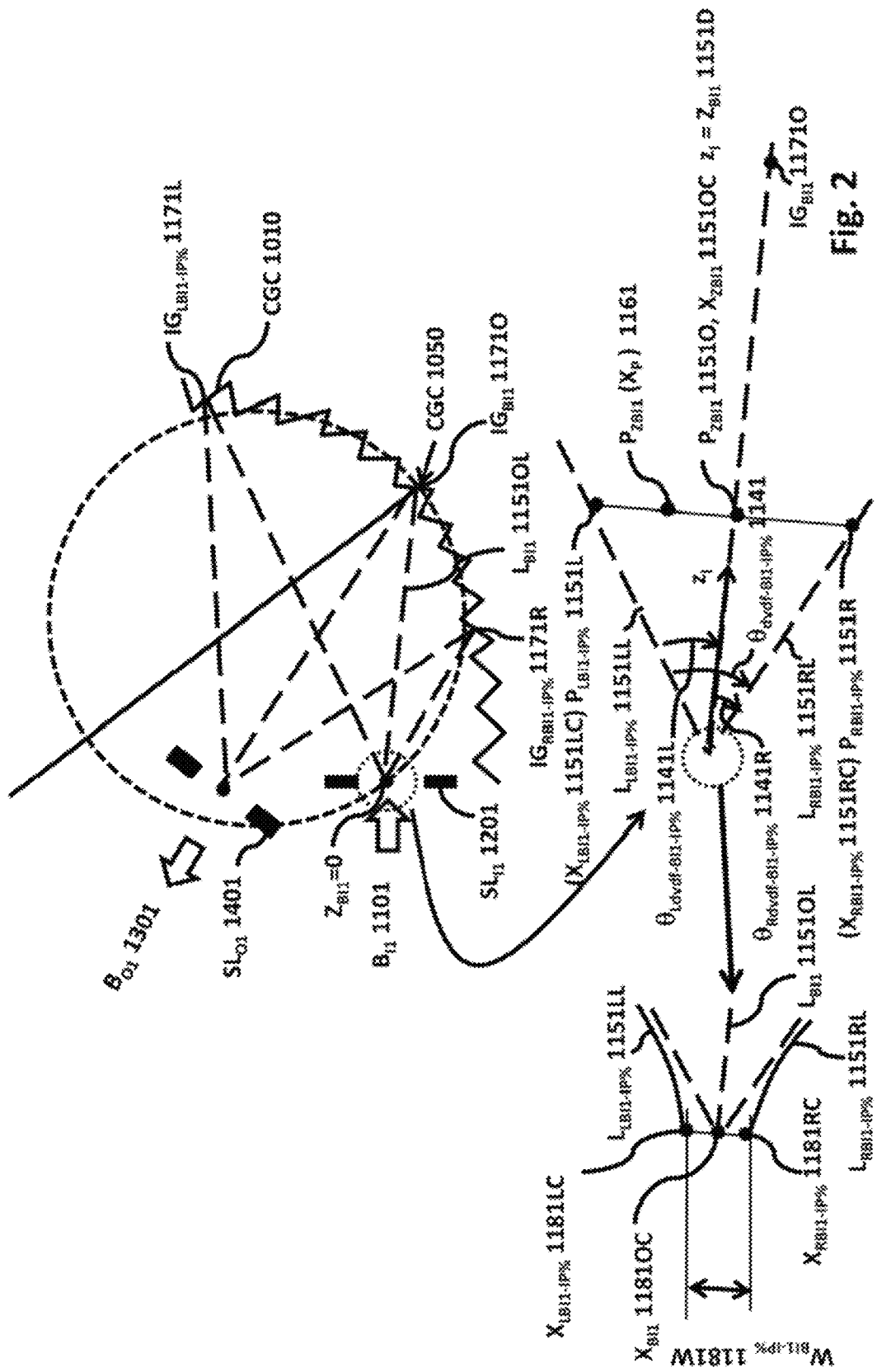
Figure 2A:
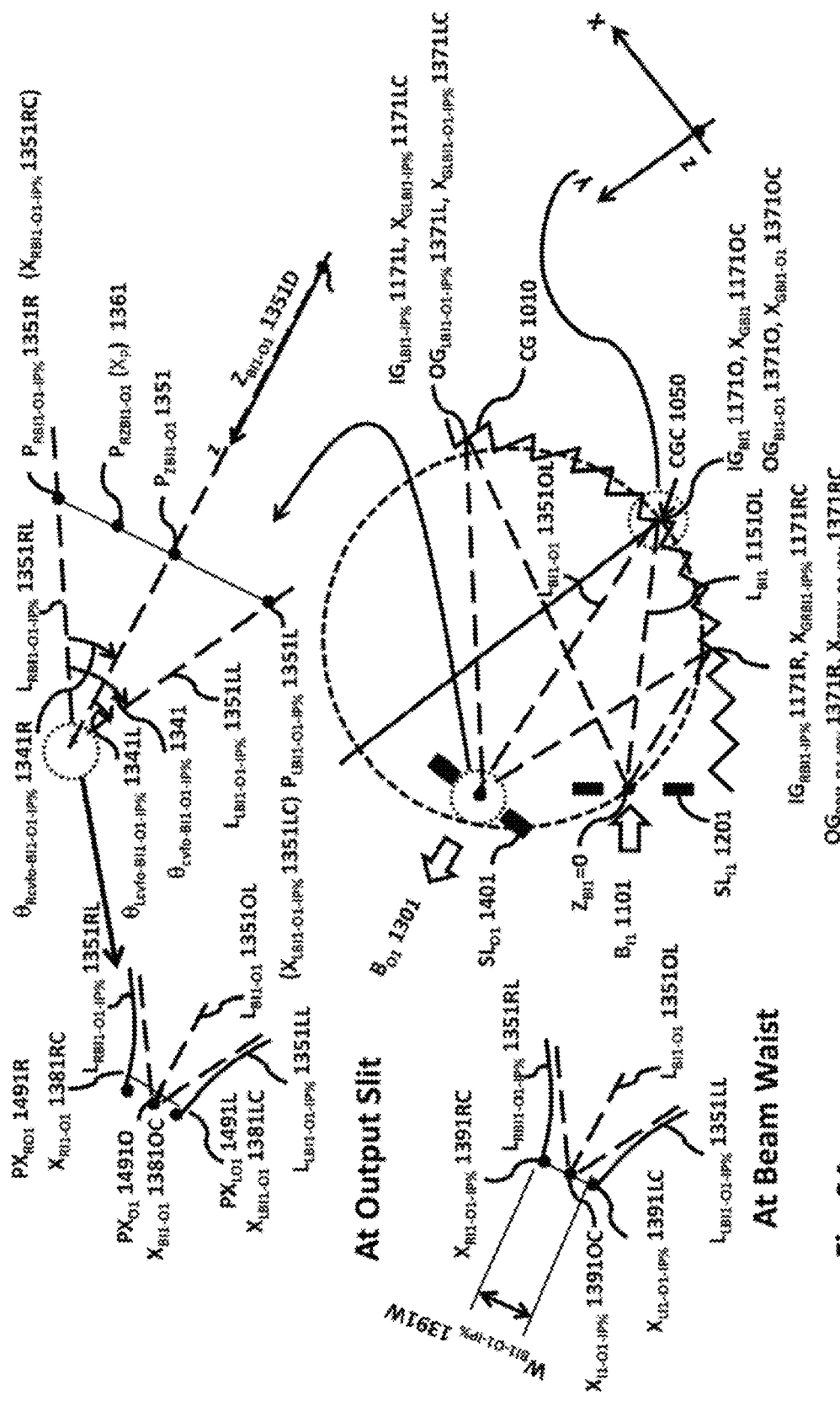

As shown by FIG. 2, let $Z_{BI1}$ 1510 measures the distance of propagation along the optical axis $L_{BI1}$ 1151OL of the input beam from the input slit $SL_{I1}$ 1201 so that $Z_{BI1}$=0 at the input slit and $Z_{BI1}$>0 when the beam propagates towards the grating. The optical axis $L_{BI1}$ 1151OL hits the grating surface at point $IG_{BI1}$ 1171O that typically coincide with the curved grating center CGC 1050. The optical axis for the purpose of this invention is defined by the locus points traced out by the peak intensity of the "fundamental mode" (i.e. the propagation mode with the lowest order transverse mode profile such as the fundamental Gaussian mode which is the lowest-order Hermit-Gaussian modes as is known to those skilled in the art) of the input beam. A point on the optical axis at $z_1$=$Z_{BI1}$ is called point $P_{ZBI1}$ 1151O. The x-y coordinates for that point is referred to as $X_{ZBI1}$ 1151OC. The optical axis line for the input beam is made up by the locus points traced out by points $P_{ZBI1}$ 1151O or coordinates $X_{ZBI1}$ 1151OC.

Let $x_1$ measures the perpendicular distance from the optical axis point $P_{ZBI1}$ 1151O to a point $P_{ZBI1}(x_P)$ 1161 for which $x_P>0$ on left side of the optical axis and $x_P<0$ on right side of the optical axis. More specifically, left means 9 O'clock side of the direct of propagation and right is 3 O'clock side if the direction of propagation is the 12 O'clock direction. Then $I(x_P,Z_{BI1})$ 1151I as a function of $x_P$ denotes the transverse or lateral intensity profile of the input beam at $Z_{BI1}$ 1151D.

Input-Slit-Width Angle and Input-Slit-Mouth Line.

Let the width of the input slit $W_{I1}$ 1291W spans an angle $\delta\theta_{I1}$ 1281 at the grating center (called "angle sustained by input slit width" or "input-slit-width angle") so that the CCW side (or left side; with front facing the slit) of the edge of the slit is at angle $\theta_{I1}+\delta\theta_{LI1}/2$ and the CW side (or right side) of the slit is at $\theta_{I1}-\delta\theta_{RI1}/2$ where $\delta\theta_{LI1}/2$ 1281L and $\delta\theta_{RI1}/2$ 1281R are the angular span to the "left" and the "right" of input angle $\theta_{I1}$ for the input slit. Here, the direction from the curved grating center CGC 1050 to the input slit $SL_{O1}$ 1201 is the front direction or 12 O'clock direction and the left/right side is the counter-clockwise/clockwise side towards the 9/3 O'clock direction. This will be the sign conventions for all the angles below that are referencing the curved grating center CGC 1050 as the pivot of rotation.

The left edge of the first input slit at angle $\theta_{I1}+\delta\theta_{LI1}/2$ is denoted as point $PX_{LI1}$ 1291L. The location of the right edge of the first input slit at angle $\theta_{I1}-\delta\theta_{RI1}/2$ is denoted as point $PX_{RI1}$ 1291R. The points $PX_{I1}$ 1291O, $PX_{LI1}$ 1291L, and $PX_{RI1}$ 1291R is an approximate straight line and point $PX_{I1}$ 1291O is at the middle of the line joining point $PX_{LI1}$ 1291L and point $PX_{RI1}$ 1291R, called the "first input slit mouth line" $L_{(PXLI1-PXRI1)}$. Thus, typically the left and right sides of the above angular spans are equal so that $\delta\theta_{LI1}=\delta\theta_{RI1}=\delta\theta_{I1}$.

The spatial x-y coordinates for the points at the input slits are: for $PX_{I1}$ 1291O its x-y coordinates are denoted by $X_{I1}$ 1291OC; for $PX_{LI1}$ 1291L its x-y coordinates are denoted by $X_{LI1}$ 1291LC; for $PX_{RI1}$ 1291R its x-y coordinates are denoted by $X_{RI1}$ 1291RC. The width of the input slit $W_{I1}$ is then given by $W_{I1}=|X_{LI1}-X_{RI1}|$ 1291W.

Typically line $L_{(PXLI1-PXRI1)}$ is designed so that it is perpendicular to the input line $L_{I1}$ 1251, though it is not always so.

While the input-slit-mouth line $L_{(PXLI1-PXRI1)}$ may or may not be perpendicular to the input line $L_{I1}$ 1251, the launching of the input beam $B_{I1}$ 1101 is done in a way so that its optical axis of propagation given by line $L_{BI1}$ 1151OL in FIG. 2 is basically parallel to the input line $L_{I1}$ 1251 and the input beam typically achieves a plane wavefront at the input slit center point $PX_{I1}$ 1291O.

Relation Between Input-Center Ray, Input Optical Axis, and Grating-Center-to-Input-Slit Line, and Plurality of Input Slits.

Note that input center ray $L_{I1-0}$ 1620O and the input beam optical axis $L_{BI1}$ 1151OL are normally close to coinciding with each other. Also the input beam optical axis $L_{BI1}$ 1151OL and grating-center-to-input-slit line $L_{I1}$ 1251 are normally close to coinciding with each other. Thus, the point $PX_{I1}$ 1291O where the grating-center-to-input-slit line $L_{I1}$ 1251 meets the input slit at coordinate $X_{I1}$ 1291OC is normally close to the same point as the point where the input beam optical axis $L_{BI1}$ 1151OL meets the input slit at coordinate $X_{BI1}$ 1181O.

The x-y coordinates for the various input beam points at the input slit location are given as follows: the x-y coordinate for the optical axis $L_{BI1}$ 1151OL at the input slit location is denoted by $X_{BI1}$ 1181OC; the x-y coordinate for the line $L_{RBI1-IP\%}$ 1151RL at the input slit location is denoted by $X_{RBI1-IP\%}$ 1181RC; the x-y coordinate for the line $L_{LBI1-IP\%}$ 1151LL at the input slit location is denoted by $X_{LBI1-IP\%}$ 1181LC. The beam width at the input slit location is denoted by $W_{BI1-IP\%}=|X_{LBI1-IP\%}-X_{RBI1-IP\%}|$ 1181W.

In general, there may be more than one input slit and the second input slit will be labeled as $SL_{I2}$ 1202. Likewise, input slit "n" will be labeled as $SL_{In}$. 120"n". All the other geometrical parameters will also follow the same numbering system as this numbering system. For example, the input line for the second input slit will be labeled as line $L_{I2}$ 1282. Likewise, input line for the input slit "n" will be labeled as $L_{In}$. 128"n" (i.e. by changing the last digit to correspond to the slit number) etc. This labeling system could illustrate "i" from i=0 to at most up to i=9 or −9 (i.e. up to |i|=9, where "|x|" means taking the absolute value of the number x). However, those skilled in the art will know how to extend it further to groove number |i|>9 if needed.

As the input beam exit input slit $SL_{I1}$ 1201, due to optical diffraction, the input beam width will also become larger giving rise to a spatially diverging beam width when the beam propagates towards the grating. The angle along which the beam diverges is called the beam's divergence angle as already discussed above. As explained there, the definition of interest for the divergence angle will depend on the applications involved.

Output Region Specification.

The curvature of the grating helps to refocus the diverging beam from the first input slit $SL_{I1}$ 1201 to a first output slit $SL_{O1}$ 1401 with a first output slit width $W_{O1}$ 1491W, where the subscript "O1" is the label for "output" slit "1" or the "first" "output" slit. Note that the term "output slit" is also referred to as "exit silt" below so that the terms "output slit" and "exit slit" will be used totally interchangeably. Similarly, the terms "input slit" and "entrance slit" will be used totally interchangeably.

Figure 1:
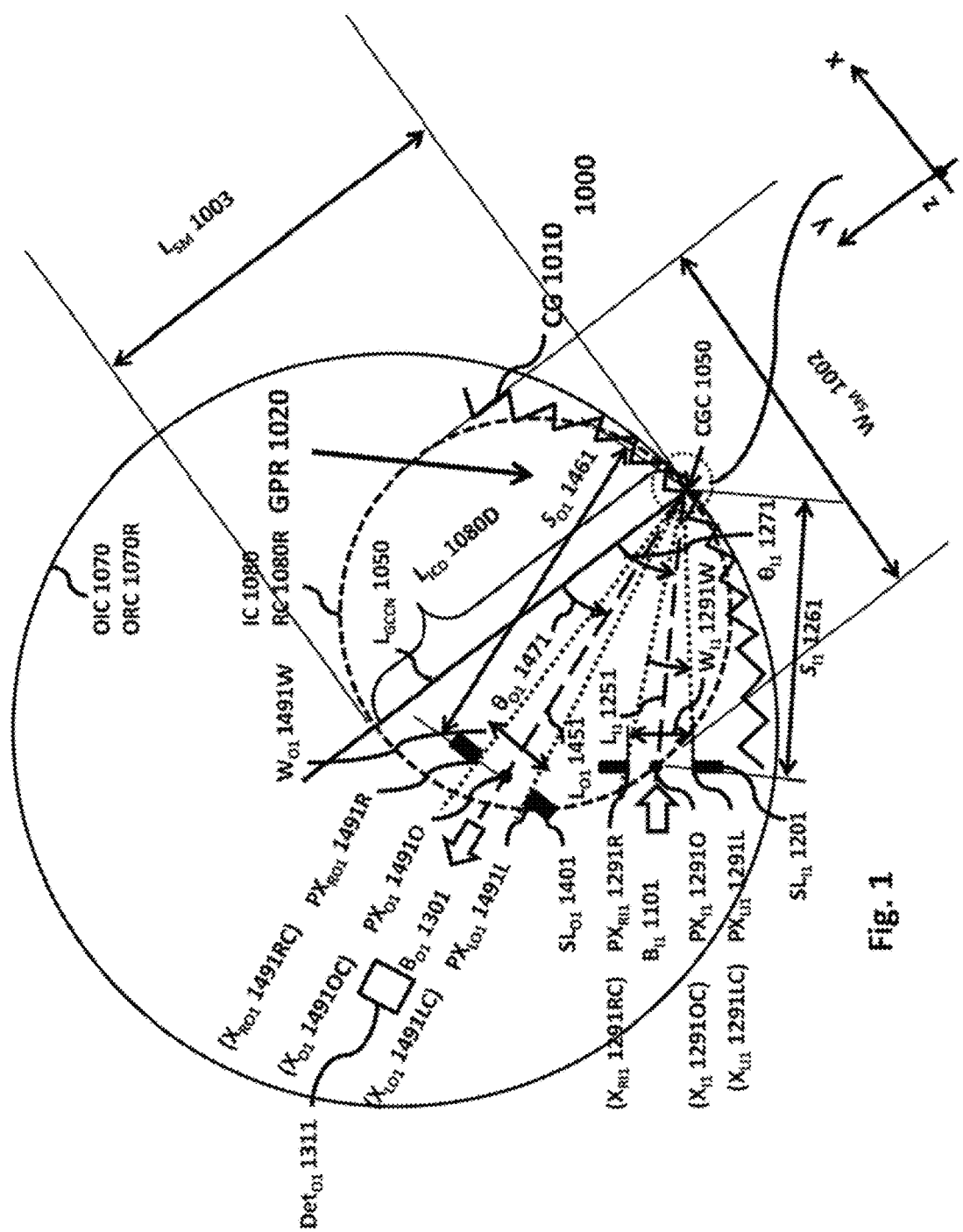
Figure 1B:
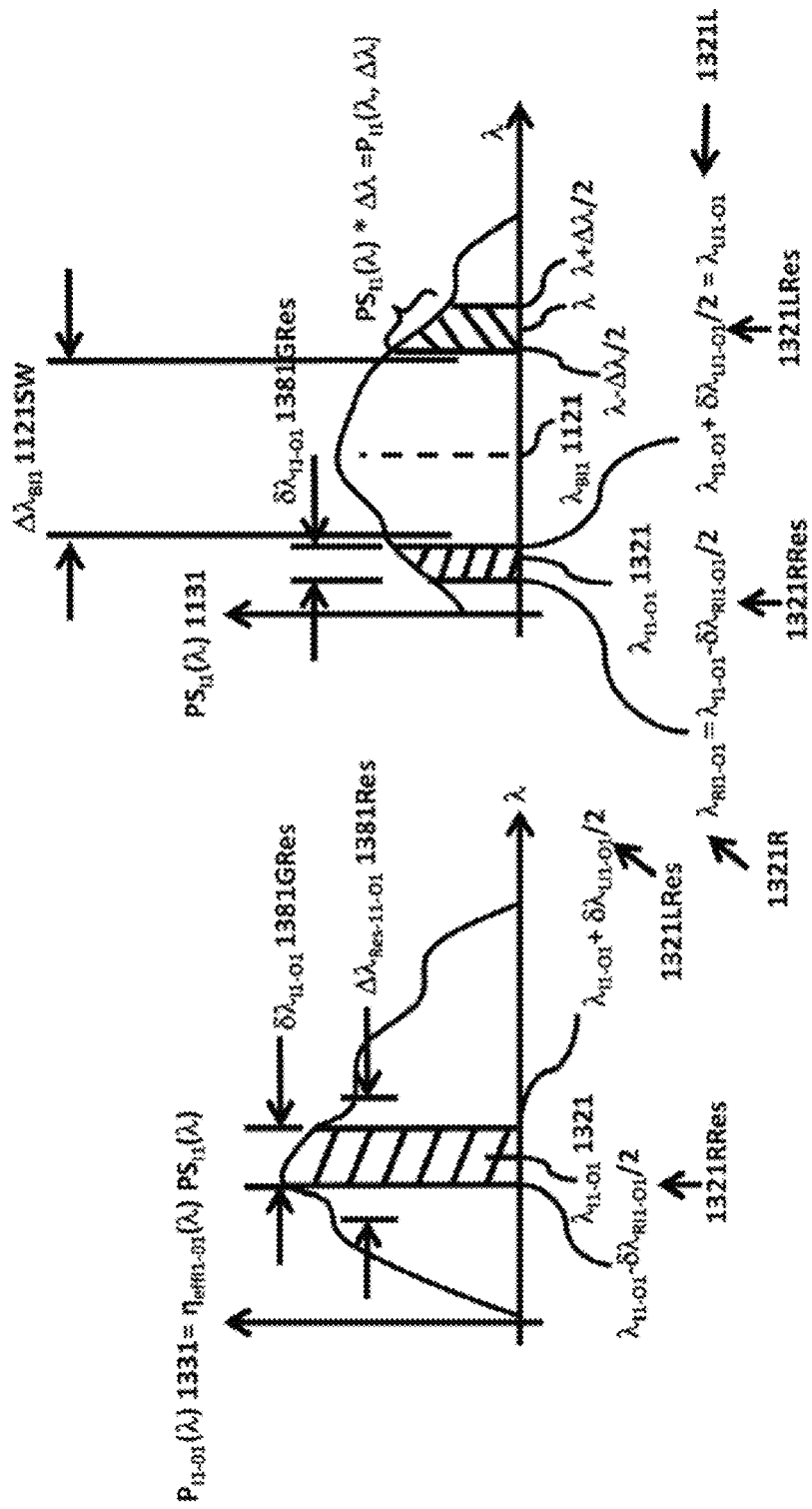

As shown in FIG. 1B, the first input beam $B_{I1}$ 1101 has an optical spectrum centered at the "first input-beam center wavelength" $\lambda_{BI1}$ 1121 with a spectral width $\Delta\lambda_{BI1}$ 1121SW measured at about full-width half-maximum of the spectral peak. The first input beam 1101 after propagating through the first input slit $SL_{I1}$ 1201, will propagate towards the curved grating CG 1010, which diffracts the beam spatially in an angular direction $\theta_{I1-Out}(\lambda)$ (called the grating output diffraction angle for an optical beam from input slit $SL_{I1}$ 1201) that is dependent on the wavelength $\lambda$ of the input beam's spectral component from input slit $SL_{I1}$ 1201. Let us assume the input beam has an optical power spectral density given by $PS_{I1}(\lambda)$ 1131. The wavelength $\lambda_{I1-O1}$ 1351 of the spectral component of the input beam that will reach the center of the first output slit at the angle $\theta_{O1}$ 1471 from the input slit at the angle $\theta_{O1}$ 1271 is thus the wavelength given by $\theta_{I1-Out}(\lambda=\lambda_{I1-O1})=\theta_{O1}$.

Output-Slit-Width Angle and Output-Slit-Mouth Line.

Let the width of the output slit $W_{O1}$ 1491W spans an angle $\delta\theta_{O1}$ 1481 (called "angle sustained by output slit width" or "output-slit-width angle") at the grating center so that the CCW side (or left side; with front facing the slit) of the edge of the slit is at angle $\theta_{O1}+\delta\theta_{LO1}/2$ and the CW side (or right side) of the slit is at $\theta_{O1}-\delta\theta_{RO1}/2$ where $\delta\theta_{LO1}/2$ 1481L and $\delta\theta_{RO1}/2$ 1481R are the angular span to the "left" and the "right" of output angle $\theta_{O1}$ for the output slit. Here, the direction from the curved grating center CGC 1050 to the output slit $SL_{O1}$ 1401 is the front direction or 12 O'clock direction and the left/right side is the counter-clockwise/clockwise side towards the 9/3 O'clock direction. This will be the sign conventions for all the angles below that are referencing the curved grating center CGC 1050 as the pivot of rotation.

The left edge of the first output slit at angle $\theta_{O1}+\delta\theta_{LO1}/2$ is denoted as point $PX_{LO1}$ 1491L. The location of the right edge of the first input slit at angle $\theta_{O1}-\delta\theta_{RO1}/2$ is denoted as point $PX_{LO1}$ 1491R. The points $PX_{O1}$ 1491O, $PX_{LO1}$ 1491L, and $PX_{RO1}$ 1491R form a straight line and point $PX_{O1}$ 1491O is at the middle of the line joining point $PX_{LO1}$ 1491L and point $PX_{RO1}$ 1491R, called the "first output-slit-mouth line" $L_{(PXLO1\text{-}PXRO1)}$. Thus, the left and right sides of the above angular spans are equal so that $\delta\theta_{LO1}=\delta\theta_{RO1}=\delta\theta_{O1}$.

The spatial x-y coordinates for the points at the output slits are: for $PX_{O1}$ 1491O its x-y coordinates are denoted by $X_{O1}$ 1491OC; for $PX_{LO1}$ 1491L its x-y coordinates are denoted by $X_{LO1}$ 1491LC; for $PX_{RO1}$ 1491R its x-y coordinates are denoted by $X_{RO1}$ 1491RC. The width of the output slit $W_{O1}$ is then given by $W_{O1}=|X_{LO1}-X_{RO1}|$ 1491W.

Typically line $L_{(PXLO1\text{-}PXRO1)}$ is designed so that it is perpendicular to the output line $L_{O1}$ 1451, though it is not always so.

While the first "output-slit-mouth line" $L_{(PXLO1\text{-}PXRO1)}$ may or may not be perpendicular to the output line $L_{O1}$ 1451, the receiving of the output beam $B_{I1\text{-}O1}$ 1301 is done in a way so that its optical axis of propagation given by line $L_{BI1\text{-}O1}$ 1351OL in FIG. 2 is basically parallel to the output line $L_{O1}$ 1451 and the grating geometry is designed so that the output beam typically achieves a plane wavefront at the output slit center point $PX_{O1}$ 1491O, though not always so.

In general, there may be more than one output slit and the second output slit will be labeled as $SL_{O2}$ 1402. Likewise, output slit "n" will be labeled as $SL_{O\text{"}n\text{"}}$ 140"n". All the other geometrical parameters will also follow the same numbering system as this numbering system. For example, the output line for the second output slit will be labeled as line $L_{O2}$ 1482. Likewise, output line for the output slit "n" will be labeled as $L_{O\text{"}n\text{"}}$ 148"n" (i.e. by changing the last digit to correspond to the slit number) etc.

Output "Geometrical Spectral Width".

Let $\delta\lambda_{LI1\text{-}O1}/2$ 1321L be the deviation from the output center wavelength $\lambda_{I1\text{-}O1}$ 1321 to the "left" such that the new wavelength $\lambda_{I1\text{-}O1}+\delta\lambda_{LI1\text{-}O1}/2$ will give output angle $\theta_{O1}+\delta\theta_{LO1}/2$ or $\theta_{I1\text{-}Out}(\lambda_{I1\text{-}O1}+\delta\lambda_{LI1\text{-}O1}/2)=\theta_{O1}+\delta\theta_{LO1}/2$. Hence, the equation $\theta_{I1\text{-}Out}(\lambda_{I1\text{-}O1}+\delta\lambda_{LI1\text{-}O1}/2)=\theta_{O1}+\delta\theta_{LO1}/2$ can also be used to define $\delta\lambda_{LI1\text{-}O1}/2$ 1321L. Likewise, Let $\delta\lambda_{RI1\text{-}O1}/2$ 1321R be the deviation from the output center wavelength $\lambda_{I1\text{-}O1}$ 1321 to the "right", which is then given by $\theta_{I1\text{-}Out}(\lambda_{I1\text{-}O1}-\delta\lambda_{RI1\text{-}O1}/2)=\theta_{O1}-\delta\theta_{RO1}/2$. Note that $\delta\lambda_{LI1\text{-}O1}/2$ 1321LRes or $\delta\lambda_{RI1\text{-}O1}/2$ 1321RRes may take on a positive or a negative value. The right edge wavelength is $\lambda_{RI1\text{-}O1}=\lambda_{I1\text{-}O1}+\delta\lambda_{RI1\text{-}O1}/2$ 1321R. The left edge wavelength is $\lambda_{LI1\text{-}O1}=\lambda_{I1\text{-}O1}+\delta\lambda_{LI1\text{-}O1}/2$ 1321L. The total spectral deviation is Adding the left and right wavelength deviations that span the range of angle that covers the output slit width then gives the "output geometrical spectral width" or "output geometrical resolution" $\delta\lambda_{I1\text{-}O1}$ (in wavelength) 1381GRes at output slit $SL_{O1}$ 1401 for the beam from input slit $SL_{I1}$ 1201, where $\delta\lambda_{I1\text{-}O1}=|\delta\lambda_{LI1\text{-}O1}/2|+|\delta\lambda_{RI1\text{-}O1}/2|$ 1381GRes. This spectral width $\delta\lambda_{I1\text{-}O1}$ 1381GRes will be referred to as the "first output slit geometrical spectral width for beam from the first input slit" or simply as "first output slit geometrical spectral width" when the context is clear which input slit the beam comes from.

Output Spectral Resolution Bandwidth and Output Power Spectrum.

In an "ideal situation", the output power spectrum $PS_{I1\text{-}O1}(\lambda)$ 1331 received/passed/detected by the first output slit would be from the input beam spectrum $PS_{I1}(\lambda)$ 1131 between Wavelengths $\delta_{RI1\text{-}O1}=\lambda_{I1\text{-}O1}-\delta\lambda_{RI1\text{-}O1}/2$ 1321R and $\lambda_{LI1\text{-}O1}=\lambda_{I1\text{-}O1}+\delta\lambda_{LI1\text{-}O1}/2$ 1321L around the center wavelength $\lambda_{I1\text{-}O1}$ 1321, where $\delta\lambda_{LI1\text{-}O1}/2$ 1321LRes and $\delta\lambda_{RI1\text{-}O1}/2$ 1321RRes correspond to the angular deviations to the left and right side of the diffraction angle of this center wavelength 1321. Adding the left and right wavelength deviations that span the range of angle that covers the output slit width then gives the "output geometrical spectral width" or "output geometrical resolution" $\delta\lambda_{I1\text{-}O1}$ (in wavelength) 1381GRes at output slit $SL_{O1}$ 1401 for the beam from input slit $SL_{I1}$ 1201, where $\delta\lambda_{I1\text{-}O1}=|\delta\lambda_{LI1\text{-}O1}/2|+|\delta\lambda_{RI1\text{-}O1}/2|$ 1381GRes.

The spectral width of the actual output power spectrum is called the "spectral resolution bandwidth" denoted as $\Delta\lambda_{Res\text{-}I1\text{-}O1}$ 1381Res. It is defined more precisely below. In the ideal situation, $\Delta\lambda_{Res\text{-}I1\text{-}O1}$ 1381Res is basically equal to the "output geometrical spectral width" $\delta\lambda_{I1\text{-}O1}$ 1381GRes or $\Delta\lambda_{Res\text{-}I1\text{-}O1}=\delta\lambda_{I1\text{-}O1}$.

However, in practice, due to spatial aberration of the output beam, the actual spectral resolution bandwidth denoted as $\Delta\lambda_{Res\text{-}I1\text{-}O1}$ 1381Res that take into account the spatial spread of the output beam width and spatial distortion of the beam when it focusses at the output slit 1401 location is larger than the ideal situation determined by geometry so that actual spectral resolution bandwidth $\Delta\lambda_{Res\text{-}I1\text{-}O1}$ 1381Res is larger than the output geometrical spectral width" $\delta\lambda_{I1\text{-}O1}$ 1381GRes or $\Delta\lambda_{Res\text{-}I1\text{-}O1}>\delta\lambda_{I1\text{-}O1}$.

Output Power Spectrum and Spectral Power Output Efficiency.

The "output power spectrum" after the beam from input slit $SL_{I1}$ 1201 goes through output slit $SL_{O1}$ 1401 is denoted by $PS_{I1\text{-}O1}(\lambda)$ 1331. It can be expressed in terms of the input beam power spectrum by: $PS_{I1\text{-}O1}(\lambda)=\eta_{effI1\text{-}O1}(\lambda)*PS_{I1}(\lambda)$, where $\eta_{effI1\text{-}O1}(\lambda)$, with a value between 0 and 1, is the efficiency factor for receiving/passing/detecting the input beam spectrum at the wavelength $\lambda$, called the "spectral power output efficiency" at wavelength $\lambda$.

Output Power.

The optical power received/passed/detected by the first output slit SLO1 1401 called the "output power for a beam going from input slit $SL_{I1}$ 1201 to output slit $SL_{O1}$ 1401 over a small spectral bandwidth $\Delta\lambda$ centered at wavelength $\lambda_A$ (small comparing to the spectral bandwidth of $PS_{I1\text{-}O1}(\lambda)$ at $\lambda_A$ or more precisely, small enough so that $PS_{I1\text{-}O1}(\lambda)$ at $\lambda_A$ does not change much over the wavelength bandwidth $\Delta\lambda$) for the beam from input slit $SL_{I1}$ be $P_{I1\text{-}O1}(\lambda_A; \Delta\lambda)$. $P_{I1\text{-}O1}(\lambda_A; \Delta\lambda)$ is then given by $PS_{I1\text{-}O1}(\lambda_A)*\Delta\lambda$ and is thus related to the spectral density of the input beam $PS_{I1}(\lambda_A)$ by:

$$P_{I1\text{-}O1}(\lambda_A; \Delta\lambda)=PS_{I1\text{-}O1}(\lambda_A)*\Delta\lambda=\eta_{effI1\text{-}O1}(\lambda_A)*PS_{I1}(\lambda_A)*\Delta\lambda. \quad (9)$$

In the situation that $\Delta\lambda$ is large, Eq. (9) should be more precisely converted to an integration of $PS_{I1\text{-}O1}(\lambda)$ with respect to wavelength $\lambda$ over wavelength bandwidth $\Delta\lambda$ centered at wavelength $\lambda=\lambda_A$ given by:

$$P_{I1-O1}(\lambda_A; \Delta\lambda) = \int_{\lambda_A-\frac{\Delta\lambda}{2}}^{\lambda_A+\frac{\Delta\lambda}{2}} PS_{I1-O1}(\lambda)d\lambda = \int_{\lambda_A-\frac{\Delta\lambda}{2}}^{\lambda_A+\frac{\Delta\lambda}{2}} \eta_{effI1-O1}(\lambda) * PS_{I1}(\lambda)d\lambda \quad (10)$$

Total Output Power.

The total optical power received/passed/detected by the first output slit called the "total output power for a beam going from input slit $SL_{I1}$ 1201 to output slit $SL_{O1}$ 1401" is then given by $P_{I1\text{-}O1}(\lambda; \Delta\lambda)$ above, with the wavelength $\lambda$ given by the output center wavelength $\lambda_{I1\text{-}O1}$ 1321 and the spectral width $\Delta\lambda$ given by the spectral resolution bandwidth $\Delta\lambda_{Res\text{-}I1\text{-}O1}$ 1381Res or more precisely integrated over the entire wavelength, and is denoted as $P_{I1\text{-}O1}$. That is, it is approximately given by:

$$P_{I1\text{-}O1} = P_{I1\text{-}O1}(\lambda_{I1\text{-}O1}; \Delta\lambda_{Res\text{-}I1\text{-}O1}) = \eta_{eff1\text{-}O1}(\lambda_{I1\text{-}O1}) \\ *PS_{I1}(\lambda_{I1\text{-}O1})*\Delta\lambda_{Res\text{-}I1\text{-}O1}. \quad (11)$$

Or by more precisely by the integration below:

$$P_{I1\text{-}O1} = P_{I1\text{-}O1}(\lambda_{I1\text{-}O1}; \Delta\lambda_{Res\text{-}I1\text{-}O1}) = \\ \int_{\lambda_{I1\text{-}O1} - \frac{\Delta\lambda_{Res\text{-}I1\text{-}O1}}{2}}^{\lambda_{I1\text{-}O1} + \frac{\Delta\lambda_{Res\text{-}I1\text{-}O1}}{2}} \eta_{eff1\text{-}O1}(\lambda) * PS_{I1}(\lambda) d\lambda \quad (12)$$

Light through the first output slit $SL_{O1}$ 1401 is then detected by a first photodetector $Det_{O1}$ 1311.

Definition of Input Beams Divergence-Diffraction Angle at Integrated Power Point.

Let us denote the input beam's full divergence angle due to diffraction from the input slit by $\theta_{dvdf\text{-}BI1\text{-}IP\%}$ 1141, which is defined by the angle made between the two lines traced out by the beam intensity locus points $P_{RBI1\text{-}IP\%}$ 1151R (coordinate at $X_{RBI1\text{-}IP\%}$ 1151RC) and $P_{LBI1\text{-}IP\%}$ 1151L (coordinate at $X_{LBI1\text{-}IP\%}$ 1151LC) on both sides of the beam, where $P_{RBI1\text{-}IP\%}$ 1151R, and $P_{LBI1\text{-}IP\%}$ 1151L are the locations of the intensity points such that the integrated power of the beam from the beam's intensity peak to each of the intensity point is IP/2 percent (IP/2%), where IP % is given by the parameter in the subscript of $\theta_{dvdf\text{-}BI1\text{-}IP\%}$ 1141. Adding up both the left and right sides will give the percentage of the integrated optical power (IP %) between points $P_{RBI1\text{-}IP\%}$ 1151R and $P_{LB1\text{-}IP\%}$ 1151L. Thus IP % denotes the percentage of the integrated power of the beam between points $P_{RBI1\text{-}IP\%}$ 1151R and $P_{LBI1\text{-}IP\%}$ 1151L of the beam perpendicular to the beam axis of propagation. This angular of divergence of the input beam is due to optical beam diffraction effect from a small finite aperture formed by the input slit width, as is also called the beam's diffraction angle. Thus, we will refer to it as "divergence-diffraction angle". It should not be confused with another diffraction effect which is the diffraction of the input beam to different output angles by the curved grating CG 1010. In that case it is called the "grating diffraction angle". The angle $\theta_{dvdf\text{-}BI1\text{-}IP\%}$ 1141 defined here will be called the "Input beam's divergence-diffraction angle at IP % integrated power point". It is labeled with subscript "dvdf" referring to divergence-diffraction.

Definition of Input Beam's Right/Left Half-Divergence-Diffraction Angle at Integrated Power Point.

The locus points $P_{RBI1\text{-}IP\%}$ forming the line $L_{RBI1\text{-}IP\%}$ 1151RL hit the grating surface at point $IG_{RBI1\text{-}IP\%}$ 1171R and the locus points $P_{LBI1\text{-}IP\%}$ forming the line $L_{LBI1\text{-}IP\%}$ 1151LL hit the grating surface at point $IG_{LBI1\text{-}IP\%}$ 1171L. The angle sustained by the line $L_{RBI1\text{-}IP\%}$ 1151RL and the optical axis $L_{BI1}$ 1151OL is the "right half-divergence-diffraction angle at IP % integrated power point" $\theta_{Rdvdf\text{-}BI1\text{-}IP\%}$ 1141R. The angle sustained by the line $L_{LBI1\text{-}IP\%}$ 1151LL and the optical axis $L_{BI1}$ 1151OL is the "left half-divergence-diffraction angle at IP % integrated power point" $\theta_{Ldvdf\text{-}BI1\text{-}IP\%}$ 1141L. The two angles are typically equal to each other though not always so and they added up to be equal to the divergence-diffraction angle $\theta_{dvdf\text{-}BI1\text{-}IP\%}$ 1141 so that: $\theta_{dvdf\text{-}BI1\text{-}IP\%} = \theta_{Rdvdf\text{-}BI1\text{-}IP} + \theta_{Ldvdf\text{-}BI1\text{-}IP\%}$. When the context is clear, these angles will be referred to simply as the input beam divergence angles.

Definition of Beam Width at IP % Integrated Power.

The distance between two points $X_{RBI1\text{-}IP\%}$ and $X_{LBI1\text{-}IP\%}$ given by: $|X_{RBI1\text{-}IP\%} - X_{LBI1\text{-}IP\%}|$ and denoted as $W_{BI1\text{-}IP\%}(Z_{BI1})$ 1151W (with $W_{BI1\text{-}IP\%}(Z_{BI1}) = |X_{RBI1\text{-}IP\%} - X_{LBI1\text{-}IP\%}|$) is referred to as the beam's width encompassing (or at) "IP % of the integrated center beam power".

For example with IP %=50%, $\theta_{dvdf\text{-}BI1\text{-}50\%}$ is the divergence angle defined by the angle made between the two lines traced out by the beam intensity locus points $P_{RBI1\text{-}50\%}$ 1151R (coordinate at $X_{RBI1\text{-}50\%}$ 1151RC) and $P_{LBI1\text{-}50\%}$ 1151L (coordinate at $X_{LBI1\text{-}50\%}$ 1151LC) on both sides of the beam that each encompasses 25% of the power of the beam from the beam's optical axis to each of the intensity point at $P_{LZBI1\text{-}50\%}$ or $P_{RZBI1\text{-}50\%}$ so that $[\int_0^{X_{LBI1\text{-}50\%}} I(x,Z_{BI1})dx/\int_{-\infty}^{\infty} I(x,Z_{BI1})dx] = 25\%$ and $[\int_{-x_{RBI1\text{-}50\%}}^0 I(x,Z_{BI1})dx/\int_{-\infty}^{\infty} I(x,Z_{BI1})dx] = 25\%$. Thus $W_{BI1\text{-}50\%}(Z_{I1})$ 1151W is referred to as the "beam's width at 50% of the integrated center beam power".

Relation to the Usual "Angle of Beam Divergence" at 1/e Intensity Point.

It is useful to relate this beam width and beam divergence angle definitions to the more commonly used definitions based on Gaussian beam approximation and description. As is known to those skilled in the art, for the purpose of estimation and description, often an optical beam such as the input beam can be approximated or fitted with a Gaussian beam intensity profile $I(x,Z_{BI1}) = (0,Z_{BI1})*Exp(-x^2)$. Let the fitted Gaussian beam width $W_{BI1\text{-}1=1/e}$ be defined by 1/e points of the Gaussian beam intensity profile, which is the points $X_{LB\text{-}1=1/e}$ and $X_{RB\text{-}1=1/e}$ at which $I(x_{LB\text{-}i=1/e}, Z_{BI1}) = (1/e)*I(0,Z_{BI1})$ and $I(x_{RB\text{-}1=1/e}, Z_{BI1}) = (1/e)*I(0,Z_{BI1})$ so that $W_{BI1\text{-}1=1/e} = X_{LB\text{-}1=1/e} - X_{RB\text{-}1=1/e}$. It can be shown that $W_{BI1\text{-}1=1/e}$ is approximately equal to (1/2.3) of $W_{BI1\text{-}IP\%=95\%}$ so that $W_{BI1\text{-}1=1/e} \sim (W_{BI1\text{-}95\%}/2.3)$. The term "angle of beam divergence" or also called "angle of beam diffraction" in the literature commonly referred to is defined as the angle made between the two lines defined by the locus points traced out by $X_{LB\text{-}1=1/e}$ and $X_{RB\text{-}1=1/e}$, and will be denoted by $\theta_{dvdf\text{-}BI1\text{-}1=1/e}$. It will be referred to as "input beam's divergence angle at 1/e intensity point".

In order not to be confused with "angle of grating diffraction", we prefer to refer to this angle of beam Width spreading as "angle of beam divergence-diffraction" or simply as "angle of beam divergence". It is important to note that for our applications, we need to deviate from this common terminology and there is no one single "angle of beam divergence". The "angle of beam divergence" of interest is depending on design needs and the angle $\theta_{dvdf\text{-}BI1\text{-}IP\%}$ 1141 as defined above describes the "x" percentage of integrated center beam power (with IP %=x %) being encompassed by the angles. It will be used to describe the various angles of divergence of interest below as they will be more specifically relevant and useful, instead of that more commonly used in the literature based on Gaussian beam approximation and description.

Definition of the Beam Waist under Gaussian Beam Approximation and the Divergence Angle at 1/e Intensity Point of the Beam.

If we approximate or decompose the input beam in terms of the Gaussian beam at the fundamental mode, we can let $W_{BI1\text{-}1=1/e}(x=0, Z_{BI1}=0)$ be the Gaussian beam waist at the input slit mouth (i.e. at $Z_{BI1}=0$) at which the wavefront is flat. Note that the location along the optical axis (i.e. the $Z_{BI1}$ defined above) at which the Gaussian beam or any optical beam has a flat wavefront is referred to in the art as the "beam waist" of the beam propagation.

If we approximate or decompose the input beam in terms of the Gaussian beam at the fundamental mode, the first input beam angle of divergence at 1/e intensity points denoted by $\theta_{dvdf-BI1-1=1/e}$ can be given approximately in terms of its 1/e Gaussian beam's approximated beam waist $W_{BI1-1=1/e}(x=0,Z_{BI1}=0)$. It is $\theta_{dvdf-BI1-1=1/e}=2*(\lambda_{BI1}/(Pi*W_{BI1-1=1/e}(x=0,Z_{BI1}=0)))$ (in Radian), where $\lambda_{BI1}$ 1121 is the "first input-beam center wavelength" shown in FIG. 1B, and Pi is the number π.

Output Beam's Propagation and Optical Axis.

Let $Z_{BI1-O1}$ 1351D measures the distance of propagation along the optical axis $L_{BI1-O1}$ 1351OL of the output beam from the curved grating CG 1010 to output slit $SL_{O1}$ 1201 so that $Z_{BI1-O1}=0$ at the curved grating surface and $Z_{BI1-O1}>0$ when the beam propagates towards the output slit. The output beam is obtained from the input beam from input slit $SL_{I1}$ reflected and diffracted by the grating. The optical axis $L_{BI1-O1}$ 1351OL hits the grating surface at point $OG_{BI1-O1}$ 1371O at which $Z_{BI1-O1}=0$. A point on the optical axis at $z_1=Z_{BI1-O1}$ is called point $P_{ZBI1-O1}$ 1351. The x-y coordinates for that point is referred to as $X_{ZBI1-O1}$ 1351C. The optical axis line for the output beam is made up by the locus points traced out by points $P_{ZBI1-O1}$ 1351 or coordinates $X_{ZBI1-O1}$ 1351C. This optical axis $L_{BI1-O1}$ 1351OL is referred to as the output beam's convergence-focusing optical axis.

In the typical application, point $OG_{BI1-O1}$ 1371O is assumed to coincide with point $IG_{BI1}$ 1171O for the input beam. The optical axis is typically defined by the locus points traced out by the peak intensity of the fundamental mode of the input beam. Let $x_i$ measures the perpendicular distance from the optical axis point $P_{ZBI1-O1}$ 1351 to a point $P_{LZBI1-O1}(x_P)$ 1361 for which $x_P>0$ on left side of the optical axis and $x_P<0$ on the right side. More specifically, left means 9 O'clock side of the direct of propagation and right is 3 O'clock side if the direction of propagation is the 12 O'clock direction. Then $I(x_P,Z_{BI1-O1})$ as a function of $x_P$ denotes the transverse or lateral intensity profile of the output beam at $Z_{BI1-O1}$ 1351D.

Output Beam's Full Convergence-Focusing Angle.

Assuming the input beam is a monochromatic source or a light beam with a very narrow spectral width at wavelength $\lambda_{I1-O1}$. Then after the monochromatic input beam is diffracted by the curved grating, the grating's surface curvature and diffraction properties will act together to focus the output beam with a focusing angle that is converging the beam size to a small focused spot at the output slit. The angle of focusing will be called the convergence-focusing angle. Let us denote this output beam's full convergence-focusing angle by $\theta_{cvfo-BI1-O1-IP\%}$ 1341, which is defined by the angle made between the two lines traced out by the beam intensity locus points $P_{RBI1-O1-IP\%}$ 1351R (coordinate at $X_{RBI1-O1-IP\%}$ 1351RC) and $P_{LBI1-O1-IP\%}$ 1351L (coordinate at $X_{LBI1-O1-IP\%}$ 1351LC) on both sides of the beam, where $P_{RBI1-O1-IP\%}$ 1351R, and $P_{LBI1-O1-IP\%}$ 1351L are the locations of the intensity points such that the integrated power of the beam from the beam's intensity peak to each of the intensity point is IP/2 percent (IP/2%), where IP % is given by the parameter in the subscript of $\theta_{cvfo-BI1-O1-IP\%}$ 1341. Adding up both the left and right sides will give the percentage of the integrated optical power (IP %) between points $P_{RBI1-O1-IP\%}$ 1351R and $P_{LBI1-O1-IP\%}$ 1351L. Thus IP % denotes the percentage of the integrated power of the beam between points $P_{RBI1-O1-IP\%}$ 1351R and $P_{LBI1-O1-IP\%}$ 1351L of the beam perpendicular to the beam's optical axis of propagation. This angular of divergence of the input beam is due to optical beam diffraction effect from a small finite aperture formed by the input slit width, as is also called the beam's diffraction angle. Thus, we will refer to it as "convergence-focusing angle". The angle $\theta_{cvfo-BI1-O1-IP\%}$ 1341 defined here will be called the "Out beam's convergence-diffraction angle at IP % integrated power point". It is labeled with subscript "cvfo" referring to convergence-focusing.

Meeting of the Output Beam and Input Beam at the Grating Surface.

The locus points $x_{LBI1-O1-IP\%}$ 1351LC is assumed to hit the grating surface at point $OG_{LBI1-O1-IP\%}$ 1371L and the locus points $x_{RBI1-O1-IP\%}$ 1351RC hits the grating surface at point $OG_{RBI1-O1-IP\%}$ 1371R. Above, we already describe the optical as $L_{BI1-O1}$ 1151OL traced out by locus points $x_{BI1-O1}$ 1151OC is assumed to hit the grating surface at point $OG_{BI1-O1}$ 1371O. In the typical application, point $OG_{LBI1-O1-IP\%}$ 1371L is assumed to coincide with point $IG_{LBI1-IP\%}$ 1171L for the input beam and $OG_{RBI1-O1-IP\%}$ 1371R is assumed to coincide with point $IG_{RBI1-O1-IP\%}$ 1171R for the input beam.

The coordinates for all these points at the grating surfaces are the coordinate for $OG_{BI1-O1}$ 1371O is $X_{GBI1-O1}$ 1371OC; the coordinate for $OG_{RBI1-O1-IP\%}$ 1371R is $X_{GRBI1-O1-IP\%}$ 1371RC; the coordinate for $OG_{LBI1-O1-IP\%}$ 1371L is $X_{GLBI1-O1-IP\%}$ 1371LC; the coordinate for $IG_{BI1-IP\%}$ 1171 is $X_{GBI1-IP\%}$ 1171C; the coordinate for $IG_{RBI1-IP\%}$ 1171R is $X_{GRBI1-IP\%}$ 1171RC; the coordinate for $IG_{LBI1-IP\%}$ 1171L is $X_{GLBI1-IP\%}$ 1171LC; the coordinate for CGC 1050 is $X_0$.

Definition of Beam Width at IP % Integrated Power.

The distance between two points $X_{RBI1-O1-IP\%}$ 1351RC and $X_{LBI1-O1-IP\%}$ 1351LC given by: $|X_{RBI1-O1-IP\%}-X_{LBI1-O1-IP\%}|$ and denoted as $W_{BI1-O1-IP\%}(Z_{BI1-O1})$ 1351W (with $W_{BI1-O1-IP\%}(Z_{BI1-O1})=|X_{RBI1-O1-IP\%}-X_{LBI1-O1-IP\%}|$) is referred to as the beam's width encompassing (or at) "IP % of the integrated center beam power".

Definition of Output Beam's Right/Left Half Convergence-Focusing Angle at Integrated Power Point.

The locus points $P_{RBI1-O1-IP\%}$ forming the line $L_{RBI1-O1-IP\%}$ 1351RL hit the grating surface at point $OG_{RBI1-O1-IP\%}$ 1371R and the locus points $P_{LBI1-O1-IP\%}$ forming the line $L_{LBI1-O1-IP\%}$ 1351LL hit the grating surface at point $OG_{LBI1-O1-IP\%}$ 1371L. The angle sustained by the line $L_{RBI1-O1-IP\%}$ 1351RL and the optical axis $L_{BI1-O1}$ 1351OL is the "right half-convergence-focusing angle at IP % integrated power point" $\theta_{Rcvfo-BI1-O1-IP\%}$ 1341R. The angle sustained by the line $L_{LBI1-O1-IP\%}$ 1351LL and the optical axis $L_{BI1-O1}$ 1351OL is the "left half-convergence-focusing angle at IP % integrated power point" $\theta_{Lcvfo-BI1-O1-IP\%}$ 1341L. The two angles are typically equal to each other though not always so and they added up to be equal to the divergence-diffraction angle $\theta_{cvfo-BI1-O1-IP\%}$ 1341 so that: $\theta_{cvfo-BI1-O1-IP\%}=\theta_{Rcvfo-BI1-O1-IP\%}+\theta_{Lcvfo-BI1-O1-IP\%}$. When the context is clear, these angles will be referred to simply as the output beam convergence angles.

Relation Between Output-Center Ray, Output Optical Axis, and Grating-Center-to-Output-Slit Line, and Plurality of Output Slits.

In the situation in which the input is a monochromatic beam at wavelength $\lambda_{I1-O1}$ 1321, the output beam after reflection and diffraction from the grating is a well-defined beam and we can refer to various output-beam related variables including output-center ray, output optical axis etc. Note that "output-center ray" $L_{O1-0}$ 1820O and the "output beam optical axis" $L_{BI1-O1}$ 1351OL are normally close to coinciding with each other. Also the "output beam optical axis" $L_{BI1-O1}$ 1351OL and "grating-center-to-output-slit line" $L_{O1}$ 1451 are normally close to coinciding with each other.

The x-y coordinates for the various output beam points at the output slit location are given as follows: the x-y coordinate for the optical axis $L_{BI1-O1}$ 1351OL at the output slit location is denoted by $X_{BI1-O1}$ 1381OC; the x-y coordinate for the line $L_{RBI1-O1-IP\%}$ 1351RL at the output slit location is denoted by $X_{RBI1-O1-IP\%}$ 1381RC; the x-y coordinate for the line $L_{LBI1-O1-IP\%}$ 1351LL at the output slit location is denoted by $X_{LBI1-O1-IP\%}$ 1381LC. The beam width at the output slit location (called "output-slit beam width") is denoted by $W_{BI1-O1-IP\%}=|X_{LBI1-O1-IP\%}-X_{RBI1-O1-IP\%}|$ 1381W.

Thus, the point $PX_{O1}$ 1491O where the grating-center output slit line $L_{O1}$ 1451 meets the output slit at coordinate $X_{O1}$ 1491OC is normally close to the same point as the point where the output beam optical axis $L_{BI1-O1}$ 1351OL meets the output slit at coordinate $X_{BI1-O1}$ 1381OC.

Output Beam's Focused Beam Waist Location and Beam Waist Width.

As noted above, if the input beam is a monochromatic beam at wavelength $\lambda_{I1-O1}$ 1321, then the output beam typically will achieve a minimal beam width at or around some spatial location. We shall call that the output focused beam waist location $X_{BI1-O1}$ 1391OC. The beam waist width at that location is denoted by $W_{BI1-O1-IP\%}$ 1391W and is called the beam waist width of the output beam.

The x-y coordinates for the various output beam points at this beam waist location are given as follows: the x-y coordinate for the optical axis $L_{BI1-O1}$ 1351OL at the output beam waist location is denoted by $X_{BI1-O1}$ 1391OC; the x-y coordinate for the line $L_{RBI1-O1-IP\%}$ 1351RL at the output beam waist location is denoted by $X_{RBI1-O1-IP\%}$ 1391RC, the x-y coordinate for the line $L_{LBI1-O1-IP\%}$ 1351LL at the output beam waist location is denoted by $X_{LBI1-O1-IP\%}$ 1391LC. The beam width at the input slit location is denoted by $W_{BI1-IP\%}=|X_{LBI1-IP\%}-X_{RBI1-IP\%}|$ 1181W.

Output Beam's Full Divergence-Diffraction Angle.

Figure 2B:
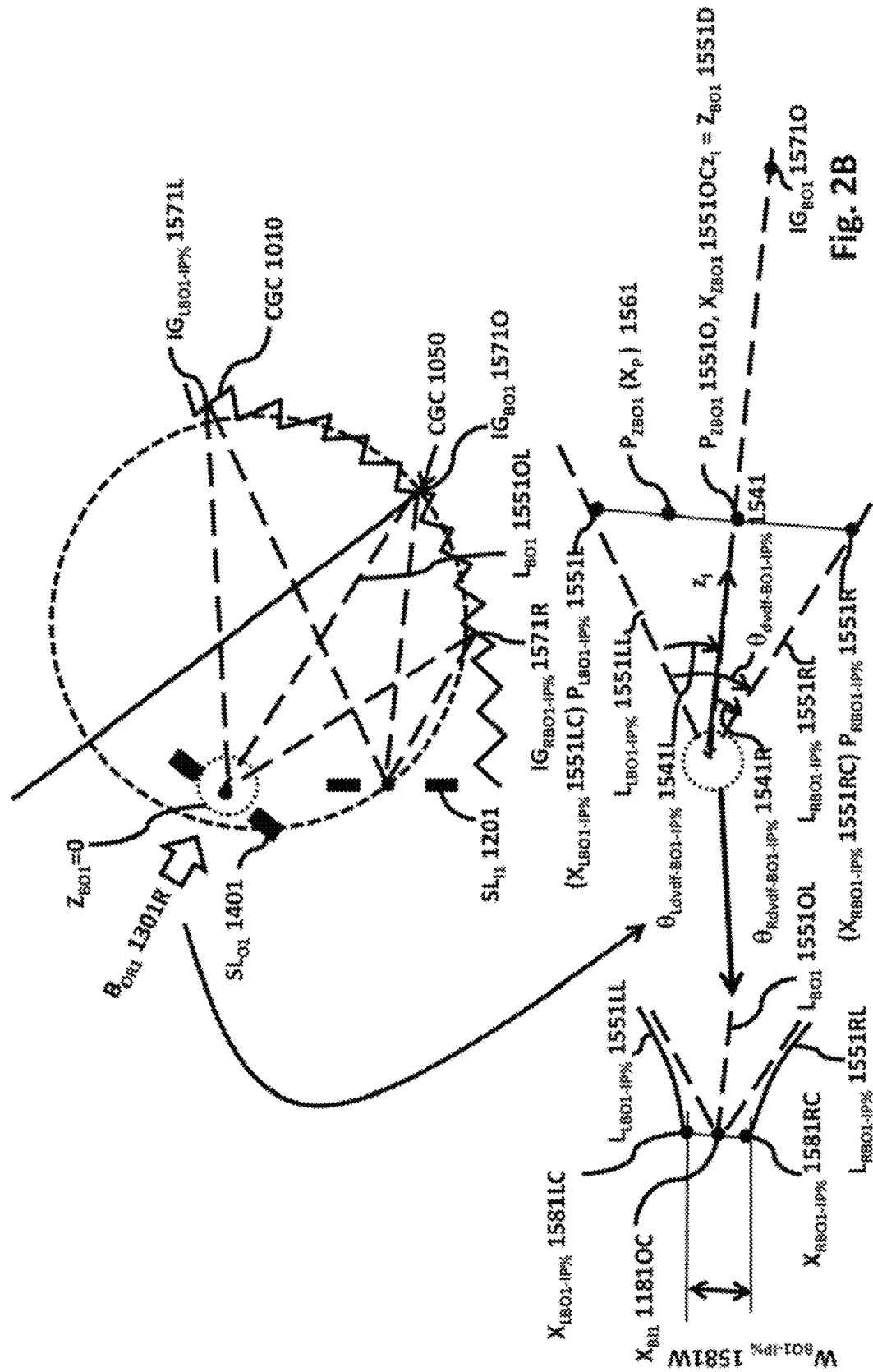

It is also useful to think of launching an optical beam from the output slit instead of the input slit and see how its angle of propagation diffracts. Let us called that the reversed output beam $B_{OR1}$ 1301R, as shown in FIG. 2B. The beam divergence angle in that case is called the output beam's divergence-diffraction angle and its corresponding optical axis is called the output beam's divergence-diffraction optical axis. By engineering the grating and the output slit so that the output beam's convergence-focusing angle matches the output beam's divergence-diffraction angle when the output beam's divergence-diffraction optical axis coincide with the output beam's convergence-focusing optical axis is a way to optimize the spectrometer resolution, optical power throughput, adjacent channel cross talks and other performances.

This divergence-diffraction of the output beam from output slit $SL_{O1}$ is shown in FIG. 3. Let us denote the output beam's full divergence-diffraction angle from the output slit by $\theta_{dvdf-BO1-IP\%}$ 1541, which is defined by the angle made between the two lines traced out by the beam intensity locus points $P_{RBO1-IP\%}$ 1551R (coordinate at $X_{RBO1-IP\%}$ 1551RC) and $P_{LBO1-IP\%}$ 1551L (coordinate at $X_{LBO1-IP\%}$ 1551LC) an both sides of the beam, where $P_{RBO1-IP\%}$ 1551R, and $P_{LBO1-IP\%}$ 1551L are the locations of the intensity points such that the integrated power of the beam from the beam's intensity peak to each of the intensity point is IP/2 percent (IP/2%), where IP is given by the parameter in the subscript of $\theta_{dvdf-BO1-IP\%}$ 1541. Adding up both the left and right sides will give the percentage of the integrated optical power (IP) between points $P_{RBO1-IP\%}$ 1551R and $P_{LBO1-IP\%}$ 1551L. Thus IP denotes the percentage of the integrated power of the beam between points $P_{RBO1-IP\%}$ 1551R and $P_{LBO1-IP\%}$ 1551L of the beam perpendicular to the beam's optical axis of propagation. This angle of divergence of the output beam is due to optical beam diffraction effect from a small finite aperture formed by the output slit width, as is also called the beam's diffraction angle. Thus, we will refer to it as "divergence-diffraction angle". The angle $\theta_{dvdf-BO1-IP\%}$ 1541 defined here will be called the "Output beam's divergence-diffraction angle at IP % integrated power point". It is labeled with subscript "dvdf" referring to divergence-diffraction.

Optical Axis Definition.

As shown by FIG. 2B, let $Z_{BO1}$ 1551D measures the distance of propagation along the optical axis $L_{BO1}$ 1551OL of the beam from the output slit $SL_{O1}$ 1401 so that $Z_{BO1}=0$ at the output slit and $Z_{BO1}>0$ when the beam propagates towards the grating. The optical axis $L_{BO1}$ 1551OL hits the grating surface at point $IG_{BO1}$ 1571O. The optical axis for the purpose of this invention is defined by the locus points traced out by the peak intensity of the "fundamental mode" (i.e. the propagation mode with the lowest order transverse mode profile such as the fundamental Gaussian mode which is the lowest-order Hermit-Gaussian modes as is known to those skilled in the art) of the input beam. A point on the optical axis at $z_i=Z_{BO1}$ is called point $P_{ZBO1}$ 1551O. The x-y coordinates for that point is referred to as $X_{ZBO1}$ 1551OC. The optical axis line for the input beam is made up by the locus points traced out by points $P_{ZBO1}$ 1551O or coordinates $X_{ZBO1}$ 1551OC.

Let $x_i$ measures the perpendicular distance from the optical axis point $P_{ZBO1}$ 1551O to a point $P_{ZBO1}(x_P)$ 1561 for which $x_P>0$ on left side of the optical axis and $x_P<0$ on right side of the optical axis. More specifically, left means 9 O'clock side of the direct of propagation and right is 3 O'clock side if the direction of propagation is the 12 O'clock direction. Then $I(x_P,Z_{BO1})$ 1551I as a function of $x_P$ denotes the transverse or lateral intensity profile of the input beam at $Z_{BO1}$ 1551D.

Definition of Output Beam's Right/Left Half-Divergence-Diffraction Angle at Integrated Power Point.

The locus points $P_{RBO1-IP\%}$ 1551R forming the line $L_{RBO1-IP\%}$ 1551RL hit the grating surface at point $IG_{RBO1-IP\%}$ 1571R and the locus points $P_{LBO1-IP\%}$ 1551L forming the line $L_{LBO1-IP\%}$ 1551LL hit the grating surface at point $IG_{LBO1-IP\%171}$ 1571L. The angle sustained by the line $L_{RBO1-IP\%}$ 1551RL and the optical axis $L_{BO1}$ 1551OL is the "right half-divergence-diffraction angle at IP % integrated power point" $\theta_{Rdvdf-BO1-IP\%}$ 1541R. The angle sustained by the line $L_{LBO1-IP\%}$ 1551LL and the optical axis $L_{BO1}$ 1551OL is the "left half-divergence-diffraction angle at IP % integrated power point" $\theta_{Ldvdf-BO1-IP\%}$ 1541L. The two angles are typically equal to each other though not always so and they added up to be equal to the divergence-diffraction angle $\theta_{dvdf-BO1-IP\%}$ 1541 so that: $\theta_{dvdf-BO1-IP\%}=\theta_{Rdvdf-BO1-IP\%}+\theta_{Ldvdf-BO1-IP\%}$. When the context is clear, these angles will be referred to simply as the output beam divergence angles.

The x-y coordinates for the various output beam points at the output slit location are given as follows: the x-y coordinate for the optical axis $L_{BO1}$ 1551OL at the output slit location is denoted by $X_{BO1}$ 1581OC; the x-y coordinate for the line $L_{RBO1-IP\%}$ 1581RL at the output slit location is denoted by $X_{RBO1-IP\%}$ 1581RC; the x-y coordinate for the line $L_{LBO1-IP\%}$ 1551LL at the output slit location is denoted by $X_{LBO1-IP\%}$ 1581LC. The beam width at the output slit location is denoted by $W_{BO1-IP\%}$ 1581W and is called the "beam waist width of the slit".

Factors Affecting the Output Spectral Resolution Bandwidth.

As is well known to those skilled in the art, the resolution of the spectrometer increases with decreasing first input slit width $W_{I1}$ 1291W. The imaging through the curved grating requires the width of the output slit, such as the width of the first output slit $W_{O1}$ 1491W, to be chosen appropriately to minimize the wavelength resolution there. Let this wavelength resolution at output slit $SL_{O1}$ be denoted by $\Delta\lambda_{Res\text{-}I1\text{-}O1}$ (called the "first output slit spectral resolution bandwidth for beam from the first input slit" or simply as "first output slit spectral resolution bandwidth" when the context is clear which input slit the beam comes from).

It is important to note that $\Delta\lambda_{Res\text{-}I1\text{-}O1}$ is dependent on: (1) the input slit width, (2) the output slit width, and (3) the grating groove design (the spatial aberration of the focusing beam can be caused by the curved grating's groove design). For the typical curved grating design, especially the usual Rowland curved grating design, the input and output slit widths $W_{I1}$ 1291W and $W_{O1}$ 1494W are about equal.

Spectral Resolution Bandwidth.

Let $P_{MI1\text{-}O1}(\lambda_{I1})$ be the output optical power at output slit $SL_{O1}$ when the input beam from input slit $SL_{I1}$ is a monochromatic beam (denoted by the subscript "M" in $P_{MI1\text{-}O1}(\lambda_{I1})$) with wavelength $\lambda_{I1}$. Let $\lambda_{I1\text{-}Ppk}$ be the peak wavelength $\lambda$ at which $P_{MI1\text{-}O1}(\lambda)$ is maximum in value when $\lambda=\lambda_{I1\text{-}Ppk}$. Let $\lambda_{Lg\text{-}I1\text{-}P=0.5}$ be the long wavelength side with respect to $\lambda_{I1\text{-}Ipk}$ with $\lambda_{Lg\text{-}I1\text{-}P=0.5}>\lambda_{I1\text{-}pk}$ at which $P_{MI1\text{-}O1}(\lambda_{Lg\text{-}I1\text{-}P=0.5})$ drops to 0.5=50% of its peak power so that $P_{MI1\text{-}O1}(\lambda_{Lg\text{-}I1\text{-}P=0.5})=0.5*P_{MI1\text{-}O1}(\lambda_{I1\text{-}pk})$. Let $\lambda_{St\text{-}I1\text{-}P=0.5}$ be the short wavelength side with respect to $\lambda_{I1\text{-}Ppk}$ with $\lambda_{St\text{-}I1\text{-}P=0.5}<\lambda_{I1\text{-}pk}$ at which $P_{MI1\text{-}O1}(\lambda_{I1})$ drops to 0.5=50% of its peak power so that $P_{MI1\text{-}O1}(\lambda_{St\text{-}I1\text{-}P=0.5})=0.5*P_{MI1\text{-}O1}(\lambda_{I1\text{-}pk})$. As shown in FIG. 1B, the wavelength resolution $\Delta\lambda_{Res\text{-}I1\text{-}O1}$ 1381Res at output slit $SL_{O1}$ is then given by the difference of these two wavelengths at the long wavelength side and short wavelength side at which the power output from output slit $SL_{O1}$ drops to 0.5=50% of its peak value. Hence, we have $\Delta\lambda_{Res\text{-}I1\text{-}O1}=\lambda_{Lg\text{-}I1\text{-}P=0.5}-\lambda_{St\text{-}I1\text{-}P=0.5}$ 1381Res. This is also known to those skilled in the art as the wavelength resolution at full-width-half-maximum of the beam power. In the ideal situation for which there is no or minimal beam focusing aberrations, the wavelength resolution is approximately equal to the "output geometrical spectral width" or "output geometrical resolution" $\delta\lambda_{I1\text{-}O1}$ (in wavelength) 1381GRes at output slit $SL_{O1}$ defined above. In general, however, the wavelength resolution will be worse or larger the output spectral width, so that $\Delta\lambda_{Res\text{-}I1\text{-}O1}>\delta\lambda_{I1\text{-}O1}$.

Input and Output Waveguides as Input and Output Slits.

When there is a channel waveguide defining the input or output slit as shown by FIG. 11. The slit $SL_{I1}$ 1201 location is typically (though not always as explained below) approximately defined by a waveguide mouth acting as an input slit and will be denoted in the same way as the slit as $SL_{I1}$ 1201 beyond which (towards the grating direction) the channel waveguide terminates and a planar waveguiding region, region GPR 1020, starts. The planar waveguiding region is a region within which the beam's lateral width is no longer "guided" by a waveguiding structure. The physical width of the input waveguide mouth at the termination point is waveguide mouth width $MW_{I1}$ 1291MW, defined by the width of its waveguide core $WGW_{I1}$ 1791W at the waveguide mouth location. In general, this width $MW_{I1}$ 1291MW may not be the same as the slit width $W_{I1}$ 1291W, but is typically quite close to $W_{I1}$ 1291W for the case where the refractive index contrast between the waveguide core and two waveguide cladding regions to the right and left of the waveguide core is large. The coordinate location of the middle of the input waveguide mouth $MSL_{I1}$ 1201MM is $MX_{I1}$ 1291MOC.

The output slit $SL_{O1}$ 1401 location is typically (though not always as explained below) approximately defined by a waveguide mouth acting as an output slit and will be denoted in the same way as the slit as $SL_{O1}$ 1401 beyond which (towards the grating direction) the channel waveguide terminates and a planar waveguiding region, region GPR 1020, starts. The physical width of the output waveguide mouth at the termination point is waveguide mouth width $MW_{O1}$ 1491MW, defined by the width of its waveguide core $WGW_{O1}$ 1991W at the waveguide mouth location. In general, this width $MW_{O1}$ 1491MW may not be the same as the slit width $W_{O1}$ 1491W, but is typically quite close to $W_{O1}$ 1491W for the case where the refractive index contrast between the waveguide core and two waveguide cladding regions to the right and left of the waveguide core is large. The coordinate location of the middle of the output waveguide mouth $MSL_{O1}$ 1401M is $MX_{O1}$ 1491MOC.

Let the cross-section of the input channel waveguide $WG_{I1}$ 1701 along A-A' of FIG. 11, has a waveguiding core with an average refractive index given by $n_{chcoI1}$ 1711O and waveguiding cladding with an average refractive index given by $n_{LchcdI1}$ 1711L on the left side (if the front side is facing the waveguide mouth) and $n_{RchcdI1}$ 1711R on the right side. The width of the waveguide core is $WGW_{I1}$ 1791W. The average refractive indices for the waveguiding core out of the plane of the waveguide is given by $n_{TchcdI1}$ 1711T above the waveguide and $n_{BchcdI1}$ 1711B below the waveguide (above is the direction away from the substrate). The thickness of the waveguide core is $WGT_{I1}$ 1791T. These are all shown in FIG. 11A for the cross-section of A-A' in FIG. 11. As is known to those skilled in the art, in order to guide wave the refractive index of the core given by $n_{chcoI1}$ 1711O, shall generally be higher than the averaged refractive indices of most of the cladding material regions. At close to the input channel waveguide mouth, an important refractive index is the "effective propagating refractive index" for the optical beam in the channel waveguide in a particular guided mode, say mode "u", where u is a number (usually an integer) for labeling the mode as is well known to those skilled in the art. Let us denote it as $n_{chI1u}$ 1721u. Typically, $n_{chI1u}$ 1721u is not too much different in value from the grating region's averaged propagating refractive index $n_{gr}$ 1040. Typically, there is one dominant waveguiding mode. In that case, the effective propagating refractive index in the input channel waveguide will just be called $n_{chI1}$ 1721.

Figure 11B:
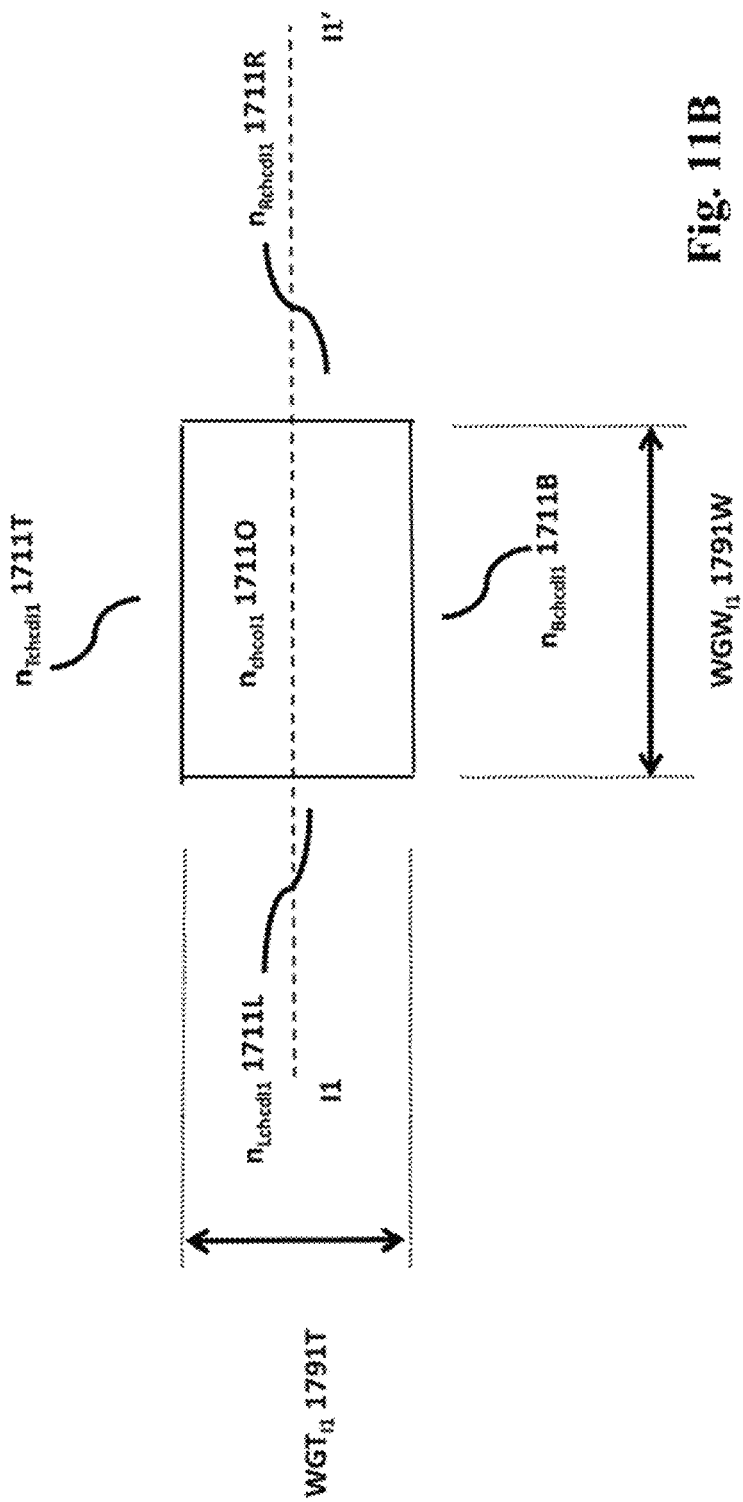
FIG. 11B illustrates a curved grating spectrometer configured with waveguides acting as the input and output slits, and the waveguide core and cladding materials around the input waveguides.

Let the cross-section of the output channel waveguide $WG_{O1}$ 1901 along B-B' of FIG. 11, has a waveguiding core with an average refractive index given by $n_{chcoO1}$ 1911O and waveguiding cladding with an average refractive index given by $n_{LchcdO1}$ 1911L on the left side (if the front side is facing away from the waveguide mouth) and $n_{RchcdO1}$ 1911R on the right side. The width of the waveguide core is $WGW_{O1}$ 1991W. The average refractive indices for the waveguiding core out of the plane of the waveguide is given by $n_{TchcdO1}$ 1911T above the waveguide and $n_{BchcdO1}$ 1911B below the waveguide (above is the direction away from the substrate). The thickness of the waveguide core is $WGT_{O1}$ 1991T. These are all shown in FIG. 11B for the cross-section of B-B' in FIG. 11. As is known to those skilled in the art, in order to guide wave the refractive index of the core given by $n_{chcoO1}$ 1911O, shall generally be higher than the averaged refractive indices of most of the cladding material regions. At close to the channel waveguide mouth, an important refractive index is the "effective propagating refractive index" for the optical beam in the output channel waveguide in a particular guided mode, say mode "v", where v is a number (usually an integer) for labeling the mode as is well known to those skilled in the art. Let us denote it as $n_{chO1v}$ 1921v. Typically, $n_{chO1v}$ 1921v is not too much different in value from the grating region refractive index $n_{gr}$ 1040. Typically, there is one dominant waveguiding mode. In that case, the effective propagating refractive index in the output channel waveguide will just be called $n_{chO1}$ 1921.

Figure 11C:
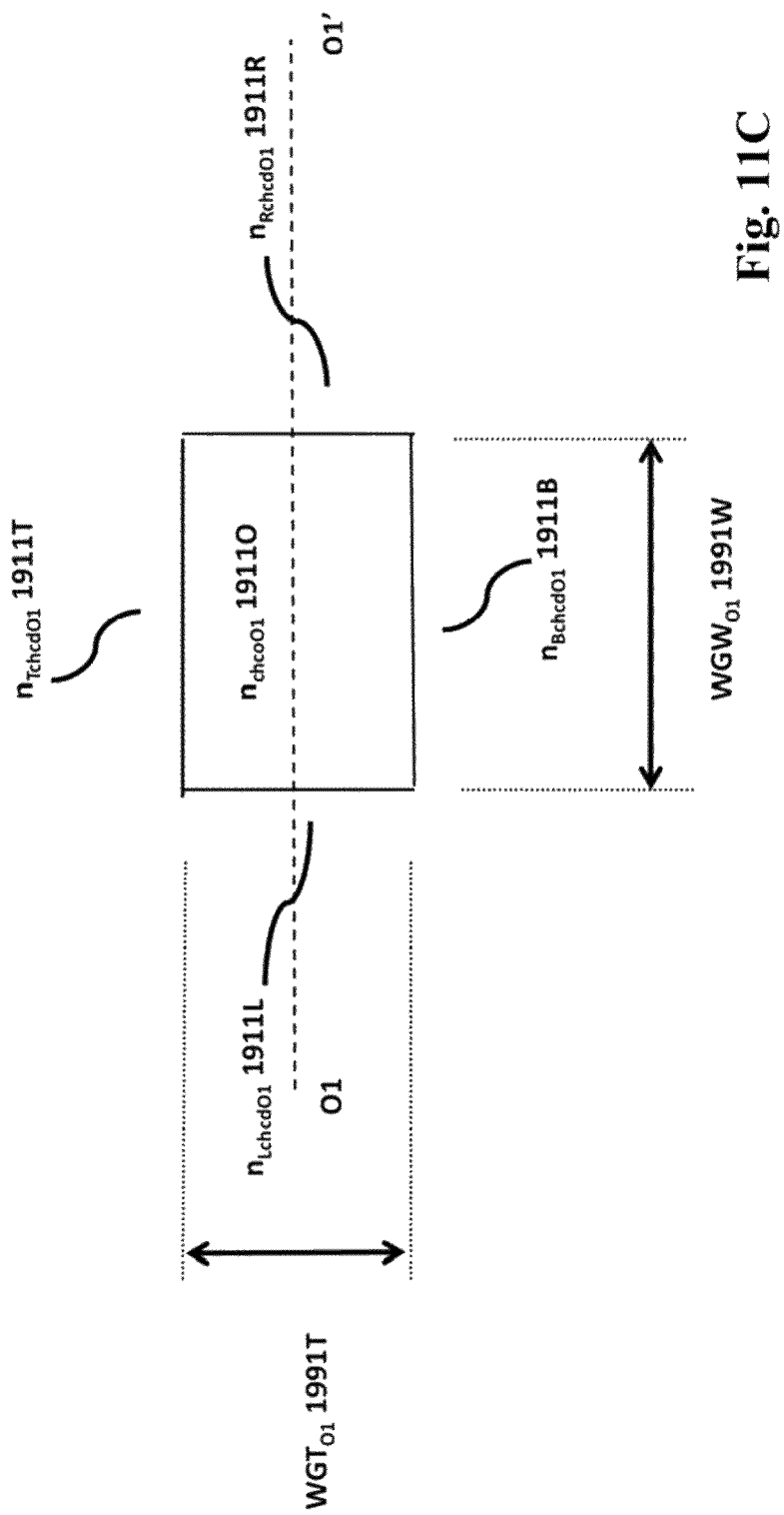
FIG. 11C illustrates a curved grating spectrometer configured with waveguides as the input and output slits, and the waveguide core and cladding materials around the output waveguides.

Let the cross-section of the planar waveguiding region, region GPR 1020's, along C-C' of FIG. 11, has a planar waveguiding core with an average refractive index given by $n_{plco}$ 1040O and waveguiding claddings out of the plane of the planar waveguide have an average refractive index given by $n_{Tplcd}$ 1040T above the waveguide and $n_{Bplcd}$ 1040B below the waveguide (above is the direction away from the substrate). The thickness of the planar waveguide is $T_{wgpl}$ 1020wgT. These are all shown in FIG. 11C for the cross-section of C-C' in FIG. 11. As is known to those skilled in the art, in order to guide wave the refractive index of the core given by $n_{plco}$ 1040O, shall generally be higher than the averaged refractive indices of most of the cladding material regions.

In many situations (though not always), the channel and planar waveguiding regions are approximately equal so that $n_{plco}$ 1040O is approximately equal to $n_{chcoI1}$ 1711O, $n_{Tplcd}$ 1040T is approximately equal to $n_{TchcdI1}$ 1711T, and $n_{Bplcd}$ 1040B is approximately equal to $n_{BchcdI1}$ 1711B. Also, typically (though not always) the refractive indices for all the input channel waveguides and output channel waveguide are approximately equal to each other.

Figure 11D:
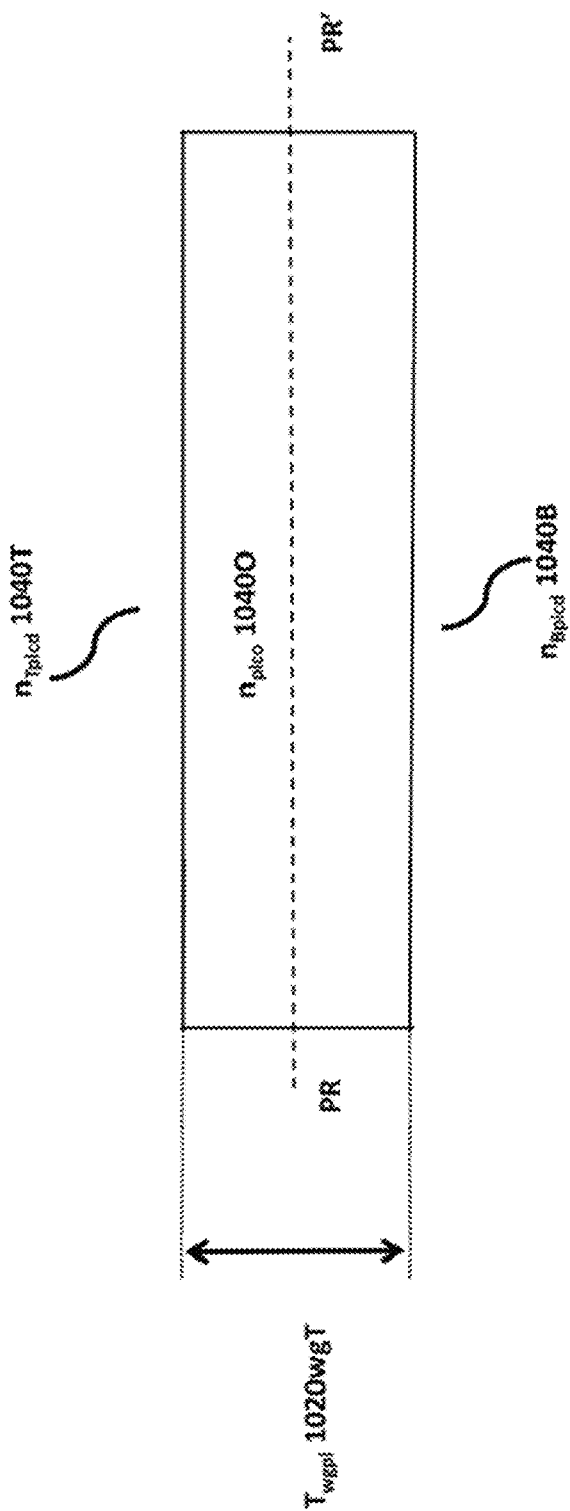
FIG. 11D illustrates a curved grating spectrometer configured with waveguides acting as the input and output slits, and the waveguide core and cladding materials around the planar waveguiding region.

The waveguide at close to the mouth can take on shape or constant width or can be tapering in width with linear shape or an arbitrary curvilinear shape, including different types such as up taper (becoming wider at the waveguide exit mouth towards the grating) down taper (becoming narrower at the waveguide exit mouth towards the grating) as shown in FIG. 11D and FIG. 11. For the input waveguide mouth, it is referred to as region $TWG_{I1}$ 1701T for the input waveguide. For the output waveguide mouth, it is referred to as region $TWG_{O1}$ 1901T.

As is known to those skilled in the art, a beam in a waveguide is "clearly guided" when the phase front of the beam is a plane or flat phase front. If the beam is clearly guided all the way to the physical input mouth location $MX_{I1}$ 1291MOC of the input channel waveguide mouth $MSL_{I1}$ 1201M (where the waveguide terminates), then the physical mouth location $MX_{I1}$ 1291MOC of the input waveguide mouth $MS1_{I1}$ 1201M becomes the slit location $X_{I1}$ 1291OC. At this location, the input beam will have a plane phase front with a certain beam width $MW_{BI1\text{-}IP\%}$ 1181MW, then the beam width $MW_{BI1\text{-}IP\%}$ 1181MW of the input waveguide mouth $MSL_{I1}$ 1201M becomes the equivalent beam width $W_{BI1\text{-}IP\%}$ 1181W of an equivalent slit $SL_{I1}$ 1201 at $X_{I1}$ 1291OC with slit width $W_{I1}$ 1291W.

After the beam propagates out of the waveguide mouth $MSL_{I1}$ 1201M, its phase front will begin to become curved in the lateral direction (i.e. for direction within the plane of the planar waveguide) when the beam propagates into the planar waveguiding region, region GPR 1020, due to optical diffraction for a freely propagating (i.e. unguided) beam (the beam becomes unguided in the direction within the plane (i.e. the x-y plane for the x-y-z Cartesian coordinate system defined above) though it is still guided in the direction perpendicular to the plane (i.e. the z direction) of the planar waveguide). This location for the beam is also called the "beam waist" of the beam as is known to those skilled in the art.

As is known to those skilled in the art, a beam in an input tapering waveguide region $TWG_{I1}$ 1701T may not be "clearly guided" when the taper is fast or when the waveguide width changes rapidly within a short distance, as in that case the phase front of the beam would not be a plane or flat phase front and would attain a beam phase front radius of curvature that is finite (plane or flat phase front corresponds to an infinite radius of curvature). In that case, based on the wave propagation in the planar waveguiding region, region GPR 1020, as is well known to those skilled in the art, it is possible to approximately fit the propagating wave (in wavefront and intensity profile) in the grating planar waveguiding region GPR 1020 (the wave-fronts indicated with "X" in case (iii) shown in FIG. 11D) with a beam that starts with a beam waist of a certain width $TWW_{BI1\text{-}IP\%}$ 1181TWW. This is known to those skilled in the art as a virtual free-propagating beam or sometimes called the "virtual image". Then the input waveguide can be characterized by this "virtual beam waist width" $TWW_{BI1\text{-}IP\%}$ 1181TWW, "virtual beam waist location" $TWX_{I1}$ 1291TWOC. Then the virtual beam waist width $TWW_{BI1\text{-}IP\%}$ 1181TWW becomes the equivalent beam width $W_{BI1\text{-}IP\%}$ 1181W of an equivalent slit $SL_{I1}$ 1201 at $X_{I1}$ 1291OC with slit width $W_{I1}$ 1291W. Also, $X_{I1}$ 1291OC is given by the virtual beam waist location $TWX_{I1}$ 1291TWOC.

Output Case

Similarly for the output waveguide, except that we shall think of each guided mode of the output waveguide and think of the reverse process in which a beam is launched into a particular mode of the output waveguide and the mode is propagating towards the grating, like the input waveguide case discussed. Then the various definitions for the input waveguide can be used for the output waveguides as well.

If the beam is clearly guided all the way to the physical output mouth location $MX_{O1}$ 1491MOC of the output channel waveguide mouth $MSL_{O1}$ 1401M (where the waveguide terminates), then the physical mouth location $MX_{O1}$ 1491MOC of the output waveguide mouth $MSL_{O1}$ 1401M becomes the slit location $X_{O1}$ 1491OC. At this location, the output beam will have a plane phase front with a certain beam width $MW_{BO1\text{-}IP\%}$ 1581MW, then the beam width $MW_{BO1\text{-}IP\%}$ 1581MW of the output waveguide mouth $MSL_{O1}$ 1401M becomes the equivalent beam width $W_{BO1\text{-}IP\%}$ 1581W of an equivalent slit $SL_{O1}$ 1401 at $X_{O1}$ 1491OC with slit width $W_{O1}$ 1491W.

After the beam propagates out of the waveguide mouth $MSL_{O1}$ 1401M, its phase front will begin to become curved in the lateral direction (i.e. for direction within the plane of the planar waveguide) when the beam propagates into the planar waveguiding region, region GPR 1020, due to optical diffraction for a freely propagating (i.e. unguided) beam (the beam becomes unguided in the direction within the plane (i.e. the x-y plane for the x-y-z Cartesian coordinate system defined above) though it is still guided in the direction perpendicular to the plane (i.e, the z direction) of the planar waveguide). This location for the beam is also called the "beam waist" of the beam as is known to those skilled in the art.

As is known to those skilled in the art, a beam in an output tapering waveguide region $TWG_{O1}$ 1901T may not be "clearly guided" when the taper is fast or when the waveguide width changes rapidly within a short distance, as in that case the phase front of the beam would not be a plane or flat phase front and would attain a beam phase front radius of curvature that is finite (plane or flat phase front corresponds to an infinite radius of curvature). In that case, based on the wave propagation in the planar waveguiding region, region GPR 1020, as is well known to those skilled in the art, it is possible to approximately fit the propagating wave (in wavefront and intensity profile) in the grating planar waveguiding region GPR 1020 (the wave-fronts indicated with "X" in case (iv) shown in FIG. 11D) with a beam that starts with a beam waist of a certain width $TWW_{BO1\text{-}IP\%}$ 1581TWW. This is known to those skilled in the art as a virtual free-propagating beam or sometimes called the "virtual image". Then the output waveguide can be characterized by this "virtual beam waist width" $TW_{BO1\text{-}IP\%}$ 1581TWW, "virtual beam waist location" $TWX_{O1}$ 1491TWOC. Then the virtual beam waist width $TWW_{BO1\text{-}IP\%}$ 1581TWW becomes the equivalent beam width $W_{BO1\text{-}IP\%}$ 1581W of an equivalent slit $SL_{O1}$ 1401 at $X_{O1}$ 1491OC with slit width $W_{O1}$ 1491W. Also $X_{O1}$ 1491OC is given by the virtual beam waist location $TWX_{O1}$ 1491TWOC. Thus, these virtual beam waist location and beam waist width are more relevant than the location of the physical mouth and serves as the slit width and location for such situations.

Equivalent "Input or Output Slit Location and Slit Width" for Channel Waveguiding Case.

The equivalence between the input or output slit and input and output waveguide parameters would be of interest when the location of the input or output slit is important and the diffraction angle of the beam is important. The width of the input or output slit mainly affects the beam diffraction angle. There are situations in which the detailed intensity profile of the input beam can affect certain performances of the spectrometer at the output slit. In those situations, the waveguide may generate different intensity profile that cannot be well matched by a uniform intensity across the slit for the purpose involved. This invention includes the use of slit as well as the use of waveguide to generate their respective input intensity profiles. When a waveguide is referred to, the waveguide includes waveguides with straight waveguide mouth, tapering waveguide mouth, and waveguide mouth with arbitrary refractive index variation of the core and cladding materials at the waveguide mouth.

For the case of an input or output waveguide that is a strongly guiding channel waveguide in the x-y plane (i.e. a waveguide with high refractive index contrast between the waveguide core region and the waveguide cladding region in the plane of the planar waveguide), if the beam is "clearly guiding" at the mouth, then the slit location is well approximated by the physical location of the mouth and the two edges of the slit are well approximated by the two edges of the waveguide mouth.

However, if the beam is "not clearly guiding", "not strongly guiding", or "not guiding" at the mouth (e.g. when its phase front is curved), then the input or output slit location and slit width are taken to be those that will produce a propagating beam that can well approximate the actual beam from the waveguide mouth in terms of the beam width, beam diffraction angle, and beam intensity variation.

In either case, the slit location is well approximated by the "virtual beam waist" location and the slit width is well approximated by the width of the slit that will give a beam at the slit that matches the beam at the virtual beam waist in terms of beam intensity width and beam intensity profile. In the case the beam is clearly guiding, the "virtual beam waist" is then given by the "actual beam waist" at the waveguide mouth.

The terms input slit and input waveguide mouth, input slit width and input waveguide mouth width are used interchangeably. When there is an ambiguity, the input waveguide mouth location and width are understood to be the location and width of the "equivalent input slit" as defined above and not the physical location and width of the actual physical waveguide mouth involved.

In short, for the input it is typically a good approximation to take the equivalent slit location $X_{I1}$ 1291OC for an equivalent input slit $SL_{I1}$ 1201 as the "virtual beam waist location" $TWX_{I1}$ 1291TWOC for an input waveguide $TWG_{I1}$ 1701T, and take the equivalent slit physical width $W_{I1}$ 1291W for an equivalent input slit $SL_{I1}$ 1201 as the slit physical width that will produce the width of a beam waist $W_{BI1\text{-}IP\%}$ 1181W that is about equal to the "virtual beam waist width" $TWW_{BI1\text{-}IP\%}$ 1181TWW (i.e. $W_{BI1\text{-}IP\%}$ 1181W~$TWW_{BI1\text{-}IP\%}$ 1181TWW).

For the output it is also typically a good approximation to take the equivalent slit location $X_{O1}$ 1491TOC for an equivalent output slit $SL_{O1}$ 1401 as the "virtual beam waist location" $TWX_{O1}$ 1491TMOC for an output waveguide $TWG_{O1}$ 1901T, and take the equivalent slit physical width $W_{O1}$ 1491W for an equivalent output slit $SL_{O1}$ 1401 as the slit physical width that will produce the width of a beam waist $W_{BO1\text{-}IP\%}$ 1581W that is about equal to the "virtual beam waist width" $TWW_{BO1\text{-}IP\%}$ 1581TWW (i.e. $W_{BO1\text{-}IP\%}$ 1581W~$TWW_{BO1\text{-}IP\%}$ 1581TWW).

As is well known to those skilled in the art. The above approximation methods are accurate to better than plus-minus 50%. Mouth width design that falls within plus-minus 50% of the design width obtained using the above descriptions gives similar functionalities and is incorporated as inclusive in the embodiments of the present invention.

Optimal Output Slit/Waveguide Design.

Typically, a good optimal output slit design is to first find the output focused beam waist location $X_{BI1\text{-}O1}$ 1391OC and place the output slit $SL_{O1}$ 1401 location $X_{O1}$ 1491OC close to it (i.e. $X_{O1}$ 1491OC~$X_{BI1\text{-}O1}$ 1391OC), and the slit width is such that the beam waist width of the slit $W_{BO1\text{-}IP\%}$ 1581W matches beam waist width of the output beam (given a monochromatic input beam) $W_{BI1\text{-}O1\text{-}IP\%}$ 1391W (i.e. $W_{BO1\text{-}IP\%}$ 1581W~$W_{BI1\text{-}O1\text{-}IP\%}$ 1391W).

Below, we will not specifically distinguish or "label" waveguide situations, and will simply use the slit location and width, with the understanding that they can represent the waveguide situations as well based on the equivalent width and position approach discussed above.

A Method of Generating the Grating

First, referring back to FIGS. 1, 1A, 1B, 2, 2A, 2B, 3, the location of entrance slit or input slit (or waveguide) $SL_{I1}$ 1201 can be adjusted in order to have the best performance for a particular design goal. Thus, the location $PX_{I1}$ 1291O of an input slit (or waveguide) $SL_{I1}$ 1201 specified by angle $\theta_{I1}$ 1271 with respect to the grating-center circle normal line $L_{GCCN}$ 1050N and the distance $S_{I1}$ 1261 from grating center CGC 12-1050 is not necessarily on the circle used for Rowland design mentioned in the prior art.

Second, the location $PX_{O1}$ 1491O of output slit $SL_{O1}$ (or waveguide or photodetector) can be adjusted in order to have the best performance for a particular design goal. Thus, the location $PX_{O1}$ 1491O of output slit $SL_{O1}$ (or waveguide or photodetector) 1401, specified by the output angle $\theta_{O1}$ 1471 with respect to the grating-center circle normal line $L_{GCCN}$ 1050N and the distance $S_{O1}$ 1461 from the grating center is not necessarily on the same circle where entrance slit or input slit (or waveguide) 1201 is located.

Third, the relation between $\theta_{I1}$ 1271, $\theta_{O1}$ 1471, and the initial groove parameter d is given by the approximate grating formula (valid at "far field") as is known to those skilled in the art, $$d*(\operatorname{Sin}(\Theta_{O1}) + \operatorname{Sin}(\Theta_{I1})) = m*\lambda_{I1-O1}/n_{gr} \qquad (13),$$

where m is the diffraction order and $\lambda_{I1-O1}$ 1321 is the wavelength that will be diffracted by the grating to the output slit $SL_{O1}$ 1401. The medium in which the light propagates in can be air or a material medium with an effective refractive index of propagation "n". In the case of free space, "n" is the material refractive index. In the case of a planar waveguide, "$n_{gr}$" is the effective refractive index of propagation within the planar waveguide.

Note that Eq. (13) primarily gives the output wavelength $\lambda_{I1-O1}/n_{gr}$ which is the wavelength diffracted to the output slit $SL_{O1}$ 1401 from input slit $SL_{I1}$ 1201 in the material of refractive index n, when given the grating order m, based on a grating parameter "d" that can be interpreted as the approximate distance between any two adjacent groove at the grating center.

Fourth, a choice of the initial groove positions are made. In a preferred embodiment, they are $X_1=(-d/2, 0)$ and $X_{-1}=(-d/2, 0)$, or alternatively $X_1=(-d/2, R-(R^2-(d/2)^2)^{1/2})$ and $X_{-1}=(-d/2, R-(R^2-(d/2)^2)^{1/2})$ (so that $X_1$ and $X_{-1}$ will be exactly on the input circle IC 1080). With these position vectors, the two initial grooves are located on line forming the tangent $L_{GCT}$ 1050T to the grating center curve $L_{GCC}$ 1050CV that is approximately perpendicular to the grating-center circle normal line $L_{GCCN}$ 1050N and have the initial groove spacing of d at the grating center.

In another embodiment, they are $X_0=(0,0)$, $X_1=(d, R-(R^2-d^2)^{1/2})$ and $X_{-1}=(-d, R-(R^2-d^2)^{1/2})$. With these position vectors, three initial grooves are located on a circle radius R, have the initial groove spacing of d at the grating center, and has a tangent $L_{GCT}$ 1050T to the grating-center curve $L_{GCC}$ 1050CV that is approximately perpendicular to the grating-center circle normal line $L_{GCCN}$ 1050N and have the initial groove spacing of d at the grating center. While this embodiment is an acceptable alternative, it is not generally a preferred alternative as it is particularly good only if the output slit is located close to the input circle IC 1080 or the Rowland circle with a radius R/2 (the three grooves will give a focus of the output beam at close to the input circle. While other grooves to be generated will give focus at any output slit point off the input circle, there will be aberration (i.e. deviation of the focusing points) from these initial three grooves that will give focus only at close to the input circle).

Figure 12:
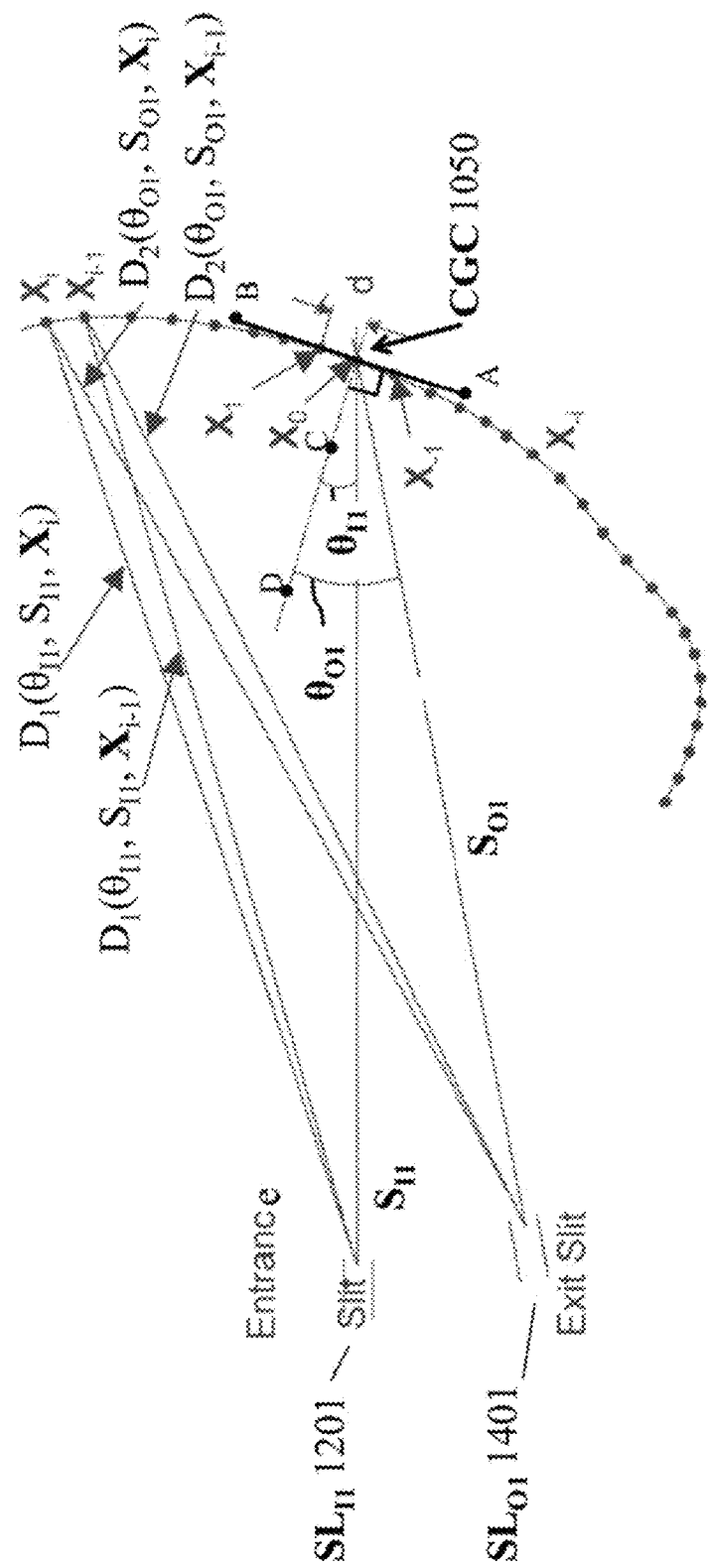
FIG. 12 describes High Resolution Compact Curved Grating specifications in accordance with a preferred embodiment of the present invention

Fifth, the locations of other grooves $X_i$'s are obtained by two conditions. The first of these conditions being that the path-difference between adjacent grooves should be an integral multiple of the wavelength in the medium. The first condition can be expressed mathematically by:

$$\operatorname{Sgn}(i-ja)*([D_1(\Theta_{I1}, S_{I1}, X_i) + D_2(\Theta_{OL4}, S_{OL4}, X_i)] - [D_1(\Theta_{I1}, S_{I1}, X_{ja}) + D_2(\Theta_{OL4}, S_{OL4}, X_{ja})]) = m*\lambda_{I1-OL4}/n_{gr}, \qquad (14)$$

Where as shown in FIG. 12, $D_1(\Theta_{I1}, S_{I1}, X_i)$ is the distance from a i-th groove located at $X_i$ to input slit (or input waveguide) $SL_{I1}$ 1201 specified by $\Theta_{I1}$ 1271 and $S_{I1}$ 1261, $D_2(\Theta_{O1}, S_{O1}, X_i)$ is the distance from i-th groove located at $X_i$ to output slit (or waveguide or photodetector) $SL_{O1}$ 1401 specified by $\Theta_{O1}$ 1471 and $S_{O1}$ 1461, m is the diffraction order, and n is the effective refractive index of propagation of the medium. In Eq. (14) groove ja is taken to be a groove adjacent to groove i.

The position of groove ja, $X_{ja}$ is typically already known. For an illustration and not limitation, if the grooves close to the grating center are already known, then groove ja is taken to be a groove adjacent to groove "i" so that $X_{ja}=X_{i-1}$ for i>0 (so ja=+|i-1|=i-1 is the previous groove close to i=0 that is already solved) and $X_{ja}=X_{i+1}$ for i<0 (so ja=-|i-1|=i+1 is the previous groove close to i=0 that is already solved). This is only an illustration as there can be situations, for example, the initial grooves may not be at the grating center. Sgn(i-ja) takes on value +1 or -1. Sgn(i-ja) is +1 if i>ja, and -1 if i<ja. This mathematical expression is numerically exact for the optical path difference requirement in the diffraction grating and is actively adjusted for every groove on HR-CCG.

The second of these conditions being specific for a particular design goal of a curved-grating spectrometer. The second condition in general can be mathematically expressed as $$f(X_i) = \text{constant} \qquad (15)$$

where Eq. (15) can be depending on other design parameters such as the input slit and output slit positions or the positions of the adjacent grooves (e.g. $\Theta_{I1}, S_{I1}, \Theta_{O1}, S_{O1}, \lambda_{I1-O1}, m, n_{gr}, \{X_j\}$) that are already known and hence can be treated as part of the constant. (e.g. $\Theta_{I1}, S_{I1}, \Theta_{O1}, S_{O1}, \lambda_{I1-O1}, m, n_{gr}, \{X_j\}$) that are already known and hence can be treated as part of the constant. The positions $\{X_j\}$ represent the location positions of some grating teeth that are already known. The functional variable involved is $X_i$ which is the variable to be solved. Specific examples of the second condition are described later in the application. The unknown variables in both equations Eq. (14) and Eq. (15) are x- and y-coordinates of the location Vector $X_i$ of the i-th groove. For a given input-slit (or input-waveguide) location ($\theta_{I1}, S_{I1}$), output slit (or waveguide or photodetector) location ($\theta_{O1}, S_{O1}$), and the previous, i.e., ja-th, groove position $X_{ja}$, $X_i$ is completely specified by equations Eq. (14) and Eq. (15) for a given wavelength $\lambda_{I1-O1}$ to output slit $SL_{O1}$, effective refractive index of propagation $n_{gr}$, and the diffraction order m.

The above two equations Eq. (14) and Eq. (15) are needed to solve for the two unknown numbers in $X_i=(x_i, y_i)$, namely x-coordinate $x_i$ and y-coordinate $y_i$ of the $i^{th}$ groove. These two equations are solved analytically, numerically, or computationally for the values of $X_i=(x_i, y_i)$ using equations solving methods that are already known to those skilled in the art. The groove positions $X_i$ starting from i=0,1,2 . . . or i=0,-1,-2 . . . are iteratively solved with the groove location of the preceding groove $X_{ja}$ already solved or specified starting from the location of initial groove $X_0=(0,0)$ or $X_1$ or $X_{-1}$, or any other initial groove position, whichever is applicable.

The last of the HR-CCG specification, namely the Fifth step, ensures that every ray from each groove focuses to a single point. This ensures the rays from HR-CCG will focus at output slit $SL_{O1}$ with minimal spatial focusing aberration, and therefore enabling a small focused spot size at the output slit.

Other Choices of Initial Grooves.

Note that Eq. (13) is an approximate assuming the distance between two adjacent grooves at near the grating center is approximately "d" and the line joining the two grooves are perpendicular to the designated grating normal line. It becomes exact only with far-field approximation, which is valid only when $S_{I1}$ 1261 and $S_{O1}$ 1461 are much larger than d or when the grating is large in size comparing to d.

The more exact form is the same as Eq. (14) by taking two adjacent grooves at the grating center such as i=1 and ja=0 groove giving:

$$[D_1(\Theta_{I1},S_{I1},X_1)+D_2(\Theta_{O1},S_{O1},X_1)]-[D_1(\Theta_{I1},S_{I1},X_0)+D_2(\Theta_{O1},S_{O1},X_0)]=m^*\lambda_{I1\text{-}O1}/n_{gr},\quad(16)$$

Specifically, Eq. (13) can be replaced by Eq. (16) with the distance between $X_0$ and $X_1$ set to be equal to approximately equal to "d" (e.g. $X_0=(0,0)$, $X_1=(d, 0)$, or alternatively $X_0=(0,0)$, $X_1=(d, R-(R^2-d^2)^{1/2}))$, and with the input slit location (i.e. $\Theta_{I1},S_{I1}$) given and the output slit location (i.e. $\Theta_{O1},S_{O1}$) given, Eq. (16) can be used to solve for $\lambda_{I1\text{-}O1}$ (with m chosen and $n_{gr}$ given), or alternatively when given $\lambda_{I1\text{-}O1}$ can be used to solve for $\Theta_{O1}$ (with m chosen and $n_{gr}$ given, and $S_{O1}$ given (or $S_{O1}$ taken to be long such as infinity)). These will be just like what Eq. (13) would do but without the need for far field approximation. Note that alternatively we can symmetrically choose the center two grooves to be at $X_{-1}$ and $X_1$ with $X_{-1}$ and $X_1$ spaced at d/2 away from the origin $X_0$ (i.e. with $X_1=(-d/2, 0)$ and $X_{-1}=(-d/2, 0)$ or alternatively, $X_1=(-d/2, R-(R^2-(d/2)^2)^{1/2})$ and $X_{-1}=(-d/2, R-(R^2-(d/2)^2)^{1/2})$. In that case $X_0$ will not be used as a groove location though it is the center (or origin) of the coordinate center.

It is easy to show that if $X_0$ and $X_1$ are given as above (e.g. $X_0=(0,0)$, $X_1=(d, 0)$), then approximately: $D_1(\Theta_{I1},S_{I1}, X_1)-D_1(\Theta_{I1},S_{I1}, X_0)\sim d^*Sin(\Theta_{I1})$ and approximately: $D_2(\Theta_{O1},S_{O1}, X_1)-D_2(\Theta_{O1},S_{O1}, X_0)\sim d^*Sin(\Theta_{O1})$. Thus Eq. (16) can be reduced to Eq. (13) that $d^*(Sin(\Theta_{O1})+Sin(\Theta_{I1}))=m^*\lambda_{I1\text{-}O1}/n_{gr}$.

Thus, the use of Eq. (13) is not for the purpose of grating structural design limitation as various other equations can be used to achieve similar goal. In particular, it shall not be used to limit the grating design as the grating design and performances are largely defined by majority of the rest of the grating grooves. Its use is merely to estimate the output wavelength $\lambda_{I1\text{-}O1}/n_{gr}$ which is the wavelength in the planar waveguiding material diffracted to the output slit $SL_{O1}$ 1401 from input slit $SL_{I1}$ 1201 in the material of refractive index $n_{gr}$, when given the grating order m. While a target grating parameter "d" that can be interpreted as the approximate distance between any two adjacent groove at the grating center is useful for the estimation, it is not an essential result.

To put it simply, there is only one initial groove location needed to generate the other grating grooves utilizing Eqs. (14) and (15). The specification of two initial grooves such as the one given by $X_1=(-d/2, 0)$ and $X_{-1}=(-d/2, 0)$ (or alternatively $X_1=(-d/2, R-(R^2-(d/2)^2)^{1/2})$ and $X_{-1}=(-d/2, R-(R^2-(d/2)^2)^{1/2}))$, ensures that the grating-center circle normal line $L_{GCCN}$ 1050N will indeed be approximately perpendicular to the tangent line $L_{GCT}$ 1050T to the grating-center curve $L_{GCC}$ 1050CV. That means the "actual" grating center tangent normal line $L_{GCTN}$ 1050TN (that by definition perpendicular to the tangent $L_{GCT}$ 1050T) is coincided with the grating-center circle normal line $L_{GCCN}$ 1050N. Otherwise they do not coincide. The grating-center circle normal line $L_{GCCN}$ 1050N is what the initial input slit angle $\Theta_{I1}$ 1271 and output slit angle $\Theta_{O1}$ 1471 are defined based on. However, if the new "actual" grating center tangent normal line $L_{GCTN}$ 1050TN does not coincide with the grating-center circle normal line $L_{GCCN}$ 1050N, then by right the input angle and output angle in Eq. (14) for example, shall be given by $\Theta_{I1}$' 1271TNA and $\theta_{O1}$' 1471TNA instead of by $\theta_{I1}$ 1271 and $\theta_{O1}$ 1471 ($\theta_{I1}$' 1271TNA and $\theta_{O1}$' 1471TNA are angles based on the grating center tangent normal line $L_{GCTN}$ 1050TN).

The specification of three initial grooves is thus overdone but is some time used. When the third initial groove is specified rather than having the third groove computed using Eqs. (14) and (15), it sometime may generate small amount of aberration as it may not be consistent with the rest of the grating groove that are generated using Eqs. (14) and (15).

Other Alternatives to the Third Step.

The essential function of Third Step is to pick or designate output free-space wavelength $\lambda_{I1\text{-}O1}$ 1321 and grating order m, and when possible, also make sure the grating-center curve $L_{GCC}$ 1050CV for the initial few grooves has a tangent $L_{GCT}$ 1050T that is perpendicular to the grating-center circle normal line $L_{GCCN}$ 1050N. The $\lambda_{I1\text{-}O1}$ 1321 and grating order m can then be used in step Five to generate all other grooves by starting from just one grating center groove.

In an embodiment, for the purpose of illustration and not limitation, we can specify the grating center groove $X_0$ 1600O as the only initial groove, and $\lambda_{I1\text{-}O1}$ 1321 and grating order m are arbitrarily chosen. In that case, it is convenient to let $X_0$ 1600O to be the coordinate origin $X_0=(0,0)$. The grooves positions are thus essentially all given by step Five, which then ensures that the grating design resulted will give diffract light to output slit $SL_{O1}$ 1401 from input slit $SL_{I1}$ 1201 at wavelength $\lambda_{I1\text{-}O1}$ 1321 with aberration-free focusing at output slit $SL_{O1}$ 1401, even for a large grating angle span. The actual distances or spacing between two adjacent grooves generated is automatically determined and we may label it as "d" at near the grating center, which substantially deviating from d at far from the grating center.

For example, $X_0$ 1600O can serve as the previous groove position for $X_1$ 1601P and $X_{-1}$ 1601N and the rest of the grating grooves can be generated from there by using Eq. (14) and (15) in the Fifth Step. For example, if Eq. (15) is the constant arc case, then the arc length choice becomes a variable of Eq. (15), which will result in certain distance "d" between $X_0$ and $X_1$. This procedure, while can be adopted, however, does not ensure the grating-center curve $L_{GCC}$ 1050CV for the initial few grooves has a tangent $L_{GCT}$ 1050T that is perpendicular to the grating-center circle normal line $L_{GCCN}$ 1050N.

Flexibility in Choosing Initial Grooves.

There are various other possible specifications of the initial groove positions that can be made. For example, instead if three initial grooves or one initial groove, the initial grooves can also be chosen to be only two grooves at $X_1=(d/2, R-(R^2-(d/2)^2)^{1/2})$ and $X_{-1}=(-d/2, R-(R^2-(d/2)^2)^{1/2})$ and there is no groove at $X_0$. Alternatively, we can also specify $X_1=(d/2, 0)$ and $X_{-1}=(-d/2, 0)$ and there is no groove at $X_0$, which is just a shift in the "y" coordinate by the amount $R-(R^2-(d/2)^2)^{1/2}$ and is mounting to a redefinition of the distance to the input or the output slits. This procedure does ensure the grating-center curve $L_{GCC}$ 1050CV for the initial few moves has a tangent $L_{GCT}$ 1050T that is perpendicular to the grating-center circle normal line $L_{GCCN}$ 1050N.

Arbitrary Reference for the Input and Output Angles.

It is important to note that in the general situation where Eq. (13) (or the more exact Eq. (16)) is not used to generate the grating with either the initial two points or three points as described above, then after the grating is generated, there is no guarantee that the grating-center circle normal line $L_{GCCN}$ 1050N is perpendicular to the grating-center tangent line $L_{GCT}$ 1050T to the resulted grating-center curve $L_{GCC}$ 1050CV at the grating center CGC 1050.

If the grating generated produces a tangent line $L_{GCT}$ 1050T that is not perpendicular to grating-center circle normal line $L_{GCCN}$ 1050N (which is used to define angle $\theta_{I1}$ 1271), it will just amount to an offset of the angle $\theta_{I1}$ 1271 with respect to an "actual normal line" that is actually perpendicular to the tangent line $L_{GCT}$ 1050T. That means the "normal line" $L_{GCCN}$ 1050N used is rotated by an angle, say $\Delta\theta_{I1}$, from this "actual normal line". With respect to this actual normal line, the value of the input angle $\theta_{I1}'$ will just be given in terms of $\theta_{I1}$ by $\theta_{I1}'=\theta_{I1}+\Delta\theta_{I1}$.

In some cases, the initial grooves generated may not fit the equations (e.g. Eqs. (14) and (15)) imposed by step Five above (e.g. for the case of three initial grooves on circle of radius R, they give focusing only at near the input circle IC 1080 or the Rowland circle with a radius R/2) and hence may even give a distortion or deviation from the using properties of other grooves (e.g. that could be giving focusing at off the input circle).

Thus, the way the initial grating grooves are chosen shall not be used to limit the grating design as the grating design and performances are largely defined by majority of the rest of the grating grooves and not necessarily the initial few grooves. Thus, variations are allowed in the positions of the grating groove as long as they fall within the domain of "grating-groove variation applicability" discussed next.

Domain of Grating-Groove Variation Applicability.

As is known to those skilled in the art, the grating performances are depending on the collective results of diffraction and wave interference from the majority of the grating grooves. They are not depending on just a few grating grooves. They are also not too sensitive to the grating grooves being moved spatially by an amount $\delta S$ less than about ½ of an optical wavelength in the material given by $\lambda_{I1-O1}/(2*n_{gr})$, where $\delta S=(\delta x^2+\delta y^2)^{0.5}$ with $\delta x$ being the spatial deviation from the designed position in the x-coordinate and $\delta y$ being the spatial deviation from the designed position in the y-coordinate. If the design of a grating groove position in accordance to an embodiment of the present invention is $X_{jDn}=(x_{jDn}, y_{jDn})$ and another design or implementation or realization of the grating groove is at $X_{jIm}=(x_{jIm}, y_{jIm})$, then $\delta x=|x_{jDn}-x_{jIm}|$ and $\delta y=|y_{jDn}-y_{jIm}|$. Moreover, two gratings or grating designs or grating implementations or grating realizations can achieve similar output spectral filtering performances for about half or more than half of the filtered spectrum if at least for a collection of grating grooves that are involved in reflecting more than 50% of the total power reflected by the grating towards the same output slit location, they are similar in their groove positions to each other in both gratings. Similar grating groove position means $\delta S<\lambda_{I1-O1}/(2*n_{gr})$.

While the five steps above is a method of generating the set of positions for all the grating grooves in accordance with an embodiment of the present invention, there are other method that could generate the set of positions for all the grating grooves.

Thus, the grating performances will be similar as long as for this collection of the grating grooves (that are involved in reflecting more than 50% of the total power reflected by the grating towards the same output slit location), the deviation denoted by $\delta S$ of each grating groove position from the designed values is less than about half of the wavelength in the material so that $\delta S<\lambda_{I1-O1}/(2*n_{gr})$.

Obviously, smaller deviation (e.g. $\delta S<\lambda_{I1-O1}/(4*n_{gr})$ or $\delta S<\lambda_{I1-O1}/(10*n_{gr})$ or a larger set of grooves involved (e.g. the set of grooves involve in over 70% of the grating total power reflection instead of 50%, or the set of grooves involve in over 90% of the grating total power reflection instead of 50%) will ensure even closer performances to the desired design. These allowed deviations (e.g. a set of grooves involved in reflecting more than 50% of the total power reflected by the grating towards the same output slit location has each of its groove's $\delta S$ satisfying $\delta S<\lambda_{I1-O1}/(2*n_{gr})$) describe the maximum deviations allowed. When two gratings meet such conditions, we will consider them to be the same design within the allowances of design variations for the purpose of this invention. The minimal of which is given by same design condition (A): two gratings are considered the same design it a set of grooves involved in reflecting more than 50% of the total power reflected by the grating towards the same output slit location has each of its groove's $\delta S$ satisfying $\delta S<\lambda_{I1-O1}/(2*n_{gr})$; a tighter one is given by same design condition (B): two gratings are considered the same design if a set of grooves involved in reflecting more than 50% of the total power reflected by the grating towards the same output slit location has each of its groove's $\delta S$ satisfying $\delta S<\lambda_{I1-O1}/(4*n_{gr})$; another tighter one is given by same design condition (C): two gratings are considered the same design if a set of grooves involve in over 70% if a set of grooves involved in reflecting more than 70% of the total power reflected by the grating towards the same output slit location has each of its groove's $\delta S$ satisfying $\delta S<\lambda_{I1-O1}/(10*n_{gr})$. As yet another tighter one is given by same design condition (D): two gratings are considered the same design if a set of grooves involved in reflecting more than 90% of the total power reflected by the grating towards the same output slit location has each of its groove's $\delta S$ satisfying $\delta S<\lambda_{I1-O1}/(10*n_{gr})$. The applicability of which is depending on grating applications. For example, for the usual spectral analysis application, same-design-conditions (A) and (B) is applicable, for the DWDM (dense wavelength division multiplexing) wavelength channel filtering applications in fiber-optic communications, same-design-condition (C) and (D) are applicable.

In terms of the performance of the grating design, the grating groove positions are what are important and not the method of generating those positions. Thus, in terms of the specification of the grating structure in accordance with an embodiment of the present invention, the method of obtaining the grating groove position is for the purpose of illustration and not limitation. In terms of the method of obtaining the grating structure in accordance to another embodiment of the present invention, the steps of obtaining the grating structure are important.

Independence on the Choice of Initial Groove as Coordinate Origin.

It is important to note that the choice of $X_0=(0,0)$ to be the coordinate origin or not should not materially alter the grating design as the choice of reference coordinate system is arbitrary. The choice of a reference coordinate system is only used as a language or reference to describe the locations of all the groove points. As is well known to those skill in the art, other coordinate systems and references can be used as there is always a way to describe the same set of groove points in terms of another coordinate system.

Constant Angle Geometry

Figure 13:
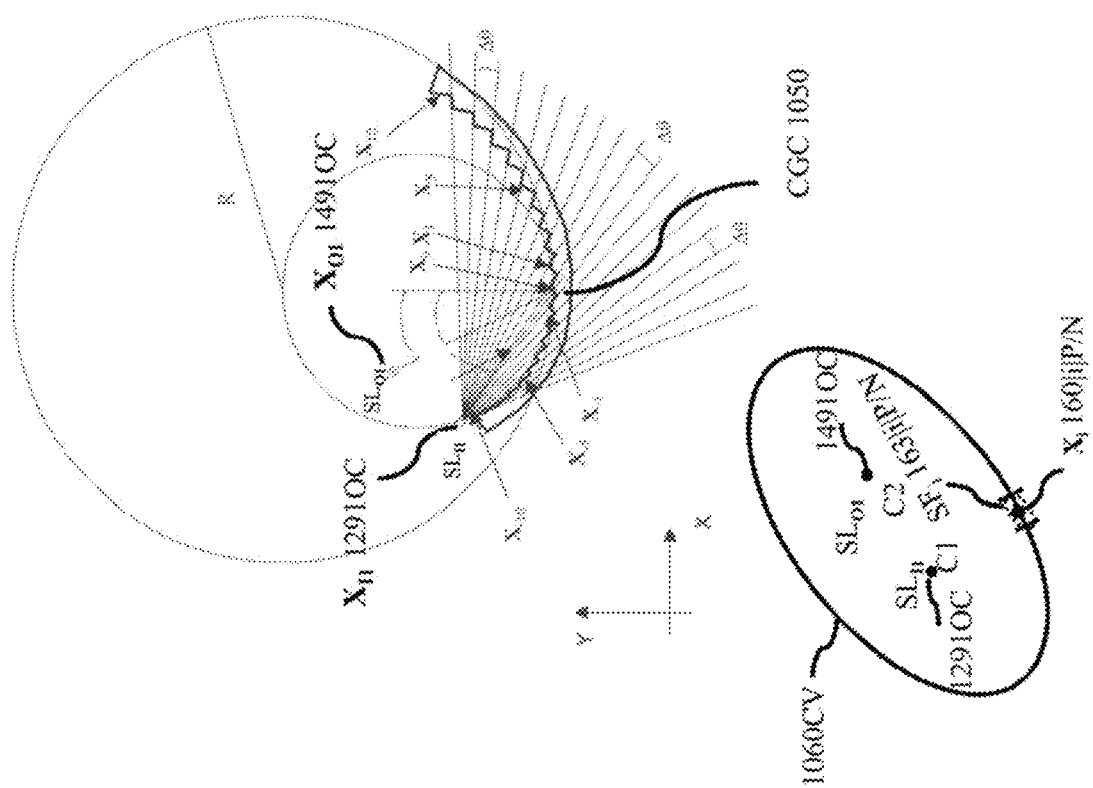
FIG. 13 illustrates an example of High Resolution Compact Curved Grating with constant angle (the Constant-Angle Case), the output slit (or waveguides or photodetectors) $SL_1$ and the input slit (or waveguide) $SL_1$ being present anywhere including but not limited to the Rowland circle, in accordance with an embodiment of the present invention.

An exemplary embodiment of HR-CCG specified above is shown in FIG. 13. The radius of curvature at the grating center is R=50 μm. Entrance slit or input slit (or waveguide) $SL_{I1}$ 1201 is located at an angle $\Theta_{I1}=55°$ 1271 from the grating-center circle normal line $L_{GCCN}$ 1050N and distance $S_{I1}=28.68$ μm 1261 from the grating center CGC 1050. Output slit (or waveguide or photodetector) $SL_{O1}$ 1401 is located at an angle $\Theta_{O1}=27.2°$ 1471 from the grating-center circle normal line $L_{GCCN}$ 1050N and distance $S_{O1}=37.65$ μm 1461 from the grating center CGC 1050. The groove spacing at the grating center is chosen to be d=3.6 μm so that diffraction order m=10 is directed toward output slit (or waveguide or photodetector) $SL_{O1}$ 1401 located at $\Theta_{O1}$ 1471. As shown in FIG. 13, entrance slit or input slit (or waveguide) $SL_{I1}$ 13-1201 and output slit (or waveguide or photodetector) $SL_{O1}$ 13-1401 are not located on a circle tangent to the grating-center CGC 1050. Three initial grooves are located at $X_0$=(0, 0) 1600O, $X_1$=(3.6, 0.13) 13-1601P, and $X_{-1}$=(−3.6, 0.13) 13-1601N which form a circle ORC 13-1070R with radius R=50 μm. This circle segment then forms the grating-center curve $L_{GCC}$ 13-1050CV. Other groove locations $X_i$'s 13-160|i|N (i<0) or 13-1601|i|P (i>0) are obtained with the condition of each groove having an optical path-difference condition (Eq. 14) and the second condition that the constant angular spacing from entrance slit or input slit (or waveguide) $SL_{I1}$ 13-1201 (the Constant-Angle Case). In a mathematical form, this second condition described by the general equation Eq. (15) is expressed as, $$|Cos(\Delta\theta_i)| = \left|\left[\frac{(X_i - X_{I1}) \cdot (X_{ja} - X_{I1})}{|X_i - X_{I1}| * |X_{ja} - X_{I1}|}\right]\right| = \text{constant} \quad (17)$$

where $X_{I1}$=(−$S_{I1}$*Sin($\theta_{I1}$), $S_{I1}$*Cos($\theta_{I1}$)) 13-1291OC is the position vector of input or entrance slit $SL_{I1}$ 13-1201, $X_{O1}$=(−$S_{O1}$*Sin($\theta_{O1}$), $S_{O1}$* Cos($\theta_{O1}$)) 13-1491OC is the position vector of output slit (or waveguide or photodetector) $SL_{O1}$ 13-1401, $X_i$ 13-160|i|P/N (N if i<0 and P if i>0) is the position of a groove i, and $\Delta\theta_i$ 13-163|i|P/N (163|i|N if i<0 or 1603|i|P (if i>0) is the difference in angular position between successive $i^{th}$ and $ja^{th}$ grooves (e.g. ja is the groove that precedes groove i (closer to grating center) so that |ja|=(|i|−1)). Position $X_{ja}$ is typically already known or solved. In Eq. 17, operator "*" means the inner product in vector analysis and defined as $A \cdot B \equiv |A|*|B|*Cos(\theta)$. The vertical bar "|" indicates taking the absolute value or the length of a vector. Equivalently, Eq. (17) can be written as:

$$|\Delta\theta_i| = \left|ArcCos\left[\frac{(X_i - X_{I1}) \cdot (X_{ja} - X_{I1})}{|X_i - X_{I1}| * |X_{ja} - X_{I1}|}\right]\right| = \text{constant} \quad (18)$$

Because $|\Delta\theta_i|$ is constant for all grooves, it is same as the angular position difference between the center groove at $X_0$ 13-1601 and the first groove at $X_1$ 13-1601P, i.e.

$$|\Delta\theta_i| = |\Delta\theta_1| = \left|ArcCos\left[\frac{(X_1 - X_{J1}) \cdot (X_0 - X_{I1})}{|X_1 - X_{I1}| * |X_0 - X_{I1}|}\right]\right| = \text{constant} \quad (19)$$

In this particular case, the position of entrance slit or input slit (or waveguide) $SL_{I1}$ 13-1201 exit slit or output slit (or waveguide) $SL_{O1}$ 13-1401 and the angular spacing between the grooves are $X_{I1}$=(−23.49, 16.45) 13-1291OC, $X_{O1}$=(−17.26, 33.46) 13-1491OC, and $\Delta\Theta_i$=$\Delta\Theta_1$=4.13° 13-1611P. In this example, wave-front of the diverging input beam propagating toward the curved grating is sliced into a set of narrow beams with angular extension $\Delta\Theta$ by the curved-grating. Each beam with angular extension $\Delta\Theta$ undergoes reflective diffraction by each groove. At a particular wavelength, grating diffraction at a particular groove is equivalent to redirecting a particular narrow beam to an output slit (or waveguide or photodetector) $SL_{O1}$ 13-1401 location with $\Theta_{O1}$ 13-1471, basically due to constructive interference of electro-magnetic waves reflected from adjacent grating grooves. In geometrical optics, it is regarded as due to constructive interference of rays or beams reflected from adjacent grating grooves. The geometrical optic picture is physically less precise but gives reasonable results in predicting the direction of the output beam due to grating diffraction. The position vectors $X_i$'s calculated from Eq. (2) and Eq. (4) are listed in the Table 2. As shown in FIG. 13 the positions of grooves $X_i$ are not on a circle that is tangent to the grating center curve.

| | |
|---|---|
| $X_{-10}$ | (−23.17, 15.28) |
| $X_{-9}$ | (−22.24, 12.89) |
| $X_{-8}$ | (−20.97, 10.60) |
| $X_{-7}$ | (−19.36, 8.43) |
| $X_{-6}$ | (−17.42, 6.44) |
| $X_{-5}$ | (−15.17, 4.65) |
| $X_{-4}$ | (−12.62, 3.10) |
| $X_{-3}$ | (−9.80, 1.83) |
| $X_{-2}$ | (−6.74, 0.87) |
| $X_{-1}$ | (−3.60, 0.14) |
| $X_0$ | (0.00, 0.00) |
| $X_1$ | (3.60, 0.14) |
| $X_2$ | (7.30, 0.70) |
| $X_3$ | (11.06, 1.70) |
| $X_4$ | (14.83, 3.13) |
| $X_5$ | (18.57, 5.02) |
| $X_6$ | (22.22, 7.36) |
| $X_7$ | (25.73, 10.16) |
| $X_8$ | (29.06, 13.39) |
| $X_9$ | (32.16, 17.06) |
| $X_{10}$ | (34.98, 21.15) |

The above example has been used for illustration purposes only and should not be construed in any way as limiting the scope of the invention.

Constant Angle with One or Plurality of Outputs on Input Circle or Rowland Circle Due to the imaging property of curved grating surfaces as shown by Rowland, when the spectrometer is constructed so that the input slit is on a circle called the input circle IC 1080 or the Rowland circle with a radius R/2 which is half the radius of curvature of the grating-center curve, the output focusing point for a particular wavelength will be approximately on the input circle or Rowland circle.

The current invention includes the situations in which one or more than one (i.e. plurality) of output slits are placed along an output plane, each slit placed along a particular output angle to detect a particular wavelength of light, and light at that wavelength is focused (i.e. is achieving its minimal beam width) at the location of that output slit. The output plane is called the focusing field.

When the first output slit is placed on the input circle IC 1080 or the Rowland circle with a radius R/2, as noted about, the property of the imaging of the curved grating surface will result in an output plane or focusing field that is curved and in fact approximately along the input circle or Rowland circle.

This in another alternative embodiment, High-Resolution Compact Curved Grating has a constant angle and output slit (or waveguide or photodetector) $SL_{O1}$ present on the circle of radius R/2. In this embodiment, each groove surface has an angular extension $(\Delta\theta)_i$ from entrance slit or input slit (or waveguide) $SL_{I1}$. In this example, the angular extensions $(\Delta\theta)_i$ are kept constant for all grooves. In addition, both entrance slit or input slit (or waveguide) $SL_{I1}$ and output slits (or waveguide or photodetector) $SL_{O1}$ are located on or near a circle of radius R/2, where R is the radius of a circle formed by three initial groove locations $X_0$, $X_1$, and $X_{-1}$.

Constant Angle with One or Plurality of Outputs on Arbitrary Locations

In as yet another alternate embodiment, High-Resolution Compact Curved Grating has a constant angle with output slit (or waveguide or photodetector) $SL_{O1}$ present at an arbitrary location, as shown by FIG. 13.

Various Curvilinear Shapes for the Groove Surfaces.

There are two commonly used shapes of grooves in the grating used in the free-space spectrometer. They are straight line and sinusoidal shape. These two shapes are widely used because of ease of manufacturing process. In an embodiment of the present invention, for a curved-grating, ideal shape of reflecting surface is not a straight line, but a curved shape that can image entrance slit or input slit (or input waveguide mouth) $SL_{I1}$ 1205 at output slit (or output waveguide mouth or photodetector) $SL_{O1}$ 1405 location. Ideal aberration-free curved mirror is an ellipse with its focal point located at source and image. Therefore, as shown in FIG. 12, the ideal shape of the groove at $X_i$ in a curved-grating is a section of ellipse 12-1060CV passing through $X_i$ with its two focal points ($X_{I1}$ 12-1291OC or C1, $X_{O1}$ 12-1491OC or C2) at the input and output slits ($SL_{I1}$ 12-1201, $SL_{O1}$ 12-1401). That is, if the focal point C1 is at $SL_{I1}$ 12-1201 and C2 is at $SL_{O1}$ 12-1401 for ellipse 12-1060CV passing though groove at $X_i$ 12-160|i|P/N (N if i<0, P if i>0), then the curved line segment $SF_i$ 12-163|i|P/N (N if i<0 and P if i>0) of the ellipse at groove $X_i$ will be the ideal shape for the groove surface $SF_i$ 12-163|i|P/N (N if i<0 and P if i>0) at $X_i$.

This, in another embodiment to be described next, elliptical shape is used for each groove as just described above.

Constant Arc Case

The geometrical specification of the HR-CCG with constant arc-length (the Constant-Arc Case) and output slit (or waveguide or photodetector) $SL_{O1}$ is as described below.

First, refer to FIGS. 1, 1A, 1B, 2, 2A, 2B, 3 for which entrance slit or input slit (or waveguide) $SL_{I1}$ 1201 is located on a circle tangent to the grating-center curve (the so-called tangent circle). Therefore, the angle $\theta_{I1}$ 1271 and the distance $S_{I1}$ 1261 of entrance slit or input slit (or waveguide) $SL_{I1}$ 1201 with respect to the curved grating center CGC 1050 is related by $S_{I1}=R*\text{Cos}(\theta_{I1})$ 1201, where R is the radius of curvature of the grating center curved $L_{GCC}$ 1050CV at the grating center CGC 1050.

Second, the location of output slit (or waveguide or photodetector) $SL_{O1}$ 1401 can be adjusted in order to have the best performance for a particular design goal. Thus, the location of output slit (or waveguide or photodetector) $X_{O1}$ 1491OC, specified by the angle $\theta_{O1}$ 1471 with respect to the grating-center circle normal line $L_{GCCN}$ 1050N and the distance $S_{O1}$ 1461 from the grating center CGC 1050 is not necessarily on the same circle where entrance slit or input slit (or waveguide) $SL_{I1}$ 1201 is located.

Third, the relation between $\Theta_{I1}$ 1271, $\Theta_{O1}$ 1471, and the initial groove spacing d is given by the grating formula $d*(\text{Sin}(\Theta_{O1})+\text{Sin}(\Theta_{I1}))=m*\lambda_{I1-O1}/n_{gr}$ where m is the diffraction order, $n_{gr}$ is the effective refractive index of propagation of the medium, and $\lambda_{I1-O1}$ is an operation wavelength.

Fourth, initial groove positions are $X_1=(d, 0)$ 1601P and $X_{-1}=(-d, 0)$ 1601N, or alternatively $X_1=(-d/2, R-(R^2-(d/2)^2)^{1/2})$ and $X_{-1}=(-d/2, R-(R^2-(d/2)^2)^{1/2})$ (so that $X_1$ and $X_{-1}$ will be exactly on the input circle IC 1080). With these position vectors, two initial grooves are located on a circle of radius R and have the initial groove spacing of d at the grating center. This circle segment of radius R at the grating center then forms the grating-center curve.

Fifth, the location of other grooves $X_i$'s 160|i|P/N (N if i<0 and P if i>0) are obtained by the following two conditions. The first condition being the path-difference between adjacent grooves should be an integral multiple of the wavelength in the medium, which is mathematically expressed as $$[D_1(\Theta_{I1},S_{I1},X_1)+D_2(\Theta_{O1},S_{O1},X_1)]-[D_1(\Theta_{I1},S_{I1},X_0)+D_2(\Theta_{O1},S_{O1},X_0)]=m*\lambda_{I1-O1}/n_{gr}, \quad (20)$$

The second condition being the arc lengths of all the grooves are the same throughout the HR-CCG. This second condition can be mathematically expressed as:

$$\Delta S_i = |X_i - X_{I1}| * \text{ArcCos}\left[\frac{\left(\frac{X_{i-1}+X_i}{2}-X_{I1}\right)\cdot\left(\frac{X_i+X_{i+1}}{2}-X_{I1}\right)}{\left|\frac{X_{i-1}+X_i}{2}-X_{I1}\right|*\left|\frac{X_i+X_{i+1}}{2}-X_{I1}\right|}\right] = \text{constant}, \quad (21)$$

where $\Delta S_i$ is the arc-length of the $i^{th}$ groove. Suppose $X_{i-1}$ is already known, this equation requires the knowledge of $X_{i+1}$, which is still unknown. However, with the constraint of the fact that each $X_i$ is located at the center of the groove, the above expression can be reduced to the following expression without $X_{i+1}$.

$$\Delta S_i = |X_i - X_{I1}| * \text{ArcCos}\left[\frac{\left(\frac{X_{i-1}+X_i}{2}-X_{I1}\right)\cdot(X_i-X_{I1})}{\left|\frac{X_{i-1}+X_i}{2}-X_{I1}\right|*|X_i-X_{I1}|}\right] = \text{constant} \quad (22)$$

Or equivalently:

$$\Delta S_i = |X_i - X_{I1}| * \text{ArcCos}\left[\frac{\left(\frac{X_{ja}+X_i}{2}-X_{I1}\right)\cdot(X_i-X_{I1})}{\left|\frac{X_{ja}+X_i}{2}-X_{I1}\right|*|X_i-X_{I1}|}\right] = \text{constant}, \quad (23)$$

where $X_{ja}$ is the position of a groove ja that is adjacent to groove i (e.g., ja can be i−1 or i+1). Typically $X_{ja}$ is already known.

Constant Arc with Output Slits on Rowland Circle

Figure 14:
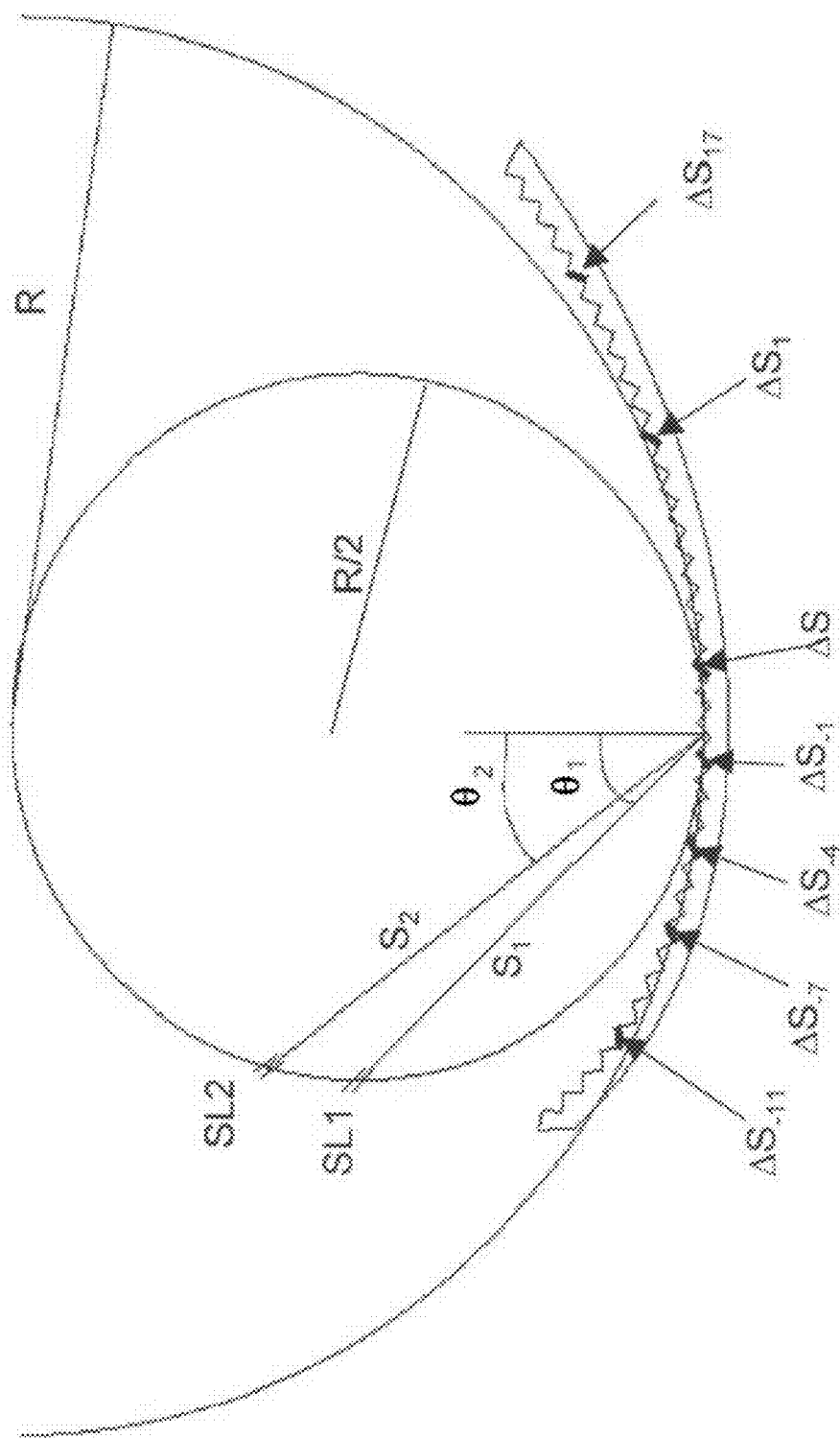
FIG. 14 shows a High Resolution Compact Curved Grating with Constant Arc (the Constant-Arc Case), the output slit (or waveguides or photodetectors) $SL_1$ and the input slit (or waveguide) $SL_1$ being present anywhere including but not limited to the Rowland circle, in accordance with an embodiment of the present invention.

For the purpose of illustration and not limitation, FIG. 14 shows a particular implementation of the current invention of the HR-CCG with constant arc-length of the grooves and output slit (or waveguide or photodetector) $SL_{O1}$ at a tangent circle. The radius of curvature at the grating center is R=100 µm. Entrance slit or input slit (or waveguide) $SL_{I1}$ is located at an angle $\Theta_{I1}=45°$ from grating normal and a distance $S_{I1}=70.71$ µm from the grating center. Output slit (or waveguide or photodetector) $SL_{O1}$ is located at an angle $\Theta_{O1}=37.37°$ and distance $S_{O1}=79.47$ µm from the grating center. Both entrance slit or input slit (or waveguide) $SL_{I1}$ and exit slit or output slit (and waveguide or photodetector) $SL_{O1}$ are located on a tangent circle of radius 50 µm. The groove spacing at the grating center is chosen to be d=4.2 µm so that diffraction order m=12 is directed toward output slit (or waveguide or photodetector) $SL_{O1}$ located at an angle $\Theta_{O1}$ from the grating normal. Three initial grooves are located at $X_0=(0, 0)$, $X_1=(4.2, 0.008)$, and $X_{-1}=(-4.2, 0.008)$ which form a circle of radius R=100 µm. Other groove locations $X_i$'s are obtained with the condition of arc-length of each groove $\Delta S_i$ is the same, i.e. $\Delta S_1$. Equation (20) and either equation (23) or (21) or (22) are simultaneously solved for a $X_i$ with $X_{f1}$=(−50, 50), $X_{O1}$=(−48.24, 63.15), and $\Delta S_i$=4.201 μm for a given $X_{i-1}$. Grating groove locations, $X_i$'s calculated in this method are listed in Table 3. As shown in FIG. 14, grating grooves in this grating are not located on a tangent circle.

| | |
|---|---|
| $X_{-15}$ | (−55.43, 23.48) |
| $X_{-14}$ | (−52.90, 20.32) |
| $X_{-13}$ | (−50.07, 17.38) |
| $X_{-12}$ | (−46.98, 14.68) |
| $X_{-11}$ | (−43.67, 12.21) |
| $X_{-10}$ | (−40.17, 9.98) |
| $X_{-9}$ | (−36.52, 7.99) |
| $X_{-8}$ | (−32.74, 6.24) |
| $X_{-7}$ | (−28.84, 4.72) |
| $X_{-6}$ | (−24.86, 3.43) |
| $X_{-5}$ | (−20.81, 2.35) |
| $X_{-6}$ | (−16.71, 1.48) |
| $X_{-5}$ | (−20.81, 2.35) |
| $X_{-4}$ | (−16.71, 1.48) |
| $X_{-3}$ | (−12.57, 0.82) |
| $X_{-2}$ | (−8.39, 0.36) |
| $X_{-1}$ | (−4.20, 0.09) |
| $X_0$ | (0.00, 0.00) |
| $X_1$ | (4.20, 0.09) |
| $X_2$ | (8.39, 0.35) |
| $X_3$ | (12.57, 0.77) |
| $X_4$ | (16.73, 1.34) |
| $X_5$ | (20.86, 2.07) |
| $X_6$ | (24.97, 2.94) |
| $X_7$ | (29.04, 3.96) |
| $X_8$ | (33.07, 5.10) |
| $X_9$ | (37.06, 6.37) |
| $X_{10}$ | (41.01, 7.76) |
| $X_{11}$ | (44.91, 9.28) |
| $X_{12}$ | (48.77, 10.90) |
| $X_{13}$ | (52.57, 12.63) |
| $X_{14}$ | (56.33, 14.47) |

The above example has been for illustration purposes only and should not in any way be limiting the scope of the above-described embodiment or invention as a whole.

Figure 5:
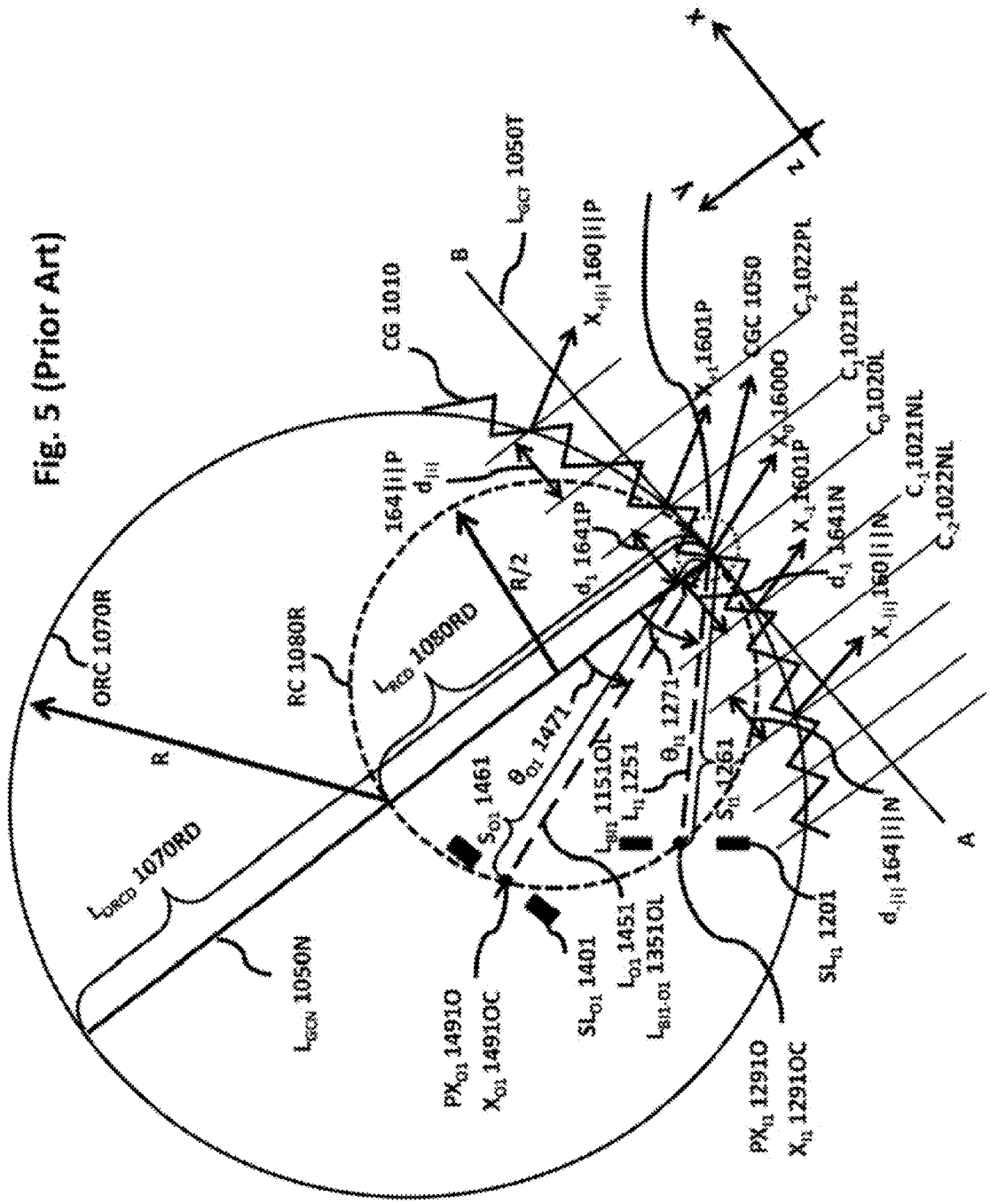
FIG. 5 illustrates the Rowland configuration specification for a Rowland curved rating.

The performance of the HR-CCG with the constant arc-length and output slit (or waveguide or photodetector) on a tangent circle is compared with a Rowland design with the same parameters such as $\theta_{f1}$, $S_{f1}$, $\theta_{O1}$, $S_{O1}$, R, m, d, and $\lambda_{f1-O1}$. It is a direct comparison of a Rowland curved-grating spectrometer described in FIG. 5 and a HR-CCG curved grating spectrometer described in FIG. 14. All the configuration parameters are the same for these two spectrometers except the grating itself. Particularly, the imaging properties, that is, how well entrance slit or input slit (or waveguide) $SL_{f1}$ is sharply imaged at the output slit (or waveguide or photodetector) location without aberration are compared. Imaging properties ultimately determine the resolution of a spectrometer. Finite Difference Time Domain (FDTD) method is used as a calculation method. FDTD is a Maxwell-equation solver, which evaluates electromagnetic wave within a spatial region for a certain period of time. By choosing a fine spatial grid size and temporal calculation step, the equation for an electromagnetic wave and its propagation can be solved with arbitrarily fine resolution. Imaging properties in these two curved grating spectrometers is calculated by propagating a monochromatic light into entrance slit or input slit (or waveguide) $SL_{f1}$ of each spectrometer. FDTD is run until the interference of beams from the entire grating groove is completed and forms an image of entrance slit or input slit (or waveguide) $SL_{f1}$ at the output slit (or waveguide or photodetector) location. The resulting snapshot of electric-field near the detector or output slit (or waveguide) is taken for these two cases as shown in FIGS. 8A and 8B. Entrance slit or input slit (or waveguide) $SL_{f1}$ width of 1 μm is used for both simulations and the wavelengths of λ=1530, 1550, 1570 nm are used. In FIG. 8A shows the snapshot of electric field at the output slit (or waveguide or photodetector) location for the Rowland design described in FIG. 5. As expected, the image of the entrance slit or input slit (or input waveguide mouth) is blurred due to imperfect grating. For 1 μm entrance slit, the full diffraction angle is about $\theta_{div}$=50° and therefore, Rowland design breaks down. FIG. 8B shows the snapshot of electric field for the HR-CCG with constant arc-length grooves and output slit (or waveguide or photodetector) on a tangent circle. In this case, a sharp aberration free image of entrance slit or input slit (or input waveguide mouth) is formed at the output slit (or waveguide or photodetector) location. The RS factor (RS=(Δλ/λ)×(L/λ)) in this case is 0.6.

In another embodiment to be described next, elliptical shape is used for each groove, and the length of this elliptical shape in each groove is kept constant (constant arc). Center positions of the grooves $X_i$'s in this example are determined so that the length of each elliptical groove is the same.

Constant Arc with Outputs Near a Straight Line or Near Flat Field Output Case

Due to the imaging property of curved grating surfaces as shown by Rowland, when the spectrometer is constructed so that the input slit is on a circle called the input circle IC 1080 of the Rowland circle with a radius R/2 that has a radius which is half the radius of curvature of the grating-center curve, the output focusing point for a particular wavelength will be approximately on the input circle or Rowland circle.

The current invention includes the situations in which one or more than one (i.e. plurality) of output slits are placed along an output plane, each slit placed along a particular output angle to detect a particular wavelength of light, and light at that wavelength is focused (i.e. is achieving its minimal beam width) at the location of that output slit. The output plane is called the focusing field.

When the first output slit is placed or the input circle or Rowland circle, as noted above, the property of the imaging of the curved grating surface will result in an output plane or focusing field that is curved and in fact approximately along the input circle IC 1080 or Rowland circle. In some application situations, such curved output plane or output focusing field is undesirable.

In some application situations, it is desirable that the output plane is closed to being a straight line. In that situation we will refer to the spectrometer as a "Flat Field" spectrometer.

In another embodiment, High-Resolution compact Curved Grating has a constant arc with the first output slit (or waveguide or photodetector) being present not on the input circle IC 1080 or Rowland circle but along a straight line that passes through the input slit on one end and the output slit on the other end, and the line is approximately perpendicular to the grating center circle normal line $L_{GCCN}$ 1050N. With reference to FIG. 14, this embodiment can be realized if the input slit (or input waveguide) and exit slits (or output slits or waveguides or photodetector) are located along a line such that $S_{O1}*\text{Cos}(\theta_{O1}) \approx S_{f1}*\text{Cos}(\theta_{f1})$ (for an output slit located at distance $S_{O1}$ from the grating center, the projection of the line joining the grating center to the output slit would have a length $S_{O1}*\text{Cos}(\theta_{O1})$. This length is called the perpendicular distance of the output slit from the grating center). The line with the input slit and output slit such that $S_{O1}*\text{Cos}(\theta_{O1}) \approx S_{f1}*\text{Cos}(\theta_{f1})$ is called "line with the same perpendicular grating distance as the input slit" or more briefly as "input-slit constant-perpendicular-distance line" or simply as "input-slit CPD line".

In as yet another embodiment, the grating is the "constant arc design" mentioned above. Furthermore, there are plurality of output slits, in which each output slit is placed along a particular output angle to detect a particular wavelength of light, and the plurality of output slits are placed close to the "input-slit CPD line".

It can be shown that for grating with "constant arc design", for an output slit placed at particular output angle to detect a particular wavelength of light, light at that wavelength will be focused near the "input-slit CPD line". This is a useful property of the "constant arc design".

Such "flat field" output is useful for example, when the input waveguide or slit is small and the input beam diffraction divergence angle is large. This also means the converging or focusing beam onto the output waveguides or slits will also have large angle. The flat field means that the output waveguide mouth (or slit) of one channel will not block the large angle converging beam that reach the adjacent output channel waveguide (or slit).

Constant Arc with Arbitrary Output Locations

In another alternate embodiment, High-Resolution Compact Curved Grating has a constant arc with an output slit (or waveguide or photodetector) $SL_{O1}$ or plurality of output slits present at arbitrary locations.

Grating Groove Near or on Outer Rowland Circle

Figure 15:
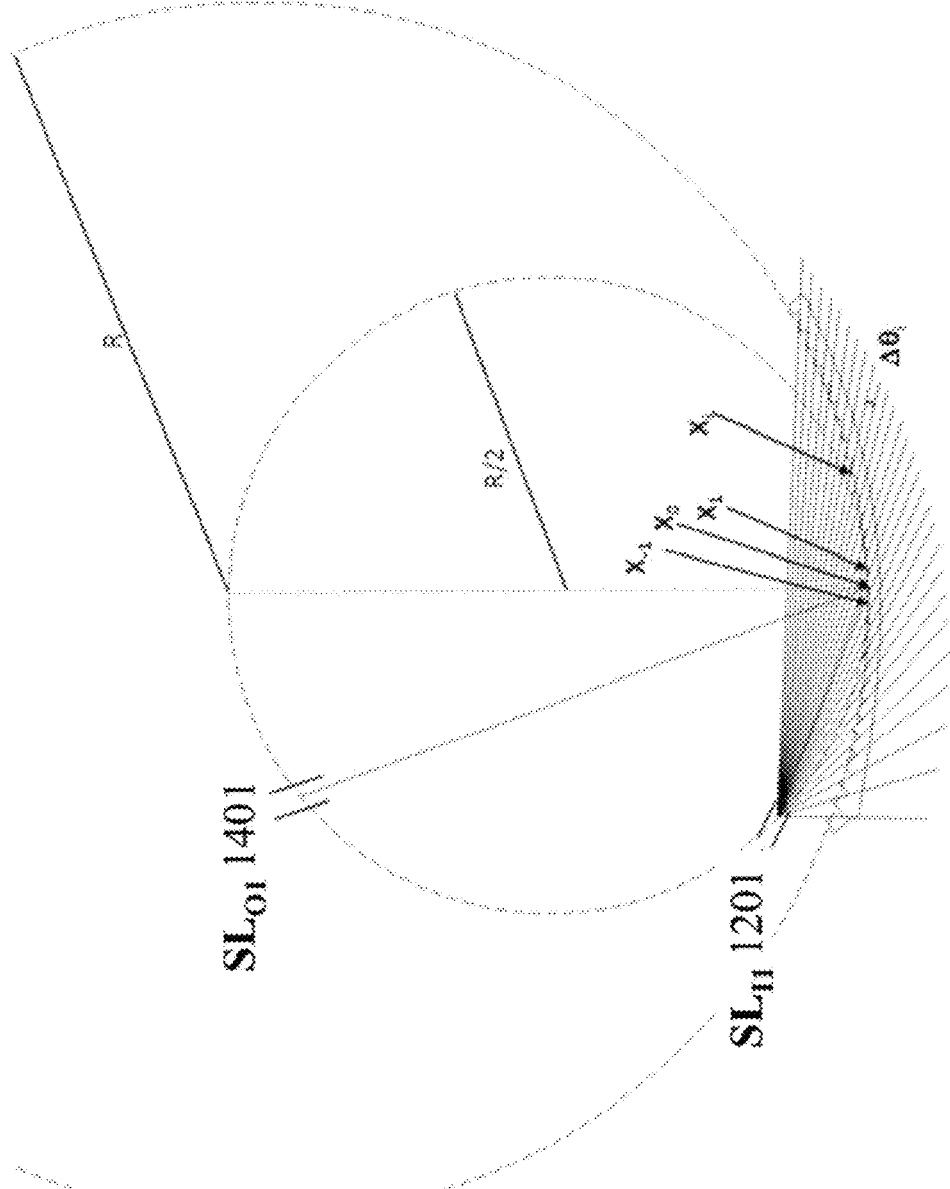
FIG. 15 illustrates a high resolution compact curved grating with grating teeth lying on or near the outer Rowland circle.

In as yet another alternate embodiment, High-Resolution Compact Curved Grating has grooves lying on or near the circle of radius R (the near-Outer-Rowland Case) where R is the radius of a circle formed by three initial groove locations $X_0$, $X_1$, and $X_2$. The output slit $SL_{O1}$ can be located at anywhere, including but not limited to the input circle IC 1080 or Rowland circle, as depicted in FIG. 15. In this embodiment, each groove surface has an angular extension $(\Delta\theta)_i$ from entrance slit or input slit (or waveguide). In this example, the angular extensions $(\Delta\theta)_i$ are chosen so that each groove lies on or near the circle of radius R. More specifically, the location of other grooves $X_i$'s are obtained by the following two conditions. The first condition being the path-difference between adjacent grooves should be an integral multiple of the wavelength in the medium, which is mathematically expressed as $$\text{Sgn}(i-ja)*([D_1(\theta_{I1},S_{I1},X_i)+D_2(\theta_{O1},S_{O1},X_i)]-[D_1(\theta_{I1},S_{I1},X_{ja})+D_2(\theta_{O1},S_{O1},X_{ja})])=m*\lambda_{I1-O1}/n_{gr}, \quad (24A)$$

where the groove "i" is next to some groove ja. The position of groove ja, $X_{ja}$ is typically already known. For an illustration and not limitation, if the grooves close to the grating center are already known, then groove ja is taken to be a groove adjacent to groove "i" so that $X_{ja}=X_{i-1}$ for i>0 (so ja=+|i-1|=i-1 is the previous groove close to i=0 that is already solved) and $X_{ja}=X_{i+1}$ for i<0 (so ja=-|i-1|=i+1 is the previous groove close to i=0 that is already solved). This is only an illustration as there can be situations, for example, the initial grooves may not be at the grating center. Sgn(i-ja) takes on value +1 or -1. Sgn(i-ja) is +1 if i>ja, and -1 if i<ja.

Secondly, the angular locations of the grooves are chosen so that each groove is located at or near the circle of radius R throughout the HR-CCG, where R is the radius of a circle formed by three initial groove locations $X_0$, $X_1$, and $X_{-1}$.

In another alternate embodiment, the High-Resolution Compact Curved Grating with grooves on or near the circle of radius R or the outer input circle 1070 (the near-Rowland case) has one or plurality of output slits (or waveguides or photodetectors) present at arbitrary locations.

Grating Groove Near or on Outer Elliptical Curve

In as yet another alternate embodiment, High-Resolution Compact Curved Grating has grooves lying on or near an elliptical curve that has a radius of curvature R (the near-Ellipse Case) at or near the grating center, where R/2 is the radius of the input circle 1080 or Rowland circle that passes through the grating center and the input slit $SL_{I1}$. The elliptical curve is also part of an ellipse with two foci of the ellipse at the input slit and the "image point" of the input slit. The "image point" of the input slit is obtained by using the grating-center circle normal line $L_{GCCN}$ 1050N as the plane of reflection for the input slit point.

The output slit $SL_{O1}$ can be located on anywhere, including but not limited to the input circle 1080 or Rowland circle (like FIG. 15 except the outer circle is an ellipse). In this embodiment, each groove surface has an angular extension $(\Delta\theta)_i$ from entrance slit or input slit (or waveguide). In this example, the angular extensions $(\Delta\theta)_i$ are chosen so that each groove lies on or near the elliptical curve obtained above. More specifically, the location of other grooves $X_i$'s are obtained by the following two conditions. The first condition being the path-difference between adjacent grooves should be an integral multiple of the wavelength in the medium, which is mathematically expressed as $$\text{Sgn}(i-ja)*([D_1(\theta_{I1},S_{I1},X_i)+D_2(\theta_{O1},S_{O1},X_i)]-[D_1(\theta_{I1},S_{I1},X_{ja})+D_2(\theta_{O1},S_{O1},X_{ja})])=m*\lambda_{I1-O1}/n_{gr}, \quad (24B)$$

where the groove "i" is next to some groove ja. The position of groove ja, $X_{ja}$ is typically already known. For an illustration and not limitation, if the grooves close to the grating center are already known, then groove ja is taken to be a groove adjacent to groove "i" so that $X_{ja}=X_{i-1}$ for i>0 (so ja=+|i-1|=i-1 is the previous groove close to i=0 that is already solved) and $X_{ja}=X_{i+1}$ for i<0 (so ja=-|i-1|=i+1 is the previous groove close to i=0 that is already solved). This is only an illustration as there can be situations, for example, the initial grooves may not be at the grating center. Sgn(i-ja) takes on value +1 or -1. Sgn(i-ja) is +1 if i>ja, and -1 if i<ja.

Secondly, the angular locations of the grooves are chosen so that each groove lies on or near the elliptical curve obtained above throughout the HR-CCG, where R is the radius of a circle formed by three initial groove locations $X_0$, $X_1$, and $X_{-1}$.

In another alternate embodiment, the High-Resolution Compact Curved Grating with grooves on or near an ellipse (the near-Ellipse case) has one or plurality of output slits (or waveguides or photodetectors) present at arbitrary locations.

Broadband Two Anchor Wavelengths Case

Figure 16:
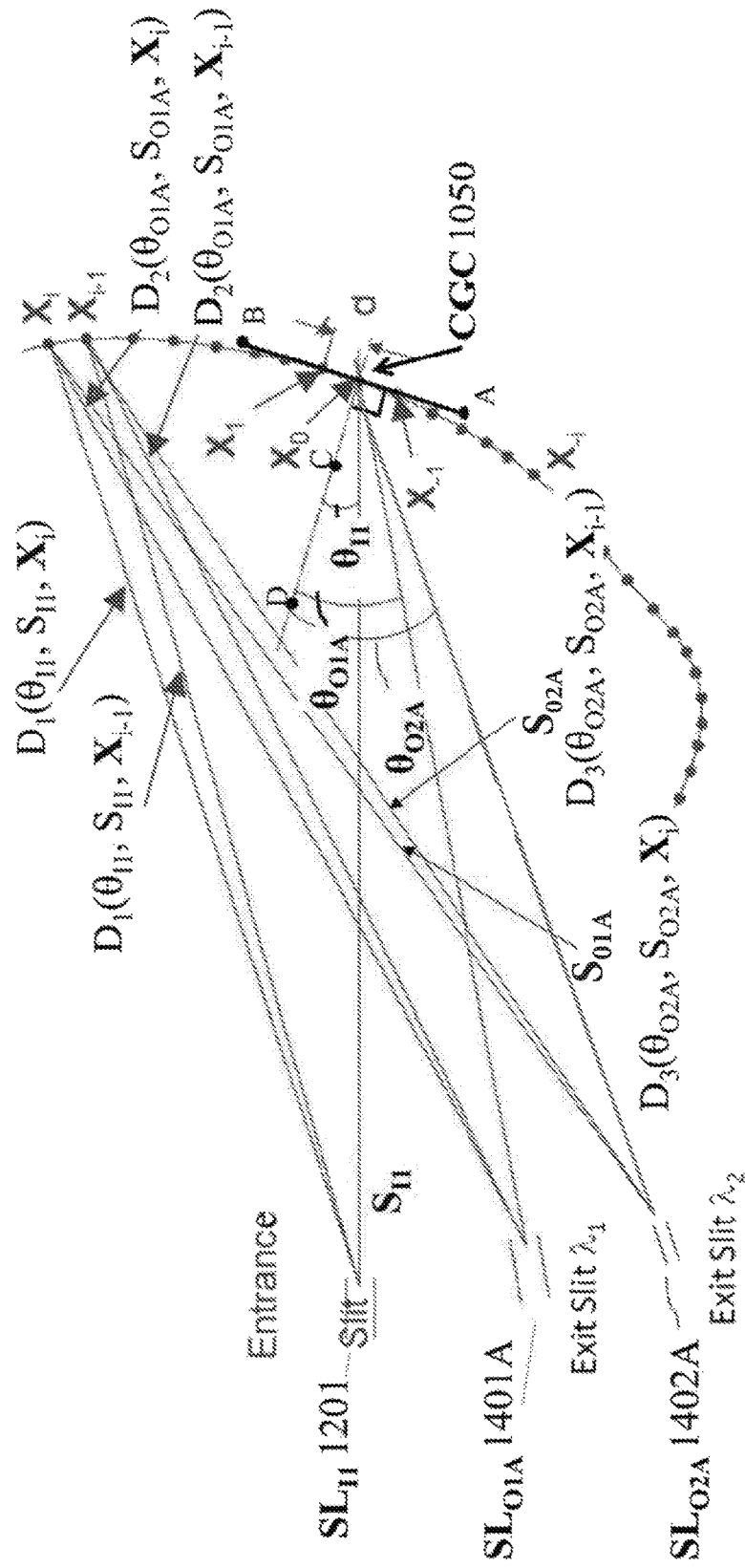
FIG. 16 illustrates a curved grating spectrometer configured as a wavelength multiplexer/demultiplexer showing an additional embodiment called the Broadband Two-Wavelength Case.

FIG. 16 shows an additional embodiment of a HR-CCG and an associated spectrometer or wavelength Mux/deMux utilizing the HR-CCG, called the Broadband Two-Wavelength Case. The HR-CCG spectrometer or wavelength Mux/deMux having the geometric configuration as described below.

First, the location of the entrance slit or input slit (or waveguide) 16-1201 is adjustable in order to have the best performance for a particular design goal. Thus, the location $X_{I1}$ 16-1291OC of an entrance slit or input slit (or waveguide) 16-1201 is specified by angle $\theta_{I1}$ with respect to a grating-center circle normal line $L_{GCCN}$ 16-1050N and the distance $S_{I1}$ from curved grating center CGC 1050.

Second, the location of the output slit (or waveguide or photodetector) for two different wavelengths $\lambda_{I1-O1A}$ and $\lambda_{I1-O2A}$ is adjustable in order to have the best performance for a particular design goal. The location $X_{O1A}$ 16-1491AOC of the first output slit (or waveguide or photodetector) $SL_{O1A}$ 16-1401A for wavelength $\lambda_{I1-O1A}$ is specified by the angle $\theta_{O1A}$ 16-1471A with respect to a grating-center circle normal line $L_{GCCN}$ 16-1050N and the distance $S_{O1A}$ 16-1461A from the curved grating center CGC 1050.

The location $X_{O1B}$ 16-1491BOC of the second output slit (or waveguide or photodetector) $SL_{O1B}$ 16-1401B for wavelength $\lambda_{I1-O1B}$ is specified by the angle $\theta_{O1B}$ with respect to a grating-center circle normal line $L_{GCCN}$ 1050N and the distance $S_{O1B}$ from the curved grating center CGC 1050.

Note that output slit $SL_{O1A}$ 16-1401A, and output slit $SL_{O2A}$ 16-1402A are not necessarily on the same circle where entrance slit or input slit (or waveguide) $SL_{I1}$ 16-1201 is located.

Third, the relation between $\theta_{I1}$, $\theta_{O1A}$, $\theta_{O2A}$ and the initial groove spacing d is given by the grating formula, $$d*(\text{Sin}(\theta_{O1A})+\text{Sin}(\theta_{I1}))=m*\lambda_{I1-O1A}/n_{gr} \quad (25)$$

$$d*(\text{Sin}(\theta_{O2A})+\text{Sin}(\theta_{I1}))=m*\lambda_{I1-O2A}/n_{gr} \quad (26)$$

where m is the diffraction order and n is the effective refractive index of propagation of the medium. For example for the purpose of illustration but not limitation, when given the locations of the two anchor output slits, $\theta_{O1A}$, $\theta_{O2A}$ are known, and with m, $n_{gr}$, and d chosen, Eqs. (25) and (26) can be used to solve for $\lambda_{I1-O1A}$ and $\lambda_{I1-O2A}$. The values for $\lambda_{I1-O1A}$ and $\lambda_{I1-O2A}$ can then be used in the next step (forth step) to obtain all the grating groove positions starting from a groove at $X_0$.

Fourth, locations of other grooves $X_i$'s are obtained by two conditions. The first of these conditions being that the path-difference between adjacent grooves should be an integral multiple of the wavelength $\lambda_{I1-O1A}$ in the medium. The first condition can be expressed mathematically by:

$$\text{Sgn}(i-ja)*([D_1(\theta_{I1},S_{I1},X_i)+D_2(\theta_{O1A},S_{O1A},X_i)]-[D_1(\theta_{I1},S_{I1},X_{ja})+D_2(\theta_{O1A},S_{O1A},X_{ja})])=m*\lambda_{I1-O1A}/n_{gr}, \quad (27)$$

where the groove "i" is next to some groove ja. The position of groove ja, $X_{ja}$ is typically already known. For an illustration and not limitation, if the grooves close to the grating center are already known, then groove ja is taken to be a groove adjacent to groove "i" so that $X_{ja}=X_{i-1}$ for i>0 (so ja=+|i-1|=i-1 is the previous groove close to i=0 that is already solved) and $X_{ja}=X_{i+1}$ for i<0 (so ja=-|i-1|=i+1 is the previous groove close to i=0 that is already solved). This is only an illustration as there can be situations, for example, the initial grooves may not be at the grating center. Sgn(i-ja) takes on value +1 or -1. Sgn(i-ja) is +1 if i>ja, and -1 if i<ja.

$D_1(\theta_{I1},S_{I1},X_i)$ is the distance from the i-th groove located at $X_i$ to entrance slit or input slit (or waveguide) location $X_{I1}$ 16-1291OC specified by $\theta_{I1}$ and $S_{I1}$, $D_2(\theta_{O1A},S_{O1A},X_i)$ is the distance from the i-th groove located at $X_i$ to output slit (or waveguide or photodetector) location $X_{O1A}$ 16-1491AOC specified by $\theta_{O1A}$ and $S_{O1A}$, m is the diffraction order, and n is the effective refractive index of propagation of the medium. This mathematical expression is numerically exact for the optical path difference requirement in the diffraction grating and is actively adjusted for every groove on HR-CCG.

The second of these conditions being that the path-difference between adjacent grooves should be an integral multiple of the wavelength $\lambda_{I1-O2A}$ in the medium. The second condition can be expressed mathematically by:

$$\text{Sgn}(i-ja)*([D_1(\theta_{I1},S_{I1},X_i)+D_3(\theta_{O2A},S_{O2A},X_i)]-[D_1(\theta_{I1},S_{I1},X_{ja})+D_3(\theta_{O2A},S_{O2A},X_{ja})])=m*\lambda_{I1-O2A}/n_{gr}, \quad (28)$$

where the groove "i" is next to some groove ja. The position of groove ja, $X_{ja}$ is typically already known. For an illustration and not limitation, if the grooves close to the grating center are already known, then groove ja is taken to be a groove adjacent to groove "i" so that $X_{ja}=X_{i-1}$ for i>0 (so ja=+|i-1|=i-1 is the previous groove close to i=0 that is already solved) and $X_{ja}=X_{i+1}$ for i<0 (so ja=-|i-1|=i+1 is the previous groove close to i=0 that is already solved). This is only an illustration as there can be situations, for example, the initial grooves may not be at the grating center. Sgn(i-ja) takes on value +1 or -1. Sgn(i-ja) is +1 if i>ja, and -1 if i<ja.

$D_3(\theta_{O2A},S_{O2A},X_i)$ is the distance from the i-th groove located at $X_i$ to output slit (or waveguide or photodetector) location $X_{O2A}$ 16-1492AOC specified by $\theta_{O2A}$ 16-1472A and $S_{O2A}$ 16-1461A. This mathematical expression is numerically exact for the optical path difference requirement in the diffraction grating and is actively adjusted for every groove on HR-CCG. Solving Equations (27) and (28) together, exact locations of other grooves $X_i$'s can be obtained.

Figure 17:
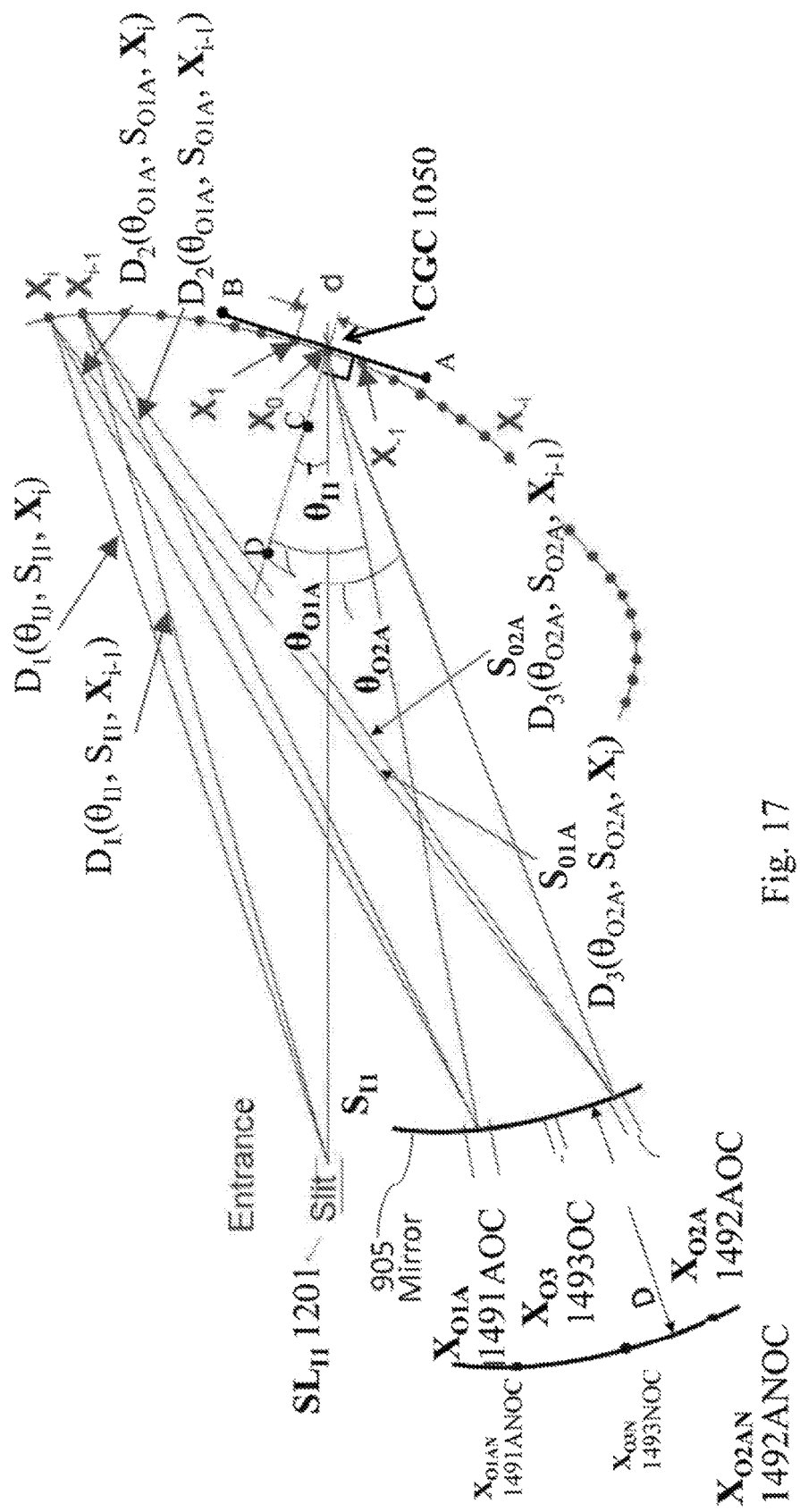
FIG. 17 illustrates a curved grating spectrometer configured as a wavelength multiplexer/demultiplexer showing an additional embodiment doe the broadband Two-Wavelength Case. In this embodiment, the distance $S_{O1A}$ from the grating center to the location of output slit (or waveguide or photodetector) location $X_{O1A}$ specified for wavelength $\lambda_{I1\text{-}O1A}$ is equal to the distance $S_{O2A}$ from the grating center to the location of output slit (or waveguide or photodetector) location $X_{O2A}$ specified for wavelength $\lambda_{I1\text{-}O2A}$. In another embodiment, the grating so generated gives rise to a third or a plurality of focal spot for a third input wavelength $\lambda_{I1\text{-}O3}$ that has a value between wavelength $\lambda_{I1\text{-}O1A}$ and wavelength $\lambda_{I1\text{-}O2A}$. In as yet another embodiment, a mirror are placed at these output slit locations or a displacement from these locations so as to reflect light back to or near the input slit.

Broadband Two Anchor Wavelengths Case with Input Slit and Two Output Slits on a Same Circle with Circle Center Near Grating Center FIG. 17 shows an additional embodiment of a HR-CCG and an associated spectrometer or wavelength Mux/deMux utilizing the HR-CCG. In this embodiment, the distance $S_{O1A}$ from the grating center to the location of output slit (or waveguide or photodetector) location $X_{O1A}$ 17-1491AOC specified for wavelength $\lambda_{I1-O1A}$ is equal to the distance $S_{O2A}$ from the grating center to the location of output slit (or waveguide or photodetector) location $X_{O2A}$ 17-1492AOC specified for wavelength $\lambda_{I1-O2A}$. In other words, the location of output slit (or waveguide or photodetector) $X_{O1A}$ 17-1491AOC for wavelength $\lambda_{I1-O1A}$ and the location of output slit (or waveguide or photodetector) $X_{O2A}$ 17-1492AOC for wavelength $\lambda_{I1-O2A}$ is on the same circle centered at grating center $X_0$ with distance $S_{O1A}=S_{O2A}$.

In an application, such relatively equidistance locations from the grating for the output slits is useful for example, when the input waveguide or slit is small and the input beam diffraction divergence angle is large. This also means the converging or focusing beam onto the output waveguides or slits will also have large angle. The equidistance means that the output waveguide mouth (or slit) of one channel will not block the large angle converging beam that reach the adjacent output channel waveguide (or slit).

In this case, optionally, in some applications one can place a curved reflecting mirror passing through points $X_{O1A}$ 17-1491AOC and $X_{O2A}$ 17-1492AOC, with the nominal direction of the curve at $X_{O1A}$ 17-1491AOC and $X_{O2A}$ 17-1492AOC pointing towards the grating center CGC17-1050. As light at wavelength $\lambda_{I1-O1A}$ enters entrance slit or input slit (or waveguide) $SL_{I1}$ 17-1201 and is diffracted by the grating towards output slit $SL_{O1A}$ 17-1401A, it will hit the mirror and be reflected back by the mirror along the same path back to the grating and further focusing back to the entrance slit or input slit (or waveguide) $SL_{I1}$ 17-1201. Similarly, as light at wavelength $\lambda_{I1-O2A}$ enters entrance slit or input slit (or waveguide) $SL_{I1}$ 17-1201 and is diffracted by the grating towards output slit $SL_{O2A}$ 17-1402A, it will hit the mirror and be reflected back by the mirror along the same path back to the grating and further focusing back to the entrance slit or input slit (or waveguide) $SL_{I1}$ 17-1201. An application that may make use of this property is when one want to reflected the beam back to the input slit location such as to form an optical cavity in the case of a laser, or to increase the path length of the beam in certain compact spectrometer applications.

Broadband Two Anchor Wavelengths Case with Input Slit and Three or Plurality of the Output Slits Near a Straight Line In another embodiment, also illustrated by FIG. 17, the grating so generated gives rise to a third or a plurality of focal spot for a third input wavelength $\lambda_{I1\text{-}O3}$ that has a value between wavelength $\lambda_{I1\text{-}O1A}$ and wavelength $\lambda_{I1\text{-}O2A}$. The location of this third focal spot is $X_{O3}$ 17-1493OC and is specified by angle $\theta_{O3}$ with respect to the normal of grating-center circle normal line $L_{GCCN}$ 17-1050N and the distance $S_{O3}$ from grating center CGC 1050.

The three output slit (or waveguide) locations $X_{O1A}$ 17-1491AOC, $X_{O2A}$ 17-1492AOC, $X_{O3}$ 17-1493OC, can be made to be located on or near a circle of radius $R_{out}$, called the radius of curvature of the output plane or output-plane radius. This circle of radius $R_{out}$, can have a center of curvature either closed to or away from the grating center.

In one embodiment, $S_{O1A}$ and $S_{O2A}$ are chosen so that the locations $X_{O1A}$ 17-1491AOC, $X_{O2A}$ 17-1492AOC, $X_{O3}$ 17-1493OC lie on a near straight line and $R_{out}$ is large.

In an application, such relatively equidistance locations from the grating and "flat field" (near straight-line) arrangement for the output slits is useful for example, when the input waveguide or slit is small and the input beam diffraction divergence angle is large. This also means the converging or focusing beam onto the output waveguides or slits will also have large angle. The flat field means that the output waveguide mouth (or slit) of one channel will not block the large angle converging beam that reach the adjacent output channel waveguide (or slit).

Optionally, in some applications, the three focal points can form a nearly flat surface of reflection if a mirror surface 17-905 is placed across the output slit locations, so that the focused beams with plane wavefront at their focal points will be reflected directly back to the entrance slit $SL_{I1}$ 17-1201. In that case, each of the reflected beam will trace back its own original physical beam propagation and hence will achieve maximum reflection back into the input slit or waveguide $SL_{I1}$ 17-1201. An application that may make use of this property is when one want to reflected the beam back to the input slit location such as to form an optical cavity in the case of a laser, or to increase the path length of the beam in certain compact spectrometer applications.

Broadband Two Anchor Wavelengths Case with Input Slit and Plurality of Output Slits on a Same Circle and Mirrors Near Output Slit with Curved Mirror Surface to Match Beam's Phase Front Curvature As shown in FIG. 17, in as yet another embodiment, the two, three, or plurality of mirror locations are displaced at distance D away from locations $X_{O1A}$ 17-1491AOC, $X_{O2A}$ 17-1492AOC, $X_{O3}$ 17-1493OC so that the new locations $X_{O1AN}$ 17-1491ANOC, $X_{O2AN}$ 17-1492ANOC, $X_{O3N}$ 17-1493NOC lie on a new curved line $X_{O1AN}$-$X_{O2AN}$-$X_{O3N}$ also with radius of curvature $R_{out}$. A curve mirror reflecting surface is then placed or fabricated at curved line $X_{O1AN}$-$X_{O2AN}$-$X_{O3N}$. The beam at $\lambda_{I1\text{-}O1A}$ will hit the curved mirror at $X_{O1AN}$, beam at $\lambda_{I1\text{-}O3}$ will hit the curved mirror at $X_{O3N}$, and beam at $\lambda_{I1\text{-}O2A}$ will hit the curved mirror at $X_{O2AN}$. Due to the diaplacement D from their original focal points, these three beams will attain a curved wavefront with a common beam phase-front radius of curvature $R_{beam}$ due to diffraction. D is chosen to make $R_{beam}=R_{out}$, so that the output plane's radius of curvature matches the beam's radius of curvature. This will again ensure that each of the reflected beams will trace back its own original physical beam propagation and hence will achieve maximum reflection back into the input slit or waveguide $SL_{I1}$ 17-1201.

Broadband Two Anchor Wavelengths Multiple Outputs and Inputs Case

An optical grating spectrometer device that can be used in various devices include but not limited to a wavelength multiplexer, wavelength demultiplexer, optical spectra processing device, or a device in an optical spectrometers, wavelength channel multiplexers, wavelength channel demultiplexers, wavelength or frequency filters, wavelength combiners, wavelength splitters, optical spectrum analyzers, wavelength detectors, spectra dispersion devices, optical arbitrary waveform generators, optical dispersion compensators, optical signal processors, and optical wavelength-domain or frequency-domain processors, for combining, filtering, analyzing, processing, or detecting the spectral compositions of an input optical beam or plurality of input beams, with one or plurality of output beams.

FIG. 18 shows a High Resolution Compact Curved Grating with dual aberration-free anchor points (the Dual Anchor Points Plurality Output and Plurality Input Case), the two anchor output slits (or waveguides or photodetectors) $SL_{O1}$ and $SL_{O2}$, and the input slit (or waveguide) $SL_{I1}$ being present anywhere including but not limited to the Rowland circle, plurality of No more outputs $SL_{O3}, \ldots, SL_{ONo}$ further disposed in-between or on both sides of the two anchor output slits (or waveguides or photodetectors) $SL_{O1}$ and $SL_{O2}$ at minimal aberration points, plurality of Ni more inputs $SL_{I2}, \ldots, SL_{INi}$ further disposed anywhere at minimal aberration points, in accordance with an embodiment of the present invention.

Specifically, the optical grating spectrometer device 18-1000 enabling a processing of light spectra in a range of operation wavelengths centered at wavelength $\lambda_c$. As shown by FIG. 18, the optical grating spectrometer device 18-1000 comprises at least an input slit $SL_{I1}$ 18-1201 (at position $X_{I1}$ 18-1291OC) or a plurality of input slits, say Ni number of slits given by $\{SL_{I1}$ 18-1201 (at position $X_{I1}$ 18-1291OC), $SL_{I2}$ 18-1202 (at position $X_{I2}$ 18-1292OC), $SL_{I3}$ 18-120k (at position $X_{I3}$ 18-129kOC), . . . , and $SL_{INi}$ 18-120Ni (at position $X_{INi}$ 18-129NiOC)$\}$. Without loss of generality, it is taken that the input circle IC 1080 is a circle that passes through the first input slit location $SL_{I1}$ 18-1201 (at position $X_{I1}$ 18-1291OC), and the curved grating center CGC 1050. The spatial orientations of all the input slits (or input waveguides) are arranged so that beam from all the input slits shall propagate approximately towards the curved grating center CGC 1050 so that the optical axis of each of the input beam will go from the location of each of the slit to the grating curved grating center CGC 1050. Any of the other input slits may be to the left or right side of input slit $SL_{I1}$ 18-1201 and may or may not be located on input circle IC 1080 (the front side from the locations of the input slits is defined as the direction facing curved grating center CGC 1050).

The optical grating spectrometer device 18-1000 also comprises at least an output slit $SL_{O1}$ 18-1401 (at position $X_{O1}$ 18-1491OC) or a plurality of output slits, say No number of slits given by $\{SL_{O1}$ 18-1401 (at position $X_{O1}$ 18-1491OC), $SL_{O2}$ 18-1402 (at position $X_{O2}$ 18-1492OC), $SL_{h3}$ 18-140h (at position $X_{O3}$ 18-1493OC), . . . , and $SL_{ONo}$ 18-140No (at position $X_{ONo}$ 18-149NoOC)$\}$, and a curved grating CG 18-1010. The curved grating CG 18-1010 for processing the spectral compositions of at least an optical beam $B_{I1}$ 18-1101 that goes through slit $SL_{I1}$ 18-1201. There may be other optical beams $B_{I2}$ 18-1102 that goes through slit $SL_{I2}$ 18-1202, $B_{Ik}$ 18-110k that goes through slit $SL_{Ik}$ 18-120k, . . . , and $B_{IN}$ 18-110N that does through slit $SL_{IN}$ 18-120N etc. The grating CG 18-1010 comprises a plurality of grooves at positions $X_{-2}, X_{-1}, X_0, X_1, X_2 \ldots$, the position of each groove being adjustable for controlling a performance of the grating spectrometer, the position of each of the input slits being adjustable for controlling a performance of the of the grating spectrometer, and the position of each of the output slits being adjustable for controlling a performance of the grating spectrometer, are determined as follows:

First: for the purpose of describing the design of the optical grating spectrometer device, a Cartesian coordinate system is set up with vector $X=(x,y,z)$ denoting a spatial point in the coordinate system for which the real number x is the x-coordinate, y is the y-coordinate, and z is the z-coordinate for the vector. The coordinate origin is at vector (0,0,0). The optical beam propagating in the grating system is assumed to be propagating approximately parallel to the two-dimensional x-y plane at z=0. In this plane, it is sufficient to describe the x and y coordinates, and the vector in this plane will be denoted by $X=(x,y)$ with the origin at (0,0).

In the case of applications to a wavelength multiplexer/demultiplexer/spectrometer/spectra-processing-device with freely propagating optics, the grating grooves are a set of planes approximately perpendicular to x-y plane at z=0. The spacing and relative locations of these planes with respect to each other at z=0 can be described by a function that depends on the x and y coordinates. The angular deviation of the optical beam diffracted by the grating is largely in a direction parallel to the x-y plane at z=0.

As is well known to those skilled in the art, the grating still can have a curvilinear surface as a function of z in the z direction but it will be to perform only the regular function of focusing and imaging the optical beam in the z direction and will not have the function of spreading the optical beam in different spatial directions for different frequency components due to the grating grooves. In one embodiment, this focusing function in the z-direction is achieved via curvilinear surface that has an elliptical shape in the z direction with two foci, one focus at the location of the input slit and the other focus at the location of the output slit. In another embodiment, this focusing ellipse is approximated by a circle whose radius of curvature matches the radius of curvature of the said elliptical curve around the z=0 region where most of the energy of the beam is hitting the grating. Thus, the wavelength dispersion functionalities of the grating grooves that depend only on the relative positions and spacing of the parallel lines of the grating grooves with respect to each other in the x and y directions can be described by functions in the x-y plane with two-dimensional coordinates denoted by vector $X=(x,y)$. When the x-y positions of these grating grooves are joined with a line (say at the z=0 plane), they will form a curvilinear line in the two-dimensional x-y plane that describes the grating surface (at near z=0 plane).

When this device is applied as a device in an integrated optic circuit or electronic-photonic integrated circuit, the optical beam in the optical grating spectrometer device will be confined within a planar waveguide with its plane parallel to the z=0 plane. As is known to those skilled in the art, a planar waveguide has a layer or set of layers of materials made up of materials with relatively high refractive indices forming a two-dimensional waveguide core with refractive index $n_{plco}$ 18-1040O (see FIG. 11C). This waveguide core is surrounded on its top and bottom by a layer or set of layers of materials made up of materials with refractive indices generally lower than those of the materials in the core layers, forming a two-dimensional waveguide cladding. Let the waveguide cladding at the top has an averaged refractive index given by $n_{Tplcd}$ 18-1040T (see FIG. 11C) and the waveguide cladding at the bottom has an averaged refractive index given by $n_{Bplcd}$ 18-1040B (see FIG. 11C). The waveguide cladding could be air, vacuum, glass, or any materials whose real parts of the refractive indices of the materials are generally lower than the real parts of the refractive indices of the materials in the waveguide core. In such integrated applications, the grating groove surfaces will be a strong function of the x-y coordinates and will have no or minimal variation in the z direction, Thus, the relative positions of the grating grooves can be described by curvilinear lines in the x-y plane with two-dimensional coordinates denoted by vector $X=(x,y)$.

Hence, for the purpose of illustration and not limitations, all the grating groove positions and all the positions for the input slits or output slits are described by a "two-dimensional" coordinate system that depends only on the x and y coordinates.

After setting up a two-dimensional coordinate system described by vector $X=(x,y)$ with the coordinate origin at (0,0), the input/output slit positions and the positions of the grating grooves are specified for an optical grating spectrometer device 18-1000 with a curved grating CG 18-1010 as described below. The center for the curved grating called the curved grating center CGC 18-1050 is chosen to be situated at $X_0$ that is set also to be at the coordinate origin so that $X_0=(0,0)$ 18-1600O. In this embodiment, the coordinate axes are set up so that the y direction is parallel to the grating-center circle normal line $L_{GCCN}$ 18-1050N and the x=0 line coincides with the grating-center normal line $L_{GCCN}$ 18-1050N and passes through the grating center GC 18-1050 at $X_0$. Thus, the grating-center circle normal line $L_{GCCN}$ 18-1050N coincides with the line that gives the y-axis.

There is a first input slit $SL_{f1}$ 18-1201 for allowing an entry of an input optical beam $B_{f1}$ 18-1101 into device 18-1000, a location of the first input slit being adjustable, and further the location of the first input slit is specified by a first input angle $\theta_{f1}$ 18-1271 that is sustained between the line joining the first input slit location $X_{f1}$ 18-1291OC to the grating center CGC 18-1050 and the grating-center circle normal line $L_{GCCN}$ 18-1050N, and further specified by a first input distance $S_{in1}$ 18-1261 from the curved grating center CGC 18-1050 to the first input slit location $X_{f1}$ 18-1291OC. The width of the first input slit being adjustable, and further the width of the first input slit being specified by a first input slit width $W_{f1}$ 18-1291W. The angle $\theta_{f1}$ 18-1271 is zero when the line joining the input slit to the grating center is parallel to grating-center circle normal line $L_{GCCN}$ 18-1050N, takes on positive value when it is rotated about the curved grating center CGC 18-1050 from this zero-angle position towards the negative x direction, and takes on negative value when it is rotated about the grating center from this zero-angle position towards the positive x direction from this zero-angle position. This will be the sign conventions for all the angles below that are referenced to the grating center CGC 18-1050 as the pivot of rotation. In terms of the Cartesian coordinates expressed in angle $\theta_{f1}$ 18-1271 and distance $S_{f1}$ 18-1261, the input slit $SL_{f1}$ 18-1201 is situated at $X_{f1}=(-S_{f1}*\mathrm{Sin}(\theta_{f1}), S_{f1}*\mathrm{Cos}(\theta_{f1}))$ 18-1291OC.

Second: a first output slit called the "first anchor output slit" $SL_{O1A}$ 18-1401A for allowing the exiting of a first anchor output optical beam $B_{O1A}$ 18-1301A, is specified. As will be clear below, the output slit of interest $SL_{O1A}$ 18-1401A is referred to as an "anchor output slit" as the position of this output slit $SL_{O1A}$ 18-1401A will be used to obtain the grating groove positions and hence will serve as an "anchor" for the groove positions generation. The location of the first anchor output slit $X_{O1A}$ 18-1491AOC being adjustable, and further the location of the first anchor output slit $X_{O1A}$ 18-1491AOC specified by a first anchor output angle $\theta_{O1A}$ 18-1471A that is sustained between the line joining the first anchor output slit location $X_{O1A}$ 18-1491AOC to the grating center CGC 18-1050 and the grating-center circle normal line $L_{GCCN}$ 18-1050N, and further specified by a first anchor output distance $S_{O1A}$ 18-1461A from the grating center CGC 18-1050 to the first anchor output slit location $X_{O1A}$ 18-1491AOC. In the subscripts for $\theta_{O1A}$ 18-1471A and $S_{O1A}$ 18-1461A, "O1A" refers to the first anchor output. The coordinate of the first anchor output slit is denoted by $X_{O1A}$ 18-1491AOC and is given by $X_{O1A}=(-S_{O1A}*\mathrm{Sin}(\theta_{O1A}), S_{O1A}*\mathrm{Cos}(\theta_{O1A}))$ 18-1491AOC. The width of the first anchor output slit being adjustable, and further the width of the first anchor output slit is being specified by a first anchor output slit width $W_{O1A}$ 18-1491W. Thus, the location of output slit is not necessarily on the Rowland circle; and Third: the medium in the "grating diffraction region" between any of the input slit and the grating or any of the output slit and the grating, has an effective propagating refractive index around $n_{gr}$ 18-1040 for the input optical beam with spectra compositions around wavelength $\lambda_{BI1}$ 18-1121, as shown in FIG. 1B. In the case of free space, "$n_{gr}$" 18-1040 is the material refractive index. In the case of a planar waveguide, "$n_{gr}$" 18-1040 is the effective refractive index of propagation within the planar waveguide. This refractive index will be wavelength dependent so that for example its value at a free-space wavelength of interest, say free-space wavelength $\lambda_x$, will be labeled by $n_{gr}(\lambda_x)$ 18-1040. More precisely, the refractive index $n_{gr}(\lambda_x)$ 18-1040 may be dependant on the actual optical path going from a particular input slit $SL_{I1}$ to a particular output slit $SL_{O1A}$ for which the averaged refractive index experienced by the beam will be denoted as $n_{gr\text{-}I1\text{-}O1A}$ 18-1041A, for example. If it goes from input slit $SL_{I1}$ to an output slit $SL_{Ok}$, the averaged refractive index experienced by the beam will then be denoted as $n_{gr\text{-}I1\text{-}Ok}$ 18-104k, as another example.

A grating order is chosen and denoted by "m", which is an integer (can be positive or negative). A particular optical wavelength of the spectral component of the input beam is chosen to be diffracted to the first anchor output slit $SL_{O1A}$ 18-1201A. The free-space wavelength for this spectral component is denoted by $\lambda_{I1\text{-}O1A}$ 18-1321A and its frequency is $f_{I1\text{-}O1A}=(c/\lambda_{I1\text{-}O1A})$, where c is the speed of light in vacuum. The value of $\lambda_{I1\text{-}O1A}$ 18-1321A (see FIG. 1B) may be arbitrarily chosen or chosen in a way described below that will ensure that the tangent line $L_{GCT}$ 18-1050T to the grating-center curve $L_{GCC}$ 18-1050CV will be approximately perpendicular to the grating-center circle normal line $L_{GCCN}$ 18-1050N. The wavelength of this spectral component in the material experiences an averaged refractive index given by $n_{gr\text{-}I1\text{-}O1A}$ 18-1041A and its averaged wavelength in the material is then given by $\lambda_{I1\text{-}O1A}/n_{gr\text{-}I1\text{-}O1A}$.

Note that this "anchor" output slit may be one of the No output slits specified as $\{SL_{O1}, \ldots, SL_{ONo}\}$ or it may be "addition to the No output slits specified as $\{SL_{O1}, \ldots, SL_{ONo}\}$. Such anchor output slits are defined for the purpose of discussion such as to define how the grating is generated, and not limitation in that in the actual implementation, this middle-wavelength output slit does not have to actually physically exist. In any case, it is specifically specified as the "anchor slit" and it carries a subscript "A" to distinguish it from the other output slits whose positions will be determined differently from such "anchor output slits".

Fourth: The position of the $i^{th}$ groove is specified by its x-y coordinates $X_i=(x_i, y_i)$ 18-160|i|P/N. Below, 18-160|i|P/N shall be taken as to mean it is given by 18-160|i|N if i<0, 18-160|i|P if i>0, and 18-160O if i=0. The x-y coordinates are specified with respect to the grating center $X_0$ 18-160O and the input slit $X_{I1}$ 18-1291OC. The angle $\theta_{grI1\text{-}i}$ 18-161|i|P/N is the angle made by the line joining the input slit location $X_{I1}$ 18-1291OC to the groove location $X_i$ 18-160|i|P/N and the line joining the input slit location $X_{I1}$ 18-1290OC to the grating center $X_0$ 18-1600O. Below, 18-161|i|P/N shall be taken as to mean it is given by 18-161|i|P/N if i<0 and 18-161|i|P if i>0. $\theta_{grI1\text{-}i}$ 18-161|i|P/N defined above can be used to give the divergence angle span of the input beam intercepted by the grating from the grating groove at i=0 up to groove number i, and may be referred to as the "input-ray angle at groove i". The value of $\theta_{grI1\text{-}i}$ 18-161|i|P/N is zero when $X_i=X_0$, is positive when i>0, and is negative when i<0.

Fifth, the locations of all other grooves are given by computing the coordinate of each groove with the $i^{th}$ groove's coordinate $X_i$ 18-160|i|P/N given by the following two conditions. The first of these conditions being that the path-difference between adjacent grooves should be an integral multiple of the wavelength in the medium. The first condition can be expressed mathematically by:

$$\mathrm{Sgn}(i-ja)*([D_1(\Theta_{I1},S_{I1},X_i)+D_2(\Theta_{O1A},S_{O1A},X_i)]-[D_1(\Theta_{I1},S_{I1},X_{ja})+D_2(\Theta_{O1A},S_{O1A},X_{ja})])=m*\lambda_{I1\text{-}O1A}/n_{gr\text{-}I1\text{-}O1A}, \quad (29)$$

where $D_1(\Theta_{I1},S_{I1},X_i)$ is the physical distance from an i-th groove located at $X_i$ 18-160|i|P/N to the input slit's (or input waveguides) $SL_{I1}$ 18-1201 position $X_{I1}$ 18-1291OC specified by $\Theta_{I1}$ 18-1271 and $S_{I1}$ 18-1261, $D_2(\Theta_{O1A},S_{O1A},X_i)$ is the distance from the i-th groove located at $X_i$ 18-160|i|P/N to the first anchor output slit's (or waveguide's or photodetector's) $SL_{O1A}$ 18-1401A position $X_{O1A}$ 18-1491AOC specified by $\Theta_{O1A}$ 18-1471A and $S_{O1A}$ 18-1461A, m is the diffraction order, and $n_{gr\text{-}I1\text{-}O1A}$ 18-1041A is the averaged effective refractive index of propagation of the medium at wavelength $\lambda_{I1\text{-}O1A}$ 18-1321A. Note that some time we would refer to just a general planar-waveguiding refractive index $n_{gr}$ 18-1040 for the grating region. When there is substantial refractive index variation as a function of the wavelength, the denotation of $n_{gr}$ 18-1040 by $n_{grI1\text{-}O1A}$ 18-1041A or $n_{grI1\text{-}O2A}$ 18-1042A is just to make the statement more precise as is well known to those skilled in the art. Hence, they are used interchangeably and $n_{gr}$ 18-1040 is often used for simplicity and is not meant to limit the scope of the present invention. Eq. (29) ensures that the free-space wavelength $\lambda_{I1\text{-}O1A}$ 18-1322A in Eq. (29) is the wavelength that will diffract to this first "anchor" output slit $SL_{O1A}$ 18-1401A from input slit $SL_{I1}$, and is called the first anchor output wavelength.

In Eq. (29), groove ja is taken to be a groove adjacent to groove "i", and $\mathrm{Sgn}(i-ja)$ takes on value +1 or −1. $\mathrm{Sgn}(i-ja)$ is +1 if i>ja, and −1 if i<ja. The position of groove ja, $X_{ja}$ is typically already known. For an illustration and not limitation, if the grooves close to the grating center are already known, then $X_{ja}=X_{i-1}$ for i>0 (so ja=+|i−1|=i−1 is the previous groove close to i=0 that is already solved) and $X_{ja}=X_{i+1}$ for i<0 (so ja=−|i−1|=i+1 is the previous groove close to i=0 that is already solved). Since the groove position $X_0$ at the grating center with i=0 is given, this will give one of the two equations needed to generate groove positions $X_1$ and $X_{-1}$ with i=1 and i=−1, and one of the two equations needed to generate all other grooves similarly. This is only an illustration as there can be situations. For example, the initial grooves may not be at the grating center at $X_0$ and may be at other groove locations. The mathematical expression given by Eq. 29 is numerically exact for the optical path difference requirement in the diffraction grating and is actively adjusted for every groove on HR-CCG.

The second of these conditions being specific for a particular design goal of a curved-grating spectrometer. The second condition in general can be mathematically expressed as $$f(X_i) = \text{constant} \tag{30}$$

where in Eq. (30), the function "f" or the "constant" on the right-hand-side of Eq. (30), can be depending on other design parameters such as the input slit and output slit positions or the positions of the adjacent grooves and other parameters (e.g. $\Theta_{I1}, S_{I1}, \Theta_{O1A}, S_{O1A}$, m, $n_{gr I1-O1A}$, $X_{ja}$) that are already known. The functional variable involved is $X_i$ 18-160|i|P/N which is the variable to be solved. Specific examples of the second condition are described later in the application. Eq. (30) will give the second of the two equations needed to generate all the groove positions.

The unknown variables in both equations Eq. (29) and Eq. (30) are x- and y-coordinates coordinates of the location vector $X_i$ 18-160|i|P/N of the i-th groove $X_i = (x_i, y_i)$. For a given input-slit (or input-waveguide) location $X_{I1}$ 18-1291OC given by $\theta_{I1}$ 18-1271 and $S_{I1}$ 18-1261, anchor output slit (or waveguide or photodetector) location $X_{O1A}$ 18-1491AOC given by $\theta_{O1A}$ 18-1471A and $S_{O1A}$ 18-1461A, and the previous ja-th groove position $X_{ja}$, the positional vector for the i-th groove $X_i$ 18-160|i|P/N is completely specified by equations Eq. (29) and Eq. (30) for a given wavelength $\lambda_{I1-O1A}$ 18-1321A to output slit $SL_{O1A}$ 18-1201A, effective refractive index of propagation $n_{gr-I1-O1A}$, and the diffraction order m.

The above two equations Eq. (29) and Eq. (30) are needed to solve for the two unknown numbers in $X_i = (x_i, y_i)$, namely x-coordinate $x_i$ and y-coordinate $y_i$ of the $i^{th}$ groove. These two equations are solved analytically, numerically, or computationally for the values of $X_i = (x_i, y_i)$ 18-160|i|P/N using equations solving methods that are known to those skilled in the art. The groove positions $X_i$ starting from i=0,1,2 . . . or i=0,−1,−2 . . . are iteratively solved with the groove location of the preceding groove $X_{ja}$ already solved or specified starting from the location of initial grooves $X_1$ or $X_{−1}$, or any other initial groove positions, such as $X_0 = (0,0)$, whichever is applicable.

This fifth step of the HR-CCG specifications ensures that the rays from all the grooves basically converge to a single point at the first anchor output location $X_{O1A}$ 18-1491AOC. This ensures the rays from HR-CCG will focus well at output slit $SL_{O1}$ 18-1401 with minimal spatial focusing aberration, and therefore enabling a small focused spot size at the output slit.

Sixth: In an alternative embodiment, the second constraint is further given by choosing the function f so that:

$$\text{Sgn}(i-ja) * ([D_1(\theta_{I1}, S_{I1}, X_i) + D_2(\theta_{O2A}, S_{O2A}, X_i)] - [D_1(\theta_{I1}, S_{I1}, X_{ja}) + D_2(\theta_{O2A}, S_{O2A}, X_{ja})]) = m * \lambda_{I1-O2A}/n_{gr-I1-O2A}, \tag{31}$$

where $D_2(\theta_{O2A}, S_{O2A}, X_i)$ is the distance from $X_i$ 18-160|i|P/N to a second "anchor" output slit $SL_{O2A}$ 18-1402A at position $X_{O2A}$ 18-1492AOC, whose location is specified by a second anchor output angle $\theta_{O2A}$ 18-1471A that is sustained between the line joining the second anchor output slit $SL_{O2A}$ 18-1402A position $X_{O2A}$ 18-1492AOC to the grating center CGC 18-1050 at $X_0$ and the grating-center circle normal line $L_{GCCN}$ 18-1050N, and a second anchor output distance $S_{O2A}$ 18-1461A from the grating center CGC 18-1050 at $X_0$ to the second anchor output slit $SL_{O2A}$ 18-1402A position $X_{O2A}$ 18-1492AOC. Note for example that f in Eq. (30) is the left hand side of Eq. 31 and the "constant" in Eq. (30) is the right hand side of Eq. (31).

The coordinate of the second anchor output slit $SL_{O2A}$ 18-1402A is denoted by:

$$X_{O2A} \text{ 18-1492AOC} \tag{32A}$$

and is given by $$X_{O2A} = (-S_{O2A} * \sin(\theta_{O2A}), S_{O2A} * \cos(\theta_{O2A})). \tag{32B}$$

The width of the second anchor output slit $SL_{O2A}$ 18-1402A being adjustable, and further the width of the second anchor output slit specified by a second anchor output slit width $W_{O2A}$ 18-1492AW. The free-space wavelength $\lambda_{I1-O2A}$ 18-1322A in Eq. (31) is the wavelength that will diffract to this second "anchor" output slit $SL^{O2A}$ 18-1402A from input slit $SL_{I1}$, and is called the second anchor output wavelength.

Note that this second "anchor" output slit may be one of the No output slits specified as $\{SL_{O1}, \ldots, SL_{ONo}\}$ or it may be "addition to the No output slits specified as $\{SL_{O1}, \ldots, SL_{ONo}\}$. Such anchor output slits are defined for the purpose of discussion such as to define how the grating is generated, and not limitation in that in the actual implementation, this middle-wavelength output slit does not have to actually physically exist. In any case, it is specifically specified as the "anchor slit" and it carries a subscript "A" to distinguish it from the other output slits whose positions will be determined differently from such "anchor output slits".

In Eq. (31), groove ja is taken to be a groove adjacent to groove "i", and Sgn(i−ja) takes on value +1 or −1. Sgn(i−ja) is +1 if i>ja, and −1 if i<ja. The position of groove ja, $X_{ja}$ is typically already known. For an illustration and not limitation, if the grooves close to the grating center are already known, then $X_{ja} = X_{i-1}$ for i>0 (so ja=+|i−1|=i−1 is the previous groove close to i=0 that is already solved) and $X_{ja} = X_{i+1}$ for i<0 (so ja=−|i−1|=i+1 is the previous groove close to i=0 that is already solved).

Eq. (31) imposes that spectral energy in the input beam at a second anchor output wavelength $\lambda_{I1-O2A}$ will be diffracted by the grating to the second anchor output slit direction at second anchor output angle $\theta_{O2A}$. The wavelength $\lambda_{I1-O2A}$ 8-1322A is at this point unknown and has to be solved and there are various ways to do so.

Arbitrariness in the Generation of the Initial Grooves (Preferred embodiment: two-groove case with exact solution and with $\lambda_{I1-O1A}$ first chosen) in another preferred embodiment, the initial set of grooves is made in the following ways: an initial two groove positions are set at:

$$X_1 = (d/2, 0) \tag{33A}$$

and $$X_{-1} = (-d/2, 0) \tag{34A}$$

and there is no groove at $X_0$. Alternatively, the two grooves can be:

$$X_0 = (0,0) \tag{33B}$$

and $$X_1 = (d, 0) \tag{34B}$$

or alternatively, the two grooves can also be:

$$X_0=(0, 0) \tag{33C}$$

and $$X_{-1}=(-d, 0) \tag{34C}$$

or alternatively, the two grooves can also be:

$$X_1=(d/2, R-(R^2-(d/2)^2)^{1/2}) \tag{33D}$$

and $$X_{-1}=(-d/2, R-(R^2-(d/2)^2)^{1/2} \tag{34D}$$

or alternatively, the two grooves can also be:

$$X_0=(0, 0) \tag{33E}$$

and $$X_1=(d, R-(R^2-d^2)^{1/2}) \tag{34E}$$

or alternatively, the two grooves can also be:

$$X_0=(0, 0) \tag{33F}$$

and $$X_{-1}=(-d, R-(R^2-d^2)^{1/2}) \tag{34F}$$

In one embodiment, the parameter "d" being adjustable such that these two points gives for the chosen wavelength $\lambda_{I1-O1A}$ 18-1321A and output slit location given by $\theta_{O1A}$, $S_{O1A}$, the following equation is satisfied:

$$d*(\mathrm{Sin}(\Theta_{O1A})+\mathrm{Sin}(\Theta_{I1}))=m*\lambda_{I1-O1A}/n_{grI1-O1A}, \tag{35A}$$

In the case of the alternative embodiment given in the sixth step (Eq. 31) above, the wavelength $\lambda_{I1-O2A}$ 18-1322A is further solved by requiring that:

$$d*(\mathrm{Sin}(\Theta_{O2A})+\mathrm{Sin}(\Theta_{I1}))=m*\lambda_{I1-O2A}/n_{grI1-O2A}, \tag{35B}$$

with $n_{grI1-O2A}$ 18-1042A being the refractive index of the grating diffraction region at the free-space wavelength $\lambda_{I1-O2A}$ 18-1322A.

In another embodiment for the case involving $X_1$ and $X_{-1}$ as the initial grooves, the parameter "d" being adjustable such that these two points gives for the chosen wavelength $\lambda_{I1-O1A}$ 18-1321A and output slit location given by $\theta_{O1A}$, $S_{O1A}$, the following equation is satisfied:

$$[D_1(\theta_{I1},S_{I1},X_1)+D_2(\theta_{O1A},S_{O1A},X_1)]-[D_1(\theta_{I1},S_{I1},X_{-1})+D_2(\theta_{O1A},S_{O1A},X_{-1})]=m*\lambda_{I1-O1A}/n_{grI1-O1A} \tag{36A}$$

In the case of the alternative embodiment given in the sixth step (Eq. 31) above, the wavelength $\lambda_{I1-O2A}$ 18-1322A is further solved by requiring that:

$$[D_1(\theta_{I1},S_{I1},X_1)+D_2(\theta_{O2A},S_{O2A},X_1)]-[D_1(\theta_{I1},S_{I1},X_{-1})+D_2(\theta_{O2A},S_{O2A},X_{-1})]=m*\lambda_{I1-O2A}/n_{grI1-O2A} \tag{36B}$$

In another embodiment for the case involving $X_0$ and either $X_1$ or $X_{-1}$ as the initial grooves, the parameter "d" being adjustable such that these two points gives for the chosen wavelength $\lambda_{I1-O1A}$ 18-1321A and output slit location given by $\theta_{O1A}, S_{O1A}$, the following equation is satisfied:

$$j0*([D_1(\theta_{I1},S_{I1},X_{j0})+D_2(\theta_{O1A},S_{O1A},X_{j0})]-[D_1(\theta_{I1},S_{I1},X_0)+D_2(\theta_{O1A},S_{O1A},X_0)])=m*\lambda_{I1-O1A}/n_{grI1-O1A} \tag{36C}$$

$$j0*([D_1(\theta_{I1},S_{I1},X_{j0})+D_2(\theta_{O2A},S_{O2A},X_{j0})]-[D_1(\theta_{I1},S_{I1},X_0)+D_2(\theta_{O2A},S_{O2A},X_0)])=m*\lambda_{I1-O2A}/n_{grI1-O2A} \tag{36D}$$

where the $X_{j0}$ is the grating groove position adjacent to $X_0$ (i.e. j0=1 or −1). The left multiplication by j0 is just to ensure the sign on the left side of the equation comes out correct.

(Three initial grooves with $\lambda_{I1-O1A}$ first chosen) In as yet another embodiment, with $\lambda_{I1-O1A}$ first chosen, the initial grooves are generated by taking the following three grooves as initial grooves:

$$X_0=(0, 0) \tag{37A},$$

$$X_1=(d, R-(R^2-d^2)^{1/2}), \tag{37B}$$

and $$X_{-1}=(-d, R-(R^2-d^2)^{1/2}) \tag{37C}$$

Note that these grooves that are on the "outer input circle" 18-1070 of radius R.

The parameter "d" being adjustable such that for the chosen wavelength $\lambda_{I1-O1A}$ 18-1321A and output slit angles given by $\theta_{O1A}$ and $\theta_{O2A}$, either the exact Eqs. (38A) and (38B) below, or the approximate Eqs. (35A) and (35B) or other similar approximate equations as Eqs. (35A) and (35B) are obeyed, which then determines the free-space wavelength $\lambda_{I1-O2A}$ 18-1322A.

$$j0*([D_1(\theta_{I1},S_{I1},X_{j0})+D_2(\theta_{O1A},S_{O1A},X_{j0})]-[D_1(\theta_{I1},S_{I1},X_0)+D_2(\theta_{O1A},S_{O1A},X_0)])=m*\lambda_{I1-O1A}/n_{grI1-O1A} \tag{38A}$$

$$j0*([D_1(\theta_{I1},S_{I1},X_{j0})+D_2(\theta_{O2A},S_{O2A},X_{j0})]-[D_1(\theta_{I1},S_{I1},X_0)+D_2(\theta_{O2A},S_{O2A},X_0)])=m*\lambda_{I1-O2A}/n_{grI1-O2A} \tag{38B}$$

where the $X_{j0}$ is the grating groove position adjacent to $X_0$ (i.e. j0=1 or −1). The left multiplication by j0 is just to ensure the sign on the left side of the equation comes out correct. Note the location of $X_{j0}$ is dependent on and varies with "d" as specified by Eqs. (37A/B/C). Note in general, choosing j0=1 will give a slightly different result for $\lambda_{I1-O2A}$ 18-1322A than if one chooses j0=−1. This is because having 3 initial grooves is redundant and may not be totally consistent with the exact solution for the grating grooves for output slits $SL_{O2A}$ or $SL_{O2A}$. Thus, one shall only pick either j0=1 or j0=−1 to solve for $\lambda_{I1-O1A}$ and $\lambda_{I1-O2A}$.

(d (instead of $\lambda_{I1-O1A}$) and Outputs first chosen case for alternative embodiment) In other embodiments, for the above two embodiments involving placement of initial grooves with parameter "d" (e.g. Eqs. 33A/B/C/D/E/F and 34A/B/C/D/E/F, or Eqs. 37A/B/C) the parameter "d" is first chosen and (instead of $\lambda_{I1-O1A}$ to be first chosen), output slit locations are also given (by $\theta_{O1A}$ and $S_{O1A}$ and $\theta_{O2A}$ and $S_{O2A}$). In the case of the alternative embodiment given in the sixth step (Eq. 31) above, $\lambda_{I1-O1A}$ and $\lambda_{I1-O2A}$ are then solved to satisfy either the exact Eqs. (36A) and (36B) (or Eqs. (36C) and 36D)) for the case of Eqs. 33A/B/C/D/E/F and 34A/B/C/D/E/F (or Eqs. (38A) and (38B) for the case of Eqs. 37A/B/C), or the approximate Eqs. (35A) and (35B) or other similar approximate equations as Eqs. (35A) and (35B).

(Another Preferred Embodiment: d, $\lambda_{I1-O1A}$, and ($S_{O1A}$, $S_{O2A}$) first chosen case) In another also preferred embodiments, for the above two embodiments involving placement of initial grooves with parameter "d" (e.g. Eqs. 33A/B/C/D/E/F and 34A/B/C/D/E/F, or Eqs. 37A/B/C), the parameter "d" is first chosen, $\lambda_{I1-O1A}$ is chosen, and output slit distances are also given (by $S_{O1A}$ and $S_{O2A}$). Then $\theta_{O1A}$ and $\theta_{O2A}$ are solved to satisfy either the exact Eqs. (36A) and (36B) (or Eqs. (36C) and 36D)) for the case of Eqs. 33A/B/C/D/E/F and 34A/B/C/D/E/F (or Eqs. (38A) and (38B) for the case of Eqs. 37A/B/C), or the approximate Eqs. (35A) and (35B) or other similar approximate equations as Eqs. (35A) and (35B).

In the case of the grating generated by Eq. (29) and Eq. (31) (or Eq. (29) and Eq. (30)), the above examples shows various ways to obtain the value for $\lambda_{I1\text{-}O2A}$ or $\theta_{O2A}$ for use in Eq. (31) that ensures that for the grating grooves so generated, the tangent to the grating-center curve passing through the few grooves closest to the grating center is perpendicular to the grating-center circle normal line $L_{GCCN}$ 18-1050N at the grating center, and the few grooves basically obey the exact Eqs. (36A) and (36B) (or Eqs. (36C) and (36D)) for the case of Eqs. 33A/B/C/D/E/F and 34A/B/C/D/E/F (or Eqs. (38A) and (38B) for the case of Eqs. 37A/B/C), or the approximate Eqs. (35A) and (35B) or other similar approximate equations as Eqs. (35A) and (35B). It is done by construction, requiring that the few grooves approximately lie on a circle of radius R with such property.

(One initial groove with $\lambda_{I1\text{-}O1A}$ first chosen) In another embodiment, with $\lambda_{I1\text{-}O1A}$ first chosen, the initial grooves are generated by taking the groove $X_0$ as the only groove in the initial set of grooves.

$$X_0 = (0, 0) \tag{39}$$

In this case, there is no constraint on $X_1$ or $X_{-1}$. A grating still can be generated based on Eq. (29) and Eq. (31) (or Eq. (29) and Eq. (30)), but there is no guarantee that the "actual" grating center tangent normal line $L_{GCTN}$ 1050TN (that by definition perpendicular to the tangent $L_{GCT}$ 1050T) will coincided with the grating-center circle normal line $L_{GCCN}$ 1050. As discussed above, when that happens, it just amount to a redefinition of the angles for the input and output slits, and the "actual" grating center tangent normal line $L_{GCTN}$ 1050TN shall take on the role of the grating-center circle normal line $L_{GCCN}$ 1050 instead. To put it in another way, it is worth noting that an arbitrary choices of the values of $\lambda_{I1\text{-}O1A}$ and $\lambda_{I1\text{-}O2A}$ given all other parameters like $\theta_{O1A}$ and $\theta_{O2A}$ etc or the values of $\lambda_{O1A}$ and $\theta_{O2A}$ given all other parameters like $\lambda_{I1\text{-}O1A}$ and $\lambda_{I1\text{-}O2A}$ etc, that deviate from the values given by the above procedure (e.g. by picking $X_0$ as the only initial point) will still enable the grating grooves to be generated based on Eq. (29) and Eq. (31) (or Eq. (29) and Eq. (30)), however, the tangent to the grating-center curve joining the grooves closest to the grating center will no longer be perpendicular to the grating-center circle normal line $L_{GCCN}$ 18-1050N. This simply results in a re-orientation of the true grating center normal line so that a new grating-center normal line that is perpendicular to the tangent to the grating-center curve joining the grooves shall be used to measure the input slit angle and output slit angle and hence altering their angles to new values. Under this new grating-center normal line, the grating so generated would be equivalent to the case in which the value of $\lambda_{I1\text{-}O2A}$ is given by one of the above procedures but with the input slit angle and output slit angle altered to their new values.

Broadband Two Anchor Wavelengths with Multiple Outputs Slits

FIG. 19 shows a High Resolution Compact Curved Grating with dual aberration-free anchor points (the Dual Anchor Points Case), the two anchor output slits (or waveguides or photodetectors) $SL_{O1}$ and $SL_{O2}$, and the input slit (or waveguide) $SL_{I1}$ being present anywhere including but not limited to the Rowland circle, in accordance with an embodiment of the present invention. FIG. 19 shows how the input spectrum power is being spaced out at the output with respect to how the output slits and the two output anchor slits are being placed in accordance to one embodiment of the present invention.

Specifically, this section refer to FIG. 19 for another exemplary embodiment of the present invention for device 19-1000. If the optical grating spectrometer device 19-1000 has a designed operating spectral "middle" wavelength for input slit "I1" around $\lambda_{BI1\text{-}M}$ 19-1121M for a designed input beam $B_{I1\text{-}M}$ 19-1101M. As an example, a designed middle wavelength may be a wavelength for which around 50% of the output spectral power designed to be detected is to have wavelength shorter than $\lambda_{BI1\text{-}M}$ 19-1121M and around 50% of the spectral power has wavelength longer than $\lambda_{BI1\text{-}M}$ 19-1121M.

Let the output angle for wavelength $\lambda_{BI1\text{-}M}$ 19-1121M after diffraction from the grating be $\theta_{I1\text{-}OM}$ 19-147M. For a potential output slit, called the middle-wavelength output slit $SL_{OM}$ 19-140M at $\theta_{I1\text{-}OM}$ 19-147M and location $X_{OM}$ 19-149M, the output wavelength from this output slit for the beam from input slit $SL_{I1}$ will be labelled as $\lambda_{I1\text{-}OM}$ 19-132M, and $\lambda_{I1\text{-}OM} = \lambda_{BI1\text{-}M}$. These are defined for the purpose of discussion such as to define how the grating is generated, and not limitation in that in the actual implementation, this middle-wavelength output slit does not have to actually physically exist.

In an embodiment of the present invention $\lambda_{I1\text{-}OM}$ 19-132M is placed between the first anchor output wavelength $\lambda_{I1\text{-}O1A}$ 19-1321A and the second anchor output wavelength $\lambda_{I1\text{-}O2A}$ 19-1322A as it would be advantages because the spatial focusing aberrations at the first anchor output slit $SL_{O1A}$ 19-1401A and the second anchor output slit $SL_{O2A}$ 19-1402A are essentially zero, giving the highest spectral resolution at $\lambda_{I1\text{-}O1A}$ 19-1321A and $\lambda_{I1\text{-}O2A}$ 19-1322A. That means the spectral resolution for a wavelength $\lambda_{I1\text{-}Om}$ 19-132m (where m is an integer labeling the channel number) around the designed middle wavelength $\lambda_{I1\text{-}OM}$ 19-132M, that is between $\lambda_{I1\text{-}O1A}$ and $\lambda_{I1\text{-}O2A}$ will also be minimized for which the output slit $SL_{Ok}$ 19-140k receiving that wavelength will have an output slit angle $\theta_{I1\text{-}Ok}$ 19-147k that is between $\theta_{I1\text{-}O1A}$ 19-1471A and $\theta_{I1\text{-}O2A}$ 19-1472A, and thus it is spatially located in-between the anchor output slits $SL_{O1A}$ 19-1401A and $SL_{O2A}$ 19-1402A and generally near a line joining the anchor output slits $SL_{O1A}$ 19-1401A and $SL_{O2A}$ 19-1402A.

The spatial closeness of slit $SL_{Ok}$ 19-140k to the aberration free points at slits $SL_{O1A}$ 19-1401A and $SL_{O2A}$ 19-1402A makes the focusing at $SL_{Ok}$ 19-140m also nearly aberration free and hence high spectral resolution can be achieved at output wavelength $\lambda_{I1\text{-}Ok}$ 19-132k.

Furthermore, if 19-1000 is "designed" for input beam from slit $SL_{I1}$ 19-1201 that is expected to have a spectral span from $\lambda_{BI1\text{-}M}$ 19-1121M to a wavelength $\lambda_{LBI1\text{-}M\text{-}X\%}$ 19-1121(X%)ML for beams at output angle $\theta_{LI1\text{-}OM\text{-}X\%}$ 19-147M(X%)L where $\theta_{LI1\text{-}OM\text{-}X\%}$ is to the left (assuming the front is facing the output slit looking from the grating center) of the output angle $\theta_{I1\text{-}OM}$ 19-147M for wavelength $\lambda_{I1\text{-}OM}$ 19-132M that encompasses X % of the total spectral energy on one side of $\lambda_{I1\text{-}OM}$ 19-132M from $\lambda_{I1\text{-}OM}$ to $\lambda_{LBI1\text{-}M\text{-}X\%}$, and a spectral span from $\lambda_{BI1\text{-}M}$ 19-1121M to a wavelength $\lambda_{RBI1\text{-}M\text{-}Y\%}$ 19-1121(Y%)MR for beams at output angle $\theta_{RI1\text{-}OM\text{-}Y\%}$ 19-147M(Y%)R where $\theta_{RI1\text{-}OM\text{-}Y\%}$ 19-147M(Y%)R is to the right of the output angle $\theta_{I1\text{-}OM}$ 19-147M for wavelength $\lambda_{I1\text{-}OM}$ 19-132M that encompasses Y % of the total spectral energy on one side of $\lambda_{I1\text{-}OM}$ 19-132M from $\lambda_{I1\text{-}OM}$ to $\lambda_{RBI1\text{-}M\text{-}Y\%}$ 19-1121(Y%)MR.

For output slit $SL_{LOM\text{-}X\%}$ 19-140M(X%)L at $\theta_{LI1\text{-}OM\text{-}X\%}$ 19-147M(X%)L, the output wavelength from this output slit for the beam from input slit $SL_{I1}$ will be labelled as $\lambda_{LI1\text{-}OM\text{-}X\%}$ 19-132M(X%)L, and $\lambda_{LI1\text{-}OM\text{-}X\%} = \lambda_{LBI1\text{-}M\text{-}X\%}$. Likewise, for output slit $SL_{ROM\text{-}Y\%}$ 19-140M(Y%)R at $\theta_{RI1\text{-}OM\text{-}Y\%}$ 19-147M(Y%)R, the output wavelength from this output slit for the beam from input slit $SL_{I1}$ will be labelled as $\lambda_{RI1\text{-}OM\text{-}Y\%}$ 19-132M(Y%)R, and $\lambda_{RI1\text{-}OM\text{-}Y\%} = \lambda_{RBI1\text{-}M\text{-}Y\%}$.

For some applications that is designed to process a beam spectral width $\Delta\lambda_{BI1-M}$ 19-1121MSW (see FIG. 1B) that is very narrow (e.g. spectral width $\Delta\lambda_{BI1-M}$ 18-1121MSW with $\Delta\lambda_{I1-M}$<0.01% of $\lambda_{I1-M}$ 18-1121M), it is alright to place the anchor outputs at anywhere at both sides of $\lambda_{I1-M}$ 18-1121M.

For some applications that is designed to process a beam spectral width $\Delta\lambda_{BI1-M}$ 19-1121MSW (see FIG. 1B) that is narrow (e.g. spectral width $\Delta\lambda_{BI1-M}$ 18-1121MSW with $\Delta\lambda_{I1-M}$<0.1% of $\lambda_{I1-M}$ 18-1121M), it is advantages to place the anchor outputs at around 10% of the energy or more at both sides so that $\lambda_{I1-OI A}<\lambda_{LI1-OM-10\%}$ and $\lambda_{I1-O2A}>\lambda_{RI1-OM-10\%}$ (for the situation $\lambda_{I1-OI A}<\lambda_{I1-O2A}$ and $\lambda_{LI1-OM-10\%}<\lambda_{RI1-OM-10\%}$; for $\lambda_{LI1-OM-10\%}>\lambda_{RI1-OM-10\%}$ just exchange $\lambda_{LI1-OM-10\%}$ and $\lambda_{RI1-OM-10\%}$) or $\lambda_{I1-O2A}<\lambda_{LI1-OM-10\%}$ and $\lambda_{I1-OI A}>\lambda_{RI1-OM-10\%}$ (for the situation $\lambda_{I1-O2A}<\lambda_{I1-OI A}$ and $\lambda_{LI1-OM-10\%}<\lambda_{RI1-OM-10\%}$; for $\lambda_{LI1-OM-10\%}>\lambda_{RI1-OM-10\%}$ just exchange $\lambda_{LI1-OM-10\%}$ and $\lambda_{RI1-OM-10\%}$).

In other applications that is designed to process a relatively wide spectral width (e.g spectral width $\Delta\lambda_{I1-M}$ 18-1121MSW with $\Delta\lambda_{I1-M}$>0.1% of $\lambda_{I1-M}$ 18-1121M), it is typically advantages to place the anchor outputs at around 25% of the energy or more at both sides.

In as yet another applications that is designed to process a relatively wide spectral width (e.g spectral width $\Delta\lambda_{I1-M}$ 18-1121MSW with $\Delta\lambda_{I1-M}$>1% of $\lambda_{I1-M}$ 18-1121M), it is typically advantages to place the anchor outputs at around 40% of the energy or more at both sides so that $\lambda_{I1-OI A}<\lambda_{I1-L40\%}$ and $\lambda_{I1-O2A}>\lambda_{I1-R40\%}$ (for the situation $\lambda_{I1-OI A}<\lambda_{I1-O2A}$ and $\lambda_{I1-L40\%}<\lambda_{I1-R40\%}$; for $\lambda_{I1-L40\%}>\lambda_{I1-R40\%}$ just exchange $\lambda_{I1-L40\%}$ and $\lambda_{I1-R40\%}$) or $\lambda_{I1-O2A}<\lambda_{I1-L40\%}$ and $\lambda_{I1-OI A}>\lambda_{I1-R40\%}$ (for the situation $\lambda_{I1-O2A}<\lambda_{I1-OI A}$ and $\lambda_{I1-L40\%}<\lambda_{I1-R40\%}$; for $\lambda_{I1-L40\%}>\lambda_{I1-R40\%}$ just exchange $\lambda_{I1-L40\%}$ and $\lambda_{I1-R40\%}$).

Plurality of Output Slits

As shown in FIG. 19, the optical grating spectrometer device 19-1000 further comprising a plurality of output slits for allowing the exiting of plurality of input optical beam spectral components at plurality of wavelengths, a location of any one of the output slits, labeled by output slit number k where k is a positive integer, being adjustable. Furthermore, the location of the $k^{th}$ output slit is specified by an angle $\Theta_{Ok}$ 19-147k that is sustained between the line joining the $k^{th}$ output slit $SL_{Ok}$ 19-140k location to the curved grating center CGC 19-1050 and a grating-center circle normal line $L_{GCCN}$ 19-1050N, and further specified by a distance $S_{Ok}$ 19-140k from the curved grating center CGC 19-1050 to the $k^{th}$ output slit $SL_{Ok}$ 19-140k location. The coordinate location of the $k^{th}$ output slit is denoted by $X_{Ok}$ 19-149kOC and is given by $X_{Ok}=(x_{Ok}, y_{Ok})$ with its x-coordinate:

$$x_{Ok}=-S_{Ok}*\operatorname{Sin}(\theta_{Ok}) \quad (40A)$$

and its y-coordinate:

$$y_{Ok}=S_{Ok}*\operatorname{Cos}(\theta_{Ok}). \quad (40B)$$

The width of the $k^{th}$ output slit being adjustable, and further the width the $k^{th}$ output slit specified by a $k^{th}$ output slit width $W_{Ok}$ 19-149kW.

Wavelengths and Angles of Output Slits

The output slit wavelength $\lambda_{I1-Ok}$ 19-132k is given by:

$$d*(\operatorname{Sin}(\Theta_{Ok})+\operatorname{Sin}(\Theta_{I1}))=m*\lambda_{I1-Ok}/n_{grI1-Ok}, \quad \text{Eq. (41)}$$

which will ensure that spectral energy in the input beam at output wavelength $\lambda_{I1-Ok}$ 19-132k will be diffracted by the grating to the $k^{th}$ output slit direction at output angle $\theta_{Ok}$ 19-147k. As noted before, equation like Eq. (41) is an approximate form. Alternatively, the exact form below:

$$j0*([D_1(\theta_{I1},S_{I1},X_{j0})+D_2(\theta_{Ok},S_{Ok},X_{j0})]-[D_1(\theta_{I1},S_{I1},X_0)+D_2(\theta_{Ok},S_{Ok},X_0)])=m*\lambda_{I1-Ok}/n_{grI1-Ok} \quad (42)$$

where the $X_{j0}$ is the grating groove position adjacent to $X_0$ (i.e. j0=1 or −1). The left multiplication by j0 is just to ensure the sign on the left side of the equation comes out correct. Eq. (42) can be used to obtain wavelength $\lambda_{I1-Ok}$ 19-132k. Note that Eq. (42) is depending on two grating center grooves ($X_0$ and $X_{j0}$) whose positions are already solved (this is equivalent to knowing d in Eq. (41)) and $\theta_{Ok}$ 19-147k, $S_{Ok}$ 19-146k are given by the position of the output slit k $X_{Ok}$ 19-149kOC. Hence the only unknown in Eq. (42) is $\lambda_{I1-Ok}$ 19-132k, which can then be solved numerically for the value that satisfies Eq. (42). As shown by the approximate form Eq. (41), $\lambda_{I1-Ok}$ 19-132k is basically determined by the output angle $\theta_{Ok}$ 19-147k and is only weakly depending $S_{Ok}$ 19-146k, which is needed only when one uses the more exact form of Eq. (41). Thus, for every angle $\theta_{Ok}$ 19-147k, there is an output wavelength $\lambda_{I1-Ok}$ 19-132k for that angle. Thus, one has a choice to either pick the wavelength of the output slit and find its angle or pick the angle of the output slit and obtain its wavelength later.

Below, we will discuss for an output slit $SL_{Ok}$ 19-140k with a given intended output wavelength $\lambda_{I1-Ok}$ 19-132k, now one would get its preferred location $X_{Ok}$ 19-149kOC.

Determining the Preferred Position for the Output Slit k

Figure 19A:
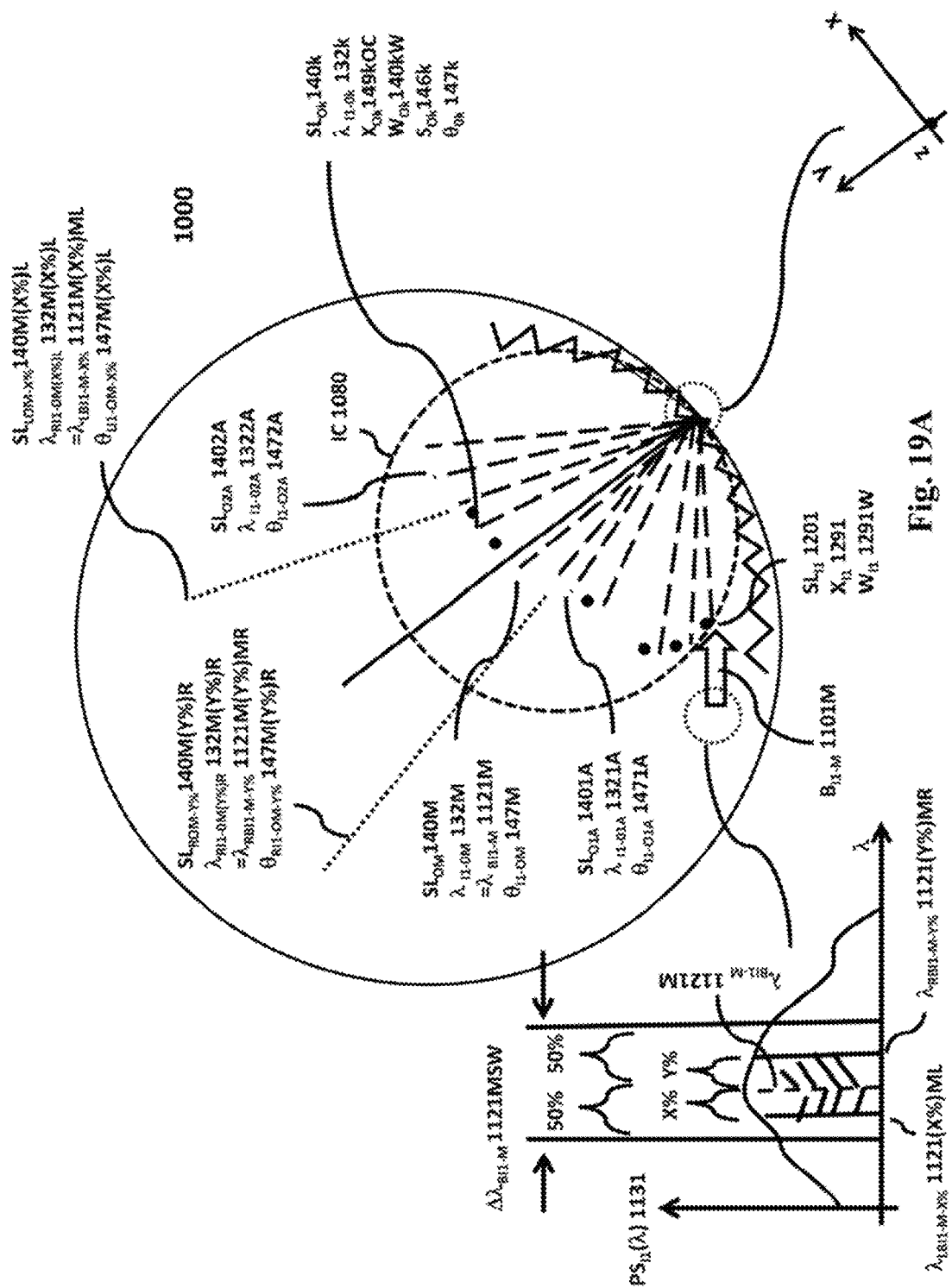
FIG. 19A shows a High Resolution Compact Curved Grating with dual aberration-free anchor points (the Dual Anchor Points Case), the two anchor output slits (or waveguides or photodetectors) $SL_{O1}$ and $SL_{O2}$, and the input slit (or waveguide) $SL_{I1}$ being present anywhere including but not limited to the Rowland circle, in accordance with an embodiment of the present invention, it shows how the input spectrum power is being spaced out at the output with respect to how the output slits and the two output anchor slits are being placed in accordance to one embodiment of the present invention.

FIG. 19A shows a High Resolution Compact Curved Grating with dual aberration-free anchor points (the Dual Anchor Points Output-Input Inline Case) and how the multiple output slit locations other than anchor points are estimated and determined by averaging.

Specifically, as shown in FIG. 19A, the location of the $k^{th}$ output slit $X_{Ok}$ 19-149kOC receiving an input beam spectral component at wavelength $\lambda_{I1-Ok}$ 19-132k, is obtained by finding the intersecting point between a pair of lines in which an adjacent pair of the grating grooves at locations $X_i$ 19-160|i|P/N and $X_{i-1}$ 19-160|i-1|P/N give one line and an adjacent pair of the grating grooves at locations $X_j$ 19-160|j|P/N and $X_{j-1}$ 19-160|j-1|P/N gives another line forming a pair of lines. The first line, called $L_{(i,i-1)I1-Ok}$ 19-189k(i,i-1)L, being parametrized by an angle $\Theta_{L(i,i-1)I1-OkP}$ 189kP(i,i-1)D and a distance $S_{L(i,i-1)I1-OkP}$ 19-189kP(i,i-1)S. The angle $\Theta_{L(i,i-1)I1-OkP}$ 19-189kP(i,i-1)D is sustained between the line joining a point P 18-189kP at coordinate $X_{L(i,i-1)I1-OkP}$ 19-189kP(i,i-1)C (along line $L_{(i,i-1)I1-Ok}$ 19-189k(i,i-1)L) to the grating center CGC 19-1050 at $X_0$ and the grating-center circle normal line $L_{GCCN}$ 19-1050N. The distance $S_{L(i,i-1)I1-OkP}$ 19-189kP(i,i-1)S is from the grating center CGC 19-1050 at $X_0$ to the point P 19-189kP at coordinate $X_{L(i,i-1)I1-OkP}$ 19-189kP(i,i-1)C (along line $L_{(i,i-1)I1-Ok}$ 19-189k(i,i-1)L). Equivalently, $L_{(i,i-1)I1-Ok}$ 19-189k(i,i-1)L is parametrized by the coordinates $X_{L(i,i-1)I1-OkP}=(x_{L(i,i-1)I1-OkP}, y_{L(i,i-1)I1-OkP})$ 19-189kP(i,i-1)C, where $x_{L(i,i-1)I1-OkP}=-S_{L(i,i-1)I1-OkP}*\operatorname{Sin}(\Theta_{L(i,i-1)I1-OkP})$ 19-189kP(i,i-1)Cx and $y_{L(i,i-1)I1-OkP}=S_{L(i,i-1)I1-OkP}*\operatorname{Cos}(\Theta_{L(i,i-1)I1-OkP})$ 19-189kP(i,i-1)Cy, for which the following equation is satisfied based on the grating grooves of number "i" and number "(i-1)":

$$[D_1(\Theta_{I1},S_{I1},X_i)+D_2(\Theta_{L(i,i-1)I1-OkP},S_{L(i,i-1)I1-OkP},X_i)]-[D_1(\Theta_{I1},S_{I1},X_{i-1})+D_2(\Theta_{L(i,i-1)I1-OkP},S_{L(i,i-1)I1-OkP},X_{i-1})]=m*\lambda_{I1-Ok}/n_{grI1-Ok} \quad (43)$$

wherein $D_2(\Theta_{L(i,i-1)I1-OkP},S_{L(i,i-1)I1-OkP},X_i)$ is the distance from $X_i$ 19-160|i|P/N to the point P 19-189kP on line $L_{(i,i-1)I1-Ok}$ c(i,i-1)L, $D_1(\Theta_{I1},S_{I1},X_i)$ is the distance from $X_i$ 19-160|i|P/N to the first input slit at $X_{I1}$. Line $L_{(i,i-1)I1-Ok}$ 19-189$k$(i,i−1)L is generated when $S_{L(i,i-1)I1-OkP}$ 19-189$k$P (i,i−1)S increases from an initial small value to a value larger than the estimated position of $S_{Ok}$ 19-146$k$ which is typically close to the value of $S_{O1A}$ 19-1461A or $S_{O2A}$ 19-1462A that are already known. There are many ways to parametrize line $L_{(i,i-1)I1-Ok}$ 19-189$k$(i,i−1)L. The locus of points tracing out line $L_{(i,i-1)I1-Ok}$ 19-189$k$(i,i−1)L is independent on parametrization and is solely dependent on the above equation that completely defines the locus of points tracing out line $L_{(i,i-1)I1-Ok}$ 19-189$k$(i,i−1)L.

The second line, called Line $L_{(j,j-1)I1-Ok}$ 19-189$k$(j,j−1)L being parametrized by an angle $\Theta_{L(j,j-1)I1-OkQ}$ 19-189$k$Q(j, j−1)D and a distance $S_{L(j,j-1)I1-OkQ}$ 19-189$k$Q(j,j−1)S. The angle $\Theta_{L(j,j-1)I1-OkQ}$ 19-189$k$Q(j,j−1)D is sustained between the line joining a point Q (along line $L_{(j,j-1)I1-Ok}$ 19-189$k$(j, j−1)L) to the grating center CGC 19-1050 and the grating-center circle normal line $L_{GCCN}$ 19-1050N. The distance $SL_{L(j,j-1)I1-OkQ}$ 19-189$k$Q(j,j−1)S from the grating center CGC 19-1050 to the same point Q (along $L_{(j,j-1)I1-Ok}$ 19-189$k$(j,j−1)L). Equivalently Line $L_{(j,j-1)I1-OkQ}$ 19-189$k$(j, j−1)L is parametrized by the coordinates $X_{L(j,j-1)I1-OkQ}$=$(x_{L(j,j-1)I1-OkQ}, y_{L(j,j-1)I1-OkQ})$ 19-189$k$Q(i,i−1)C where $x_{L(j,j-1)I1-OkQ}$=−$S_{L(j,j-1)I1-OkQ}$*$\sin(\Theta_{L(j,j-1)I1-OkQ})$ 19-189$k$Q(i,i−1)Cx and $y_{L(j,j-1)I1-OkQ}$=$S_{L(j,j-1)I1-OkQ}$*$\cos(\Theta_{L(j,j-1)I1-OkQ})$ 19-189$k$Q(i,i−1)Cy, for which the following equation is satisfied based on the grating grooves of number "j" and "(j−1)":

$$[D_1(\Theta_{I1},S_{I1},X_j)+D_2(\Theta_{L(j,j-1)I1-OkQ},S_{L(j,j-1)I1-OkQ},X_j)]-[D_1(\Theta_{I1},S_{I1},X_{j-1})+D_2(\Theta_{L(j,j-1)I1-OkQ},S_{L(j,j-1)I1-OkQ},X_{j-1})]=m*\lambda_{I1-Ok}/n_{grI1-Ok} \quad (44)$$

wherein $D_2(\Theta_{L(j,j-1)I1-OkQ}, S_{L(j,j-1)I1-OkQ}, X_j)$ is the distance from $X_j$ 19-160|j|P/N to a point Q with coordinate $X_{L(j,j-1)I1-OkQ}$ 19-189$k$Q(j,j−1)C on line $L_{(j,j-1)I1-Ok}$ 19-189$k$(j,j−1)L, $D_1(\Theta_{I1},S_{I1}, X_j)$ is the distance from $X_j$ 19-160|j|P/N to the first input slit at $X_{I1}$ 19-1201. The first line is generated when $S_{L(j,j-1)I1-OkQ}$ 19-189$k$Q(i,i−1)S increases from an initial small value to a value larger than the estimated position of $S_{Ok}$ 19-146$k$, which is typically close to the value of $S_{O1A}$ 19-1461A or $S_{O2A}$ 19-1462A that are already known. There are many ways to parametrize line $L_{(j,j-1)I1-Ok}$ 19-189$k$(j,j−1)L. The locus of points tracing out $L_{(j,j-1)I1-Ok}$ 19-189$k$(j,j−1)L is independent on parametrization and is solely dependent on the above equation that completely defines the locus of points tracing out Line-j.

Determining the Preferred Location for the Output Slit k Via Averaging Intersecting Points.

As an exemplary embodiment, it is typically advantages to choose two pairs of grating groove, each from one side of the grating center. In that case, let the grating groove pairs (j,j−1) for grating grove at $X_j$ and $X_{j-1}$ be chosen to lie on the opposite side of the grating center from that of grating groove pair (i,i−1) for grating grove at $X_i$ and $X_{i-1}$. For example if j−1>0, then i<0 and if i−1>0, then j<0, and i=0 gives the position at the grating center. The intersecting point between line $L_{(i,i-1)I1-Ok}$ and line $L_{(j,j-1)I1-Ok}$ then gives the coordinate $X_{Ok(i,i-1;j,j-1)}$. The intersecting point between line $L_{(i,i-1)I1-Ok}$ 19-189$k$(i,i−1)L and line $L_{(j,j-1)I1-Ok}$ 19-189$k$(j,j−1)L then gives the coordinate $X_{I1-Ok(i,i-1;j,j-1)}$ 19-149$k$OC(i,i−1;j,j−1). Below, we will replace subscript "I1-Ok" by "Ok" in "$X_{I1-Ok(i,i-1;j,j-1)}$" so $X_{I1-Ok(i,i-1;j,j-1)}$=$X_{Ok(i,i-1;j,j-1)}$ for simplicity with the understanding that it is generated for beam from input slit "I1". Likewise we will also do the replacement for other $X_{I1-Ok}$ variables. The location of $X_{Ok}$ 19-149$k$OC of output slit k that shall receive beam spectral component at wavelength $\lambda_{I1-Ok}$ is then chosen to be a point either "at", "near", or "very near" the point $X_{Okest}$ 19-149$k$OCest, called the estimated output location, where the point $X_{Okest}$ 19-149$k$OCest is obtained by a function V=V({$X_{Ok(i,i-1;j,j-1)}$}) that is dependent on all the vectors $X_{Ok(i,i-1;j,j-1)}$ 19-149$k$OC(i,i−1;j,j−1) generated by a selected set of the grating groove pairs with different values of i,i−1 or j,j−1 so that:

$$X_{Okest}=V(\{X_{Ok(i,i-1;j,j-1)}\}) \quad (45)$$

By "near" means the placement is within three times the beam diameter generated by the input beam at $X_{Okest}$ 19-149$k$OCest defined by the full-width half-maximum of the beam intensity width, or three times the width $W_{Ok}$ 19-149$k$W of the slit at $X_{Ok}$ 19-149$k$OC, whichever is larger. By "very near" means the placement is within half the beam diameter generated by the input beam at $X_{Okest}$ 19-149$k$OCest defined by the full-width half-maximum of the beam intensity width, or half the width $W_{Ok}$ 19-149$k$W of the slit at $X_{Ok}$ 19-149$k$OC, whichever is larger. By "at" means the placement is within 10% of the beam diameter generated by the input beam at $X_{Okest}$ 19-149$k$OCest defined by the full-width half-maximum of the beam intensity width, or 10% of the width $W_{Ok}$ 19-149$k$W of the slit at $X_{Ok}$ 19-149$k$OC, whichever is larger.

Determining the Preferred Location for the Output Slit k Via Averaging Intersecting Points from Rays Near Grating Center In an exemplary embodiment, the estimated output slit location $X_{Okest}$ 19-149$k$OCest is given by one of $X_{Ok(i,i-1;j,j-1)}$ 19-149$k$OC(i,i−1;j,j−1) in which the grooves are close to the grating center CGC 19-1050 within the angle at plus and minus 30° from the grating center CGC 19-1050 for which the angle is measured with respect to the line joining the input slit to the grating center and pivoted at the input slit. That is let $\theta_{grI1-i}$ 19-161|i|P/N be the angle made by two lines pivoted (or joint) at the input slit location: the line joining the input slit location $X_{I1}$ 19-129IOC to the groove location $X_i$ 19-160|i|P/N (called line $L_{I1-i}$ 19-162|i|P/N or "input light ray to groove i") and the line joining the input slit location $X_{I1}$ 19-129IOC to the groove at grating center $X_0$ 19-1600O (called line $L_{I1}$ 19-1251 or "grating-center to input-slit line"). Then the above requires that $\Theta_{grI1-i}$<30°.

Determining the Preferred Location for the Output Slit k Via an Weighted Average of the Intersecting Points by Multiplying with Beam Power In an exemplary embodiment of the averaging function V=V({$X_{Ok(i,i-1;j,j-1)}$}) shown in FIG. 19A, the estimated output slit location $X_{Okest}$ 19-140$k$OCest is given by a function V=V({$X_{Ok(i,i-1;j,j-1)}$}) involving a weighted average of the intersecting points between pairs of lines in which each pair of the grating grooves at locations $X_i$ 19-160|i|P/N and $X_j$ 20-160|j|P/N gives a pair of lines $L_{(i,i-1)I1-Ok}$ 19-189$k$(i,i−1)L and $L_{(j,j-1)I1-Ok}$ 19-189$k$(j,j−1)L that intersect at $X_{Ok(i,i-1;j,j-1)}$ 19-149$k$OC(i,i−1;j,j−1) as specified above. The averaging is weighted by multiplying the solution $X_{Ok(i,i-1;j,j-1)}$ 19-149$k$OC(i,i−1;j,j−1) with the total input beam power (or its positive power exponential) that reaches both grating groove i,i−1 pair and groove j,j−1 pair. By vectorially summing up all vectors obtained after such multiplications computed from a set of vectors $X_{Ok(i,i-1;j,j-1)}$ 19-149$k$OC(i,i−1;j,j−1) obtained from a selected set of grooves, and divided by the sum of the total input beam power used in the weighting multiplications, then gives the x and y coordinate values $x_{Okest}$ 19-149$k$OCestx, and $y_{Okest}$ 19-149$k$OCesty, for obtaining the estimated output slit location $X_{Okest}$ 19-149$k$OCest ($X_{Okest}$=($x_{Okest}$, $y_{Okest}$)). Specifically, let {i,j} denote the range of values of i,i−1 pair and j,j−1 pair designating all the grating groove pairs in the selected set of grooves and $P_{\Pi(i,i-1;j,j-1)}$ 19-129$k$P(I,i−1; j,j−1) be the total input beam power that falls on the surfaces of both groove i,i−1 pair and groove j,j−1 pair from input slit $SL_{\Pi}$ 1201 due primarily to beam spatial diffraction from the input slit $SL_{\Pi}$ 1201 (assuming the input bean has a narrow spectral width so the input beam is almost a monochromatic light), then $X_{Okest}$ is given by:

$$X_{Okest} = V(\{X_{Ok(i,i-1;j,j-1)}\}) = [\text{Sum}(\{i,i-1;j,j-1\}) \\ ([P_{\Pi(i,i-1;j,j-1)}]^N \times X_{Ok(i,i-1;j,j-1)})]/[\text{Sum}(\{i,i-1;j,j-1\}) (P_{\Pi(i,i-1;j,j-1)})]. \quad (46A)$$

where Sum($\{i,i-1;j,j-1\}$) denotes sum over the range of all the i,i−1 and j,j−1 pairs in the set $\{i,i-1;j,j-1\}$ defined above, and N in Eq. (46A) is taking P to the power of N, where N is a positive real number larger than 0. In an exemplary embodiment, N=1. Alternatively, it can be multiplied by any function of the power:

$$X_{Okest} = V(\{X_{Ok(i,i-1;j,j-1)}\}) = [\text{Sum}(\{i,i-1;j,j-1\}) \\ (f[P_{\Pi(i,i-1;j,j-1)}] \times X_{Ok(i,i-1;j,j-1)})]/[\text{Sum}(\{i,i-1;j,j-1\}) (P_{\Pi(i,i-1;j,j-1)})]. \quad (46B)$$

where $f[P_{\Pi(i,i-1;j,j-1)}]$ is any mathematical function of $P_{\Pi(i,i-1;j,j-1)}$.

Note that one or both of the two anchor output slits may not be physically present. In that case, their positions are still designated but are only used for the purpose of generating the grating teeth, and are not to be used for forming physical output slit locations or output waveguide locations.

Determining the Preferred Location for the Output Slit k Via an Weighted Average of the Intersecting Points from Rays Originated Symmetrically from Grating Center In an exemplary embodiment, the estimated output slit location $X_{Okest}$ 19-149$k$OCest is given by the function V=V($\{X_{Ok(i,i-1;j,j-1)}\}$) above with j,j−1 set to the groove −i,−(i−1) wherein groove −i is opposite to groove i and −(i−1) is opposite to groove i−1 with respect to the curved grating center CGC 19-1050. The sum is then taken over all pairs of grooves (i, i−1) of the grating.

Generating Multiple Input Silts/Waveguides for Multiple Output and Input Slits/Waveguides Case In another exemplary embodiment for the case with multiple input slits/waveguides beside multiple output slits/waveguides, input slit/waveguide $SL_{\Pi}$ is first used to generate all the output slits using the method described above. Once the output slit/waveguide positions are determined using input slit/waveguide $SL_{\Pi}$, one can then use one of the output slit/waveguide, including either one of the two anchor slits/waveguides acting as "new input slit" and $SL_{\Pi}$ acting as one of the "new anchor output slit" and then designate another input slit location as the second "new anchor output slit". The other plurality of multiple input slit locations are then generated just like the way we generate the multiple "output slits" described above.

Two Anchor Outputs Slits In-Line with Input Slit

Figure 19B:
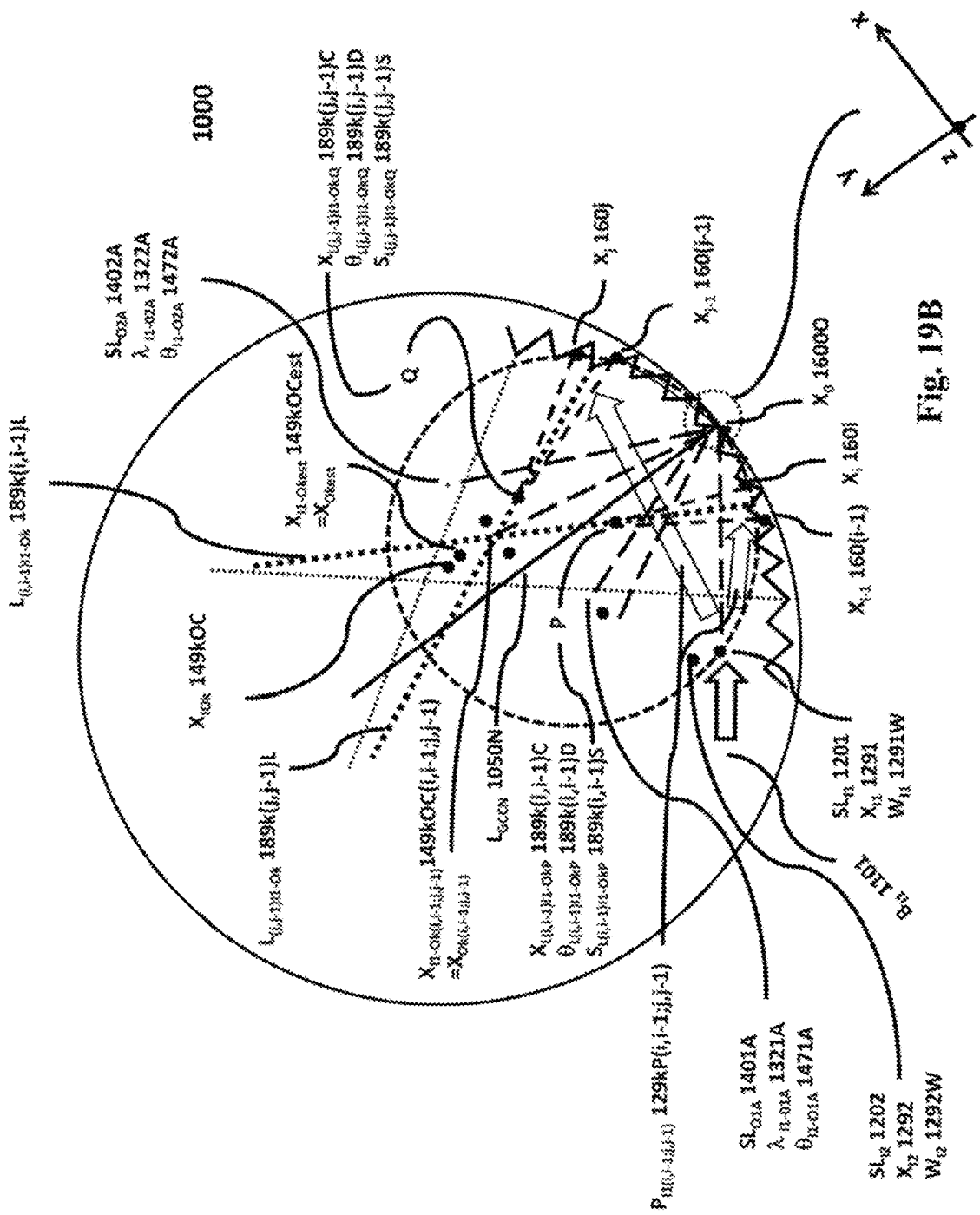
FIG. 19B shows a High Resolution Compact Curved Grating with dual aberration-free anchor points (the Dual Anchor Points Output-Input Inline Case) and how the multiple output slit locations other than anchor points are estimated and determined by averaging.

FIG. 19B shows a High Resolution Compact Curved Grating with dual aberration-free anchor points (the Dual Anchor Points Output-Input Inline Case), the two anchor output slits (or waveguides or photodetectors) $SL_{O1}$ and $SL_{O2}$, and the input slit (or waveguide) $SL_{\Pi}$ being present along a same straight line, in accordance with an embodiment of the present invention.

Specifically, as shown in FIG. 19B, in an exemplary embodiment, the estimated output slit locations $\{X_{Okest}$ 19-149$k$OCest$\}$ are obtained via the function V=V ($\{X_{Ok(i,i-1;j,j-1)}\}$), wherein the anchor output slits at $X_{O1A}$ 19-1401A and $X_{O2A}$ 9-1402A are chosen to be located along an approximate straight line with each other and with the input slit location $X_{\Pi}$ 19-1201 ("located along an approximately straight line" for three or more points, means all the points are near the line joining two extreme points that are farthest apart. Near means the location deviation is less than 10% of the distance between the input slit and the curved grating center or any of the anchor output slit location and the curved grating center, whichever is larger).

Two Anchor Outputs Slits on a Line Rotated from In-Line with Input Slit

Figure 19C:
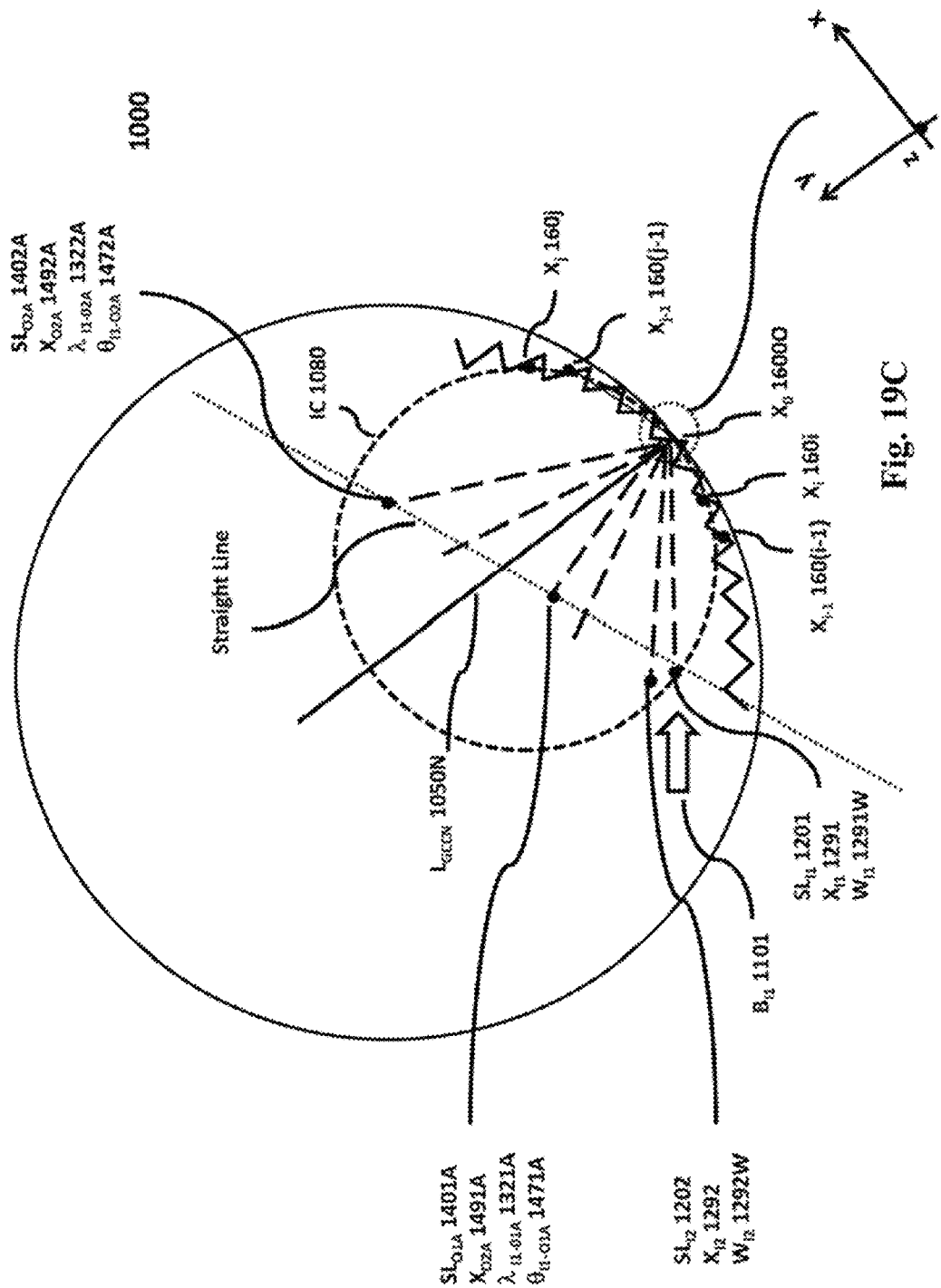
FIG. 19C shows a High Resolution Compact Curved Grating with dual aberration-free anchor points (the Dual Anchor Points Output-Input Inline Case), the two anchor output slits (or waveguides or photodetectors) $SL_{O1}$ and $SL_{O2}$, and the input slit (or waveguide) $SL_{I1}$ being present along a same straight line, in accordance with an embodiment of the present invention.

FIG. 19C shows a High Resolution Compact Curved Grating with dual aberration-free anchor points (the Dual Anchor Points Output Rotated from Inline Case), the two anchor output slits (or waveguides or photodetectors) $SL_{O1}$ and $SL_{O2}$ being on a straight line rotated from a line passing through them and the input slit (or waveguide) $SL_{\Pi}$, in accordance with an embodiment of the present invention.

Specifically, as shown in FIG. 19C, in an exemplary embodiment, the estimated output slit locations $\{X_{Okest}$ 19-149$k$OCest$\}$ are obtained via the function V=V ($\{X_{Ok(i,i-1;j,j-1)}\}$), wherein the anchor output slits at $X_{O1A}$ 19-1401A and $X_{O2A}$ 19-1402A are located along a straight line with each other, the line joining $X_{O1A}$ 19-1401A and $X_{O2A}$ 19-1402A is called line $L_{(O1A,O2A)} = L_{AOS}$ 19-1400AL or referred to as "anchor-output-slits line".

The midpoint of $L_{(O1A,O2A)}$ is denoted as $X_{L(O1A,O2A)M}$ 19-1400AM or referred to as "anchor-output-slits-midpoint". $X_{L(O1A,O2A)M}$ is also called $X_{AOSM}$ 19-1400AM. The line joining the input slit location $X_{\Pi}$ to $X_{L(O1A,O2A)M}$ called line $L_{(\Pi-(O1A,O2A)M)}$ 19-1400IML (or as line $L_{IM}$ so $L_{IM} = L_{(\Pi-(O1A,O2A)M)}$) referred to as "input to anchor-output-slits-midpoint line" 19-1400IML.

The line joining the input slit to the grating center at $X_0$ is called line $L_{\Pi}$ 19-1251 or "grating-center to input-slit line". The line joining the grating center at $X_0$ 19-1600O to the anchor-output-slits-midpoint $X_{L(O1A,O2A)M}$ is called line $L_{(GC-(O1A,O2A)M)}$ 19-1400GML or "grating-center to anchor-output-slits-midpoint line" (denoted as $L_{GM} = L_{(GC-(O1A,O2A)M)}$).

The angle between line $L_{\Pi}$ plus 90 degrees (shown as Line A) and line $L_{IM}$ is $\theta_{IM}$ 19-1470IMD, which takes on a value of 0° when line $L_{\Pi}$ and line $L_{IM}$ are perpendicular to each other, and take on a positive value when line $L_{IM}$ is rotated about the input slit point $X_{\Pi}$ 19-1291OC in a direction to bring the point $X_{AOSM} = X_{L(O1A,O2A)M}$ closer in its distance to the grating center.

The angle $\theta_{IM}$ 19-1470IMD being adjustable for controlling a performance of the optical gratin spectrometer.

The angle between line $L_{GM}$ plus 90 degrees (shown as Line B) and line $L_{IM}$ is $\theta_{GM}$ 19-1470GMD, which takes on a value of 0° when line $L_{GM}$ and line $L_{IM}$ are perpendicular to each other, and take on a positive value when line $L_{IM}$ is rotated about the input slit point $X_{\Pi}$ 19-1201 in a direction to bring the point $X_{AOSM} = X_{L(O1A,O2A)M}$ closer in its distance to the grating center. Note that $\theta_{GM}$ and $\theta_{IM}$ are not independent and are geometrically related through or constrained by $\theta_{\Pi}$ 19-1271, $\theta_{O1A}$ 19-1471A, and $\theta_{O2A}$ 19-1472A.

The angle made between line $L_{IM}$ and line $L_{AOS}$ is $\theta_{AM}$ 19-1470AMD which takes on a zero value when $X_{\Pi}$, $X_{O1A}$, and $X_{O2A}$ are all in a straight line (i.e. when line $L_{IM}$ and line $L_{AOS}$ are parallel to each other) and take on a positive value when line $L_{AOS}$ is rotated about its midpoint at $X_{AOSM}$ in a direction that brings the "furthest end" of line $L_{AOS}$ from the input slit point $X_{\Pi}$ 19-1291OC closer in its distance to the grating center at $X_0$. The furthest end of line $L_{AOS}$ is the end point of $L_{AOS}$ that is furthest away from $X_{\Pi}$.

The angle $\theta_{AM}$ 19-1470AMD being adjustable for controlling a performance of the optical grating spectrometer device 1000.

Two Anchor Outputs Slits on a Line Rotated from In-Line with Input Slit by 45 Degree and Rotated from Perpendicular with Grating-Center to Input-Slit Line by 45 Degree The larger the angles $\theta_{IM}$ and $\theta_{AM}$ are, typically the worse the aberration for the channels in-between the anchor slits. High grating resolution requires the input slit size to be small, which will result in a large beam divergence angle from the input slit to the grating and a large beam convergence angle from the grating to the output slit. If two output slits are closely spaced, and if one slit is has a further distance from the grating center than the other slit (we will call this as behind the other slit), then the convergence beam to the one behind may hit the mouth of the one in front, which means some energy will go into the slit in front. This result in "adjacent channel cross talk" as is known those skilled in the art. That is if we regard each slit as one wavelength channel. This can be avoided if all the output slits are about equal distance from the grating center. That means $\theta_{GM}$ is around zero so the line joining the two anchor output slits is perpendicular to the line joining the grating center to the midpoint between the two anchor output slits. An angle for $\theta_{GM}$ up to plus and minus 45 degrees may still be alright to reduce adjacent channel cross talks, depending on the distance between two adjacent output slits and the angle of convergence for the beam from the grating to the output slit.

The angle $\theta_{IM}$ is another angle of measurement that has a value close to $\theta_{GM}$ if the input slit angle is small (less than plus and minus 45 degrees). The angle $\theta_{IM}$ is around zero when the line joining the two anchor output slits is perpendicular to the line joining the grating center to the input slits. When the input slit angle is relatively small (less than plus and minus 45 degrees), we can also impose similar requirement on $\theta_{IM}$ as the above requirement for $\theta_{GM}$.

Thus, for many applications, it is preferred that the anchor output slits at $X_{O1A}$ 19-1401A and $X_{O2A}$ 19-1402A are located such that $\theta_{IM}$ is within +45° and −45° and the anchor output slits at $X_{O1A}$ 19-1401A and $X_{O2A}$ 19-1402A are located such that $\theta_{AM}$ is within +45° and −45°.

Two Anchor Outputs Slits on a Line Rotated from In-Line with Input Slit by 45 Degree and Rotated from Perpendicular with Grating-Center to Anchor-Output-Slits-Midpoint Line by 45 Degree The larger the angles $\theta_{GM}$ and $\theta_{AM}$ are, typically the worse the aberration for the channels in-between the anchor slits. High grating resolution requires the input slit size to be small, which will result in a large beam divergence angle from the input slit to the grating and a large beam convergence angle from the grating to the output slit. If two output slits are closely spaced, and if one slit is has a further distance from the grating center than the other slit (we will call this as behind the other slit), then the convergence beam to the one behind may hit the mouth of the one in front, which means some energy will go into the slit in front. This result in "adjacent channel cross talk" as is known those skilled in the art. That is if we regard each slit as one wavelength channel. This can be avoided if all the output slits are about equal distance from the grating center. That means $\theta_{GM}$ is around zero so the line joining the two anchor output slits is perpendicular to the line joining the grating center to the midpoint between the two anchor output slits. An angle for $\theta_{GM}$ up to plus and minus 45 degrees may still be alright to reduce adjacent channel cross talks, depending on the distance between two adjacent output slits and the angle of convergence for the beam from the grating to the output slit.

Thus, for many applications, it is preferred that the anchor output slits at $X_{O1A}$ 19-1401A and $X_{O2A}$ 19-1402A are located such that $\theta_{GM}$ is within +45° and −45° and the anchor output slits at $X_{O1A}$ 19-1401A and $X_{O2A}$ 19-1402A are located such that $\theta_{AM}$ is within +45° and −45°.

Input Angle within 45 Degree

In another embodiment, the output slits of wherein the input angle $\theta_{I1}$ 19-1271 is less than 45° and the location of at least one of the output slits is within the area bounded by the input circle IC 19-1080 with a radius R/2.

Two Anchor Outputs Slits on a Line Rotated from In-Line with Input Slit by 30 Degree and Rotated from Perpendicular with Grating-Center to Input-Slit Line by 30 Degree The larger the angles $\theta_{IM}$ and $\theta_{AM}$ are, typically the worse the aberration for the channels in-between the anchor slits. An angle for $\theta_{IM}$ up to plus and minus 30 degrees will further reduce adjacent channel cross talks (comparing to plus and minus 45 degrees), especially when the output beam convergence angle is large.

Thus, for some more stringent applications such as in certain optical networks, it is preferred that the anchor output slits at $X_{O1A}$ 19-1401A and $X_{O2A}$ 19-1402A are located such that $\theta_{IM}$ is within +30° and −30° and the anchor output slits at $X_{O1A}$ 19-1401A and $X_{O2A}$ 19-1402A are located such that $\theta_{AM}$ is within +30° and −30°

Two Anchor Outputs Slits on a Line Rotated from In-Line with Input Slit by 30 Degree and Rotated from Perpendicular with Grating-Center to Anchor-Output-Slits-Midpoint Line by 30 Degree The larger the angles $\theta_{GM}$ and $\theta_{AM}$ are, typically the worse the aberration for the channels in-between the anchor slits. An angle for $\theta_{GM}$ up to plus and minus 30 degrees will further reduce adjacent channel cross talks (comparing to plus and minus 45 degrees), especially when the output beam convergence angle is large.

Thus, for some more stringent applications such as in certain optical networks, it is preferred that the anchor output slits at $X_{O1A}$ 19-1401A and $X_{O2A}$ 19-1402A are located such that $\theta_{GM}$ is within +30° and −30° and the anchor output slits at $X_{O1A}$ 19-1401A and $X_{O2A}$ 19-1402A are located such that $\theta_{AM}$ is within 30° and −30°.

Two Anchor Outputs Slits on a Line Rotated from In-Line with Input Slit by 15 Degree and Rotated from Perpendicular with Grating-Center to Input-Slit Line by 15 Degree The larger the angles $\theta_{IM}$ and $\theta_{AM}$ are, typically the worse the aberration for the channels in-between the anchor slits. An angle for $\theta_{IM}$ up to plus and minus 15 degrees will further reduce adjacent channel cross talks (comparing to plus and minus 30 degrees), especially when the output beam convergence angle is large.

Thus, for some even more stringent applications such as in certain stringent optical networks, it is preferred that the anchor output slits at $X_{O1A}$ 19-1401A and $X_{O2A}$ 19-1402A are located such that $\theta_{IM}$ is within +15° and −15° and the anchor output slits at $X_{O1A}$ 19-1401A and $X_{O2A}$ 19-1402A are located such that $\theta_{AM}$ is within +15° and −15°.

Two Anchor Outputs Slits on a Line Rotated from In-line with Input Slit by 15 Degree and Rotated from Perpendicular with Grating-Center to Anchor-Output-Slits-Midpoint Line by 15 Degree The larger the angles $\theta_{GM}$ and $\theta_{AM}$ are, typically the worse the aberration for the channels in-between the anchor slits. An angle for $\theta_{GM}$ up to plus and minus 15 degrees will further reduce adjacent channel cross talks (comparing to plus and minus 30 degrees), especially when the output beam convergence angle is large.

Thus, for some even more stringent applications such as in certain stringent optical networks, it is preferred that the anchor output slits at $X_{O1A}$ 19-1401A and $X_{O2A}$ 19-1402A are located such that $\theta_{GM}$ is within +15° and −15° and the anchor output slits at $X_{O1A}$ 19-1401A and $X_{O2A}$ 19-1402A are located such that $\theta_{AM}$ is within 15° and −15°.

Spanning Angle of the Grating Teeth

Smaller Input Slit Width Case

Figure 19D:
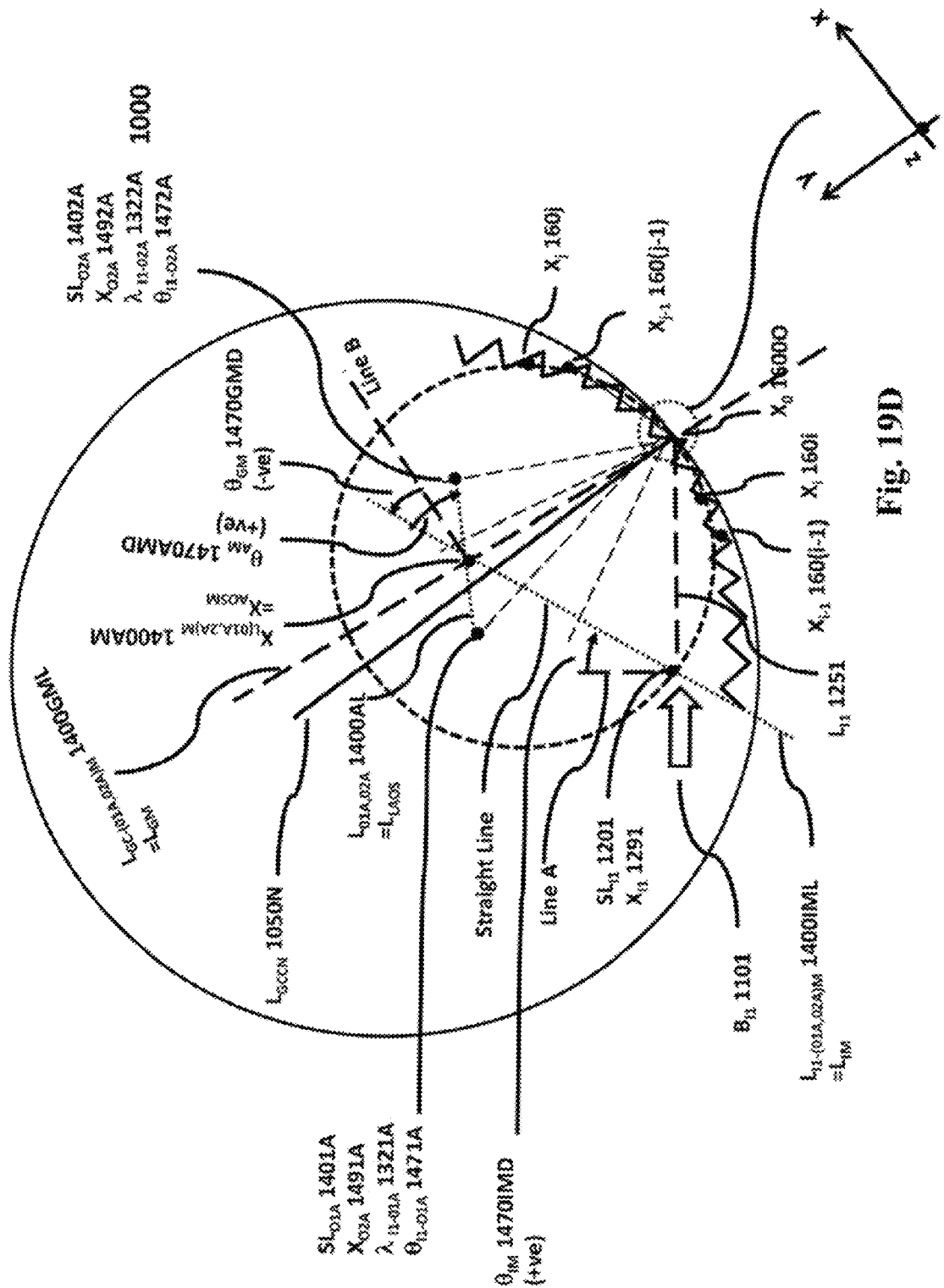
FIG. 19D shows a High Resolution Compact Curved Grating with dual aberration-free anchor points (the Dual Anchor Points Output Rotated from Inline Case), the two anchor output slits (or waveguides or photodetectors) $SL_{O1}$ and $SL_{O2}$ being on a straight line rotated from a line passing through them and the input slit (or waveguide) $SL_{I1}$, in accordance with an embodiment of the present invention.

FIG. 19D shows a High Resolution Compact Curved Grating with dual aberration-free anchor points (the Dual Anchor Points Output-Input Inline Case) and how the angles spanned by the grating teeth are determined so as to capture sufficiently large percentage of the beam energy from the input slit due to input beam divergence because of wave diffraction.

Specifically, as shown in FIG. 19D, the optical grating spectrometer wherein the input slit width $W_{I1}$ 19-1291W is smaller than about $\lambda_{I1-O1A}/n_{grI1-O1A}$ or wherein the input beam's full divergence angle $\theta_{dvdf-BI1-95\%}$ 19-1141, defined by the angle between the two lines traced out by the two beam intensity points on both sides of the beam that each encompasses 47.5% of the power of the beam from the beam's intensity peak to each of the two intensity points, is larger than about 70°.

Let the grating input left angular span be defined as $\theta_{grI1L}$ 19-1651L where $\theta_{grI1L}=|\theta_{grI1-MP}|$, where i=MP is the maximum groove number to left side of the grating with i>0 and $\theta_{grI1-MP}$ 18-161|MP|P is its input-groove angle (also called "input-ray angle at groove MP"). Let the grating input right angular span be defined as $\theta_{grI1R}$ 19-1651R where $\theta_{grI1R}=|\theta_{grI1-MN}|$, j=MN is the maximum groove number to the right side of the grating with j<0 and $\theta_{grI1-MN}$ 19-161|MN|N is its input-groove angle (also called "input-ray angle at groove MN"). Then the grating input total angular span $\theta_{grI1}$ 19-1651 is defined as $\theta_{grI1}=\theta_{grI1L}+\theta_{grI1R}=|\theta_{grI1-MP}|+|\theta_{grI1-MN}|$.

The grating is to be designed with a large enough angular span $\theta_{grI1}$ with $\theta_{grI1}>\theta_{dvdf-BI1-95\%}$, where larger than $\theta_{dvdf-BI1-95\%}$ 19-1141 means that over 95% of the beam energy from the input beam is intercepted by the grating and all the rays from the input slit, after reflecting from the grating, will converge to the first anchor output slit at around a single point at wavelength $\lambda_{I1-O1A}$ and also converge to the second anchor output slit at around a single point at wavelength $\lambda_{I1-O2A}$, thereby resulting in minimal beam focusing aberrations at the two anchor output slits. Otherwise if $\theta_{grI1}<\theta_{dvdf-BI1-95\%}$, then the beam after reflecting from the grating will have not just power loss but smaller beam converging angle to the output slits, which means it will not be able to focus to as small a spot size than if the beam converging angle is larger. This will result a loss in spectral resolution for the optical grating spectrometer as well.

Medium Input Slit Width Case

As shown in FIG. 19D, the optical grating spectrometer wherein the input slit width $W_{I1}$ 19-1291W is smaller than about $3*\lambda_{I1-O1A}/n_{grI1-O1A}$ or wherein the input beam's full divergence angle $\theta_{dvdf-BI1-95\%}$ 19-1141, defined by the angle between the two lines traced out by the two beam intensity points on both sides of the beam that each encompasses 47.5% of the power of the beam from the beam's intensity peak to each of the two intensity points, is larger than about 35°.

The grating is to be designed with a large enough angular span $\theta_{grI1}$ with $\theta_{grI1}>\theta_{dvdf-BI1-90\%}$, where larger than $\theta_{dvdf-BI1-90\%}$ 19-1141 means that over 90% of the beam energy from the input beam is intercepted by the grating and all the rays from the input slit, after reflecting from the grating, will converge to the first anchor output slit at around a single point at wavelength $\lambda_{I1-O1A}$ and also converge to the second anchor output slit at around a single point at wavelength $\lambda_{I1-O2A}$, thereby resulting in minimal beam focusing aberrations at the two anchor output slits. Otherwise if $\theta_{grI1}<\theta_{dvdf-BI1-90\%}$, then the beam after reflecting from the grating will have not just power loss but smaller beam converging angle to the output slits, which means it will not be able to focus to as small a spot size than if the beam converging angle is larger. This will result a loss in spectral resolution for the optical grating spectrometer as well.

Large Input Slit Width Case

As shown in FIG. 19D, the optical grating spectrometer wherein the input slit width $W_{I1}$ 19-1291W is smaller than about $5*\lambda_{I1-O1A}/n_{grI1-O1A}$ or wherein the input beam's full divergence angle $\theta_{dvdf-BI1-95\%}$ 19-1141, defined by the angle between the two lines traced out by the two beam intensity points on both sides of the beam that each encompasses 47.5% of the power of the beam from the beam's intensity peak to each of the two intensity points, is larger than about 20°.

The grating is to be designed with a large enough angular span $\theta_{grI1}$ with $\theta_{grI1}>\theta_{dvdf-BI1-80\%}$, where larger than $\theta_{dvdf-BI1-80\%}$ 19-1141 means that over 80% of the beam energy from the input beam is intercepted by the grating and all the rays from the input slit, after reflecting from the grating, will converge to the first anchor output slit at around a single point at wavelength $\lambda_{I1-O1A}$ and also converge to the second anchor output slit at around a single point at wavelength $\lambda_{I1-O2A}$, thereby resulting in minimal beam focusing aberrations at the two anchor output slits. Otherwise if $\theta_{grI1}<\theta_{dvdf-BI1-80\%}$, then the beam after reflecting from the grating will have not just power loss but smaller beam converging angle to the output slits, which means it will not be able to focus to as small a spot size than if the beam converging angle is larger. This will result a loss in spectral resolution for the optical grating spectrometer as well.

Very Large Input Slit Width Case

As shown in FIG. 19D, the optical grating spectrometer wherein the input slit width $W_{I1}$ 19-1291W is larger than about $5*\lambda_{I1-O1A}/n_{grI1-O1A}$ or wherein the input beam's full divergence angle $\theta_{dvdf-BI1-95\%}$ 19-1141, defined by the angle between the two lines traced out by the two beam intensity points on both sides of the beam that each encompasses 47.5% of the power of the beam from the beam's intensity peak to each of the two intensity points, is smaller than about 20°.

The grating is to be designed with a large enough angular span $\theta_{grI1}$ with $\theta_{grI1}>\theta_{dvdf-BI1-70\%}$, where larger than $\theta_{dvdf-BI1-70\%}$ 19-1141 means that over 70% of the beam energy from the input beam is intercepted by the grating and all the rays from the input slit, after reflecting from the grating, will converge to the first anchor output slit at around a single point at wavelength $\lambda_{I1-O1A}$ and also converge to the second anchor output slit at around a single point at wavelength $\lambda_{I1-O2A}$, thereby resulting in minimal beam focusing aberrations at the two anchor output slits. Otherwise if $\theta_{grI1}<\theta_{dvdf-BI1-70\%}$, then the beam after reflecting from the grating will have not just power loss but smaller beam converging angle to the output slits, which means it will not be able to focus to as small a spot size than if the beam converging angle is larger. This will result a loss in spectral resolution for the optical grating spectrometer as well.

Grating Angular Span and Output Slit Width

FIG. 19E shows a High Resolution Comp Curved Grating with dual aberration-free anchor points (the Dual Anchor Points Output-Input Inline Case) and how the output beam divergence or convergence angles are made to be close to each other.

Specifically, as shown in FIG. 19E, let the output beam's full divergence angle at an output slit k be $\theta_{dvdf\text{-}BO1\text{-}50\%}$ 19-154*l* for a beam with "beam waist width of the slit" given by $W_{BO1\text{-}50\%}$ 19-1581W, existing the output slit k with slit width $W_{Ok}$ 19-149*k*W and propagating towards the grating. $\theta_{dvdf\text{-}BO1\text{-}50\%}$ 19-154*l* is defined by the angle between the two lines traced out by the two beam intensity points on both sides of the beam that each encompasses 25% of the power of the beam from the beam's intensity peaks to each of the two intensity points. Let the grating input total angular span be $\theta_{grI1}$ 19-1651.

Let the output beam's full convergence focusing angle at output slit be $\theta_{cvfo\text{-}BI1\text{-}Ok\text{-}50\%}$ 19-134*k* for a beam entering the output slit k with slit width $W_{Ok}$ 19-149*k*W from an input beam reflected and diffracted from the grating, defined by the angle between the two lines traced out by the beam intensity points on both sides of the beam that each encompasses 25% of the power of the beam from the beam's intensity peak to each of the two intensity points.

The grating is to be designed with a large enough angular span $\theta_{grI1}$ with $\theta_{grI1} > \theta_{dvdf\text{-}BI1\text{-}90\%}$, where larger than $\theta_{dvdf\text{-}BI1\text{-}90\%}$ 19-1141 means that over 45% of the beam energy from the input beam is intercepted by the grating and all the rays from the input slit, after reflecting from the grating, will converge to the first anchor output slit at around a single point at $\lambda_{I1\text{-}O1A}$ and also converge to the second anchor output slit at around a single point at wavelengths $\lambda_{I1\text{-}O2A}$, thereby resulting in minimal beam focusing aberrations at the two anchor output slits. This will enable high spectral resolution.

Furthermore the output slit width $W_{Ok}$ are designed so that $\theta_{dvdf\text{-}BO1\text{-}90\%}$ 19-1541 is about equal to $\theta_{cvfo\text{-}BI1\text{-}Ok\text{-}90\%}$ 19-134*k* and differs from $\theta_{cvfo\text{-}BI1\text{-}Ok\text{-}90\%}$ 19-134*k* by no more than plus and minus 50% of the value of $\theta_{cvfo\text{-}BI1\text{-}Ok\text{-}00\%}$ 19-134*k* in one aspect of the embodiment to achieve high spectral resolution and low optical loss for the output beam.

In another aspect of the embodiment, the grating input total angular span $\theta_{grI1}$ 19-1651 and the output slit width $W_{Ok}$ are designed so that $\theta_{dvdf\text{-}BO1\text{-}50\%}$ 19-1541 is about equal to $\theta_{cvfo\text{-}BI1\text{-}Ok\text{-}50\%}$ 19-134*k* and differs from $\theta_{cvfo\text{-}BI1\text{-}Ok\text{-}50\%}$ 19-134*k* by no more than plus and minus 25% of the value of $\theta_{cvfo\text{-}BI1\text{-}Ok\text{-}50\%}$ 19-134*k* to achieve high spectral resolution and medium-low optical loss for the output beam.

In as yet another aspect of the embodiment, the grating input total angular span $\theta_{grI1}$ 19-1651 and the output slit width $W_{Ok}$ are designed so that $\theta_{dvdf\text{-}BO1\text{-}50\%}$ 19-1541 is about equal to $\theta_{cvfo\text{-}BI1\text{-}Ok\text{-}50\%}$ 19-134*k* and differs from $\theta_{cvfo\text{-}BI1\text{-}Ok\text{-}50\%}$ 19-134*k* by no more than plus and minus 10% of the value of $\theta_{cvfo\text{-}BI1\text{-}Ok\text{-}50\%}$ 19-134*k* to achieve high spectral resolution and ultra-low optical loss for the output beam.

Output Slit Width

Figure 19F:
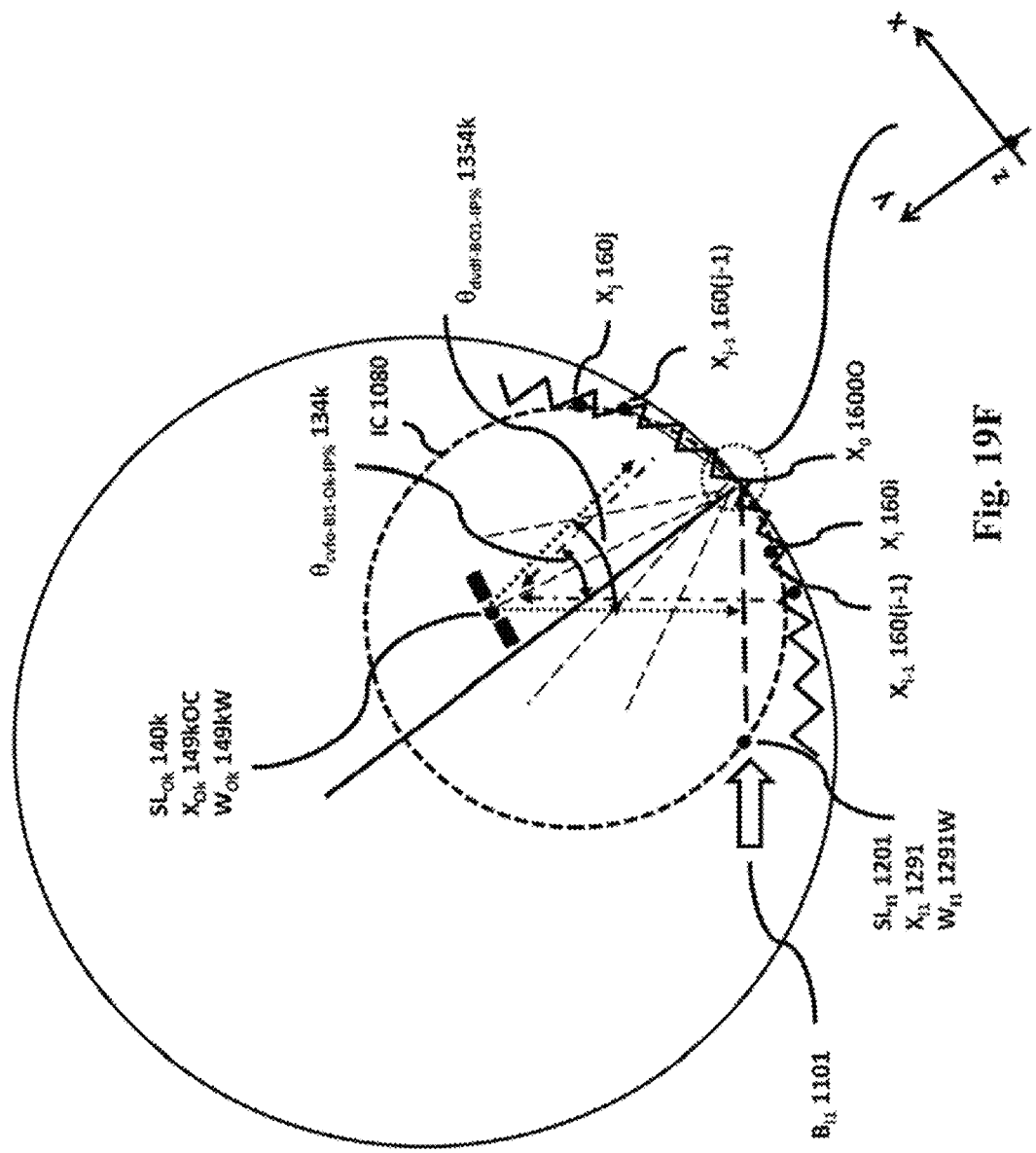
FIG. 19F shows a High Resolution Compact Curved Grating with dual aberration-free anchor points (the Dual Anchor Points Output-Input Inline Case) and how the output beam divergence or convergence angles are made to be close to each other.
Figure 19G:
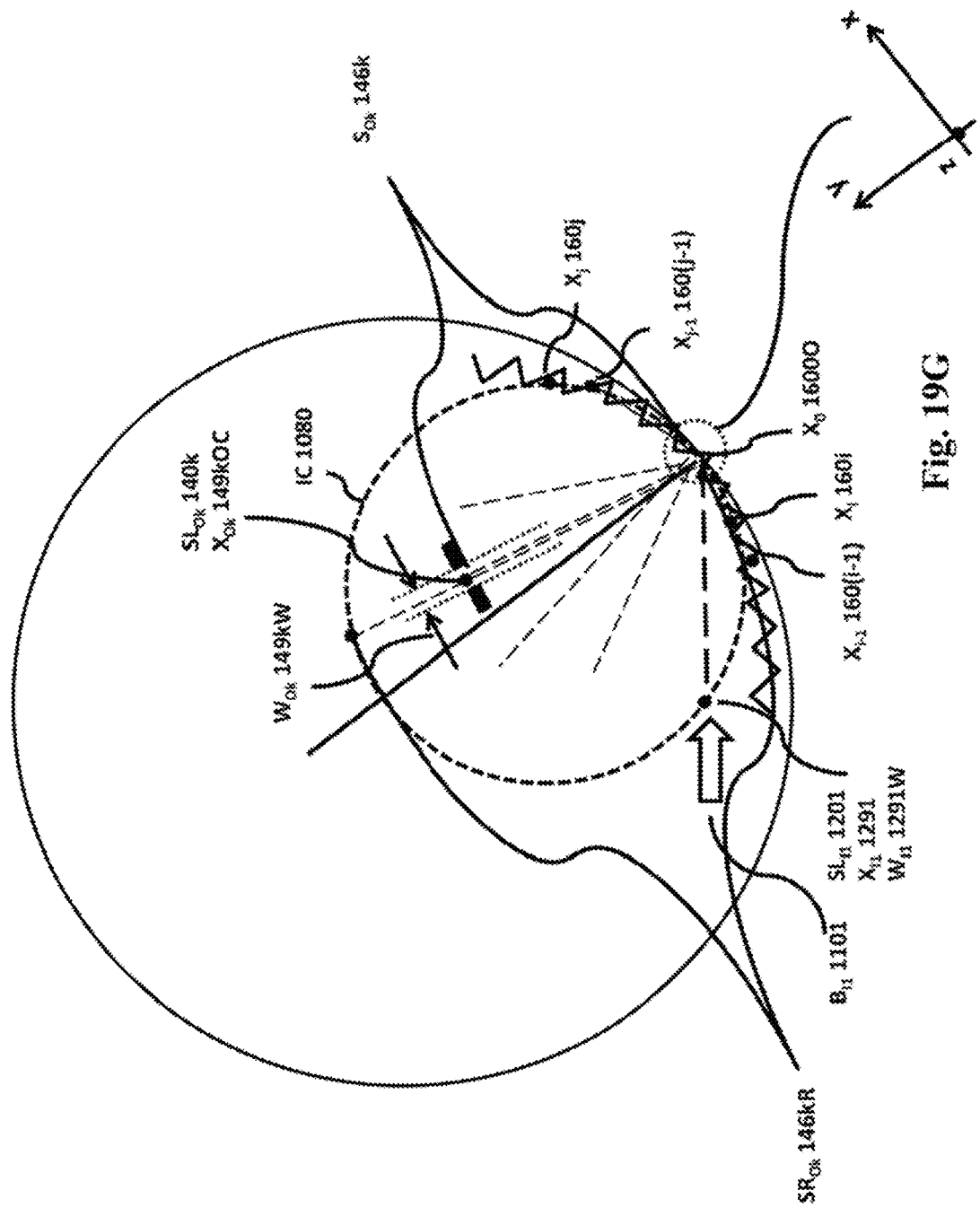
FIG. 19G shows a High Resolution Compact Curved Grating with dual aberration-free anchor points (the Dual Anchor Points Output-Input Inline Case) and how the output slit width or waveguide width is optimized by scaling depending on how far it is from the grating center comparing to the distance between the grating center and the inner output circle.

FIG. 19F shows a High Resolution Compact Curved Grating with dual aberration-free anchor points (the Dual Anchor Points Output-Input Inline Case) and how the output slit width or waveguide width is optimized by scaling depending on how far it is from the grating center comparing to the distance between the grating center and the inner output circle.

Specifically, as shown in FIG. 19F, any of the output slit widths which can be $W_{Ok}$ 19-149*k*W or $W_{O1A}$ 19-1491AW or $W_{O2A}$ 19-1492AW is given approximately in terms of the input slit width $W_{I1}$ 19-1291W by first giving $W_{Okest}$ 19-149*k*estW as follows:

$$W_{Okest} = W_{I1} \cdot S_{Okest}/S_{ROk} \quad (47)$$

and then $W_{Ok}$ 19-149*k*W shall differs $W_{Okest}$ 19-149*k*estW by no more than plus and minus 10% of the value of $W_{Okest}$ 19-149*k*estW. In the above Eq. 47, $S_{Okest}$ 19-146*k*est is the distance from the grating center $X_0$ to $X_{Ok}$ 19-149*k*OC along the angle $\theta_{Ok}$ 19-147*k* for the case of $W_{Okest}$ 19-149*k*West, and $S_{ROk}$ 19-146*k*R is the distance from the grating center $X_0$ to the input circle IC 19-1080 or the Rowland circle with a radius R/2 along the angle $\theta_{Ok}$ 19-1471 (for the case of $W_{Ok}$ 19-149*k*W), or along the angle $\theta_{O1A}$ (for the case of $W_{O1A}$), or along the angle $\theta_{O2A}$ (for the case of $W_{O2A}$).

$W_{Ok}$ can also be directly given approximately by having its value differ by no more than 10% of the value $W_{Ok}'$ given below:

$$W_{Ok}' = W_{I1} \cdot S_{Ok}/S_{ROk} \quad (48)$$

Figure 20A:
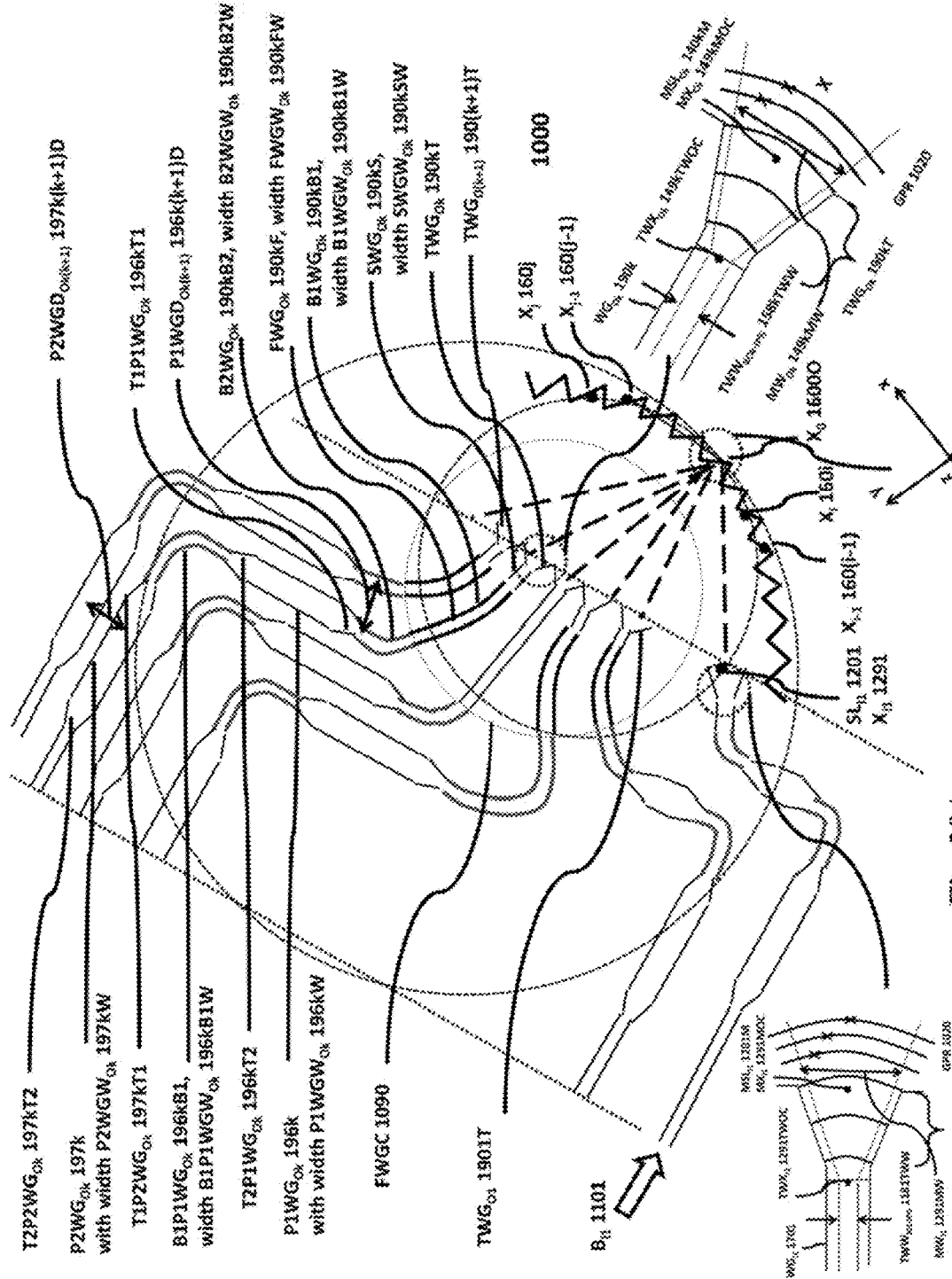
FIG. 20A shows a High Resolution Compact Curved Grating with dual aberration-free anchor points (the Dual Anchor Points Output-Input Inline Case) and how the output waveguides are channeled out from the output waveguide mouths so as to minimize beam energy coupling between waveguides that can increase adjacent channel cross talks.
Figure 20B:
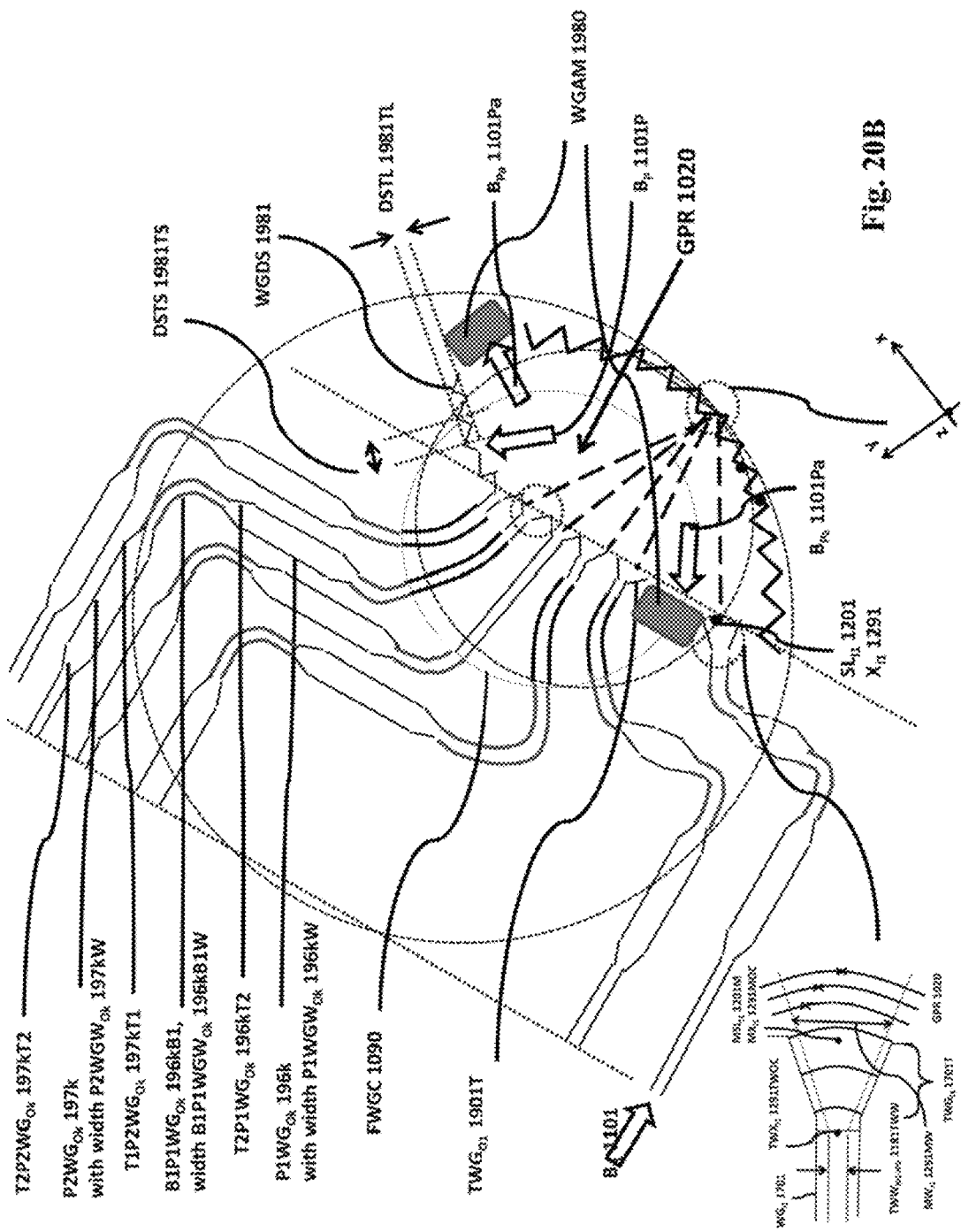
FIG. 20B shows a High Resolution Compact Curved Grating with dual aberration-free anchor points (the Dual Anchor Points Output-Input Inline Case) and how the output waveguides are channeled out from the output waveguide mouths and how dissipating and absorbing structures can be placed around them to reduce stray light reflections that can eventually go into the output waveguides.

Two Anchor Outputs with Multiple Output Waveguides Designed to Reduce Adjacent Channel Cross Talks FIG. 20 shows a High Resolution Compact Curved Grating with dual aberration-free anchor points (the Dual Anchor Points Output-Input Inline Case) and how the output waveguides are channeled out from the output waveguide mouths so as to minimize beam energy coupling between waveguides that can increase adjacent channel cross talks.

Specifically, the design of the grating, input slits placements and output slits placements are only part of the requirement to obtain high adjacent channel extinction ratio. The way the multiple waveguides at the output slit locations are placed and channel out and the absorption of unwanted back scattered light from other photonic device components is also important. FIG. 20 shows an optical grating spectrometer device 20-1000. Device 20-1000 shows the example of an input with an input waveguide $WG_{I1}$ 20-1701. The corresponding waveguide mouth, for example for input waveguide $WG_{I1}$ 20-1701 is $MSL_{I1}$ 20-1201M and the physical width of the waveguide mouth is waveguide mouth width $MW_{I1}$ 20-1291MW. The coordinate location of the middle of the input waveguide mouth $MSL_{I1}$ 20-1201M is $MX_{I1}$ 20-1291MOC.

It also shows multiple outputs with output waveguides $WG_{O1}$ 20-1901 $WG_{O2}$ 20-1902, . . . . $WG_{Ok}$ 20-190*k*. The corresponding waveguide mouth, for example for output waveguide $WG_{Ok}$ 20-190*k* is $MSL_{Ok}$ 20-140*k*M and the physical width of the waveguide mouth is waveguide mouth width $MW_{Ok}$ 20-149*k*MW usually defined by the width of its waveguide core. The coordinate location of the middle of the output waveguide mouth $MSL_{Ok}$ 20-140*k*M is $MX_{Ok}$ 20-149*k*MOC.

Further, an input and output waveguide at close to the mouth can take on shape of constant width or can be tapering in width with linear shape or an arbitrary curvilinear shape as shown in FIG. 11D. For the input waveguide mouth, it is referred to as region $TWG_{I1}$ 20-1701T for the input waveguide. The tapered input waveguide can be characterized by a "virtual beam waist width" $TWW_{BI1\text{-}IP\%}$ 20-1181TWW, "virtual beam waist location" is $TWX_{I1}$ 20-1291TWOC. For non-tapered waveguide, the "virtual beam waist location" $TWX_{I1}$ 20-1291TWOC typically coincides with waveguide mouth's physical location $MX_{I1}$ 20-1291MOC.

For the input waveguide mouth at input "1", the tapering region is referred to as region $TWG_{I1}$ 20-1701T. The tapered input waveguide can be characterized by a "virtual beam waist width" given by $TWW_{BI1-IP\%}$ 20-1181TWW, and "virtual beam waist location" given by $TWX_{f1}$ 20-1291TWOC (see (iii) in FIG. 11D). For non-tapered waveguide, the "virtual beam waist location" $TWX_{f1}$ 20-1291TWOC typically coincides with waveguide mouth's physical location $MX_{f1}$ 20-1291MOC. Also if the tapering is gradual so that the wavefront of the propagating beam remains as plane wavefront in the tapering region, the "virtual beam waist location" $TWX_{f1}$ 20-1291TWOC will also coincide with waveguide mouth's physical location $MX_{f1}$ 20-1291MOC.

For the output waveguide mouth at output "k", the tapering region referred to as region $TWG_{Ok}$ 20-190kT. The tapered output waveguide can be characterized by a "virtual beam waist width" given by $TWW_{BOk-IP\%}$ 20-158kTWW, and "virtual beam waist location" given by $TWX_{Ok}$ 20-149kTWOC (see (iv) in FIG. 11D). For non-tapered waveguide, the "virtual beam waist location" $TWX_{Ok}$ 20-149kTWOC typically coincides with waveguide mouth's physical location $MX_{Ok}$ 20-149kMOC. Also if the tapering is gradual so that the wavefront of the propagating beam remains as plane wavefront in the tapering region, the "virtual beam waist location" $TWX_{Ok}$ 20-149kTWOC will also coincide with waveguide mouth's physical location $MX_{Ok}$ 20-149kMOC.

The tapering mouth region may taper the waveguide width in a linear fashion (linear shape), or parabolic shape, or arbitrary curvilinear shape.

Let the cutoff waveguide width that supports only the up to mode v as is known to those skilled in the art be width $WGW_{Okv}$ 20-199kv for waveguide $WG_{Ok}$ 20-190k. In a preferred embodiment as illustrated by device 20-1000, the output waveguide has a tapering mouth region that rapidly tapered from the entrance mouth width $MW_{Ok}$ 20-149kMW to near or smaller than the waveguide width $WGW_{Ok0}$ 20-199k0 that supports only the fundamental mode referred to as mode-0 (i.e. with v=0) or more precisely the waveguide width that cutoff the propagation of mode 1. Near means within 50% of the value of $WGW_{Ok0}$ 20-199k0. This tapering region reduces the wave coupling between adjacent waveguides by separating the distance between the waveguides and hence reduces the adjacent channel crosstalk or increases the adjacent channel extinction. This is then followed by an optional section of straight waveguide $SWG_{Ok}$ 20-190kS with waveguide width $SWGW_{Ok}$ 20-190kSW. Thus, this straight waveguide can have zero length (if the waveguide is absent) or finite length. In an embodiment width $SWGW_{Ok}$ 20-190kSW is near or smaller than the fundamental mode width $WGW_{Ok0}$ 20-199k0. After that is a section of bending region called region with waveguide $B1WG_{Ok}$ 20-190kB1 and fanning out region called region with waveguide $FWG_{Ok}$ 20-190kF in which the waveguides are further separated from each other in a radial-like fashion by bending slightly and then fan out radially as illustrated (see FIG. 20) in that the distance between any two waveguides is increased gradually as the wave propagates. This further reduces the wave coupling between adjacent waveguides by separating the distance between the waveguides and hence reduces the adjacent channel crosstalk or increases the adjacent channel extinction. $B1WG_{Ok}$ 20-190kB1 has a waveguide width $B1WGW_{Ok}$ 20-190kB1W. In an embodiment width $B1WGW_{Ok}$ 20-190kB1W is near or smaller than the fundamental mode width $WGW_{Ok0}$ 20-199k0. $FWG_{Ok}$ 20-190kF has a waveguide width $FWGW_{Ok}$ 20-190kFW. In an embodiment width $FWGW_{Ok}$ 20-190kFW is near or smaller than the fundamental mode width $WGW_{Ok0}$ 20-199k0.

After that is another bending of the waveguide called bending waveguide $B2WG_{Ok}$ 20-190kB2 so that the fanning out waveguide is joined to a section of parallel propagating waveguide called $P1WG_{Ok}$ 20-196k. In an exemplary embodiment, as an option, the locations where the fanning out waveguides end and begin to bend as bending waveguides $B2WG_{Ok}$ 20-190kB2 form an approximate circle called "fanning out waveguide circle" FWGC 20-1090 as shown in FIG. 20.

At the parallel propagating waveguide $P1WG_{Ok}$ 20-196k region, the waveguides, after being separated by a distance $P1WGD_{Ok(k+1)}$ 20-196k(k+1)D (between waveguide k and waveguide k+1), is propagated almost parallel to each other. In this region, to reduce loss, the waveguide width $P1WGW_{Ok}$ 20-196kW is tapered out to larger than the fundamental mode width $WGW_{Ok0}$ 20-199k0 via a tapering region $T1P1WG_{Ok}$ 20-196kT1. Close to the end of $P1WG_{Ok}$ 20-196k, the waveguide is tapered back to near or smaller than the fundamental mode width $WGW_{Ok0}$ 20-199k0 via another tapering region $T2P1WG_{Ok}$ 20-196kT2. After that is a section of waveguide bending region called region $B2P1WG_{Ok}$ 20-196kB1. In an embodiment, in this region, each waveguide undergoes a substantial bending such as close to a 90° bend. In other embodiment, the bending may be less substantial.

The above $B2WG_{Ok}$ 20-190kB2 waveguide has a waveguide width $B2WGW_{Ok}$ 20-190kB2W. In an embodiment width $B2WGW_{Ok}$ 20-190kB2W is near or smaller than the fundamental mode width $WGW_{Ok0}$ 20-199k0. $B1P1WG_{Ok}$ 20-196kB1 has a waveguide width $B1P1WGW_{Ok}$ 20-196kB1W. In an embodiment width $B1P1WGW_{Ok}$ 20-196kB1W is near or smaller than the fundamental mode width $WGW_{Ok0}$ 20-199k0.

After that is another section of parallel propagating waveguide called $P2WG_{Ok}$ 20-197k at which the waveguides, after being separated by a distance (between waveguide k and waveguide k+1) $P2WGD_{OK(k+1)}$ 20-197k(k+1)D, is propagated almost parallel to each other. In this region, to reduce loss, the waveguide width $P2WGW_{Ok}$ 20-197kW is tapered out to larger than the fundamental mode width $WGW_{Ok0}$ 20-199k0 via a tapering region $T1P2WG_{Ok}$ 20-197kT1. Close to the end of $P2WG_{Ok}$ 20-197k, optionally the waveguide may be tapered back to near the fundamental mode width $WGW_{Ok0}$ 20-199k0 via another tapering waveguide $T2P2WG_{Ok}$ 20-197kT2. Thus, this tapering waveguide can have zero length (if the waveguide is absent) or finite length.

The substantial bending at $B1WG_{Ok}$ 20-190kB, $B2WG_{Ok}$ 20-190kB2, and $B1P1WG_{Ok0}$ 20-196kB1 regions can help to shred what is called the higher order modes such as the first order mode, which will make the output spectrum more pure such as reducing adjacent channel cross talk and kinks in the output spectrum. Thus the bending part serves as a "mode filter" for higher order mode and passes mainly the fundamental mode.

Optionally, the input waveguide(s) may use the same waveguide tapering, bending, or fanning out scheme, similar to that described above for the output waveguides as illustrated in FIG. 20. However, the input waveguide geometry may also use other scheme that is different from that used for the output waveguides.

Two Anchor Outputs With Multiple Output Waveguides and Absorber or Structures to Reduce Light Reflection into Output Waveguides.

FIG. 20A shows a High Resolution Compact Curved Grating with dual aberration-free anchor points (the Dual Anchor Points Output-Input Inline Case) and how dissipating and absorbing structures can be placed around the output waveguides to reduce stray light reflections that can eventually go into the output waveguides.

Specifically, in order to reduce back scattering for wave that propagates to outside the grating planar-waveguiding region GPR 20-1020, as shown by FIG. 20A, optical absorbing materials WGAM 20-1980 or wave dissipating structures WGDS 20-1981 are placed outside the grating propagating region GPR 20-1020. Examples of wave absorbing materials include metals (gold, silver, aluminum, copper etc), non-transparent materials, or any material with a high optical absorption per unit length (e.g. semiconductor with small bandgap energy, non-transparent ceramics and polymers etc). These materials may be deposited on the top or bottom surface of the planar waveguide of the planar-waveguiding region GPR 20-1020. With these materials, optical energy that propagates towards it as shown by beam $B_{Pa}$ 1101Pa in FIG. 20A will get absorbed, so that the reflection back from it is reduced and lower than that without it (e.g. from other surfaces behind or around it when it is absent).

Example of wave dissipating structure include tapered structures that send the wave into the region above the planar waveguide occupied by certain materials (e.g dielectric material or air) or the region below the planar waveguide occupied by certain materials (e.g. dielectric material or the substrate). An example of wave dissipating structure is simply via zigzagging the edges of the GPR 20-1020 region. An example of the zigzagging is a teeth-like structure with teeth spacing (called dissipating structure teach spacing DSTS 20-1981TS) and teeth length (called dissipating structure teach length DSTL 20-1981TL). In an exemplary embodiment DSTS=50 and DSTL=100 nm. In general, DSTS is smaller than an optical wavelength in the material, and DSTL is larger than 0.25 of an optical wavelength in the material. The zigzagging can also take on other curvilinear shapes such as square shape, sinusoidal shape, triangular shape etc as long as it dissipate additional optical energy that propagates towards it as shown by beam $B_P$ 1101P in FIG. 20A, so that the reflection back from the structure is reduced and lower than that from just a plane surface would do to the optical energy, and there are various design of sthe zigzagging shapes and dimensions that will achieve that as is well known to those skilled in the art.

In Summary, tapering region $TWG_{Ok}$ 20-190kT and fanning-out region $FWG_{Ok}$ 20-190kF both act to decouple from adjacent waveguide and can be called waveguide mode decoupling region, which will increase adjacent channel extinction. Next region $BWG_{Ok}$ 20-190kB and region $B2WG_{Ok}$ 20-190kB2 both involving waveguide bending, will help to shred higher-order modes and can be called waveguide mode filter region, which will help to reduce "side modes" in the output spectrum and increase the adjacent channel extinction as well. In alternative embodiments, one or more of the four regions $TWG_{O1}$ 20-1901T, $FWG_{O1}$ 20-1901F, $BWG_{O1}$ 20-19018, and region $B2WG_{O1}$ 20-1901B2, may be used alone or in combinations to reach the purposes discussed above. Thus, they do not all have to be used together or in the sequences discussed above though what is discussed above would be the preferred embodiment.

Another Description of Grating Generating Method

As an exemplary embodiment, the wavelength multiplexer/demultiplexer/spectrometer or compact curved grating spectrometer using discrete optical components or with integration possibility as a wavelength dispersion element in a photonic integrated circuit, enabling dispersiom of light spectra around a wavelength $\lambda_{BIi}$. The wavelength multiplexer/demultiplexer/spectrometer comprising:

at least one input slit;

a plurality of output slits; and a curved grating, the curved grating configured for processing the spectra compositions of the optical beam including a plurality of grooves, the position of each groove being adjustable for controlling a performance of the wavelength multiplexer/demultiplexer/spectrometer, and the position of the input slit and each of the output slit being adjustable for controlling a performance of the wavelength multiplexer/demultiplexer/spectrometer.

wherein the input slit allows an entry of the optical beam into the wavelength multiplexer/demultiplexer/spectrometer, a location of the input slit being adjustable, and further the location of the input slit $X_{I1}$ specified by a first input angle $\theta_{I1}$ that is sustained between the line joining the input slit to the grating center and a normal line to the grating center, and a first input distance $S_{I1}$ from the grating center to the input slit.

further wherein a first output slit for allowing the exiting of a first output optical beam having a first anchor output wavelength $\lambda_{I1-O1A}$, a location of the first anchor output slit being adjustable, and further the location of the first anchor output slit specified by a first output angle $\theta_{O1A}$ that is sustained between the line joining the first output slit to the grating center and a normal line to the grating center, and a first output distance $S_{O1A}$ from the grating center to the first anchor output slit, further wherein a medium in which the light propagates in having an effective refractive index of propagation "$n_{gr}$". In the case of free space, $n_{gr}$ is the material refractive index. In the case of a planar waveguide, "$n_{gr}$" is the effective refractive index of propagation within the planar waveguide, further wherein a position of the $i^{th}$ groove is specified by its x-y coordinates $X_i=(x_i, y_i)$, the x-y coordinates are specified with respect to the grating center and the input slit, for which the grating center has the coordinate $X_0=(0, 0)$ and the input slit has the coordinate $X_{I1}=(-S_{I1}*Sin(\theta_{I1}), S_{I1}*Cos(\theta_{I1}))$.

With the given value of the input circle radius R where R is related to the input slit position by $S_{I1}=R*Cos(\theta_{I1})$, around the grating center at $X_0=(0, 0)$, two initial grating teeth are chosen to be located at a distance "d" apart from each other so that they are placed at locations:

$$X_1=(d/2, R-(R^2-(d/2)^2)^{1/2}) \tag{49A}$$

and $$X_{-1}=(-d/2, R-(R^2-(d/2)^2)^{1/2}) \tag{49B}$$

where when given the first anchor output wavelength $\lambda_{I1-O1A}$, the distance "d" is to be determined as follows:

A grating order is chosen and denoted by an integer "m". Then the grating parameter "d" is obtained approximately from $$d*(Sin(\Theta_{O1A})+Sin(\Theta_{I1}))=m*\lambda_{I1-O1A}/n_{gr}, \tag{49C}$$

further wherein the locations of all other grooves are given by computing the coordinate of each groove with the $i^{th}$ groove's coordinate $X_i$ given by the following two conditions:

The first condition is $$\text{Sgn}(i-ja)*([D_1(\Theta_{I1},S_{I1},X_i)+D_2(\Theta_{O1A},S_{O1A},X_i)]-[D_1(\Theta_{I1},S_{I1},X_{ja})+D_2(\Theta_{O1A},S_{O1A},X_{ja})])=m*\lambda_{I1-O1A}/n_{gr}, \quad (50)$$

wherein $D_1(\Theta_{I1},S_{I1},X_i)$ is the distance from $X_i$ to the first input slit location $X_{I1}$ specified by $\theta_{I1}$ and $S_{I1}$, $D_2(\Theta_{O1A},S_{O1A},X_i)$ is the distance from $X_i$ to the first anchor output slit location specified by $\theta_{O1A}$ and $S_{O1A}$. The position of groove ja, $X_{ja}$ is typically already known. For an illustration and not limitation, if the grooves close to the grating center are already known, then groove ja is taken to be a groove adjacent to groove "i" so that $X_{ja}=X_{i-1}$ for i>0 (so ja=+|i−1|=i−1 is the previous groove close to i=0 that is already solved) and $X_{ja}=X_{i+1}$ for i<0 (so ja=−|i−1|=i+1 is the previous groove close to i=0 that is already solved). Sgn(i−ja) takes on value +1 or −1. Sgn(i−ja) is +1 if i>ja, and −1 if i<ja. The second condition is such that a function f is equal to a numerical constant, functionally expressed as:

$$f(X_i)=\text{constant} \quad (51)$$

where the above constant can be depending on other design parameters such as the input slit and output slit positions or the positions of the adjacent grooves (e.g. $\Theta_{I1},S_{I1},\Theta_{O1},S_{O1}$, $\lambda_{I1-O1}$, m, $n_{gr}$, $\{X_j\}$) that are already known and hence can be treated as part of the constant. The positions $\{X_j\}$ represent the positions of some grating teeth that are already known.

The unknown variables in both equations Eq. (50) and Eq. (51) are x- and y-coordinates of the location vector $X_i$ of the i-th groove. For a given input-slit (or input-waveguide) location ($\theta_{I1}$, $S_{I1}$), output slit (or waveguide or photodetector) location ($\theta_{O1},S_{O1}$), and the previous, i.e., ja-th, groove position $X_{ja}$, $X_i$ is completely specified by equations Eq. (50) and Eq. (51) for a given wavelength $\lambda_{I1-O1}$ to output slit $SL_{O1}$, effective refractive index of propagation $n_{gr}$, and the diffraction order m, wherein the second constraint is further given by choosing the function f so that:

$$[D_1(\theta_{I1},S_{I1},X_i)+D_3(\theta_{O2A},S_{O2A},X_i)]-[D_1(\theta_{I1},S_{I1},X_{i-1})+D_3(\theta_{O2A},S_{O2A},X_{i-1})]=m*\lambda_{I1-O2A}/n_{gr}, \quad (52)$$

wherein $D_3(\theta_{O2A},S_{O2A},X_i)$ is the distance from the i-th groove located at $X_i$ to the second anchor output slit specified by a third angle $\theta_{O2A}$ that is sustained between the line joining the second output slit to the grating center and a normal line of the grating center, and a second output distance $S_{O2A}$ from the grating center to the second output slit, wavelength $\lambda_{I1-O2A}$ is a second wavelength that is the wavelength for the second output slit given by:

$$d*(\text{Sin}(\Theta_{O2A})+\text{Sin}(\Theta_{I1}))=m*\lambda_{I1-O2A}/n_{gr}, \quad (53)$$

and by solving (50) and (52) for the x-coordinate $x_i$ and y-coordinate $y_i$ of the $i^{th}$ groove at $X_i=(x_i, y_i)$, exact locations of other grooves $X_i$'s are obtained.

In another embodiment, Eq. (49C): $d*(\text{Sin}(\Theta_{O1A})+\text{Sin}(\Theta_{I1}))=m*\lambda_{I1-O1A}/n_{gr}$, is replaced by the more accurate:

$$[D_1(\theta_{I1},S_{I1},X_1)+D_2(\theta_{O1A},S_{O1A},X_1)]-[D_1(\theta_{I1},S_{I1},X_{-1})+D_2(\theta_{O1A},S_{O1A},X_{-1})]=m*\lambda_{I1-O1A}/n_{grI1-O1A} \quad (54)$$

further, Eq. (53): $d*(\text{Sin}(\Theta_{O2A})+\text{Sin}(\Theta_{I1}))=m*\lambda_{I1-O2A}/n_{gr}$, is replaced by the more accurate:

$$[D_1(\theta_{I1},S_{I1},X_1)+D_2(\theta_{O2A},S_{O2A},X_1)]-[D_1(\theta_{I1},S_{I1},X_{-1})+D_2(\theta_{O2A},S_{O2A},X_{-1})]=m*\lambda_{I1-O2A}/n_{grI1-O2A} \quad (55)$$

Note the locations of $X_1$ and $X_{-1}$ are dependent on and varies with "d" as specified by Eqs. (49A) and (49B).

Independence on Geometry Generating Method and Design Tolerances

As is known to those skilled in the art, the grating performances are depending on the collected results of diffraction and wave interference from the majority of the grating grooves. They are not depending on just a few grating grooves. They are also not too sensitive to the grating grooves being moved spatially by an amount δS less than about an optical wavelength in the material given by $\lambda_{I1-O1A}/(n_{grI1-O1A})$ for output slit $SL_{O1A}$ for example, where $$\delta S=(\delta x^2+\delta y^2)^{0.5}, \quad (56)$$

with δx being the spatial deviation of grating groove position in another grating design from the designed position (in accordance with an embodiment of this invention) in the x-coordinate and δy being the spatial deviation of grating groove position in another grating design from the designed position (in accordance with an embodiment of this invention) in the y-coordinate. If the design of a grating groove position in accordance with an embodiment of this invention is $X_{jDn}=(x_{jDn}, y_{jDn})$ and another design or implementation or realization of the grating groove is at $X_{jIm}=(x_{jIm}, y_{jIm})$, then $\delta x=|x_{jDn}-x_{jIm}|$ and $\delta y=|y_{jDn}-y_{jIm}|$. Moreover, two gratings or grating designs or grating implementations or grating realizations can achieve similar output spectral filtering performances for about half or more than half of the filtered spectrum if at least for a collection of grating grooves that are involved in reflecting more than 50% of the total power reflected by the grating towards the same output slit location, they are similar in their groove positions to each other in both gratings. Similar grating groove position means:

$$\delta S<\lambda_{I1-O1A}/(n_{grI1-O1A}). \quad (57)$$

While the steps above is a method of generating the set of positions for all the grating grooves in accordance with an embodiment of the present invention, there are other methods that could generate the same set of positions for all the grating grooves.

Thus, the grating performances will be similar as long as for this collection of the grating grooves (that are involved in reflecting more than 50% of the total power reflected by the grating towards the same output slit location), the deviation denoted by δS of each grating groove position from the designed values is less than about half of the wavelength in the material so that $\delta S<\lambda_{I1-O1A}/(n_{grI1-O1A})$.

Obviously, smaller deviation (e.g. $\delta S<\lambda_{I1-O1A}/(2*n_{grI1-O1A})$ or $\delta S<\lambda_{I1-O1A}/(10*n_{grI1-O1A})$ or a larger set of grooves involved (e.g. the set of grooves involve in over 70% of the grating total power reflection instead of 50%, or the set of grooves involve in over 90% of the grating total power reflection instead of 50%) will ensure even closer performances to the desired design. These allowed deviations (e.g. a set of grooves involved in reflecting more than 50% of the total power reflected by the grating towards the same output slit location has each of its groove's δS satisfying $\delta S<\lambda_{I1-O1A}/(n_{grI1-O1A})$) describe the maximum deviations allowed. When two gratings meet such conditions, we will consider them to be the same design within the allowances of design variations for the purpose of this invention. The minimal of which is given by "same-design-condition" (A): two gratings are considered basically the same design if a set of grooves involved in reflecting more than 50% of the total power reflected by the grating towards the same output slit location has each of its groove's δS satisfying $\delta S<\lambda_{I1-O1A}/(n_{grI1-O1A})$; a tighter one is given by same-design-condition (B): two gratings are considered essentially the same design if a set of grooves involved in reflecting more than 50% of the total power reflected by the grating towards the same output slit location has each of its groove's δS satisfying $\delta S < \lambda_{f1-O1A}/(2*n_{grf1-O1A})$; (C): two gratings are considered highly the same design if a set of grooves involved in reflecting more than 50% of the total power reflected by the grating towards the same output slit location has each of its groove's δS satisfying $\delta S < \lambda_{f1-O1A}/(4*n_{grf1-O1A})$; another tighter one is given by same-design-condition (D): two gratings are considered strongly the same design if a set of grooves involve in over 70% if a set of grooves involved in reflecting more than 50% of the total power reflected by the grating towards the same output slit location has each of its groove's δS satisfying $\delta S < \lambda_{f1-O1A}/(10*n_{grf1-O1A})$. As yet another tighter one is given by same-design-condition (E): two gratings are considered very strongly the same design if a set of grooves involved in reflecting more than 90% of the total power reflected by the grating towards the same output slit location has each of its groove's δS satisfying $\delta S < \lambda_{f1-O1A}/(10*n_{grf1-O1A})$. The applicability of which is depending on grating applications. For example, for the usual spectral analysis application, same-design-conditions (A) and (B) is applicable, for the DWDM (dense wavelength division multiplexing) wavelength channel filtering applications in fiber-optic communications, same-design-conditions (C), (D), and (E) are applicable.

What is claimed is:

1. A wavelength multiplexer/demultiplexer/spectrometer or compact curved grating spectrometer using discrete optical components or with integration possibility as a wavelength dispersion element in a photonic integrated circuit, enabling dispersiom of light spectra around a wavelength $\lambda_{f1}$, the wavelength multiplexer/demultiplexer/spectrometer comprising:

at least one input slit;
a plurality of output slits; and
a curved grating, the curved grating configured for processing the spectra compositions of the optical beam including a plurality of grooves, the position of each groove being adjustable for controlling a performance of the wavelength multiplexer/demultiplexer/spectrometer, and the position of the input slit and each of the output slits being adjustable for controlling a performance of the wavelength multiplexer/demultiplexer/spectrometer, wherein the input slit allows an entry of the optical beam into the wavelength multiplexer/demultiplexer/spectrometer, a location of the input slit being adjustable, and further the location of the input slit $X_{f1}$ specified by a first input angle $\theta_{f1}$ that is sustained between the line joining the input slit to the grating center and a normal line to the grating center, and a first input distance $S_{f1}$ from the grating center to the input slit;

further wherein a first output slit for allowing the exiting of a first output optical beam having a first anchor output wavelength $\lambda_{f1-O1A}$, a location of the first anchor output slit being adjustable, and further the location of the first anchor output slit specified by a first output angle $\theta_{O1A}$ that is sustained between the line joining the first output slit to the grating center and a normal line to the grating center, and a first output distance $S_{O1A}$ from the grating center to the first anchor output slit, further wherein a medium in which the light propagates in having an effective refractive index of propagation "$n_{gr}$";

wherein in the case of free space, $n_{gr}$ is the material refractive index;

wherein in the case of a planar waveguide, $n_{gr}$ is the effective refractive index of propagation within the planar waveguide;

further wherein a position of the $i^{th}$ groove is specified by its x-y coordinates $X_i = (x_i, y_i)$, the x-y coordinates are specified with respect to the grating center and the input slit, for which the grating center has the coordinate $X_0 = (0, 0)$ and the input slit has the coordinate $X_{f1} = (-S_{f1}*\text{Sin}(\theta_{f1}), S_{f1}*\text{Cos}(\theta_{f1}))$, wherein the given value of the input circle radius R where R is related to the input slit position by $S_{f1} = R*\text{Cos}(\theta_{f1})$, around the grating center at $X_0 = (0, 0)$, two initial grating teeth are chosen to be located at a distance "d" apart from each other so that they are placed at locations $$X_1 = (d/2, R - (R^2 - (d/2)^2)^{1/2})$$

and $$X_{-1} = (-d/2, R - (R^2 - (d/2)^2)^{1/2}),$$

where when given the first anchor output wavelength $\lambda_{f1-O1A}$, the distance "d" is to be determined as follows:

choosing a grating order and denoting the order by an integer "m", and obtaining the grating parameter "d" from $$d*(\text{Sin}(\Theta_{O1A}) + \text{Sin}(\Theta_{f1})) = m*\lambda_{f1-O1A}/n_{gr},$$

further wherein the locations of all other grooves are given by computing the coordinate of each groove with the $i^{th}$ groove's coordinate $X_i$ given by the following two conditions:

further wherein the locations of all other grooves are given by computing the coordinate of each groove with the $i^{th}$ groove's coordinate $X_i$ given by a first condition:

$$\text{Sgn}(i-ja)*([D_1(\Theta_{f1}, S_{f1}, X_i) + D_2(\Theta_{O1A}, S_{O1A}, X_i)] - [D_1(\Theta_{f1}, S_{f1}, X_{ja}) + D_2(\Theta_{O1A}, S_{O1A}, X_{ja})]) = m*\lambda_{f1-O1A}/n_{gr},$$

wherein $D_1(\Theta_{f1}, S_{f1}, X_i)$ is the distance from $X_i$ to the first input slit location $X_{f1}$ specified by $\theta_{f1}$ and $S_{f1}$, $D_2(\Theta_{O1A}, S_{O1A}, X_i)$ is the distance from $X_i$ to the first anchor output slit location specified by $\theta_{O1A}$ and $S_{O1A}$, and the position of groove ja, $X_{ja}$ is typically already known, and a second condition such that a function f is equal to a numerical constant, functionally expressed as:

$$f(X_i) = \text{constant}$$

where the above constant can be depending on other design parameters such as the input slit and output slit positions or the positions of the adjacent grooves (e.g. $\Theta_{f1}, S_{f1}, \Theta_{O1}, S_{O1}, \lambda_{f1-O1}, m, n_{gr}, \{X_j\}$) that are already known and treated as part of the constant, wherein the positions $\{X_j\}$ represent the positions of some grating teeth that are already known, wherein the second constraint is further given by choosing the function f so that:

$$[D_1(\theta_{f1}, S_{f1}, X_i) + D_3(\theta_{O2A}, S_{O2A}, X_i)] - [D_1(\theta_{f1}, S_{f1}, X_{i-1}) + D_3(\theta_{O2A}, S_{O2A}, X_{i-1})] = m*\lambda_{f1-O2A}/n_{gr},$$

wherein $D_3(\theta_{O2A}, S_{O2A}, X_i)$ is the distance from the i-th groove located at $X_i$ to the second anchor output slit specified by a third angle $\theta_{O2A}$ that is sustained between the line joining the second output slit to the grating center and a normal line of the grating center, and a second output distance $S_{O2A}$ from the grating center to the second output slit, wavelength $\lambda_{f1-O2A}$ is a second wavelength that is the wavelength for the second output slit given by:

$$d*(\text{Sin}(\Theta_{O2A}) + \text{Sin}(\Theta_{f1})) = m*\lambda_{f1-O2A}/n_{gr},$$

and by solving (2) and (4) for the x-coordinate $x_i$ and y-coordinate $y_i$ of the $i^{th}$ groove at $X_i=(x_i, y_i)$, exact locations of other grooves $X_i$'s are obtained, further wherein for more than one of the plurality of the output waveguides, the waveguide has a first tapering region forming the output mouth that tapered from the entrance mouth width to near or smaller than a waveguide width that supports only the fundamental mode, further wherein somewhere after the first tapering region is a first straight waveguide that can have zero length or a finite length, further wherein somewhere after the first straight waveguide is a section of first waveguide bending region, further wherein somewhere after the first waveguide bending region is a section of first waveguide fanning out region, further wherein somewhere after the first waveguide fanning out region is a second waveguide bending region to join the fanned out waveguide to a section of a first parallel propagating waveguide region, wherein at the first parallel propagating waveguide region, the adjacent waveguides are propagated almost parallel to each other, and the waveguide width is tapered out to larger than the fundamental mode width via a second tapering region, and close to the end of the first parallel propagating waveguide region, the waveguide is tapered back to near or smaller than the fundamental mode width via a third tapering region, further wherein after the third tapering region, is a section of a third waveguide bending region in which each waveguide undergoes a bending to connect to a second section of parallel propagating waveguide region, wherein at the second parallel propagating waveguide region, the adjacent waveguides are propagated almost parallel to each other, and the waveguide width is tapered out to larger than the fundamental mode width via a fourth tapering region, and close to the end of the second parallel propagating waveguide region, the waveguide is tapered back to near or smaller than the fundamental mode width via a fifth tapering region that can have a zero length or a finite length.

2. The wavelength multiplexer/demultiplexer/spectrometer as recited in claim 1, wherein the two anchor output slit positions $X_{O1A}$ and $X_{O2A}$, and the input slit position $X_{I1}$ are in-line such that they lie approximately along a straight line that passes through $X_{I1}$.

3. The wavelength multiplexer/demultiplexer/spectrometer as recited in claim 1, wherein two anchor output slit positions $X_{O1A}$ and $X_{O2A}$, and the input slit position $X_{I1}$ are descried by two lines, a first line called "anchor-output-slits line" $L_{AOS}$, joins $X_{O1A}$ and $X_{O2A}$ with a midpoint at $X_{AOSM}$, and a second line called "input to anchor-output-slits-midpoint line" $L_{IM}$, joins $X_{AOSM}$ and $X_{I1}$, wherein a line joining the input $X_{I1}$ to the grating center is called line $L_{I1}$, the angle between a line at 90 degrees to line $L_{I1}$ and the line $L_{IM}$ is $\theta_{IM}$, which takes on a value of 0° when line $L_{I1}$ and line $L_{IM}$ are perpendicular to each other, and take on a positive value when line $L_{IM}$ is rotated about the input slit point $X_{I1}$ in a direction to bring the point $X_{L(O1A,O2A)M}$ closer in its distance to the grating center, wherein a line joining the midpoint $X_{AOSM}$ to the grating center is called line $L_{GM}$, the angle between a line at 90 degrees to line $L_{GM}$ and the line $L_{IM}$ is $\theta_{GM}$, which takes on a value of 0° when line $L_{IM}$ and line $L_{GM}$ are perpendicular to each other, and take on a positive value when line $L_{IM}$ is rotated about the input slit point $X_{I1}$ in a direction to bring the point $X_{AOSM}$ closer in its distance to the grating center; and wherein the angle between line $L_{IM}$ and the line $L_{AOS}$ is $\theta_{AM}$, which takes on a value of 0° when line $L_{IM}$ and line $L_{AOS}$ are parallel to each other, and take on a positive value when line $L_{AOS}$ is rotated about its midpoint $X_{AOSM}$ in a direction that brings the "furthest end" of line $L_{AOS}$ from $X_{I1}$ closer in its distance to the grating center;

The two anchor output slit positions $X_{O1A}$ and $X_{O2A}$ are placed such that $\theta_{IM}$ is within +45° and −45° and $\theta_{AM}$ is within +45° and −45°.

4. The wavelength multiplexer/demultiplexer/spectrometer as recited in claim 3 wherein the two anchor output slit positions $X_{O1A}$ and $X_{O2A}$ are placed such that $\theta_{GM}$ is within +45° and −45° and $\theta_{AM}$ is within +45° and −45°.

5. The wavelength multiplexer/demultiplexer/spectrometer as recited in claim 3 wherein the two anchor output slit positions $X_{O1A}$ and $X_{O2A}$ are placed such that $\theta_{IM}$ is within +30° and −30° and $\theta_{AM}$ is within +30° and −30°.

6. The wavelength multiplexer/demultiplexer/spectrometer as recited in claim 3 wherein the two anchor output slit positions $X_{O1A}$ and $X_{O2A}$ are placed such that $\theta_{GM}$ is within +30° and −30° and $\theta_{AM}$ is within +30° and −30°.

7. The wavelength multiplexer/demultiplexer/spectrometer as recited in claim 3 wherein the two anchor output slit positions $X_{O1A}$ and $X_{O2A}$ are placed such that $\theta_{IM}$ is within +15° and −15° and $\theta_{AM}$ is within +15° and −15°.

8. The wavelength multiplexer/demultiplexer/spectrometer as recited in claim 3 wherein the two anchor output slit positions $X_{O1A}$ and $X_{O2A}$ are placed such that $\theta_{GM}$ is within +15° and −15° and $\theta_{AM}$ is within +15° and −15°.

9. The wavelength multiplexer/demultiplexer/spectrometer as recited in claim 1, wherein the plurality of more than one output slits with location positions at $X_{O1}, \ldots X_{Ok}$ wherein $X_{Ok}$ is determined as follows:

defining a point P to have position given by $X_{L(i,i-1)I1-OkP}=(x_{L(i,i-1)I1-OkP}, y_{L(i,i-1)I1-OkP})$, where $x_{L(i,i-1)I1-OkP}=-S_{L(i,i-1)I1-OkP}*\mathrm{Sin}(\Theta_{L(i,i-1)I1-OkP})$ and $y_{L(i,i-1)I1-OkP}=S_{L(i,i-1)I1-OkP}*\mathrm{Cos}(\Theta_{L(i,i-1)I1-OkP})$, for which the following equation is satisfied based on the grating grooves of number "i" and number "(i−1)":

$$[D_1(\Theta_{I1},S_{I1},X_i)+D_2(\Theta_{L(i,i-1)I1-OkP},S_{L(i,i-1)I1-OkP},X_i)]-[D_1(\Theta_{I1},S_{I1},X_{i-1})+D_2(\Theta_{L(i,i-1)I1-OkP},S_{L(i,i-1)I1-OkP},X_{i-1})]=m*\lambda_{I1-Ok}/n_{grI1-Ok}$$

wherein the locus of all position point P forms a line $L_{(i,i-1)I1-Ok}$, wherein $D_2(\Theta_{L(i,i-1)I1-OkP},S_{L(i,i-1)I1-OkP},X_i)$ is the distance from $X_i$ to the point P on line $L_{(i,i-1)I1-Ok}$ c(i,i−1)L, $D_1(\Theta_{I1},S_{I1},X_i)$ is the distance from $X_i$ to the first input slit at $X_{I1}$, Line $L_{(i,i-1)I1-Ok}$ is generated when $S_{L(i,i-1)I1-OkP}$ 19-189kP(i,i−1)S increases from an initial small value to a value larger than the estimated position of $S_{Ok}$;

wherein the second line, Line $L_{(j,j-1)I1-Ok}$ is generated with grating grooves of number "j" and "(j−1) for which a point Q having position given by $X_{L(j,j-1)I1-OkQ}=(x_{L(j,j-1)I1-OkQ}, y_{L(j,j-1)I1-OkQ})$, where $x_{L(j,j-1)I1-OkQ}=-S_{L(j,j-1)I1-OkQ}*\mathrm{Sin}(\Theta_{L(j,j-1)I1-OkQ})$ and $y_{L(j,j-1)I1-OkQ}=S_{L(j,j-1)I1-OkQ}*\mathrm{Cos}(\Theta_{L(j,j-1)I1-OkQ})$, for which the following equation is satisfied based on the grating grooves of number "j" and number "(j−1)":

$$[D_1(\Theta_{I1},S_{I1},X_j)+D_2(\Theta_{L(j,j-1)I1-OkQ},S_{L(j,j-1)I1-OkQ},X_j)]-[D_1(\Theta_{I1},S_{I1},X_{j-1})+D_2(\Theta_{L(j,j-1)I1-OkQ},S_{L(j,j-1)I1-OkQ},X_{j-1})]=m*\lambda_{I1-Ok}/n_{grI1-Ok}$$

wherein the locus of all position point Q forms a line $L_{(j,j-1)I1-Ok}$, wherein the grating groove pairs (j,j−1) for grating grove at $X_j$ and $X_{j-1}$ are chosen to lie on the opposite side of the grating center from that of grating groove pair (i,i−1) for grating grove at $X_i$ and $X_{i-1}$, and the location of $X_{Ok}$ of output slit k that shall receive beam spectral component at wavelength $\lambda_{I1\text{-}Ok}$ is then chosen to be a point near the point $X_{Okest}$, called the estimated output location, where the point $X_{Okes}$ is obtained by a function $V=V(\{X_{Ok(i,i-1;j,j-1)}\})$ that is dependent on all the vectors $X_{Ok(i,i-1;j,j-1)}$ generated by a selected set of the grating groove pairs with different values of i,i−1 or j,j−1, such that:

$$X_{Okest}=V(\{X_{Ok(i,i-1;j,j-1)}\})$$

wherein near is within three times the beam diameter generated by the input beam at $X_{Okest}$ defined by the full-width half-maximum of the beam intensity width, or three times the width $W_{Ok}$ of the slit at $X_{Ok}$, whichever is larger.

10. The wavelength multiplexer/demultiplexer/spectrometer as recited in claim 9, wherein the location of $X_{Ok}$ of output slit k that shall receive beam spectral component at wavelength $\lambda_{I1\text{-}Ok}$ is then chosen to be a point very near the point $X_{Okest}$, called the estimated output location, where the point $X_{Okes}$ is obtained by a function $V=V(\{X_{Ok(i,i-1;j,j-1)}\})$ that is dependent on all the vectors $X_{Ok(i,i-1;j,j-1)}$ generated by a selected set of the grating groove pairs with different values of i,i−1 or j,j−1, so that:

$$X_{Okest}=V(\{X_{Ok(i,i-1;j,j-1)}\})$$

wherein very near is within half the beam diameter generated by the input beam at $X_{Okest}$ defined by the full-width half-maximum of the beam intensity width, or half the width $W_{Ok}$ of the slit at $X_{Ok}$, whichever is larger.

11. The wavelength multiplexer/demultiplexer/spectrometer as recited in claim 9, wherein the location of $X_{Ok}$ of output slit k that shall receive beam spectral component at wavelength $\lambda_{I1\text{-}Ok}$ is then chosen to be a point at the point $X_{Okest}$, called the estimated output location, where the point $X_{Okes}$ is obtained by a function $V=V(\{X_{Ok(i,i-1;j,j-1)}\})$ that is dependent on all the vectors $X_{Ok(i,i-1;j,j-1)}$ generated by a selected set of the grating groove pairs with different values of i,i−1 or j,j−1, so that:

$$X_{Okest}=V(\{X_{Ok(i,i-1;j,j-1)}\})$$

wherein at is within 10% of the beam diameter generated by the input beam at $X_{Okest}$ defined by the full-width half-maximum of the beam intensity width, or 10% of the width $W_{Ok}$ of the slit at $X_{Ok}$, whichever is larger.

12. The wavelength multiplexer/demultiplexer/spectrometer as recited in claim 9, wherein $V=V(\{X_{Ok(i,i-1;j,j-1)}\})$ involves a weighted average of the intersecting points between pairs of lines in which the averaging is weighted by multiplying the solution $X_{Ok(i,i-1;j,j-1)}$ with the total input beam power or its positive power exponential that reaches both grating groove i,i−1 pair and groove j,j−1 pair, and by vectorially summing up all vectors obtained after such multiplications computed from a set of vectors $X_{Ok(i,i-1;j,j-1)}$ obtained from a selected set of grooves, and divided by the sum of the total input beam power used in the weighting multiplications, then gives the x and y coordinate values $x_{Okest}$ and $y_{Okest}$ for obtaining the estimated output slit location $X_{Okest}=(x_{Okest}, y_{Okest})$, wherein $P_{I1(i,i-1;j,j-1)}$ is the total input beam power that falls on the surfaces of both groove i,i−1 pair and groove j,j−1 pair from input slit $SL_{I1}$ due to beam spatial diffraction from the input slit $SL_{I1}$, then $X_{Okest}$ is given by:

$$X_{Okest}=V(\{X_{Ok(i,i-1;j,j-1)}\})=[\text{Sum}(\{i,i-1;j,j-1\}) ([P_{I1(i,i-1;j,j-1)}]^N \times X_{Ok(i,i-1;j,j-1)})]/[\text{Sum}(\{i,i-1;j,j-1\})(P_{I1(i,i-1;j,j-1)})],$$

where $\text{Sum}(\{i,i-1;j,j-1\})$ denotes sum over the range of all the i,i−1 and j,j−1 pairs in the set $\{i,i-1;j,j-1\}$ defined above, and N in Eq. ( ) is taking P to the power of N, where N is a positive real number larger than 0.

13. The wavelength multiplexer/demultiplexer/spectrometer as recited in claim 9, wherein $V=V(\{X_{Ok(i,i-1;j,j-1)}\})$ involves a weighted average of the intersecting points between pairs of lines in which the averaging is weighted by multiplying the solution $X_{Ok(i,i-1;j,j-1)}$ with a function that depends on total input beam power that reaches both grating groove i,i−1 pair and groove j,j−1 pair, and vectorially summing up all vectors obtained after such multiplications computed from a set of vectors $X_{Ok(i,i-1;j,j-1)}$ obtained from a selected set of grooves, and divided by the sum of the total input beam power used in the weighting multiplications, then gives the x and y coordinate values $x_{Okest}$ and $y_{Okest}$ for obtaining the estimated output slit location $X_{Okest}=(x_{Okest}, y_{Okest})$, wherein $P_{I1(i,i-1;j,j-1)}$ is the total input beam power that falls on the surfaces of both groove i,i−1 pair and groove j,j−1 pair from input slit $SL_{I1}$ due to beam spatial diffraction from the input slit $SL_{I1}$, then $X_{Okest}$ is given by:

$$X_{Okest}=V(\{X_{Ok(i,i-1;j,j-1)}\})=[\text{Sum}(\{i,i-1;j,j-1\}) (f[P_{I1(i,i-1;j,j-1)}] \times X_{Ok(i,i-1;j,j-1)})]/[\text{Sum}(\{i,i-1;j,j-1\})(P_{I1(i,i-1;j,j-1)})],$$

and where $f[P_{I1(i,i-1;j,j-1)}]$ is any mathematical function of $P_{I1(i,i-1;j,j-1)}$.

14. The wavelength multiplexer/demultiplexer/spectrometer as recited in claim 13, wherein one or both of the two anchor output slits are not physically present, and are only used for the purpose of generating the grating teeth.

15. A second device wavelength multiplexer/demultiplexer/spectrometer with a grating that is basically the same design as recited in claim 1, wherein two gratings are the same design if a set of grooves involved in reflecting more than 50% of the total power reflected by the grating towards the same output slit location has each of its groove's $\delta S$ satisfying $\delta S < \lambda_{I1\text{-}O1A}/(n_{gr})$, where $\delta S=(\delta x^2+\delta y^2)^{0.5}$ with $\delta x$ being the spatial deviation of grating groove position in the second device from the designed position of claim 1 in the x-coordinate and $\delta y$ being the spatial deviation of grating groove position in the second device from the designed position of claim 1 in the y-coordinate.

16. The wavelength multiplexer/demultiplexer/spectrometer as recited in claim 9, wherein Eq. (1C): $d^*(\text{Sin}(\Theta_{O1A})+\text{Sin}(\Theta_{I1}))=m^*\lambda_{I1\text{-}O1A}/n_{gr}$, is replaced by the more accurate:

$$[D_1(\theta_{I1},S_{I1},X_1)+D_2(\theta_{O1A},S_{O1A},X_1)]-[D_1(\theta_{I1},S_{I1},X_{-1})+D_2(\theta_{O1A},S_{O1A},X_{-1})]=m^*\lambda_{I1\text{-}O1A}/n_{grI1\text{-}O1A}$$

further, Eq. (53): $d^*(\text{Sin}(\Theta_{O2A})+\text{Sin}(\Theta_{I1}))=m^*\lambda_{I1\text{-}O2A}/n_{gr}$, is replaced by the more accurate:

$$[D_1(\theta_{I1},S_{I1},X_1)+D_2(\theta_{O2A},S_{O2A},X_1)]-[D_1(\theta_{I1},S_{I1},X_{-1})+D_2(\theta_{O2A},S_{O2A},X_{-1})]=m^*\lambda_{I1\text{-}O2A}/n_{grI1\text{-}O2A}.$$

\* \* \* \* \*